United States Patent [19]

Lofgren et al.

[11] Patent Number: 5,588,044

[45] Date of Patent: Dec. 24, 1996

[54] VOICE RESPONSE SYSTEM WITH PROGRAMMING LANGUAGE EXTENSION

[75] Inventors: Dan M. Lofgren, Milpitas; William A. Dietrich, Sunnyvale, both of Calif.

[73] Assignee: Voysys Corporation, Fremont, Calif.

[21] Appl. No.: 343,721

[22] Filed: Nov. 22, 1994

[51] Int. Cl.[6] .......................... G06F 15/419; H04M 1/64
[52] U.S. Cl. .............................. 379/67; 379/88; 379/201; 379/207
[58] Field of Search ................................ 379/67, 88, 89, 379/201, 207; 395/600

[56] References Cited

U.S. PATENT DOCUMENTS

| | | | |
|---|---|---|---|
| 4,695,977 | 9/1987 | Hansen ..................................... | 379/201 |
| 5,113,430 | 5/1992 | Richardson .............................. | 379/207 |
| 5,125,024 | 6/1992 | Golen ....................................... | 379/88 |
| 5,201,046 | 4/1993 | Goldberg ................................. | 395/600 |
| 5,255,305 | 10/1993 | Sattar ...................................... | 379/201 |
| 5,354,069 | 10/1994 | Guttman et al. ......................... | 273/439 |

OTHER PUBLICATIONS

Informix Software, Inc., "Informix–4GL Rapid Development System, SQL–Based Application Development Language" (Unix Products Installation Guide & Release Notes) (Nov. 1988), pp. 1–59–1–76.
InterVoice, "Voice Response Solutions" (data sheet) (1993).
Microsoft Corporation, "Microsoft® FoxPro® Library Construction Kit" (Developer's Guide), Ver. 2.5 (1993).
National Semiconductor Corporation, "TyIN 4000 Pro Personal Communication Assistant–Getting Started" (manual) (1994).
Pronexus, "VBvoice; Visual Basic & VB Voice: A Complete Solution" (brochure) (Jun. 1994).
Pronexus, "VBvoice" (Press Release) (Jun. 2, 1994).
Stylus Innovation, Inc., "Visual Voice™ Technical Specifications" (1993).
Stylus Innovation, Inc., "Visual Voice™ Turns Visual Basic into a Voice Processing Powerhouse" (1993).
Applied Voice Technology, "Automated Agent–IVR", Part No. 085–00520–00 (brochure).
Centrigram Communications Corp., "Faxmemo: Centigram's Comprehensive Fax Management Solution", Part No. 2720–0046–01 (brochure) (Jul. 1994).
Centrigram Communications Corp., "AIP120: good Things Do Come in Small Packages", Part No. 2720–0024–01 (brochure) (Oct. 1994).
Centrigram Communications Corp., "Callagent: Advanced Call Processing for Companies, Departments, and Individuals", Part No. 2720–0047–01 (brochure) (Aug. 1994).
Pronexus, "VB Voice" (User's Guide, Control Reference and Announce? Voice Editor), Release 1.2 (Jun. 1994).
Stylus Innovation, Inc., "Visual Voice™ Pro", Version 2.01 (User's Manual) (1994).

*Primary Examiner*—Krista M. Zele
*Assistant Examiner*—Parag Dharia
*Attorney, Agent, or Firm*—Fliesler, Dubb, Meyer & Lovejoy

[57] ABSTRACT

A telephony voice response system includes a database language sequencer, a database control module having a plurality of procedures callable by the database language for performing database operations, and a telephony control module having a plurality of procedures callable by the database language sequencer for performing telephony operations. The telephony operations can include speaking a predefined prompt onto a telephony channel, receiving and storing DTMF-encoded input from the telephony channel, and recording audio input from the telephony channel. The database language sequencer calls the database control module procedures and the telephony control module procedures in a sequence defined by a program prepared according to a database language. The telephony voice response system can control multiple telephony channels by running a separate task for each such channel under a multitasking operating system. A common channel server task is provided which manages the resources of the telephony card for all of the individual channel tasks.

24 Claims, 4 Drawing Sheets

VOICE RESPONSE SYSTEM WITH PROGRAMMING LANGUAGE EXTENSION

BACKGROUND

1. Field of the Invention

The invention relates to telephony voice response systems, and more particularly, to the extension of database languages to handle telephony voice response functions.

2. Description of Related Art

An interactive voice response (IVR) system is a system which allows callers to use a telephone to interact with a remote computer and retrieve data from, or enter data into, one or more databases. Usually callers enter information and commands by pressing buttons on a tone-generating telephone. The telephone generates a DTMF-encoded (dual-tone multi-frequency) signal in response to such buttons, and transmits the tones to the voice response system. The voice response system decodes the tones to determine which buttons were pressed, and proceeds accordingly. In other systems, callers enter information and commands by speaking into the telephone. In such a situation, the voice response system recognizes the words spoken and proceeds accordingly. IVR systems can be as simple as ordinary voice mail systems, or can be highly complex, with multiple menus and caller-data-entry facilities. They can support either a single telephony channel or multiple simultaneously active telephony channels.

IVR systems are typically developed by programming a general purpose computer system that has telephony hardware installed. For example, IVR systems often include a DOS-based personal computer with a telephony expansion card installed, such as a TyIN 4000 Pro Personal Communication Assistant, available from National Semiconductor Corporation, Santa Clara, Calif., or a Model D/41 available from Dialogic Corporation, Parsippany, N.J.

IVR systems usually need to have a high degree of flexibility for customization by value-added resellers (VARs) and by the MIS departments of end-user customers. VARs will often customize an IVR system for the needs of a particular customer, and many customers need to be able to modify their IVR systems themselves to meet changing requirements for their callers.

In the past, many IVR systems were difficult to customize because they were programmed in an ordinary, general purpose program language, such as C or C++. In order to speed application development and customization, some IVR system suppliers have developed proprietary libraries of C-language procedures which could manage both the control of the telephony hardware and also the data that the caller is accessing. Other suppliers have developed proprietary scripting languages, and provide an interpreter program written in C (or another general purpose programming language). The interpreter follows a script prepared by the developer. Still other suppliers have developed form, table or graphical (GUI) programming environments for IVR system development or customization. VARs and enduser customers have found all of these mechanisms difficult to learn and use, however, and this has restricted the growth of the IVR market.

One of the problems with the above mechanisms for IVR system development is that while they may be well-suited to managing the telephony aspects of the system, they are not as well suited to managing the database aspects of the system. Database management is best performed by facilities which are designed for that purpose, namely database management systems. A database management system (DBMS) is a software package designed to operate on a collection of one or more computer-stored files, or what is referred to as a database. Its primary operation is to select database records that have user-specified common characteristics, and retrieve those records for further processing and display. The database management system also adds new records to the database, and modifies existing records as desired. A typical database management system can include a non-procedural user interface through which a user at a terminal can cause the DBMS to perform desired operations on the database. A typical DBMS also includes a high-level programming language (referred to herein as a database language or a DBMS language) that can be used procedurally to operate on the data in the database. Often both the non-procedural interface and the procedural interface call a common set of procedures, referred to herein as the database engine, to perform the desired operations on the database. The simple, high-level commands supported by DBMSs to manage a database, such as "seek", "replace", "sort", and so on, are quite powerful. However, DBMSs do not support telephony functions.

It is desirable to use DBMSs in IVR applications also because they inherently manage their databases in the "native format" of the DBMS. Unlike general purpose programming languages which provide enormous flexibility to programmers in the formation of data structures, database management systems organize their databases in a predefined format which users rarely, if ever, need to understand. The high-level commands of a DBMS obviate any necessity for the programmer to be concerned with the underlying format in which the data is actually stored.

Once the data is already maintained in the DBMS native format, a host of additional applications become possible. DBMS language programs can be written easily to operate on the data independently of the telephony connections. For example, a bank might create and manage all of its account information using a DBMS, and have an IVR system for customers to call to retrieve such information. Such an IVR system would need to be able to obtain the desired information from the database in the DBMS native format. As another example, an IVR system might be designed to obtain information from callers and place the information in a database; reports can then be easily generated from the data using the various user interfaces of the DBMS. Thus an IVR system which maintains its data in the native format of a DBMS can be much more tightly integrated with the remainder of the customer's business.

In one conventional attempt to integrate native format database management in IVR systems, the IVR system and a database management system were set up to operate independently on two separate computer systems. The IVR system communicated with the DBMS system via terminal emulation, in which the IVR system acted as a user terminal communicating and receiving individual characters from a non-procedural terminal interface of the DBMS. The software for the IVR system was written in a general purpose programming language, and the character stream to and from the DBMS system took place through an ordinary I/O port of the IVR system computer. As might be expected, the terminal emulation technique can be extremely slow, inflexible, and arcane.

Another way that IVR system developers have sought to operate on a database in a native DBMS format, as part of an IVR system, was to provide a procedure library, written in a general purpose programming language such as C, which could be compiled with or linked to the main program module of the IVR application, also written in C. However, this technique required a detailed understanding of the DBMS native format and, in large part, duplicated all of the effort that DBMS manufacturers had already expended in the development of their own database engines and tools. It is also rare for IVR system developers to have the expertise necessary to optimize database management software to run as efficiently as that available from the DBMS manufacturer.

Accordingly, as can be seen, prior attempts to integrate IVR systems with native format DBMS databases have left much to be desired. The present invention achieves such integration much more effectively.

SUMMARY OF THE INVENTION

Many existing DBMS languages can be extended using library extension modules. Thus a developer of a database language program can create a proprietary library for operating on the database or for performing other functions, and can then access the procedures of the library in the same manner as the ordinary procedures of the database engine are accessed. For example, the FoxPro® database management system, available from Microsoft®, includes a "library construction kit" which allows developers to create external libraries of C-language routines that can be integrated into any FoxPro application through a predefined external Fox-Pro application programing interface (API). Once the library is installed, a FoxPro language program invokes an extension procedure merely by calling it in the same manner that it calls FoxPro built-in procedures. The FoxPro library construction kit is described in Microsoft, "FoxPro® Library Construction Kit, Developer's Guide" (1993), incorporated herein by reference.

Another example of a DBMS which allows language extensions is Informix 4GL. Extensions for this database language are described in Informix, "Informix-4GL Rapid Development System, Unix Products Installation Guide and Release Notes", Rev. A, pp. 1-59–1-76 (1988), incorporated herein by reference.

These DBMS systems can be thought of as being organized into three components: (1) a database language sequencer module, which follows a database language script (either as an interpreter or as compiled code); (2) a database engine module which contains the DBMS's built-in procedures for operating on the database; and (3) the extension library module, which contains the developer's extension library procedures. The database language sequencer traverses the script, and calls the procedures in either the database engine module or the extension module as required by the script. The interface to these procedures is the same for both the database engine module and the extension module, as set forth in the above-incorporated references.

Although extension library capabilities have been available in DBMS languages for a long time, they have not heretofore been used for telephony operations. One possible reason for this is that those working in the telephony field developing IVR applications, are used to working in either general purpose programming languages such as C, or in specialized languages developed specifically for telephony operations only.

Accordingly, the invention involves the addition of a telephony library extension to a DBMS that has a programming language, with the resulting combination executing on computer hardware to form a telephony server. In one embodiment, telephony server apparatus includes a database and software instructions executable by a processor structure, the software instructions including a database language sequencer, a database control module having a plurality of procedures callable by the database language for performing at least one database operation, and a telephony control module having a plurality of procedures callable by the database language sequencer for performing at least one telephony operation. The database operations include at least the operations of reading and writing data to a database, and the telephony operations include at least the operations of speaking a predefined prompt onto a telephony channel, receiving and storing DTMF-encoded input from the telephony channel, and recording audio input from the telephony channel. The database language sequencer calls the database control module procedures and the telephony control module procedures in a sequence defined by a program prepared according to the rules of a database language. The database language sequencer can include either an interpreter or compiled code.

The telephony server apparatus can control multiple telephony channels by running a separate task for each such channel under a multitasking operating system. The above software can be instantiated separately for each task, or parts can be separated out and provided in a common task communicating with the individual channel tasks via inter-process communication (IPC), shared memory, or by another mechanism. In one embodiment, a common channel server task is provided which manages the resources of the telephony card for all of the individual channel tasks.

BRIEF DESCRIPTION OF THE DRAWINGS

The invention will be described with respect to particular embodiments thereof, and reference will be made to the drawings, in which.

DETAILED DESCRIPTION

I. HARDWARE ARCHITECTURE

Figure 1:
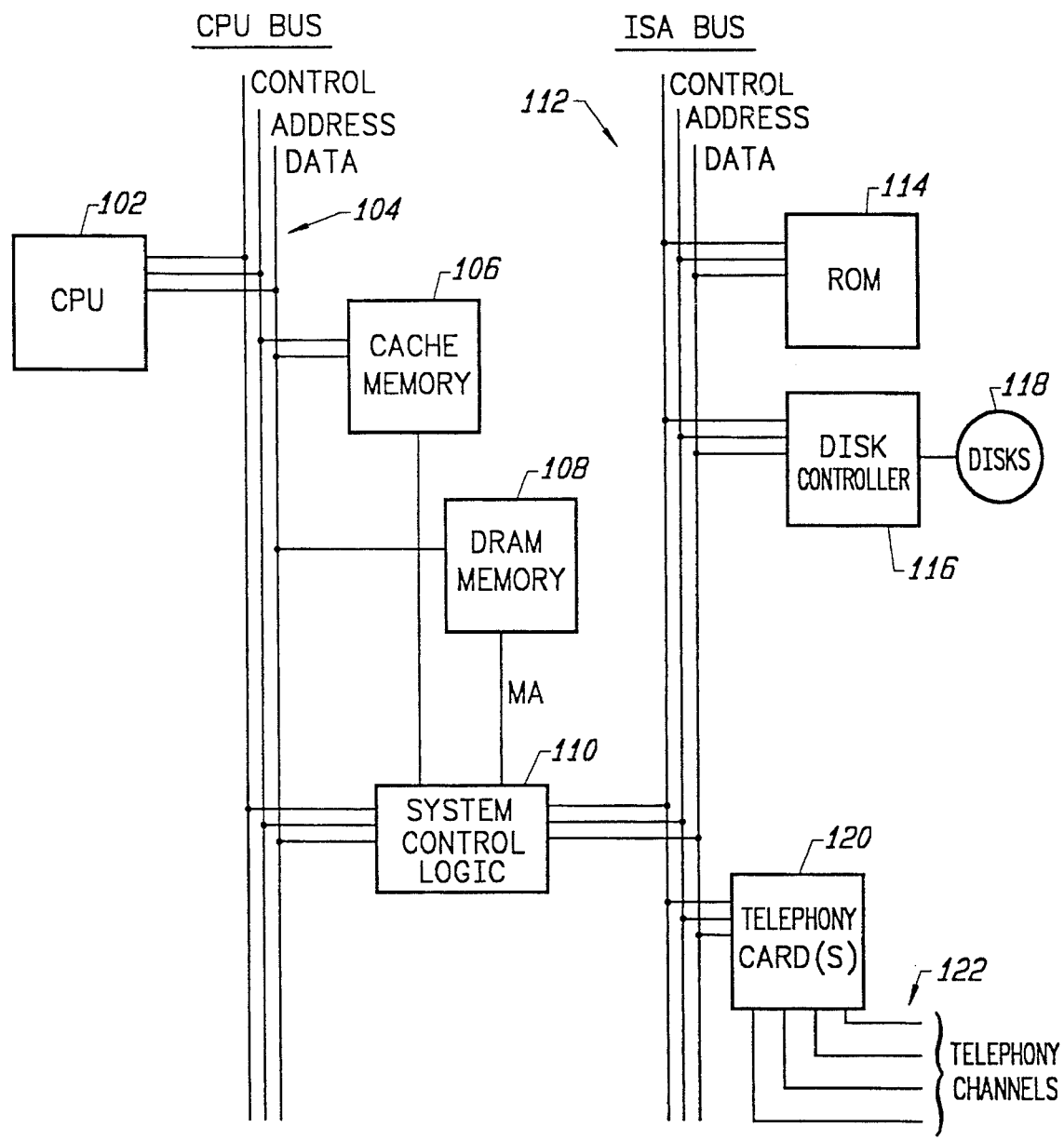
FIG. 1 is a symbolic block diagram of an IBM PC/AT-compatible personal computer incorporating features of the invention.

FIG. 1 is a symbolic block diagram of an IBM PC/AT-compatible personal computer incorporating features of the invention. It comprises a CPU 102, which may be an Intel 80486 compatible CPU or an Intel Pentium processor, for example. The CPU 102 has address, data and control lines which are connected to a CPU bus 104. The CPU bus 104 is also connected to a cache memory 106 and to DRAM memory 108, both of which are controlled by system control logic 110. The system control logic 110 is connected to the CPU bus 104 and also to control, address and data lines of an ISA bus 112. Connected to the ISA bus 112 is a ROM 114 containing the system BIOS, a disk controller 116 for floppy and hard-disk drives 118, and one or more telephony cards 120 connected to a plurality of telephony channels 122. The telephony card 120 is a model D/41, available from Dialogic Corporation, Parsippany, N.J. In another embodiment, the telephony card is a TyIN 4000 Pro, available from National Semiconductor, Santa Clara, Calif. The Dialogic board is described in Dialogic, "Voice Hardware Reference" (Dialogic Ref. No. OS-0147-002) (1994), incorporated by reference herein. The TyIN 4000 Pro is described in National Semiconductor, "TyIn 4000 Pro, Getting Started" (1994), incorporated herein by reference. The system of FIG. 1 illustrates only one platform which can run software according to the invention. Numerous other platforms can also suffice, such as Macintosh-based platforms available from Apple Computer, Inc., platforms with different local bus configurations, networked platforms, multi-processor platforms, and so on.

The telephony channels 122 represent separate analog phone lines for each channel. However, a wide variety of other implementations are possible. For example, the telephony channels 122 could represent separate logical channels all carried on one or more telephone-company-provided T1 connections or higher. As another example, the telephony channels 122 may be carried on one or more ISDN BRI or PRI links into the public switched telephone network. In either case, the telephony cards 120, together with any software drivers, are responsible for presenting the appearance of separate, individual channels (also referred to herein as telephony lines) to higher level software.

Because of the numerous types of hardware platforms which can run software according to the invention, the term "processor structure" as used herein will refer to the CPU or CPUs of single or multiple processor arrangements, whether located in a single box or distributed across a network. Similarly, due to the possibility of paging and overlay mechanisms of different operating systems and application programs as well as memory, disk and network caching, the term "memory structure" includes both volatile and non-volatile memory, mass storage and cache memories, whether these types of memory are all located in a single box or distributed across a network.

II. SOFTWARE ARCHITECTURE

Figure 2:
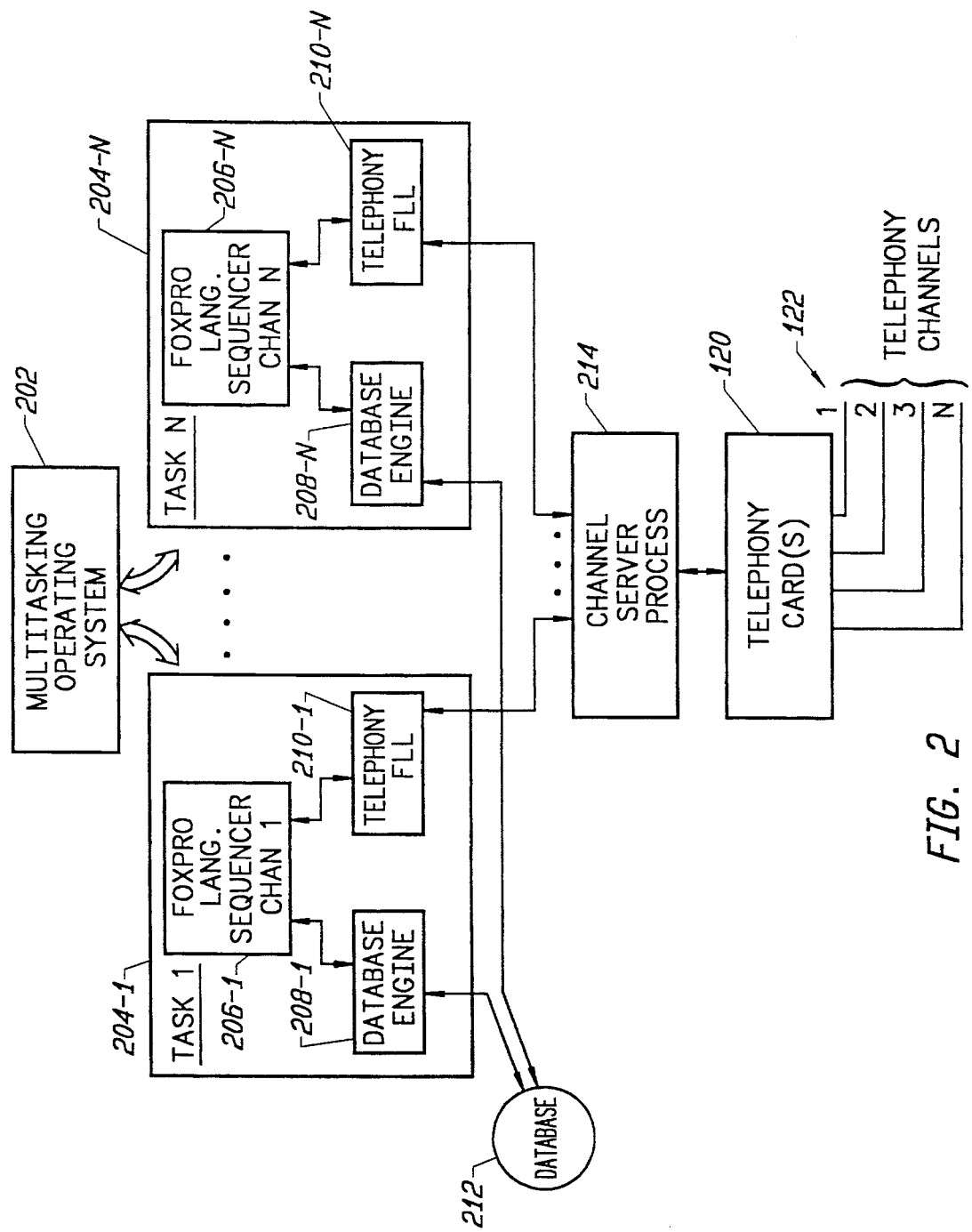
FIG. 2 is a block diagram of the software architecture used in the system of FIG. 1.

FIG. 2 is a block diagram of the software architecture used in the present embodiment. The software runs under a multitasking operating system such as Microsoft Windows, Windows NT or UNIX. As used herein, the term "multitasking operating system" includes permissive multitasking operating systems as well as preemptive multitasking operating systems. Preferably, the operating system 202 in FIG. 2 is Microsoft Windows. All of the software and data illustrated in FIG. 2 is present in the memory structure of FIG. 1, although because of paging, memory caching and disk caching and other memory management mechanisms, different parts may at different times be located physically in one or more of the different components of the memory structure.

In the architecture of FIG. 2, each of the telephony channels is associated with a separate concurrent task (also called a concurrent process) running under the operating system 202. The term "concurrent task" does not require that their instructions be executing simultaneously, although this may be possible on a multi-processor system. In FIG. 2, N tasks are shown, 204-1, . . . 204-N (collectively, 204). In one embodiment, these tasks are all created upon initialization of the IVR system, whereas in another embodiment, the tasks are created only as their associated telephony channels become active.

In a multitasking operating system, a task (or process) can be thought of as being divided into two components: software instructions which are executable by the processor structure, and data. Data is further divisible into read-only data and read-write data. When two tasks are running the same software, the read-write data for each task is maintained in a separate region of the memory structure, whereas, depending on the operating system, there may either be a separate copy of the software instructions and read-only data for each task or the different tasks can share the same copy of the software instructions and read-only data. In the present embodiment, a single copy of the software instructions and read-only data is shared. See Pietrek, "Windows Internals," Addison-Wesley, pp. 216–218 (1993). The entire Pietrek text is incorporated by reference herein. Whether or not two tasks running the same program share their software instructions and read-only data, the program is considered herein to be separately "instantiated" for each of the tasks.

Each of the tasks in FIG. 2 can be thought of as including three modules 206-i, 208-i and 210-i. The module 206-i is a database language sequencer. The sequencer is the portion which the IVR system developer creates or modifies in order to define the caller's experience with the IVR system. Voice prompts are set up in the sequencer module, as are menu hierarchies, actions in response to caller input, and so on. In order to facilitate the extensive data manipulation and data access which sophisticated IVR systems usually require, the IVR system developer creates the sequencer 206-i using a feature-rich database language rather than with a minimal IVR language or general purpose programming language. Any database language can be used in different embodiments of the invention. The embodiment described herein uses FoxPro, but the languages of many other database systems can be used instead, such as dbase, Paradox, Oracle/SQL, Clipper, and so on.

Figure 3:
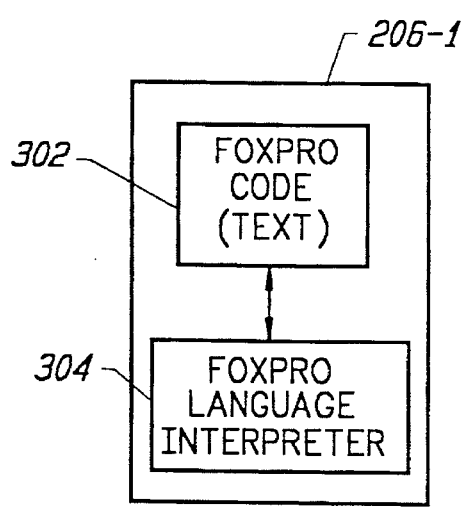
FIG. 3 is a detail of a sequencer of FIG. 2.

The DBMS-language sequencer 206-i can include either a fully compiled version of the developer's DBMS language code, or can include the combination of the DBMS-language code in text form plus an interpreter. Other variations are also possible, such as the combination of a tokenized version of the developer's DBMS code plus a traverser for sequencing through the tokens. FIG. 3 illustrates the interpreter variation. As can be seen, the sequencer 206-i includes the FoxPro code 302 in text form as written by a developer, and a FoxPro language interpreter 304 which parses the FoxPro code 302 in order to determine which actions to take. In this variation, the interpreter 304 includes software instructions executable by the processor structure, which may be shared between tasks, while the FoxPro code 302 is considered read/write data and is not shared between the tasks. However, in another embodiment, the FoxPro code 302 may be shared between tasks. Note that it will typically be desired that most, if not all, of the telephony channels should present the same user experience to callers. In this case, if the FoxPro code 302 is not actually shared, it can at least be identical among all the channels that require the same handling.

Figure 4:
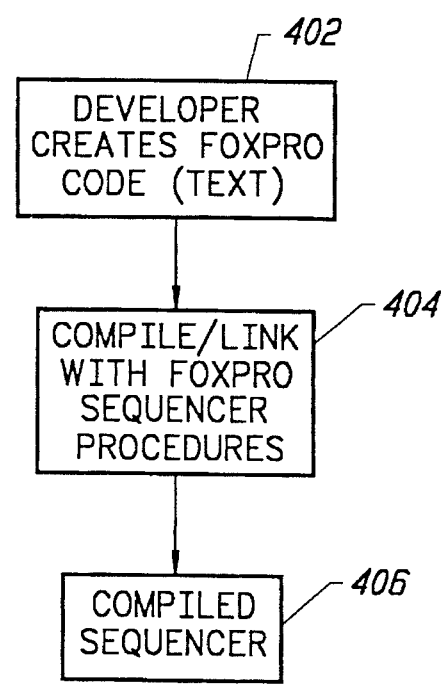
FIG. 4 is a flowchart illustrating the creation of a sequencer in FIG. 2.

FIG. 4 is a flowchart illustrating the creation of the sequencer 206-1 in the variation in which the sequencer constitutes compiled code. In a step 402, the developer prepares the FoxPro code in text form. This may be the same code as 302 in FIG. 3. In step 404, the FoxPro code is compiled using the FoxPro DBMS compiler in the FoxPro Distribution Kit, available from Microsoft Corporation, Redmond, Wash. This compiler is described in Microsoft, "FoxPro User's Guide" pp. U6-12–U6-15 (1993). (The entire User's Guide is incorporated herein by reference.) In step 406 the compiled sequencer 206-1 has been created.

Since each task 204-i in FIG. 2 corresponds to a separate telephony channel 122, the IVR system developer can prepare the FoxPro code used to create the sequencer 206-i, as if only one telephony channel was to be handled. The developer need not be concerned with any other telephony channel, or even with the possibility that more than one telephony channel may exist, since all consequences of these possibilities are handled by the multitasking operating system 202 and/or the channel server process 214 described below.

Returning to FIG. 2, the module 208-i represents a database engine for the particular DBMS in which the IVR system's developer's code was prepared. In the presently described embodiment, database engine 208-i is the FoxPro database engine, available from Microsoft Corporation and incorporated herein by reference.

All of the database engines 208-i contain a set of database management procedures which are callable by the sequencer 206-i in order to manage the data in a common database 212. The database 212 is stored in the memory structure of the computer system of FIG. 1, and for the most part on the disks 118 of such memory structure.

The module 210-i contains a library of telephony-related procedures callable by the sequencer 206-i. The module 210-i can be provided to the IVR system developer in compiled form, so the developer need not be concerned at all with its contents (except to know the identity of, and syntax for, the procedures which may be called from the FoxPro language code). In the situation where the DBMS language used is FoxPro, and the operating system 202 is Microsoft Windows, then the procedures of the module 210-i are preferably written in C and compiled and linked together to create an .FLL (FoxPro Linked Library). The procedures of FLL 210-i are described in more detail below.

The telephony modules 210, each instantiation of which is associated with a different telephony channel 122, communicate with a channel server process 214 which is charged with controlling the telephony cards 120 and allocating their resources in a manner which avoids conflicts among the different tasks 204. The channel server process 214 is described in more detail below as well.

Figure 5:
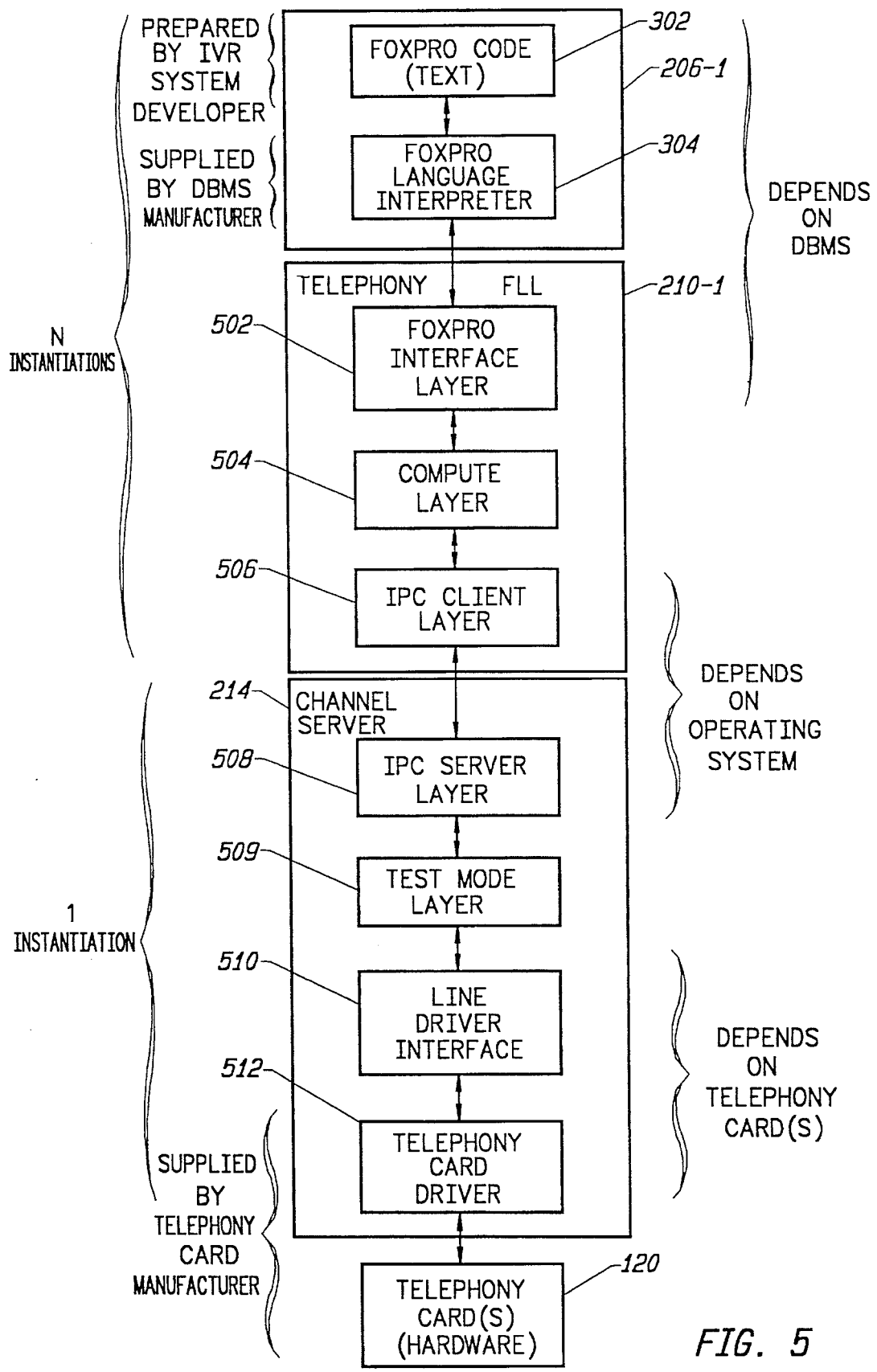
FIG. 5 is another block diagram of the software architecture used in the system of FIG. 1.

FIG. 5 is another diagram of the software architecture used in the present embodiment. For simplicity, only one task 204 is illustrated, but greater detail is provided throughout the hierarchy. In addition, since the database engine modules 208 and the database 212 are conventional, they are omitted from FIG. 5.

As can be seen in FIG. 5, the software architecture of the present embodiment is organized into layers. It will be seen that by substituting one module at one layer, different database management systems can be accommodated. By substituting modules at two other layers, different operating systems can be accommodated. Finally, by substituting modules at two further layers, different telephony cards can be accommodated.

Referring to FIG. 5, the top two levels 302 and 304 together form the FoxPro language sequencer 206-1 (FIG. 2). The example of FIG. 3, specifically the combination of FoxPro code in text (layer 302) and a FoxPro language interpreter (layer 304) is illustrated. The FoxPro code in layer 302 is prepared by the IVR system developer, whereas the FoxPro language interpreter 304 is supplied by the DBMS manufacturer (Microsoft, in the case of FoxPro).

The telephony FLL module 210-1 (FIG. 2) comprises three layers: a DBMS interface layer 502, charged with the task of converting parameters between the form in which they are passed to and from the sequencer 206-1, and a generic form used by lower layers in the hierarchy. The layer 502 thus isolates lower layers from having to know which DBMS is running in the higher layers. The module 502 is specific to the particular DBMS used; other versions of this module can be substituted in order to support sequencers from other DBMSs.

Below the DBMS interface layer 502 in the telephony FLL 210-1 is a compute layer 504. Roughly, the compute layer 504 is charged with performing any computations that are both generic (not specific to a particular DBMS) and not appropriate for the channel server 214 to perform. For example, certain operations should not be performed by the channel server 214 because they may create a bottleneck; these operations are performed in the compute layer 504 instead. Examples of operations performed in the compute layer 504 include retrying an operation if no input is received before a time-out expires; converting a date value input parameter to a list of individual voice prompts to speak; and so on. Different versions of the compute layer 504 may be substituted to meet the needs of different market segments, for example to accommodate different human languages or the customs of different countries.

Below the compute layer 504 in telephony-FLL 210-1 is an IPC client layer 506. The IPC client layer 506 communicates with an IPC server layer 508 at the top of the channel server 214 using an inter-process communication (IPC) protocol or mechanism of the underlying operating system 202 (FIG. 2). In Windows implementations, the IPC mechanism can be Dynamic Data Exchange (DDE). Whereas there are N instantiations of the sequencer 206-i and the telephony FLL 210-i, including the IPC client layer 506, there is only one instantiation of the channel server 214, including an IPC server layer 508. The purpose of IPC client layer 506 is to perform the client side of the inter-process communication mechanism for the compute layer 504 in a manner which isolates the compute layer 504 from all details of the IPC communication mechanism. The layer 506 also isolates higher layers from having to know whether the IVR system is serving only a single channel, or multiple channels. The IPC server layer 508 performs the server side of the inter-process communication mechanism. Note that in systems that support only a single telephony channel, the IPC client layer 506 and the IPC server layer 508 can be combined into a single very simple layer.

Below the IPC server layer 508 in the channel server 214 is a test mode layer 509. When test mode is activated, this layer simulates the operation of the telephony hardware using user dialogs, so that an application can be tested without requiring actual use of telephony hardware. In normal operation, test mode is disabled and the test mode layer 509 simply becomes transparent.

Below the test mode layer 509 is a line driver interface layer 510. The layer 510 implements standard voice/telephony primitives for the particular telephony card(s) installed in the system. In some embodiments, the line driver interface 510 might also control a voice recognition card (not shown). The layer 510 implements such primitives as "answer incoming call", "hang up line", "get DTMF keys", and "play list of prompts". Since the line driver interface layer 510 isolates higher layers from having to know how to control the particular telephony card(s) installed in the system, different versions of the layer 510 may be substituted to handle different telephony cards.

Below the line driver interface layer 510 in the channel server 214 is the telephony card driver 512 supplied by the telephony card manufacturer. For the Dialogic D/41 card, the driver 512 is the D40Drv DOS TSR ("Terminate and Stay Resident") program, available from Dialogic. For the National Semiconductor TyIN 4000 Pro telephony card, the driver layer 512 is the TAPI service provider (TSP) program available from National Semiconductor. For the Rhetorex telephony card (Model RDSP 9432, available from Rhetorex, Inc., Campbell, Calif.), the driver 512 is the RhetDrv DOS TSR program available from Rhetorex. All three of these driver programs are incorporated herein by reference in their entirety. Such drivers may also include a number of procedures to be compiled with the channel server 214, which properly call the TSR or TAPI routines.

III. EXAMPLE FOXPRO PROGRAM

Set forth in Appendix A is an example FoxPro program for layer 302 (FIG. 5). The programing language in which the FoxPro code in Appendix A is written, is described in Microsoft, "FoxPro Language Reference" (1993), incorporated herein by reference.

The example program in Appendix A represents the telephony component of an interactive voice response system which schedules part-time workers at a plant. It demonstrates a solution to the need for a large retail outlet to schedule temporary labor, and have temporary employees be able to call in and obtain their work schedule. The voice response system permits workers to enter their worker number, and be told which days of the current week, and which work shift (early or late) they should report to work. They have a chance to accept or reject each individual shift scheduled. As will be seen, the program uses ordinary FoxPro commands (verbs and procedure calls) to access the database. The telephony functions are available by way of new procedure calls, but the syntax for calling these procedures is the same as the ordinary FoxPro language syntax for calling database management procedures. In another embodiment, access to the telephony functions can be provided by way of newly defined verbs, instead of or in addition to newly defined procedure calls.

The program in Appendix A operates on two databases: a control database called BASEDATA and a working database called WORKERS. The control database contains only two values: a labor rate and an hours-per-shift value. The WORKERS database contains 100 rows, each for a respective temporary worker. The fields in each entry

| | |
|---|---|
| Worker ID Number | 1001-1100 |
| Address Street | |
| Address City | |
| Address State | |
| Address Zip Code | |
| Home Phone | |
| Work Schedule Fields es1–es7, ls1–ls7 | Boolean values for early shifts 1–7 and late shifts 1–7, indicating whether the worker is scheduled to work the specified shift |

In a portion of FoxPro code prior to that set forth in Appendix A, an initial work schedule was set up in a WORKERS database.

At line 10 of the program, a SET LIBRARY TO command is issued, which loads in a FoxPro linked library called voysaccs. This is the telephony FLL 210-1 (FIG. 5). When FoxPro loads a library, it also runs a start-up procedure of that library which, among other things, registers a procedure for the task 204-1 to handle events in substitution for the default FoxPro event handler.

In line 11, the program calls a telephony FLL function VSET to establish a directory in which application prompt files are to be found. In line 12, the program calls the same function to establish a directory in which recording files are to be found.

In lines 18–22, certain variables are loaded with base data from the BASEDATA database. In line 28, the actual working database table, WORKERS, is selected. The FoxPro command SET ORDER TO is then used to establish an index based on the field ID.

Lines 36–52 constitute a continuous loop which simply waits for the phone to ring, answers it after one ring, and then calls a procedure pt_call. The function to wait for the phone to ring and answer it after one ring, is VWaitRing( ), at line 42, and this is a procedure in the telephony FLL 210-1. The VWaitRing( ) procedure takes two arguments, both of which are optional. The first argument indicates the number of rings to wait before answering; the default is two. The second argument indicates the number of seconds to wait before timing out; the default is 0, indicating no time-out. Return values indicate success (answered a phone call), time-out, or invalid parameters.

The pt_call function is described below. After pt_call returns, the example program in Appendix A calls another telephony FLL procedure VChkHangup( ) to determine whether the call is still active (line 47) and, if not, it calls yet another telephony FLL procedure VSpeak( ) to speak a "good-bye" prompt over the telephony channel. The VSpeak( ) procedure allows a program to speak a sequence of prompts or values. It can take up to 10 arguments. These arguments can be values (numbers or character strings which contain dates or voice file names), or "speak modes" that regulate how numeric values should be spoken. Speak modes apply only to numeric values, and the default is a standard numeric format in which, for example, 432 is spoken as "four hundred thirty-two". The speak mode DIGITS causes subsequent numbers to speak out the digits, for example "4 3 2". DOLLARS speaks the numbers as a dollar amount. For example, 432.54 would be spoken as "four hundred thirty-two dollars and fifty-four cents". DAY speaks numbers in the range 1–7 as days of the week; this speak mode is designed to work hand-in-hand with the FoxPro DOW( ) function. The speak mode specified in an argument list remains active for all subsequent numbers in the argument list until changed. Prompt names given as arguments are in the form of voice file names in the current "AppPrompts" directory, and are in one of several standard digitized audio file formats. The VSpeak( ) procedure returns codes indicating success or failure, or code indicating success but interrupted by DTMF key press.

In the case of the VSpeak( ) call on line 48 of the example program in Appendix A, only one argument is provided, specifically the name of a file which contains the prompt "Good-bye, and thank you for calling." In line 51, still another telephony FLL procedure VHangup( ) is called in order to disconnect the telephony channel.

The pt_call procedure begins on line 62 of the example FoxPro program in Appendix A. In line 71, it calls the VSpeak procedure to speak the prompt in the data file pthello, specifically a hello prompt.

In lines 77–108, the pt_call procedure enters a loop which attempts to obtain a valid 4-digit ID from the caller. The caller is given three tries. In line 78, the procedure calls the telephony FLL function VChkHangup( ) in order to determine whether the caller has hung up. If so, the procedure returns to line 44. A typical database language program using the telephony FLL will make frequent calls to VChkHangup( ) because a caller may hang up at any time.

At line 86, the pt_call procedure calls the VSpeak( ) telephony FLL procedure to speak the prompt in file ptid, which asks the caller to enter a 4-digit worker ID. In line 87, the pt_call procedure calls another telephony FLL function VGetTones( ). The VGetTones( ) procedure allows the caller to provide information to the program, including menu choices, worker identifications, answers to questions, PIN numbers, and so on. The function takes up to four arguments, beginning with a character variable which upon return will contain the sequence of digits entered by the caller. The second argument is optional and indicates the number of digits to terminate on. The default is 1, and 0 accepts any number of digits. The third argument is optional and indicates a string containing a single character representing a key to terminate on (0–9, * or #). The default is "space", which indicates no key-specific termination. The fourth argument indicates an inter-digit time-out—the number of seconds to wait between digits before timing out. 0 indicates no inter-digit time-out and the default is 10 seconds. Thus, three different termination mechanisms are available: fixed number of digits, an end-of-input key, and an inter-digit time-out. If more than one mechanism is used, then the first to occur terminates the input. Additionally, VGetTones( ) will terminate upon a "first-digit time-out" if the caller has not pressed any keys at all within the first five seconds. The database language program can adjust the first-key time-out using a VSetTimeOut( ) telephony FLL procedure.

On successful termination, VGetTones( ) returns a value indicating whether termination occurred on inter-digit time-out, specified key, or number of digits. On failure, VGetTones( ) returns a value indicating whether termination occurred on first-key time-out, on hang up, or because of bad arguments.

In line 87, the arguments passed to VGetTones are @loc_id, 4, "space" and 15. Thus, it will return after four digits have been entered or after an inter-digit time-out of 15 seconds. There is no key on which it will terminate. The number entered by the caller will be in the FoxPro variable loc_id.

In line 94, the program uses the FoxPro SEEK verb to search the WORKERS database table for the worker ID in loc_id, using the ORDER previously established at line 29. In line 95, the FoxPro function FOUND( ) is used to determine whether the worker ID entered by the caller exists in the database. If so, then at line 96, the program exits the FOR loop. If not, then at line 104, the program calls VSpeak( ) with the name of a file ptnoid containing a prompt such as "Sorry, I couldn't find that ID. Please try again." The program allows three attempts for the caller to enter a valid ID; after the third attempt, at line 106, pt_call simply returns.

Once a valid worker ID has been entered, lines 115–183 check each shift individually and for each one, if the worker is scheduled to work, requests confirmation. A count of the number of shifts confirmed is maintained in a FoxPro variable var_num_shifts.

Referring to line 115, pt_call first determines whether the worker is scheduled to work in the early shift on day 1 (es1). If so, then in line 116, pt_call calls another FoxPro procedure query_shift, passing in two parameters: .T. and date1. The first parameter for query_shift indicates whether this is the early or late shift (.T. means TRUE and .F. means FALSE), and the second parameter is a date string in the form MM/DD/YY. Accordingly, the call in line 116 specifies to query_shift that this is the early shift of the date indicated in date1. The query_shift procedure uses the telephony FLL functions to ask the caller about working the specified shift, and returns true (.T.) or false (.F.) in a variable var_confirm to indicate whether the caller has confirmed that shift. In line 117, the pt_call procedure uses the FoxPro verb REPLACE to update es1 with the Boolean value returned in var_confirm. The procedure pt_call performs this operation for each shift of each date in the week.

After all shifts have been queried, the program determines at line 188 whether or not the worker has agreed to work any shifts at all. If not, then in line 189, the program calls VSpeak( ) with the name of a file ptnoshft containing the prompt, "You are not scheduled to work any shifts in the next week."

Otherwise, at line 198, the program calls VSpeak( ) with a series of arguments which give the worker an earnings prediction for the coming week. The statement contains five arguments which together assemble the prompt as follows:

| Argument | Meaning |
|---|---|
| "ptsigned" | "Thank you. You are signed up to work . . ." |
| var_num_shifts | (The number of shifts confirmed, to be spoken in the standard numeric format) |
| "ptshifts" | " . . . shifts this week, for a total earnings of . . . " |
| "Dollars" | (Subsequent numbers are to be spoken as dollars) |
| var_num_shifts * var_hours_per_shift * var_hourly | (Earnings prediction for the week, spoken as dollars) |

In step 203, pt_call returns to line 44 of the main FoxPro code.

The query_shift procedure used in pt_call begins on line 210 of the example program in Appendix A. In lines 215–217, query_shift first uses the VChkHangup( ) procedure to exit if the caller has hung up.

In line 224, if this is an early shift, query_shift speaks a prompt by passing arguments to the VSpeak( ) procedure as follows:

| Argument | Meaning |
|---|---|
| "ptearly" | "You are scheduled to work the early shift on . . . " |
| "Day" | (Subsequent numbers are to be spoken as days (Mon., Tues., Wed. . . .)) |
| DOW(param_date) | Uses the FoxPro DOW( ) function to convert the specified date to a number 1–7; the number will be spoken as a day. |
| DTOC(param_date) | Uses the FoxPro DTOC( ) function to convert the specified date to a character-type date (e.g. "01/01/94"). |

In line 227, if the specified shift is a late shift, then the same prompt is spoken except that it begins with the language in the prompt file ptlate, which is "You are scheduled to work the late shift on . . . ".

In lines 234–268, the caller is given three attempts to enter 1 to confirm, or 2 to reject. Specifically, after checking for hangup (lines 235–237), query_shift calls VSpeak( ) to speak the prompt "To confirm that you will be available for this shift, press 1. If you will not be available, press 2." In line 242, query_shift calls VGetTones( ) with arguments indicating termination after one digit or a 15-second inter-digit time-out, with the caller's input to be placed in a variable loc_confirm. In lines 247–251, if the caller pressed the numeral 1 key, then var_confirm is set to .T. and var_num-shifts is incremented. If not, then in lines 253–256, var_confirm is set to .F. If the caller pressed a number that was neither 1 nor 2, then on the first two tries, query_shift calls VSpeak( ) to speak the prompt, "Please press 1 or 2," ( line 263) and the loop repeats. After the third attempt, query_shift sets var_confirm to .F. (line 265) and returns.

It can be seen that the availability of telephony function calls in a database programming language creates a powerful combination which permits interactive voice response system developers to easily allow callers to interact with a database in a very complex manner.

IV. TELEPHONY FLL

The telephony FLL 210 will now be described. For illustration purposes, one of the procedures of the telephony FLL 210 which are callable from the FoxPro language sequencer 206, specifically VSpeak( ), will be followed all the way down to the telephony card driver layer 512. A number of additional telephony FLL procedures are described in Appendix B, and their internal operation can be gleaned from Appendices C–G hereto.

A. FoxPro Interface Layer Procedures

Initially, note that FoxPro requires a library extension module to include a structure which defines the entry points and various other characteristics of each procedure which is callable from the FoxPro language code. In the FoxPro interface layer 502 in telephony FLL 210-1, this structure is as follows:

```
FoxInfo myFoxInfo[ ] = {
        {"START", ( FPFI ) start, CALLONLOAD, ""},
        {"STOP", ( FPFI ) stop, CALLONUNLOAD, ""},
        {"VWAITRING", ( FPFI ) vwaitring, 2, ".I,.I"},
        {"VHANGUP", ( FPFI ) vhangup, 0, ""},
        {"VCHKHANGUP", ( FPFI ) vchkhangup, 0, ""},
        {"VSPEAK", ( FPFI ) vspeak, 10,
                ".?,.?,.?,.?,.?,.?,.?,.?,.?,.?"},
        {"VGETTONES", ( FPFI ) vgettones, 4, "R,.I,.C,.I"},
        {"VGETTONESM", ( FPFI ) vgettonesm, 7,
                "C, I, R, .I, .C, .I, .C"},
        {"VGETWORDS", ( FPFI ) vgetwords, 5,
                "R,.C,.I,.C,.I"},
        {"VRECORD", ( FPFI ) vrecord, 2, "?,.I"},
        {"VDIAL", ( FPFI ) vdial, 3, "C,.I,.R"},
        {"VDEBUG", ( FPFI ) vdebug, 1, "I"},
        {"VSETDIR", ( FPFI ) vsetdir, 2, "C,C"},
        {"VSETDSPEAK", ( FPFI ) vsetdatespeak, 1, "C"},
        {"VSETTMOUT", ( FPFI ) vsettimeout, 2, "C, I"},
//      {"VFAXCOVER", ( FPFI ) vfaxcover, 2, "C,.?"},
//      {"VFAXDOC", ( FPFI ) vfaxdoc, 1, "C"},
//      {"VFAXSEND", ( FPFI ) vfaxsend, 2, "C,.C"},
//      {"VFAXSETUP", ( FPFI ) vfaxsetup, 2, "C,?"},
        {"VSET", ( FPFI ) vset, 2, "C,?"},
};
FoxTable_FoxTable = {
        ( FoxTable FAR * ) 0,
        sizeof ( myFoxInfo ) / sizeof ( FoxInfo ),
        myFoxInfo
};
```

Pertinent parts of the source code for the FoxPro interface layer are set forth in Appendix C. Pertinent parts of the VSpeak( ) procedure will now be described.

VSpeak( ) begins by obtaining a handle to the current task and passing it to a function FindSlot( ). The FindSlot( ) function returns, in a specified pointer variable sp, a pointer to a DBMS interface layer telephony line status table line[ ]. The DBMS interface layer 502 and the compute layer 504 each maintain such a table for their own purposes, and the structure of an entry in the line [ ] table of the DBMS interface layer is as follows:

```
struct line_t {
        boolean         bInUse;             // is this table slot in use ?
        unsigned int    hTask;              // Windows task handle
        int             nLineNum;           // line number (not really used)
        unsigned int    handlerid;          // FoxPro event handler ID
        WHANDLE         whandleClientDDE;   // FoxPro handle of hidden client window
        HWND            hwndClientDDE;      // Windows handle of hidden client window
};
static
struct line_t line [MAX_LINES] = {0};
```

Each process 204-i maintains a copy of this table, but looks at only the data for itself.

The FindSlot( ) function merely loops through the above line table until it finds an entry whose hTask field matches the specified task number, and whose binUse field is true. A pointer to the resulting entry of line[ ] is returned in sp.

Returning to VSpeak( ), a variable play_type is then initialized to play numbers "as numbers". A FOR loop then loops through all of the arguments in the call to VSpeak( ). FoxPro passes parameters to extension library procedures using a parameter block consisting of an integer that represents the number of parameter, immediately followed by an array of parameter unions. The first byte of each parameter union indicates that the parameter is passed by reference if it contains the character R, otherwise it is passed by value. If the parameter is passed by value, then the first byte contains a character indicating whether the parameter is a string (C), numeric (N), an integer (I), a date (D), a logical (L), or another type of data. The entire parameter has the following structure:

```
typedef struct {
        char                     ev_type;
        char                     ev_padding;
        short                    ev_width;
        unsigned     short       ev_length;
        long                     ev_long;
        double                   ev_real;
        MHANDLE                  ev_handle;
}
```

VSpeak( ) begins the parameter loop by determining whether the first parameter is a string. If so, then it copies the length of the string from the ev_length field into a variable nCount, and copies the text of the string into the variable 'text' from the array pointed to by the ev_handle field of the parameter. The procedure then adds a terminating NULL character, trims any trailing blanks, and capitalizes the string.

If the parameter text is one of the predefined numeric format flags "digits" "dollars" or "day" then the VSpeak( ) procedure sets the flag play_type to indicate how subsequent numeric parameters are to be spoken. It also turns off a play_flag to indicate that the current parameter is not to be spoken.

If the first byte of the current parameter was not a C, but rather was an I, then VSpeak( ) converts the integer parameter is converted to a string and places it into the variable 'text'. The flag play_flag remains true.

If the first byte of the current parameter is N, then the number contained in the parameter is also converted to text and stored in the variable 'text'.

If play_flag is false with the current parameter, then the loop continues at this point with the next parameter (lines 180, 207). Otherwise, VSpeak( ) calls a procedure com_Play( ) either to start a "play list" with the current parameter, or to add the current parameter to an existing play list. The procedure com_Play and related procedures are part of the compute layer 504 and are described in more detail below. Briefly, however, com_Play is called with five arguments: a task handle, which indicates the current Windows task; a call type, which can be either START_PLAY_LIST or ADD_PLAY_LIST or PLAY_PLAY_LIST; a string which can be either a string of digits or the name of an audio file; a play_type, which indicates how numeric parameters are to be spoken; and an interrupt_mode specifying whether to terminate the prompt if the caller presses a DTMF key.

After the entire parameter list has been parsed in the loop, VSpeak( ) calls com_Play( ) one more time in line 213 with the call type PLAY_PLAY_LIST. VSpeak( ) then prepares a result parameter, which has the same format as an argument list parameter and returns it to the FoxPro sequencer 206.

B. Compute Layer Procedures

The compute layer 504 procedure com_Play( ) will now be described, as will the compute layer procedures which are called by com_Play( ). Pertinent procedures of the compute layer source code are set forth in Appendix D.

1. com_Play( )

The com_Play( ) procedure is as follows:

```
int com_Play (
        const unsiged int hTask,  // task handle (Windows only)
        const int call_type,
        const char *voice_file,  // one filename, a num, or a date
        const int play_type,
        const int interrupt_mode
)
{
        int nVRetVal = RC_INTERNAL;  // Voysys return value
        struct line_t *sp;  // ptr to slot in line table
        // find slot in the line table
        nVRetVal = FindSlot( hTask, &sp );
        if (nVRetVal != RC_SUCCEED)
                goto done;
        // Note: to support speak for online and not online
        // should not check for bOnLine here and it will be checked
        // in the line driver layer of the server
        if ( !sp->bConnected ) {
                nVRetVal = RC_NOTCONNECTED;
                goto done;
        }
        if ( ( play_type < AS_NUMBER ) || ( play_type > AS_DAY ) ) {
                nVRetVal = -10;
                goto done;
        }
        switch ( call_type ) {
                case IMMEDIATE:  // not use for now
                        init_play_list ( sp );
//                      if ( add_to_play_list ( sp, voice_file, play_type ) ==
                                        RC_NOFILE )
                        if ( add_to_play_list ( sp, voice_file, play_type ) !=
                                        RC_SUCCEED )
                                        nVRetVal = RC_SPEAKPROMPTFILENOTFOUND;
                                else
                                        nVRetVal = play_play_list ( sp, interrupt_mode );
                        break;
                case START_PLAY_LIST:
                        init_play_list ( sp );
                        if (add_to_play_list ( sp, voice_file, play_type ) !=
                                        RC_SUCCEED )
                                        nVRetVal = RC_SPEAKPROMPTFILENOTFOUND;
                        break;
                case ADD_PLAY_LIST:
                        sp->nNumItemsInPlayList++;
                        if ( add_to_play_list ( sp, voice_file, play_type ) !=
                                        RC_SUCCEED )
                                        nVRetVal =       RC_SPEAKPROMPTFILENOTFOUND -
                                                         sp->nNumItemsInPlayList;
                        break;
                /*
                 * PLAY_PLAY_LIST no longer adds to the play list -
                 * just plays the list
                 */
                case PLAY_PLAY_LIST:
                        nVRetVal = play_play_list ( sp, interrupt_mode );
                        break;
                default:
                        nVRetVal = -12;
```

```
            }
done:
            return ( nVRetVal );
}           /* function com_Play */
```

As can be seen, com_Play( ) is relatively simple. It merely checks for parameter errors and then calls either init_play_list( ), add_to_play_list( ) or play_play_list( ), depending on the call type. Additionally, if the call_type was START_PLAY_LIST, then after calling init_play_list( ), the routine also calls add_to_play_list( ).

2. init_play_list( )

The play list is not actually maintained in the compute layer, but rather it is maintained by the channel server process 214. The entire function init_play_list( ) is merely to assemble an IPC "command" and to pass it to an IPC client layer 506 procedure ipc_Do_Command( ).

At this point it will be useful to understand that inter-process communications are accomplished in the present embodiment by a client 210-i preparing a command data block and passing it down to the channel server process 214, or by the channel server 214 preparing an event data block and passing it back up to a client process 210-i. The procedure init_play-list( ) uses only the command block, and this structure is defined as follows:

```
/* format of a command from a higher layer to lower layer */
struct command
{
        int         nCommand;          /* command number */
        int         nLine;             /* line number */
        /*
         * syntax inside dialing string is:
         *
         * 0123456789#*ABCD      digit to dial
         * T                     use tone dialing (default)
         * P                     use pulse dialing
         * W                     wait for dial tone
         * ,                     pause 2 seconds
         * !                     do a switch hook
         */
        char        string[MAX_DIGITS + 1];   /* dialing string */
        struct pitem play_item;        /* item to play, record to,
                                          or delete */
        int         path[MAX_DIRS];    /* dirs to search for file
                                          (for PLAY) */
        int         dir_num;           /* dir num (for SETDIR,
                                          DELETE, RECORD) */
        /*
         * overused field: directory name for setdir, phrase map file
         *    name for setfile, syntax map file name for setvocab,
         *    syntax name for getwords,
         */
        char        name[MAX_DN + MAX_FN];
        /* for CALLOUT, max rings to wait before giving up */
        /* for WAITFORCALL, rings to wait before answering incoming
         * call */
        int         answer_rings;      /* for CALLOUT, max rings to wait */
        /* for CALLOUT, after answer wait for silence */
        boolean     wait_for_silence;
        /* DTMF digit-string stuff for RECORD, PLAY, GETDTMF */
        boolean     flush_digits_at_start;   /* flush input at start of
                                                operation? */
        boolean     end_voice_on_any_digit;  /* stop voice if get any
                                                DTMF digit ? */
        boolean     end_voice_on_digit_end;  /* stop voice if get
                                                end-of-digits ? */
        boolean     end_oper_on_any_digit;   /* stop operation if get
                                                any DTMF digit? */
        boolean     end_oper_on_digit_end;   /* stop operation if get
                                                end-of-digits? */
        boolean     end_oper_on_voice_end;   /* stop operation if voice
                                                ends? */
        /*
         * Values of max_digits:
         *   =0     unlimited (limited only by line card).
         *   >0     limited to max_digits digits.
         *
         * Also used to signify max number of words for
         * voice-recognition.
         */
        int         max_digits;        /* end-of-digits if this many
                                          received */
        char        end_digit;         /* end-of-digits if this
```

```
                                        digit received */
        ulong    start_timeout;          /* timeout after voice bef
                                           1st dig (msec) */
        ulong    total_timeout;          /* timeout for whole op
                                           (msec); 0 == inf */
        ulong    interdigit_to;          /* timeout after 1st dig betw
                                           digs (msec) */
        boolean  get_digits_at_end;      /* get input digits at end of
                                           operation ? */
        /* limits for RECORD */
        ulong    end_silence;            /* this much silence ends
                                           recrding (msec) */
        int      total_recording;        /* max length of recording
                                           (sec) */
        /* following are for initializing line in CONNECT command */
        boolean  do_double_keys;                 /* detect and report double-keys?
                                                    */
        ulong    doub_key_time;                  /* double-key max spacing (msec)
                                                    */
        boolean  allow_rate_gain;                /* allow user to change rate +
                                                    gain ? */
        int      initial_rate;                   /* initial playback rate */
        int      initial_gain;                   /* initial playback gain */
        boolean  do_pause_compr;                 /* compress silence to save
                                                    space? */
        boolean  pause_pure_sil;                 /* expand comprd pauses to pure
                                                    silence ? */
        boolean  do_AGC;                         /* do automatic gain control on
                                                    input ? */
        /* voice-recognition stuff */
        int      max_score;                      /* reject scores > this (lower ==
                                                    better) */
        int      min_ambiguity;                  /* reject ambig < this (lower ==
                                                    worse) */
        int      input_gain;                     /* input gain (0 - 0x7FFF; def ==
                                                    0x1000) */
        /* set commands */
        int      io_location;                    /* input source or output
                                                    destination - should merge with
                                                    nSetParm */
        /* fax commands */
        int      nFaxOpCode;                     /* numeric operation code */
        int      nFaxParm;                       /* integer parameter */
        char     cFaxParm[MAX_FAXPARM+1];        /* string parameter */
        /* set/get commands */
        int      nSetGetOpCode;                  /* numeric operation code for set
                                                    and get commands */
        ulong    dwSetParm;                      /* unsigned long parameter */
        char     cSetParm[MAX_SETPARM+1];        /* string parameter */
};
```

The different commands which can be sent to the lower layer using this command structure are as follows:

```
/* commands from higher layer to lower layer */
/* all must be consecutive + ascending for debug funcs to work */
#define DVRC_NONE           0    /* no command (placeholder) */
#define DVRC_CONNECT        1    /* Connect Line task to line N */
#define DVRC_DISCONNECR     2    /* disconnect Line task from line N */
#define DVRC_RECORD         3    /* record voice or FAX from user */
#define DVRC_INITPLAY       4    /* initialize playlist to empty */
#define DVRC_ADDPLAY        5    /* add file to playlist */
#define DVRC_PLAY           6    /* play list of voice/FAX files out
                                    to user */
#define DVRC_CALLOUT        7    /* initiate a call and wait for
                                    answer */
#define DVRC_GETDTMF        8    /* get DTMF digit string from user */
#define DVRC_SENDDTMF       9    /* send DTMF digit string out on
                                    line */
#define DVRC_ABORT          10   /* abort any operation in progress */
#define DVRC_DELETEFILE     11   /* delete user voice or FAX file */
#define DVRC_HANGUP         12   /* hang up (go on-hook) */
#define DVRC_WAITFORCALL    13   /* wait for incoming call and answer
                                    it */
#define DVRC_SETDIR         14   /* set prompt/message directory name
```

| | | |
|---|---|---|
| #define DVRC_GETSTATE | 15 | /*<br>/* get information about state of line */ |
| #define DVRC_GETSYSSTAT | 16 | /* get info about state of entire system */ |
| #define DVRC_SETIFILE | 17 | /* open indexed prompt file */ |
| #define DVRC_SETVOCAB | 18 | /* open vocabulary Map files */ |
| #define DVRC_GETWORDS | 19 | /* get voice-recognized words from user */ |
| #define DVRC_SETINPUT | 20 | /* set the sound input source */ |
| #define DVRC_SETOURPUT | 21 | /* set the sound output destination */ |
| #define DVRC_FAXCOVER | 22 | /* set fax cover page */ |
| #define DVRC_FAXDOC | 23 | /* set fax document pages */ |
| #define DVRC_FAXSEND | 24 | /* send a fax document */ |
| #define DVRC_FAXSETUP | 25 | /* setup fax options and parameters /* |
| #define DVRC_SET | 26 | /* set options and parameters */ |
| #define DVRC_GET | 27 | /* get options and parameters */ |

The structure pitem referred to in the definition of struct command is as follows:

```
/* format of a "playable item"; it specifies a single prompt or
phrase */
/*
 * tricky: fname[ ] may contain partial name down to IPC layer,
 *   but is converted to full name in that layer.
 */
struct pitem
{
    /* stuff passed down from higher levels
    int       type;                        /* playable item type */
    char      fname[MAX_DN + MAX_FN];      /* voice or FAX file name,
                                              dir name */
    void far  *vdata;                      /* ptr to voice data in RAM */
    /* stuff created and used only at lowest level */
    int       ifnum;                       /* indexed voice file num (-1 = none) */
    int       index;                       /* index into indexed voice file */
};
```

Given the above, the init_play_list( ) procedure is self-explanatory and is as follows:

```
static
void init_play_list (
    struct line_t    *sp        // ptr to slot in line table
)
{
    struct command   cmd;       // command to send
    struct event     event;     // event received
    int              nVRetVal;  // Voysys return value
    cmd.nCommand = DVRC_INITPLAY;
    cmd.nLine = sp->nLineNum;
    cmd.play_item.type = PI_NONE;
    sp->nNumItemsInPlayList = 0;
    nVRetVal = ipc_Do_Command
        ( sp->hTask, cmd, &event );
}  /* function init_play_list */
```

3. add_to_play_list( )

The compute layer 504 procedure add_to_play_list( ) is as follows:

```
static int add_to_Play_list (
    const struct line_t  *sp,         // ptr to slot in
                                      // line table
    const char           *voice_file,
    const int            play_type
)
{
    int   nVRetVal;
    int   i, vfile_len;
    char  non_digit_char = ( char ) NULL;
    /*
     * Find the first non-digit, non-blank symbol in the string.
     * If there isn't any, speak it as a number. If there is
     * one, and it's a slash (/), speak the string as a date.
     * Otherwise, treat the string as a file name.
     */
    vfile_len = strlen ( voice_file );
    for ( i = 0; i < vfile_len; i++ ) {
        if ( ( ( voice_file[i] < '0' ) || ( voice_file[i] > '9' ) ) &&
                                              // not a digit
             ( voice_file[i] != ' ' ) &&      // space
             ( voice_file[i] != '-' ) &&      // minus sign
             ( voice_file[i] != '.' ) ) {     // dot
            non_digit_char = voice_file[i];
            break;
        }
    }
    if ( non_digit_char == ( char ) NULL ) {
        /* voice file contains a number value */
        /* Adding number type */
        switch ( play_type ) {
            case AS_NUMBER:
                nVRetVal = speak_as_number ( sp, voice_file );
                break;
            case AS_DIGITS:
                nVRetVal = speak_as_digits ( sp, voice_file );
                break;
            case AS_DOLLARS:
                nVRetVal = speak_as_dollars ( sp, voice_file );
```

```
                break;
            case AS_DAY:
                nVRetVal = speak_as_day ( sp, voice_file );
                break;
            default:
                nVRetVal = -2;
                break;
        }
    }
    else if ( non_digit_char == '/' ) {
        nVRetVal = speak_as_date ( sp, voice_file );
    }
    else {
        /* voice file contains the name of the voice file to play */
        nVRetVal = addu ( sp, voice_file );
    }
    return ( nVRetVal );
}   /* function add_to_play_list */
``` add_to_play_list( ) can be called with either a number, a date or the name of a voice file to play in the field *voice_file. The field play_type applies only if *voice_file is numeric, so add_to_play_list( ) first checks to determine whether *voice_file is numeric. If it is, then it calls one of the routines speak_as_number( ), speak_as_digits( ), speak_as_dollars( ) or speak_as_day( ), depending on play_type. These routines are discussed below.

If *voice_file contains a date, recognized by the presence of the slash (/), add_to_play_list( ) calls the routine speak_as_date( ). Otherwise, *voice_file is assumed to be the name of a voice file to play. The function add_to_play_list( ) passes this on to yet another function, addu( ).

The compute layer function addu( ) is as follows:

```
static int addu (
    const struct line_t *sp,  // ptr to slot in line table
    const char *voice_file
)
{
    int nVRetVal;
    int path[MAX_DIRS];
    int i;
    path[0] = DIR_APPPROMPTS;
    path[1] = DIR_USERVOICE;
    path[2] = DIR_TEMPFILES;
    for (i = 3; i < MAX_DIRS; i++)
        path[i] = DIR_ENDS;
    nVRetVal = add_voice (sp, voice_file, path);
    return (nVRetVal);
} /* function addu */
```

As can be seen, the addu( ) routine merely creates an array of paths where the specified voice file might be found, and then calls yet another compute layer procedure add_voice( ). The routine add voice( ) is as follows:

```
static int add_voice
    const struct line_t *sp,  // ptr to slot in line table
    const char *voice_file,
    const int path[Max_DIRS]
)
{
    int nVRetVal; // Voysys return value
    struct command cmd; // command to send
    struct event event; // event received
    int i;
    if (strlen (voice_file) >= (MAX_DN + MAX_FN) ){
        nVRetVal = RC_BADFILENAME;
        goto done;
    }
    cmd.nCommand = DVRC_ADDPLAY;
    cmd.nLine = sp->nLineNum;
    for (i = 0; i < MAX_DIRS; i++)
        cmd. path[i] = path[i];
    cmd.play_item.type = PI_SINGLE_FILE;
    strcpy (cmd.play_item.fname, voice_file);
    cmd.play_item.index = -1;
    cmd.play_item.vdata = (void *) 0xFFFFFFFF;
    nVRetVal = ipc_Do_Command (sp->hTask, cmd, &event);
done:
    return (nVRetVal);
}/* function add_voice */
```

This routine takes as arguments a pointer to the present task's slot in the line table, a pointer to the name of the voice file to be spoken, and an array of paths where the voice file might be found. It sets up a command block using this information and passes it on to ipc_Do_Command( ).

The routines speak_as_number( ), speak_as_digits( ), speak_as_dollars( ), speak_as_day( ) and speak_as_date, all essentially dissect the string of characters in *voice_file into individual atomic prompts which are present in voice files in a system prompts directory. These routines all call another compute layer routine addp( ) with the voice file name for each of the atomic prompts, which merely prepends the path to the system prompts directory and passes the information on to add_voice( ). add_voice( ) sets up the appropriate command block as described above, and passes the individual voice file names on to ipc_Do_Command( ). The compute layer speak_as_...( ) routines and addp( ) are set forth in Appendix D, together with any utility routines that they call.

4. play_play_list( )

The play_play_list( ) compute layer procedure is as follows:

```
static int play_play_list (
    const struct line_t *sp,  // ptr to slot in line table
    const boolean interrupt_mode // end play if DTMF received?
)
{
    struct command cmd; // command to send
    struct event event; // event received
    int nVRetVal = RC_INTERNAL; // Voysys return value
    cmd.nCommand = DVRC_PLAY;
    cmd.nline = sp->nLineNum;
    cmd.play_item.type = PI_NONE;
    cmd.flush_digits_at_start = TRUE;
    cmd.end_voice_on_any_digit = interrupt_mode;
    cmd.end_voice_on_digit_end = FALSE;
    cmd.end_oper_on_any_digit = FALSE;
    cmd.end_oper_on_digit_end = TRUE;
    cmd.end_oper_on_voice_end = (!interrupt_mode);
    cmd.max_digits = 0;
    cmd.end_digit = '#';
    cmd.get_digits_at_end = FALSE;
    cmd.start_timeout = 0;
    cmd.total_timeout = 0;
    cmd.interdigit_to = 0;
    cmd.end_silence = (unsigned) NOT_APPLIC;
    cmd.total_recording = (unsigned) NOT_APPLIC;
    nVRetVal = ipc_Do_Command (sp->hTask, cmd, &event);
    return (nVRetVal);
}/* function play_play_list */
```

As can be seen, this routine merely sets up a command block with the command DVRC_PLAY and various other parameters, and passes it on to ipc_Do_Command( ). ipc_Do_Command( ) returns the event structure from the channel server 214 in 'event', which play_play_list( ) ignores since it contains no useful information.

C. IPC Client Layer Procedures

Pertinent procedures of the IPC client layer 506 are set forth in Appendix E. The layer includes initialization and termination functions, as well as procedures to handle commands being passed down from the IPC client layer to the IPC server layer 508, and events being passed up from the IPC server layer 508 to the IPC client layer 506.

As can be seen, the ipc_Do_Command( ) procedure first initializes an event data structure to values which indicate that no event has been received yet. It then obtains the current client task's slot in the telephony line table line[ ] for the IPC client layer 506, and calls the IPC client layer 506 send_message( ) procedure with the command data structure cmd.

The send_message( ) procedure merely calls another IPC client layer 506 procedure SendPoke( ), which calls the Windows functions to send the command cmd via dynamic data exchange (DDE) in a conventional manner to the DDE window for the present client in server task 214. SendPoke( ) then awaits a Windows return message using the IPC client layer 506 procedure wait_for_wmessage( ). Absent an error, the channel server 214 will always send a return acknowledge message (WM_DDE_ACK).

The wait_for_message( ) procedure uses conventional Windows functions to periodically poll the Windows event queue until a specified DDE message has been received for the current client task DDE window. It then returns to the calling routines, SendPoke( ), send_message( ), and, ultimately, ipc_Do_Command( ).

In the present embodiment, after acknowledging a command, the channel server process 214 always responds to DDE commands with an event structure also sent by DDE. Accordingly, after returning from send_message( ), ipc_Do_Command( ) calls yet another IPC client layer 506 procedure get_message( ) to wait for and obtain the returned event structure. get_message( ) is set forth in Appendix E, and as can be seen, it calls wait_for_message( ) to await a WM_DDE_DATA message for this task. It then calls another IPC client layer 506 procedure ClientReceiveData( ), which sends a WM_DDE_ACK acknowledge message back to the channel server process and places the event structure in the current task's event queue sp→eventq[ ]. ClientReceiveData( ) then returns to get_message( ), which returns to ipc_Do_Command( ), which returns to the compute layer 504 routine which called it.

V. CHANNEL SERVER

As previously described, the channel server 214 is responsible for allocating the telephony and resources of the IVR system in a manner that avoids conflicts. To do this, the IPC server layer and the line driver interface layer of the channel server 214 each maintain a respective static line[ ] table which contains a large amount of status information about each telephony channel. Each entry in the table corresponds to a different channel. The structure of a single entry in line[ ] in the IPC server layer 508 is:

```
struct line_t {
    struct command cmd; // command
    boolean bCmdInProgress; // is there a command in
                                                progress?
    boolean bConnected; // is there a task attached to line?
    HWND serverwnd; // server window handle for line
    HWND clientwnd; // client window handle for line
    boolean bTestMode; // is the test mode on for this
                                                line?
    /* stuff set from dyrc setdir commands */
    /* dirs voice files are in */
    /* tricky: these names have '\' on the end */
    char dirname [MAX_DIRS] [MAX_DN+1];
};
```

The structure of a single entry in line[ ] in the line driver interface layer 510 is:

```
struct line_t
    boolean bExists; /* is this entry used for a line ? */
    int nLineNum; /* line number (0 to MAX_AL-1) */
    boolean bConnected; /* is a client connected to line? */
    boolean bCmdInProgress; /* is there a cmd in progress? */
    int nCmdStage; /* current step of command being
                                                executed */
    struct command cmd; /* command that is in progress */
    struct event event; /* event being constructed */
    clock_t timeout; /* if != 0, time to abort cmd */
    int nMaxDTMF; /* end paly or record if this many
                                                digits received */
    int nTempVRetVal; /* ultimate value of ep->result */
    boolean bSendEvent; /*event filled in; ready to return*/
    int num_events; // number of queued events for line
    struct {
            boolean bIsWinEvent; // is this a Windows event ?
            // fields for Windows event
            DWORD dwMsg;
            DWORD dwParam1;
            DWORD dwParam2;
            DWORD dwDevice;
            // fields for Dialogic event
            int nDialEvent; // Dialogic event number
            int nDialCallState; // Dialogic call state number
            } queued_ev[MAX_EVENTS_PER_LINE];
    boolean bUserIsOffHook; /* is user/caller off-hook ? */
    boolean bCardIsOffHook; /* card has line off-hook ? */
    boolean silent; /* for callout, is person silent ? */
#if defined(E_W) /* Windows */
    // The following pointer variables should be initialized to
    // all zeros.
    long rwb_DosPointer;
    short rwb_ProtectedSelector;
    long rwb_ProtectedPointer;
    long xrwb_DosPointer;
    short xrwb_ProtectedSelector;
    long xrwb_ProtectedPointer;
    long fi_DosPointer;
    short fi_ProtectedSelector;
    long fi_ProtectedPointer;
    long dtmf_DosPointer;
    short dtmf_ProtectedSelector;
    long dtmf_ProtectedPointer;
    long cpb_DosPointer;
    short cpb_ProtectedSelector;
    long cpb_ProtectedPointer;
    long csb_DosPointer;
    short csb_ProtectedSelector;
    long csb_ProtectedPointer;
#endif
    int open_file; /* for play/rec, voice file handle */
    struct findex Files_Index[Max_PF]; /* for play, for playing
                                                playlist */
    boolean close_after[Max_PF]; /* close file after play
                                                finishes */
    boolean voice_has_ended; /* for play/rec, voice data done?
                                                */
    boolean digits_have_ended; /* for play/rec, DTMF string
                                                done ? */
    struct ifmap ifile[Max_IFILE]; /* for play, indexed voice
                                                files */
    int num_openifile; /* for play, num open indexed files
                                                */
    /* stuff set from initplay, addplay, play commands */
    struct pitem plist[MAX_PF]; /* play list items */
    int plist_count; /* num files in play list */
};
```

A. IPC Server Layer Procedures

Pertinent routines of the IPC server layer 508 are set forth in Appendix F. The IPC server layer 508 runs a polling loop in the procedure WinMain( ), and when a new message has been received, passes it on to either MainWndProc( ) or DDEWndProc( ) depending on the specified destination window. When each client starts up, it sends a WM_DDE_INITIATE message by DDE to the server process's main window. This message is received in the IPC server layer's polling loop. In response, the server calls ServerInitiate( ), which opens up a hidden window for the particular client and establishes a "conversation" between server and client by placing a correspondence between the two windows in the next available entry of an array Conv[ ]. Eventually the polling loop will receive a WM_DDE_CONNECT command from the client, with the client requesting telephony line 0. If telephony line 0 is already assigned to a client, the server polling loop will return a "busy" event code. The client will then request connection to line 1, and so on until the first free line is found. When this occurs, the IPC server layer will update the specified entry of its line[ ] table with an identification of the client and server DDE windows now associated with the channel, and mark the channel as in-use. It then passes the WM_DDE_CONNECT command down to the tm_Do_Command( ) procedure of the test mode layer 509. Assuming the system is not in test mode, the test mode layer 509 simply passes the command on down to an ld_Do_Command( ) procedure of the line driver interface layer 510. (It is assumed herein that test mode is disabled, in which case all calls to the test mode layer are passed directly to the line driver layer. The procedure names are the same, except for a "tm_" prefix for test mode layer procedures and as "ld_" prefix for line driver layer procedures. The two versions of each procedure name are therefore used interchangeably hereinafter and in the appendices.)

If the polling loop receives a WM_DDE_POKE command from a client, then MainWndProc( ) or DDEWndProc( ) pass the command on to an IPC server layer routine ServerPoke( ), which extracts the command from the message, checks for errors, and calls do_command( ). The do_command( ) procedure begins by setting up a default event structure for return to the client, and then performs various preliminary procedures depending on the command. For the command DVRC_ADDPLAY, do_command( ) locates the specified voice file in the memory structure of FIG. 1 and assembles a complete path name to the file. It then places the command in the client's entry in the line[ ] array and sets a "command-in-progress" bit in that entry. The same happens for DVRC_INITPLAY and DVRC_PLAY. do_command( ) then calls the ld_Do_Command( ) procedure in the line driver interface layer 510, passing the command structure and an event structure for return information. When ld_Do_Command( ) returns, do_command( ) returns the event back to the client using the IPC server layer 508 send_event( ) procedure. do_command( ) then unsets the "command-in-progress" bit for the current client, and returns to ServerPoke( ). ServerPoke( ) then sends a WM_DDe_ACK back to the client to acknowledge receipt of the command.

If the polling loop in WinMain( ) receives a time-out event, then it calls do_polling( ), which calls the line driver layer to see if any command currently in progress has completed. If so, then the return event structure is transmitted to the client and the command-in-progress flag for that client's entry in the IPC server layer's line [ ] array is cleared.

B. Line Driver Interface Layer Procedures

The line driver interface layer 510 has four procedures which are callable from the IPC server layer 508: ld_Initialize( ) (called to start up the layer); ld_Shutdown( ) (called to shut down the layer); ld_Do_Command( ) (execute a new command from a client or the next stage of a command already in progress); and ld_Process_Event( ) (handle an event that came from a telephony card driver using a Windows TAPI service provider). Pertinent ones of these procedures, as well as pertinent support procedures, are set forth in Appendix G.

1. ld_Initialize( )

Referring to Appendix G, when the ld_Initialize( ) procedure is called by the IPC server layer 508, it starts up the Dialogic driver 512, finds out how many telephony channels exist, and initializes them. The Dialogic driver 512 includes a terminate-and-stay-resident (TSR) facility which has been pre-loaded into memory. It is initialized by calling a Dialogic procedure startsys( ), which calls a Windows function to generate a software interrupt. The software interrupt vectors to the TSR facility which communicates with the telephony cards 120 via predefined system hardware address ports in a conventional manner. The startsys( ) function returns the number of telephony channels available. Initialization of the telephony channels takes place by initializing the line driver interface's array line[ ] of active line states to initial values.

2. ld_Process Event( )

The routine is pertinent only to certain kinds of telephony card driver software. Events generated by the Dialogic telephony card and driver are passed "up" from the driver layer 512 to the line driver interface layer 510 as described herein. Other kinds of telephony card driver software, however, such as those that use a Windows TAPI service provider, pass events "down" from the top of the server 214 into the IPC server layer 508. These events would be handled by ld_Process_Event( ). The present embodiment uses the former technique, so ld_Process_Event( ) is never used.

3. ld_Do_Command( )

This procedure first uses a routine Check_For_Event( ) to obtain all events which are waiting in the Dialogic event queue, and transfers them into the server 214's event queue for the appropriate channel numbers. All events pending in the Dialogic event queue are transferred, regardless of the channel number to which they pertain. The server 214's event queues are serviced by the periodic invocation of the IPC server layer 508 do_polling( ) routine as previously described.

The ld_Do_Command( ) procedure can be called to start a new command or to perform the next stage of a staged command. The IPC server layer 508 indicates in the argument list to ld_Do_Command( ) whether the present invocation of the procedure is to start or continue a command, the current stage of a staged command being maintained by the line driver layer 510 in its own static line table. In the case of the new command, ld_Do_Command( ) copies the command into the current channel's entry in the line driver layer's static line table, sets the command stage to 0, and sets a flag for the entry to indicate that a command is now in progress. Whether or not this is a new command, the procedure then 'switch'es on the command number.

If the command is DVRC_CONNECT, then a DoConnectCommand( ) procedure is called which checks whether the specified channel is available, updates the line driver layer's line[ ] entry for the channel, and invokes the telephony card driver TSR routines to establish the connection.

If the command is DVRC_INITPLAY, then the procedure merely initializes a play list in the line table entry for the current channel. Since this is a single-stage command, the routine then turns off the command-in-progress bit in the entry of the line table, copies an "EV_INITPLAY" code into an event structure, and returns to the IPC server layer 508.

If the command is DVRC_ADDPLAY, then the routine merely adds the provided voice file name to a play list within the line table entry for the current channel. Again, it turns off the command-in-progress flag in the entry, copies the code EV_ADDPLAY into the return event structure, and returns to the IPC server layer 508.

The DVRC_PLAY command is a multi-stage command. A number of different stages are set out in Appendix G, but only stages 0, 11 and 12 need be discussed herein. Stage 0 indicates the start of a command, and in this stage, the procedure calls another line driver interface layer 510 procedure, Play_Playlist( ). This is also a staged procedure, and ld_Do_Command sets the stage to 10 prior to calling Play_Playlist( ). Play_Playlist( ) changes the command stage for the current channel to stage 11 as described hereinafter.

The first time Play_Playlist( ) is called at the start of a command (command stage 10), it loops through all of the items on the play list in the current channel's entry in the static line table, opening each voice file, and determining the DOS file handle, the starting position in the file of the voice prompt, and the length of the voice prompt. Note that the starting position will not always be at the beginning of the file, since the line driver layer 510 supports the presence of multiple indexed prompts in a single file. Play_Playlist( ) then sets up a table Files_Index[ ] listing the DOS file handle, the starting position and the length, for each voice prompt in the play list. The format of this table is defined by Dialogic.

Play_Playlist( ) then builds another Dialogic-defined structure, called a read/write block (My_rwb). Specifically, a pointer to Files_Index[ ] is written into My_rwb, as are a number of other parameters and pointers, including certain flags which were set by the client in compute layer 504. Such flags include whether speaking should terminate if the caller presses a DTMF key, and if so, which key. Play_Playlist( ) then passes My_rwb and the current channel number to the Dialogic card TSR driver via the Dialogic xplayf( ) function. This function will return after the information is transmitted to the telephony cards 120 and will not wait for all of the speaking to complete. In the background, the telephony cards obtain the actual voice data from the voice files via interrupts to the TSR driver as needed. In the meantime, Play_Playlist( ) sets the command stage in the current channel's entry in the static line table to stage 11 and returns to ld_Do_Command( ), which merely returns to the IPC server layer 508. The Dialogic TSR will add an event to a Dialogic event queue when speaking has terminated.

As previously described, the IPC server layer 508 do_polling( ) routine periodically calls ld_Do_Command( ) for each channel for which a command is in progress. In can be seen in Appendix G that if ld_Do_Command( ) is called before the Dialogic telephony card has sent an event indicating termination of speaking, then ld_Do_Command( ) simply returns to the polling routine.

If a Dialogic end-of-playing event has been placed in the event queue for the present channel during the pendency of a DVRC_PLAY command, then the command stage will still be 11. ld_Do_Command( ) will again call Play_Playlist( ) which, in stage 11, closes all files that contain only one prompt, and examines the Dialogic event to determine why speaking terminated. Assuming it terminated normally, the procedure sets the command stage to 12 in the current channel's entry in the static line table, sets a flag to indicate whether termination occurred because all prompts were spoken or because of appropriate entry of DTMF digits, and returns to ld_Do_Command( ). ld_Do_Command( ) returns to the IPC server level do_polling( ) which, because the command is now done, sends an event back to the client to indicate as much.

Accordingly, a telephony voice response system has been described which includes a database language sequencer, a database control module having a plurality of procedures callable by the database language for performing database operations, and a telephony control module having a plurality of procedures callable by the database language sequencer for performing telephony operations. The database operations in the embodiment include reading and writing data to a database. The telephony operations in the embodiment include speaking a predefined prompt onto a telephony channel, receiving and storing DTMF-encoded input from the telephony channel, and recording audio input from the telephony channel. The database language sequencer calls the database control module procedures and the telephony control module procedures in a sequence defined by a program prepared according to the rules of the database language. The telephony voice response system can control multiple telephony channels by running a separate task for each such channel under a multitasking operating system. A common channel server task is provided which manages the resources of the telephony card for all of the individual channel tasks.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

APPENDIX A
Example FoxPro Code
Copyright 1994 Voysys Corporation

```
5
1    SET EXACT ON
2    SET NEAR OFF
3    *
4    * Exit from the program if ESC is pressed.
5    *
6    ON ESCAPE RETURN
7    *
8    * Set the library to "voysaccf"
9    *
10   SET LIBRARY TO \voysaccs\core\voysaccf
11   retval = VSet("AppPrompts", "\voysaccs\apps\parttime\prompts")
12   retval = VSet("Recordings", "\voysaccs\apps\parttime\record")
13   *
14   * Get the hourly rate and the shift length out of the first
15   * record of the
16   * BASEDATA table.
17   *
18   SELECT 1
19   USE BASEDATA
20   GOTO 1
21   var_hourly          = laborrate
22   var_hours_per_shift = hrspershft
23   *
24   * Move on to the WORKERS table, which is the one we'll use for
25   * the phone
26   * conversations.
27   *
28   USE WORKERS
29   SET ORDER TO TAG ID
30   *
31   * To handle calls continuously, go into an infinite loop of
32   * receiving calls.
33   *
34   *
35
36      DO WHILE .T.
37
38   * Wait for the phone to ring.  Answer it after one ring.  Then
39   * call the
40   * pt_call procedure.
41   *
42      retval = VWaitRing(1, 60)
43      DO pt_call
44   *
45   * If the phone has not been hung up, speak the "goodbye" prompt.
46   *
47      IF VChkHangup() = 0
48          retval = VSpeak("ptbye")
49      ENDIF
50
51      retval = VHangup()
52   * ENDDO
53
54   SET ECHO OFF
55   SET LIBRARY TO
56   RETURN
```

ATTORNEY DOCKET NO: VOYS2220WSW
wsw/voys/2220.001

```
 57
 58   ********************************************************************
 59   *
 60   * pt_call:     process one call from a part-time worker.
 61   *
 62   PROCEDURE pt_call
 63
 64      loc_id         = " "
 65      var_num_shifts = 0
 66      var_confirm    = .F.
 67
 68   *
 69   * Say hello.
 70   *
 71      retval = VSpeak("pthello")
 72   *
 73   * Loop: ask for a 4-digit worker ID until we get a good one.
 74   * Give the
 75   * caller three tries, then hang up.
 76   *
 77      FOR var_strikes = 1 TO 3
 78         IF VChkHangup() = 1
 79            RETURN
 80         ENDIF
 81   *
 82   * Get a 4-digit ID.  Set an inter-digit timeout of 15 seconds
 83   * just in
 84   * case the caller decides to just sit there.
 85   *
 86         retval = VSpeak("ptid")
 87         retval = VGetTones(@loc_id, 4, " ", 15)
 88         IF retval < 0
 89            RETURN
 90         ENDIF
 91   *
 92   * Check the ID in the WORKERS table.
 93   *
 94         SEEK loc_id
 95         IF FOUND()
 96            EXIT
 97         ENDIF
 98   *
 99   * If it wasn't found, tell the caller so and try again on the
100   * first two
101   * "strikes"; on the third one, hang up.
102   *
103         IF var_strikes < 3
104            retval = VSpeak("ptnoid")
105         ELSE
106            RETURN
107         ENDIF
108      ENDFOR
109   *
110   * Go through each of the shifts individually.  For each one, if
111   * the worker is scheduled to work, ask them to confirm.  For each
112   * one that
113   * they confirm, add 1 to var_num_shifts.
114   *
115      IF es1
116         DO query_shift WITH .T., date1
117         REPLACE es1 WITH var_confirm
```

- 65 -

```
118        ENDIF
119
120        IF ls1
121            DO query_shift WITH .F., date1
122            REPLACE ls1 WITH var_confirm
123        ENDIF
124
125        IF es2
126            DO query_shift WITH .T., date2
127            REPLACE es2 WITH var_confirm
128        ENDIF
129
130        IF ls2
131            DO query_shift WITH .F., date2
132            REPLACE ls2 WITH var_confirm
133        ENDIF
134
135        IF es3
136            DO query_shift WITH .T., date3
137            REPLACE es3 WITH var_confirm
138        ENDIF
139
140        IF ls3
141            DO query_shift WITH .F., date3
142            REPLACE ls3 WITH var_confirm
143        ENDIF
144
145        IF es4
146            DO query_shift WITH .T., date4
147            REPLACE es4 WITH var_confirm
148        ENDIF
149
150        IF ls4
151            DO query_shift WITH .F., date4
152            REPLACE ls4 WITH var_confirm
153        ENDIF
154
155        IF es5
156            DO query_shift WITH .T., date5
157            REPLACE es5 WITH var_confirm
158        ENDIF
159
160        IF ls5
161            DO query_shift WITH .F., date5
162            REPLACE ls5 WITH var_confirm
163        ENDIF
164
165        IF es6
166            DO query_shift WITH .T., date6
167            REPLACE es6 WITH var_confirm
168        ENDIF
169
170        IF ls6
171            DO query_shift WITH .F., date6
172            REPLACE ls6 WITH var_confirm
173        ENDIF
174
175        IF es7
176            DO query_shift WITH .T., date7
177            REPLACE es7 WITH var_confirm
178        ENDIF
```

ATTORNEY DOCKET NO: VOYS2220WSW
wsw/voys/2220.001

```
179
180       IF ls7
181           DO query_shift WITH .F., date7
182           REPLACE ls7 WITH var_confirm
183       ENDIF
184   *
185   * Now that we've checked all the shifts, give the output result.
186   * If there are no shifts, tell the worker so.
187   *
188       IF var_num_shifts = 0
189           retval = VSpeak("ptnoshft")
190   *
191   * On the other hand, if there are shifts scheduled, tell the
192   * worker so
193   * and give the earnings prediction.  The DOLLARS flag is used to
194   * speak
195   * the earnings in dollar format.
196   *
197       ELSE
198           retval = VSpeak("ptsigned", var_num_shifts, "ptshifts", ;
199                   "Dollars", ;
200                   var_num_shifts * var_hours_per_shift * var_hourly)
201       ENDIF
202
203   RETURN
204
205   ****************************************************************
206   *
207   * Query_shift:  ask the worker about working a particular shift.
208   * If param_early is TRUE, it is an early shift.
209   *
210   PROCEDURE query_shift
211   PARAMETERS param_early, param_date
212
213       loc_confirm = " "
214
215       IF VChkHangup() = 1
216           RETURN
217       ENDIF
218   *
219   * Tell the caller about the shift. Note that the date must be
220   * converted to character format before it can be spoken.  The DAY
221   * flag is used to speak the DOW() as a day of the week.
222   *
223       IF param_early
224           retval = VSpeak("ptearly", "Day", DOW(param_date),
225   DTOC(param_date))
226       ELSE
227           retval = VSpeak("ptlate", "Day", DOW(param_date),
228   DTOC(param_date))
229       ENDIF
230   *
231   * Now do a loop until we get a 1 (=confirm) or 2 (=won't work)
232   * from the caller.  Give the caller three chances.
233   *
234       FOR var_strikes = 1 TO 3
235           IF VChkHangup() = 1
236               RETURN
237           ENDIF
238   *
239   * Ask for confirmation.
```

- 67 -

```
240     *
241             retval = VSpeak("ptconfrm")
242             retval = VGetTones(@loc_confirm, 1, " ", 15)
243     *
244     * Check if it's a 1 or a 2.  If so, set var_confirm and exit.
245     * If the shift is confirmed, also increment var_num_shifts.
246     *
247             IF loc_confirm = "1"
248                 var_confirm    = .T.
249                 var_num_shifts = var_num_shifts + 1
250                 EXIT
251             ENDIF
252
253             IF loc_confirm = "2"
254                 var_confirm = .F.
255                 EXIT
256             ENDIF
257     *
258     * If not, remind the caller to press 1 or 2, and
259     * loop again on the first two tries; on the third, assume
260     * non-confirmation.
261     *
262             IF var_strikes < 3
263                 retval = VSpeak("pt1or2")
264             ELSE
265                 var_confirm = .F.
266                 RETURN
267             ENDIF
268         ENDFOR
269
270     RETURN
```

ATTORNEY DOCKET NO: VOYS2220WSW
wsw/voys/2220.001

- 68 -

APPENDIX B
TELEPHONY MODULE PROCEDURES

Copyright 1994 Voysys Corporation 2.0 The voysAccess Library - Introduction

The voysAccess library is a set of FoxPro functions created using the FoxPro Library Construction Kit (LCK). The library is called VOYSACCF.FLL. This library must be loaded at the beginning of a voice response program. To do this, the user's program calls:

SET LIBRARY TO \.........\voysaccf 2.1 The Functions (in alphabetical order)

The following is a list of the voysAccess functions. They are implemented in FoxPro as functions that return an integer return code. All of the functions, and their arguments, are case-independent (VSpeak("HELLO.wav") is the same as vspeak("hello.wav")).

The return codes from the functions are coded as follows:

| | |
|---|---|
| Positive integers | Function-specific flavors of success |
| Zero | Standard "success" code |
| -X or -XX | Function-specific flavors of failure |
| -XXX | Standard failure codes |

2.1.1 Check for hangup - VChkHangup

Syntax:    retval = VChkHangup()

Arguments: none

Return Codes:  1   Success, hangup detected
               0   Success, no hangup detected Description: Check whether the caller has hung up on your program. This is a good thing to do at regular intervals. One frequent cause of caller hang-ups is rotary-dial phones, which cannot produce tones and therefore are not useful with voysAccess applications. If the caller has hung up, you should do a VHangup on your side before waiting for the next call.

ATTORNEY DOCKET NO: VOYS2220WSW
wsw/voys/2220.001

- 69 -

2.1.2 Dial out - VDial

Syntax:
    retval = VDial( <phone_number> [,<num_rings> ])

Arguments:
    <phone_number>  A character string containing
            the phone number. The characters
            "0123456789*#ABCD" will be dialed if
            included. Special characters allowed in
            a dialing string are:

T   use tone dialing (default)
            P   use pulse dialing
            W   wait for dial tone
            , . pause for 2 seconds
            !   do a switch hook All other characters ("-", "(", and ")",
            for example) in a dialing string will be
            ignored.

<num_rings>  The number of times to let the
            phone ring before deciding to give up
            (default is 6).

Return Codes:
    0    Success
    -3   Busy
    -4   Rings, but no answer in <num_rings>
         rings (RNA)
    -9   Other failure
    -11  Bad "rings" parameter; must be a
         positive integer Description: Call out to any phone number. This
    and VWaitRing are the two ways to start a call.
    The phone number must be in a character format.

Example: Dial the digit "9" to ask for an
    outside line, wait two seconds to make sure you
    get it, then dial Voysys' phone number. Notice
    that extraneous characters will be ignored.

retval = VDial("9, (510) 252-1100")

2.1.3 Get Tone (DTMF) Input - VGetTones

Syntax:
    retval = VGetTones( @<variable> [,<number_of_digits>
                [,<key_to_terminate_on>

- 70 -

```
              [,<interdigit_timeout>] ] ] )

Arguments:
        @<variable>  A character variable passed by
              reference.  After a successful return,
              this variable will contain the sequence
              of digits entered by the caller.

<number_of_digits> Integer; the number of digits
              to terminate on (0 = any number of
              digits).  Default number of digits is 1.

<key_to_terminate_on> A string containing a
              single character, which should be a key
              (0..9, *, or #) to terminate input upon.
              (" " = no key; this is the default).

<interdigit_timeout> Integer; maximum number of
              seconds between keys (0 = no interdigit
              timeout).  The  default  here  is  10
              seconds.

Return Codes:
         2  Success; terminated on inter-digit timeout
         1  Success; terminated on specified key
         0  Success; terminated on number of digits
        -1  Failure; terminated on first-key timeout
        -2  Failure; terminated on hangup
       -11  Failure; bad termination digits (must be
             0-50)
       -12  Failure; bad termination key (must be 0-9,
             *, #, or blank)
       -13  Failure; bad interdigit timeout (must be
             non-negative)

Description: Get one or more tones (DTMF digits)
           from the caller.  This is the caller's primary
           way of communicating with your application.  You
           must pass in a character variable by reference.
           The rest of the arguments specify how VGetTones
           knows when the callers input is done.  You have
           three choices:  1) you may specify a set number
           of digits (this is good for menu choices and
           fixed-length data like account numbers), 2) you
           may specify a key that signals end-of-input (as
           in "please enter your account number and then
           press pound"), or 3) you may specify an
           interdigit timeout (wait N seconds after each
           digit - if there is a timeout after the first
           digit, then the input is complete).  The last
           method is a good way of getting variable-length
```

- 71 - input out of novice users. Note that in case (2), the key you specify as the termination key does not get included in the string passed back to you by VGetTones. In rarer cases, you may elect to use more than one of these termination methods; put together, they operate on an OR basis - if any of the termination methods is found, input is terminated. The defaults for the termination methods are <number_of_digits> = 1, <key_to_terminate_on> = " ", and <interdigit_timeout> = 0; in other words, the complete default is to get one digit and then stop. All examples below assume you have a character variable named "MYVAR". Note that to use the <key_to_terminate_on> argument, you must specify a <number_of_digits> parameter; to use the <interdigit_timeout> argument, you must specify both preceding parameters. VGetTones will return a -1 if the caller has not pressed any keys at all within the first five seconds (5 seconds is a default; this value can be reset with VSetTmOut); this usually indicates a rotary phone or a brain-dead caller.

The timeout issue needs to be carefully considered by the programmer. When prototyping, it is easiest to work without timeouts; this model is closest to PC use, where the system waits patiently for you to finish your input. In voice systems, things are more complicated. One scenario to think about, for example: your program has asked for a 7-digit phone number. If the caller punches in 6 digits, thinking he/she has punched in 7, your program will now wait forever for that seventh digit unless you have a timeout set. For that reason, we have timeouts set (5 seconds for the first key, 10 for inter-digit timeout) on as defaults. This case also shows that you should actively check the return codes from VGetTones. If you had asked specifically for seven digits (as in the second example below), you would get a 0 return code if the caller put in seven digits, or a 2 return code if there was an inter-digit termination timeout. In this case, you want exactly 7 digits, so a return code of 2 should cause you to do the VGetTones again.

Example: Get a single-digit menu choice from the caller (assumes you have a prompt 'menu.wav' recorded that speaks your menu).

- 72 -

```
        retval = VSpeak("menu.wav")
        retval = VGetTones(@MYVAR)
```

Example: Get a seven-digit account number from the caller.

```
        retval = VGetTones(@MYVAR, 7)
```

Example: Get a credit card number of arbitrary length, terminated with a # sign, from the caller. Notice that you use 0 (don't care) for the number of digits.

```
        retval = VGetTones(@MYVAR, 0, "#")
```

Example: Get a credit card number of arbitrary length, terminated when the user pauses for two seconds between digits (two seconds has been found to be a good choice with normal callers; higher values would be appropriate for complete novices). Notice that you use 0 (don't care) for the number of digits and " " (no terminating key) for the key to terminate on.

```
        retval = VGetTones(@MYVAR, 0, " ", 2)
```

2.1.4 Get Tone (DTMF) Input (Macro)  - VGetTonesM

Syntax:
```
  retval =  VGetTonesM( <voice_prompt>, <tries>,
                @<variable>
                [,<number_of_digits>
                        [,<key_to_terminate_on>
                        [,<interdigit_timeout>
                        [,<valid_list>] ] ] )
```

Arguments:
    <voice_prompt> A character string containing a file name or memo field name. See the description of the VSpeak function.

<tries> The number of total "tries" to make. In each try, the prompt is spoken, then VGetTonesM waits for input. If it does not get correct input, it tries again, until <tries> is exhausted.

@<variable> A character variable passed by reference. After a successful return, this variable will contain the sequence of digits entered by the caller.

ATTORNEY DOCKET NO: VOYS2220WSW
wsw/voys/2220.001

- 73 -

<number_of_digits> Integer; the number of
digits to terminate on (0 = any number
of digits). Default: 1 digit.

<key_to_terminate_on> A string containing a
single character, which should be a key
(0..9, *, or #) to terminate input upon.
(" " = no key). Default: no key.

<interdigit_timeout> Integer; maximum number of
seconds between keys (0 = no interdigit
timeout). Default: 10.

<valid_list> Character; a comma-separated list
of legal choices. The default for this
argument is no validation list.

Return Codes:
  2  Success; terminated on inter-digit timeout
  1  Success; terminated on specified key
  0  Success; terminated on number of digits
 -1  Failure; terminated on initial timeout
 -2  Failure; terminated on hangup
 -3  Failure; ran out of tries
-11  Failure; bad termination digits (must be
     0-50)
-12  Failure; bad termination key (must be 0-9,
     *, #, or blank)
-13  Failure; bad interdigit timeout (must be
     non-negative)

Description: VGetTonesM is a "macro" command that
combines features of VSpeak and VGetTones. It
is meant to address simple demands like "If
you're using VISA, press 1. If you're using
Mastercard, press 2." and to spare you the
necessity of writing loops and input checking.
VGetTones allows you to specify multiple
"tries"; for each try, this function will speak
the prompt and then wait for input. If there is
no input, or if the input does not match one of
the possibilities given in the optional
<valid_list>, the function will try again,
provided the total number of tries has not been
exhausted.

Example: Get a four-digit account number into
the variable MYVAR. If the user does not enter
any keys, or does not enter enough keys, try one
more time before reporting failure. This

- 74 - example assumes that you have a prompt file "getacct".

retval = VGetTonesM( "getacct", 2, @MYVAR, 4)

Example: Ask the user "For VISA, press 1. For Mastercard, press 2. For Discover, press 3" (assume this is prompt "getcard"), and verify that the input is in fact 1, 2, or 3. Try this three times before giving up.

retval = VGetTonesM("getcard", 3, @MYVAR, 1, " ", 0, "1,2,3")

For more information, please see the descriptions of VSpeak and VGetTones.

Design Notes: Can anyone suggest a better name for this function?

2.1.5 Get Word (Voice Recognition) Input - VGetWords

IMPORTANT NOTE: This function will not be included in the initial developers kit. Also, this design is based on our prototype integration with the VPC board; it may be modified in the future.

Syntax: retval =
    VGetWords( @<variable> [,<sub-vocabulary_name>
                [,<number_of_words>
                [,<word_to_terminate_on>
                [,<interword_timeout>]]]] )

Arguments:
    @<variable>  A character variable passed in by reference. After a successful return, this variable will contain the words spoken by the caller. Numbers will be returned in numeric ("1" not "one") form. If there are multiple words, they will not be separated by spaces.

<sub-vocabulary_name>  This is the name of the sub-vocabulary set which contains the words to be recognized. The current vocabularies are "yesno" (the words"yes" and "no"), "numbers" (the ten digits, plus "oh"which is interpreted as "zero"), and "all", which has"yes", "no", "oh", and 0-9.  If no

- 75 - sub-vocabulary is specified, "all" is used.

<number_of_words>  Integer; the number of words to get.
0 = any number of words.
The default is one word.

<word_to_terminate_on>  Character; this is a word to be used as a termination marker (this word is not included in the returned string).
" " = no word to terminate on; this is the default.

<interword_timeout>  Integer; the maximum number of seconds between words.
0 = no timeout; the default is 10 seconds.

Return Codes:
2       Success; terminated on inter-word timeout
1       Success; terminated on specified word
0       Success; terminated on number of words
-1      Failure; terminated on first-word timeout
-2      Failure; terminated on hangup
-11     Failure; bad number of words (must be 0-50)
-13     Failure; bad interword timeout (must be non-negative)
-XXX    Failure; 50-character word buffer filled up Description: Get one or more words by voice recognition from the caller. You must pass in a character variable by reference. The second argument lets you choose a sub-vocabulary name from which words will be recognized. The last three arguments specify how VGetWords knows that input is finished. The standard way is to specify a given number of words. You also have the choice, however, of choosing to terminate on a given word, or to terminate if there is a sufficient pause between words.

The default first-word timeout is five seconds. In other words, if the caller hasn't said anything within the first five seconds after a

- 76 -

VGetWords call, the function will return a -1 (failure) error code.

Example: Get a "yes" or a "no" from the caller. Note that this example uses the default termination condition: get one word.

retval = VGetWords(@MYVAR, "yesno")

Example: Get a 4-digit account number from the caller.

retval = VGetWords(@MYVAR, "numbers", 4)

Example: Get a number of arbitrary length from the caller. Assume the caller has finished reciting the number if there is a 4-second pause after any word. Note that this example uses number of words=0 (any number of words) and terminating word=" " (do not terminate on a particular word).

retval = VGetWords(@MYVAR, "numbers", 0, " ", 4)

Design Notes: In the future, we will want to think about a separator option for this function (having the words un-separated is good for numbers and letters, but bad for real words).

2.1.6 Hang up - VHangup

Syntax:    retval = VHangup()

Arguments: none

Return codes:  0    Success

Description: Hang up the line; terminates the call. It is important to remember to do this once a call is complete, to better prepare the system to make or receive the next call.

2.1.7 Record a message - VRecord

Syntax: retval =
    VRecord( <filename> | <memo_name> | @<variable>
                [,<max_recording_length>] )

- 77 -

Arguments:
<filename> Character; the file name for the
recording. Unless a full path is
specified, this file will be placed
in the recordings directory set with
VSetDir (see below).

<memo_name> Character; the name of a memo field
where the recording is to be stored. The
name of the memo field must be enclosed
in quotes.

@<variable> Character variable passed by
reference. Generate a unique name for
the recording and pass it back in the
variable. The file will be placed in
the directory set with VSetDir.

<max_recording_length> Integer; maximum length
of the recording in seconds.
Default is 120 seconds.

Return Codes:
    0      Success
    -1     Failure; timeout
    -11    Failure; invalid input (not a character
           string or character variable passed by
           reference)
    -12    Invalid file name
    -XX    Invalid recording length; must be a
           positive integer Description: Record a message (voice file) from the
caller. The file this is to go to can be
explicitly specified, or the voysAccess system
can generate a unique name.

The second method is generally more appropriate;
it is done by passing in a character variable
passed by reference. The recording will be
terminated after a two-second silence, or if the
caller presses "#". Unless otherwise specified,
the files will be placed in the RECORDINGS
directory set with VSetDir. Recordings can be
"embedded" in a database by putting the file
name in a character field, or, more directly, by
putting the recording into a memo field.

Notice that there is the possibility of a naming
conflict between memo fields and file names.
For each name passed in quotes that is not

- 78 - obviously a file name, the voysAccess software will first check to see whether it is a valid memo field.

The final parameter to VRecord is the (optional) maximum recording length. The recording will terminate if the length of the message reaches the set maximum. The default is 120 seconds.

Example: Record a message into the file "newmsg.wav"; allow it to be no more than 30 seconds long.

```
retval = VRecord("newmsg.wav", 30)
```

Example: Record a message into a file name chosen by the system. Get name back in the character variable MYVAR.

```
MYVAR = " "
retval = VRecord(@MYVAR)
```

Example: Record a message into the memo field MYMEMO.

```
retval = VRecord("MYMEMO")
```

2.1.8   Send Tones (DTMF) - VSendTones

Syntax: retval = VSendTones( <tone_string> )

Arguments:
   <tone_string>  A character string containing tones to be sent over the phone line. Valid tone characters are 0..9, *, #, and A..D.

Return codes:
   0      Success
   -XX    Invalid tone in tone string

Description: The VSendTones function sends Touch-tone (DTMF) presses over the phone line. It has the same effect as if a human user pressed those keys on his or her phone. This command is mostly useful for creating automated computer-to-computer applications; testing or data transfer, for example.

ATTORNEY DOCKET NO: VOYS2220WSW
wsw/voys/2220.001

- 79 -

Example: Play the tones "1", "2", and "3" (analogous to a human user pressing these same keys on their phone):

retval = VSendTones("123")

2.1.9 Set voysAccess parameters - VSet

Syntax: retval = VSet( <parameter> , <value> )

Arguments:
| Parameter | Allowable Values |
|---|---|
| AppPrompts | <directory that application prompts are stored in> |
| Recordings | <directory that recordings are stored in> |
| SysPrompts | <directory that system prompts are stored in> |
| DateSpeak | "mmddyy", "mmdd", "ddmmyy", "ddmm" |
| VGetTones1stKey | <positive integer> |
| TestMode | "on", "off" |

Return Codes:
- 0 Success
- -71 Failure; bad parameter (first argument)
- -72 Failure; bad value (second argument)

Description: The VSet function allows the user to set various parameters that affect the behavior of the voysAccess tool kit. All of these settings are also available in the "VOYSACCS.INI" file, with the same names. The rule of precedence is: any use of VSet with a particular parameter overrides the .INI setting of that parameter, but only for the session in which the VSet is used (the .INI file is not changed).

AppPrompts, Recordings, SysPrompts:
These set the directories in which voice files are expected to be found (we use "prompts" to mean voice files that are part of your application, like "for sales, press 1..." and "messages" or "recordings" to indicate voice files recorded by callers). "SysPrompts" sets the directory in which system prompts (like "thirteen" or "April") are to be found.

- 80 -

"AppPrompts" sets the directory in which you've placed your application's prompts. "Recordings" sets the directory in which your user messages are recorded. We suggest "\VOYSACCS\APPS\<yourapp>\PROMPTS" for your application's prompts, and "\VOYSACCS\APPS\<yourapp>\RECORD" for the recordings. "RECORDINGS" has a direct effect on where the files recorded with VRecord are placed; all three settings are used to set VSpeaks search order. We suggest that you set your AppPrompts directory (and your Recordings directory, if your application does any recordings) in each of your voysAccess applications. You would do this with the following commands:

retval =   VSet("AppPrompts",
               "c:\voysaccs\apps\myapp\prompts")

retval =   VSet("Recordings",
               "c:\voysaccs\apps\myapp\record")

assuming that you followed our suggested directory structure, that your files were on the C: drive, and that the directory name for your application was "myapp". It is generally not necessary to specify where your system prompts are stored; since this is normally fixed, it can be specified in the .INI file.

DateSpeak:
This sets the way dates are to be spoken by VSpeak. The default is "mmddyy". The allowable settings are:

"mmddyy":  speak dates as month, day, year ("January 25th, 1994")
"mmdd":    speak dates as month and day only ("January 25th")
"ddmmyy":  speak dates as day, month, year ("the 25th of January 1994")
"mmdd":    speak dates as day and month only ("the 25th of January")

VGetTones1stKey:
This sets the first-key timeout for the VGetTones function. This is how long, in seconds, the function will wait if no keys are pressed before declaring a failure. Note that this is different from the interdigit timeout

- 81 - that you can set in VGetTones itself: the
inter-digit timeout is how long the function
will wait between digit presses.

TestMode:
Test Mode allows the programmer to test their
program without being connected to a phone line.
When TestMode is set to "on", the core telephony
functions put up a screen in Windows allowing
the user control of their results.  For example,
VWaitRing function puts up a screen that allows
the user to say whether someone called in, or
whether there was a timeout.

2.1.10  Speak prompt(s) - VSpeak

Syntax: retval =
        VSpeak( <value> [,<value>] ... [,<value>] )

Arguments:
        VSpeak can take up to 10 <value> parameters.

<value> can be either a value to be spoken,
        or a code word indicating a "speak mode" for
        the following argument(s).

Valid values to be spoken:
            - any numeric value
            - any date (converted to a character
              string)
            - a character string containing a voice
              file name
            - a character string containing the
              name of a memo field that contains
              voice data Valid speak modes:

DOLLARS:  speak numeric amounts as
                      dollars and cents
            DIGITS:   speak numeric amounts as digits
            DAY:      speak integer amounts as days
                      of the week (1=Sunday)

Return Codes:
     1  Success, but interrupted by DTMF keypress
     0  Success
    -2X Failure:  prompt file not found (-21 means
        first arg, etc.)

Description:  VSpeak allows you to speak a sequence

- 82 - of prompts or values. It can take up to 10 arguments. The arguments can be values (numbers, or character strings containing dates or prompt names) or 'speak modes' that regulate how numeric values should be spoken.

Example: To speak the string "We have <number> widgets in our inventory," you would record a voice file containing "We have" (say maybe 'wehave.wav') and another containing "widgets in our inventory" ('widgets.wav'). If WIDGETS was an integer variable or data field containing the number of widgets in inventory, you would then use the FoxPro expression:

retval =   VSpeak("wehave.wav",   WIDGETS, "widgets.wav")

The "speak modes" only apply to numeric values. The default is a standard numeric format: 432 is spoken as "four hundred thirty two". DIGITS says speak out the digits: 432 would be spoken as "four three two" (this is useful for account numbers and suchlike). DOLLARS speaks numbers as dollar amounts: 432.54 would be spoken as "four hundred thirty-two dollars and fifty-four cents". DAY speaks numbers in the range 1..7 as days of the week; this is designed to work hand-in-hand with the FoxPro DOW( ) function. The speak mode must precede its target(s) in the VSpeak function; putting in a speak mode says "speak all the rest of the numbers in this VSpeak in this format unless I tell you otherwise".

The current version allows you to either specify the file name and the extension ("pname.wav") or just the name ("pname"), assuming that the extension is ".wav". We usually use the latter, the idea being to facilitate portability to other file formats in the future (you could have one version of the file in each format, and tell us once which file format you were using). You may also use the file name plus the dot, but without the extension ("pname.") to tell the voysAccess software that it is a file name.

Notice that there are possible conflicts between voysAccess code words (such as DOLLARS, file names, and memo field names. If a string passed in to VSpeak has letters of the alphabet, but

- 83 - not the dot (.), that would signal a file name, the voysAccess software will first check to see if it's a code word, then if it is a memo, before assuming that it's a file name.

Example: To speak "Today is <day of the week> <date>" you would execute the following FoxPro code (assuming that you have recorded a voice file 'today.wav' with the phrase "Today is..."):

```
retval = VSpeak("today", "DAY", DOW(DATE()),
            DTOC(DATE()))
```

Example: To speak the contents of the memo field NAME (if name has voice data inside it):

```
retval = VSpeak("name")
```

2.1.11 Wait for the phone to ring and answer it - VWaitRing

Syntax: retval =
    VWaitRing( [<num_rings> [, <timeout> ] ] )

Arguments:
    <num_rings>  The number of rings to wait before
            answering.
            Optional argument; default is 2 rings.
            Must be a positive integer.

<timeout>  Number of seconds to wait before
            timing out; 0 means don't time out.
            Optional argument (you must specify a
            <num_rings> if you want to set a
            <timeout>); default is 0 (no timeout).
            Must be a non-negative integer.

Return Codes:
    0       Success (answered a phone call)
    -1      Timeout
    -11     Invalid <num_rings> argument
    -12     Invalid <timeout> argument Description: Wait for the phone to ring and answer it. The <num_rings> parameter sets the number of rings to wait before answering the phone (1 or 2 are good choices). The <timeout> parameter sets the number of seconds to wait before timing out (0 - no timeout - is easiest to work with at the beginning).

- 84 -

APPENDIX C
DB_Fox.c
Copyright 1992-1994 Voysys Corporation

```
/******************************************************************
 *
 * File:   DB_Fox.c
 *
 * Purpose:
 *     Set of routines for FLL interface (FoxPro 2.0, 2.5, 2.6)
 *
 * $Log: /VoysAccess/core/dbi/DB_FOX.C $
 *
 *
 ******************************************************************/ include <dos.h>
include <errno.h>
#include <math.h>
#include <fcntl.h>
#include <io.h>              // _mktemp
#include <sys\stat.h>
include <stdio.h>
#include <stdlib.h>          // Definition of _MAX_PATH
#include <string.h>
include <windows.h>
include <dde.h> include "pro_ext.h"

define IN_MAIN 1

// if define equals to 1, enable fax support
// remember to go the end of this file to uncommented the fax
// functions in FoxInfo structure
// need to define this before the .h files as it could be used in
// the .h header files
define DO_FAX          0 include "OS.h"
include "dVR.h"
include "Command.h"
include "Compute.h"

#define MAX_PN        20    // maximum number of characters
                                        allowed for program name
#define MAX_LN        127   // maximum number of characters
                                        allowed for library name define TMPBUFF_SIZE  ( 8 * 1024 )   // 8 KB define TMP_TEMPLATE  "~vXXXXXX"

/*
 * Information about state of each active task.
 *
 * This data is shared by all client processes, but each process
```

- 85 -

```
 * looks only at the data for itself.
 *
 * Processes find a free slot by looking at the bInUse field.
 */
struct line_t { boolean        bInUse;     // is this table slot in use ?

unsigned int   hTask;      // Windows task handle int            nLineNum;   // line number (not really used)

unsigned int   handlerid;      // FoxPro event handler ID

WHANDLE    whandleClientDDE; // FoxPro handle of hidden client
                                                             window
    HWND       hwndClientDDE;    // Windows handle of hidden
                                                      client window
};

static
struct line_t line[MAX_LINES] = {0};

/****************************************************/
// Find line table slot that is being used by task hTask static
int    FindSlot (
    const  unsigned int   hTask, // task handle (Windows only)
           struct line_t **psp   // ptr to ptr to slot in line
                                                             table
)
{
    int             nVRetVal;    // Voysys return value
    int             nSlot;       // slot in line table // find slot in the line table by using hTask
    for ( nSlot = 0 ; nSlot < MAX_LINES ; nSlot++ ) {
        if ( line[nSlot].bInUse &&
             ( line[nSlot].hTask == hTask ) )
            break;
    }
    if ( nSlot >= MAX_LINES ) {
        Debug ( 1, sprintf ( Debug_buf, "DB_Fox/FindSlot: couldn't
                                      find slot in line table" ) );
        nVRetVal = RC_NOTINITIALIZED;     // best guess
        goto done;
    }

*psp = &line[nSlot];

nVRetVal = RC_SUCCEED;

done:
    return nVRetVal;

}   /* function FindSlot */
```

ATTORNEY DOCKET NO: VOYS2220WSW
wsw/voys/2220.001

```
/******************************************************************
   Trim trailing blanks: trim_trailing This function trims trailing blanks in strings by replacing them
   with '\0's. It is needed because FoxPro passes strings filled
   with blanks to the end of the field, and because several of our
   routines (like "dollars" etc options, plus play of file names) do
   not check for trailing blanks.
******************************************************************/ void trim_trailing (
        char    *buffer
   )
   {
        char    *buf_ptr;

for ( buf_ptr = buffer + strlen ( buffer ) - 1; *buf_ptr ==
                                                  ' '; buf_ptr-- )
             *buf_ptr = ( char ) NULL;

} /* function trim_trailing */

/******************************************************************
      GetProgramName Get filename of currently executing FoxPro program.
      Gives base file name, in all caps, without PRG extension.

******************************************************************/
   static
   void GetProgramName (
        char far    *szProgramName    // result - name of PRG file
   )
   {
        Value       result;         // FoxPro result structure
        int         nFRetVal;       // FoxPro return value
        int         nCount;

nFRetVal = _Evaluate( &result, "PROGRAM()" );

szProgramName[0] = ( char ) NULL;
        if (nFRetVal == 0) {
            nCount = min ( MAX_PN, result.ev_length );
            _fstrncpy (
                  szProgramName,
                  _HandToPtr ( result.ev_handle ),
                  nCount );
            szProgramName[nCount] = ( char ) NULL;
            trim_trailing ( szProgramName );
        }
        else {
            Debug ( 1, sprintf ( Debug_buf, "DB_Fox/GetProgramName:
                                 _Evaluate ret %d", nFRetVal ) );
        }
        Debug ( 3, sprintf ( Debug_buf, "DB_Fox/GetProgramName: ret,
```

- 87 -

```
                                szProgramName '%s'", szProgramName ) );
        }   /* function GetProgramName */

/*****************************************************************

GetLibraryName

Get filename of currently executing library.

*****************************************************************/
        static
        void GetLibraryName (
            char far    *szLibraryName      // result - name of LIBRARY file
        )
        {
            Value       result;         // FoxPro result structure
            int         nFRetVal;       // FoxPro return value
            int         nCount;

nFRetVal = _Evaluate( &result, "SET('LIBRARY')" );

szLibraryName[0] = ( char ) NULL;
            if (nFRetVal == 0) {
                nCount = min ( MAX_LN, result.ev_length );
                _fstrncpy (
                        szLibraryName,
                        _HandToPtr ( result.ev_handle ),
                        nCount );
                szLibraryName[nCount] = ( char ) NULL;
                trim_trailing ( szLibraryName );
            }
            else {
                Debug ( 1, sprintf ( Debug_buf, "DB_Fox/GetLibraryName:
                                            _Evaluate ret %d", nFRetVal ) );
            }

Debug ( 3, sprintf ( Debug_buf, "DB_Fox/GetLibraryName: ret,
        szLibraryName '%s'", szLibraryName ) );
        }

/*****************************************************************

FoxPro event handler:           EvtHandler

*****************************************************************/
        int FAR EvtHandler (
            WHandle         theWindow,
            EventRec FAR    *theEvent
        )
        {
            struct event    event;      // event to send down
            UINT            message;    // component of Windows message
            WPARAM          wParam;     // component of Windows message
            LPARAM          lParam;     // component of Windows message
            struct line_t   *sp;        // ptr to slot in line table
```

ATTORNEY DOCKET NO: VOYS2220WSW
wsw/voys/2220.001

- 88 -

```
        int         nVRetVal;    // Voysys return value

// find slot in the line table
        nVRetVal = FindSlot( GetCurrentTask ( ), &sp );
        if ( nVRetVal != RC_SUCCEED )
            return NO;              // FoxPro should handle the event if ( theWindow != sp->whandleClientDDE )
            return NO;              // FoxPro should handle the event
        // extract fields from FoxPro form to Windows form
        message = ( UINT ) ( theEvent->message );
        wParam = ( WPARAM ) ( theEvent->misc );
        lParam = ( LPARAM ) ( theEvent->misc2 );
        switch ( message ) {
            case WM_DDE_ACK:
            case WM_DDE_DATA:
            case WM_DDE_TERMINATE:
                // we will handle the event
                break;
            default:
                // event we don't care about
                return YES;    // FoxPro should NOT handle the event
        } event.nEvent = EV_DDE;
        event.nLine = 0;
        event.C_error = 0;
        event.DV_error = 0;
        event.DOS_error = 0;
        event.string[0] = ( char ) NULL;
        event.filename[0] = ( char ) NULL;

        // pack fields from Windows form to voysAccess form
        event.dde[0] = message;
        event.dde[1] = wParam;
        event.dde[2] = lParam;

        nVRetVal = com_ProcessEvent ( sp->hTask, event );
        if ( nVRetVal < RC_SUCCEED ) {
            Debug ( 1, sprintf ( Debug_buf, "DB_Fox/EvtHandler: event
                                            handling failed\n" ) );
        }
        return YES;      // FoxPro should NOT handle the event }   /* function EvtHandler */

/****************************************************************

Put memo field data into a temporary file and return the
    filename if success.

****************************************************************/ int IsMemoField (
        char        *field,
        boolean     *bMemoField,
```

- 89 -

```
            Value      *val,
            Locator    *loc
      )
      {
          int        nVRetVal;
          NTI        nNameTblIndex;

*bMemoField = FALSE;

          // try to find out if this is a memo field
          nNameTblIndex = _NameTableIndex ( ( char far * ) field );
          if ( nNameTblIndex != -1 ) {
              // name is in the name table
              if ( _FindVar( nNameTblIndex,
                              0,                    // database area number
                              ( Locator FAR * ) loc
                          ) ) {
                  // variable with the name exist
                  if ( _Load ( ( Locator FAR * ) loc, ( Value FAR * )
                                                         val ) != 0 ) {
                      nVRetVal = RC_FOXPROERROR;
                      goto done;
                  }

                  if ( val->ev_type == 'M' ) {         // memo field
                      // this is a memo field
                      if ( val->ev_width <= 0 ) {
                          nVRetVal = RC_FOXPROERROR;
                          goto done;
                      }
                  }
                  *bMemoField = TRUE;
              }
          }
35
          nVRetVal = RC_SUCCEED;

done:
          return ( nVRetVal );
40
      }   /* function IsMemoField */

45    /***************************************************************

Get temporary filename.

***************************************************************/
      int GetTmpFilename (
          const  unsigned int  hTask,       // task handle (Windows only)
          const  int           nFileType,
                 char          *pTmpFile
      )
      {
          int     nVRetVal;
          ulong   dwDummy;
          char    szTmpName[MAX_FN];        // temporary filename
          // Assumption: pTmpFile has the size of MAX_DN + MAX_FN
```

ATTORNEY DOCKET NO: VOYS2220WSW
wsw/voys/2220.001

```
        // Attempt to find a unique filename
        strcpy ( szTmpName, TMP_TEMPLATE );
        if( _mktemp( szTmpName ) == NULL ) {
            nVRetVal = RC_OSERROR;
            goto done;
        }

// get the temporary file path from server
        nVRetVal = com_Get ( hTask, nFileType, ( char far * )
                                                pTmpFile, &dwDummy );
        if ( nVRetVal != RC_SUCCEED )
            goto done;

strcat ( pTmpFile, szTmpName );
        strcat ( pTmpFile, ".TMP" );

nVRetVal = RC_SUCCEED;

done:
        return ( nVRetVal );

} /* function GetTmpFilename */

/*****************************************************************

Put memo field data into a temporary file.

*****************************************************************/ int PutMemoDataInTmpFile (
    const   unsigned int    hTask,      // task handle (Windows only)
            char            *filename,
    const   Value           val
)
{
    char        szTmpFile[MAX_DN + MAX_FN];
    int         nVRetVal;
    FCHAN       MHandle, FHandle;
    long        lStartPos;
    long        lMemoSize;
    char        *pBuff;
    int         nReadSize, nWriteSize;
    MHANDLE     mh;

lMemoSize = val.ev_long;
    if ( lMemoSize <= 0) {
        nVRetVal = RC_FOXPROERROR;
        goto done;
    }

MHandle = ( FCHAN ) val.ev_width;

// position the file pointer on the beginning of the section
    // that belongs to the current record
    lStartPos = ( long ) val.ev_real;
    _FSeek ( MHandle, lStartPos, FS_FROMBOF );

mh = _AllocHand ( TMPBUFF_SIZE );
```

- 91 -

```
         if ( mh == 0 ) {
             nVRetVal = RC_RAMFULL;
             goto done;
         }
         pBuff = ( char * ) _HandToPtr ( mh );

nVRetVal = GetTmpFilename ( hTask, GET_TMPFILES, ( char * )
                                                          &szTmpFile );
         if ( nVRetVal != RC_SUCCEED )
             goto finish2;

// open the temporary file
         FHandle = _FCreate ( ( char far * ) &szTmpFile, FC_NORMAL );
         if ( FHandle == -1 ) {
             nVRetVal = RC_FOXPROERROR;
             goto finish2;
         }

         . while ( lMemoSize > 0 ) {
             nReadSize = (int) min ( (long) TMPBUFF_SIZE, lMemoSize );
             nReadSize = _FRead ( MHandle, ( char FAR * ) pBuff,
                                                          nReadSize );
             lMemoSize -= nReadSize;
             nWriteSize = _FWrite ( FHandle, ( char FAR * ) pBuff,
                                                          nReadSize );
             if ( nReadSize != nWriteSize ) {
                 nVRetVal = RC_DISKFULL;
                 goto finish1;
             }

}

         strcpy ( filename, ( char * ) &szTmpFile );
         nVRetVal = RC_SUCCEED;

finish1:
         _FClose ( FHandle );
     finish2:
         _FreeHand ( mh );

done:
         return ( nVRetVal );

} /* function PutMemoDataInTmpFile */

     /*****************************************************************

Get memo field data from a temporary file.

     *****************************************************************/ int GetMemoDataFromTmpFile (
                 char      *filename,
         const   Value     val,
         const   Locator   loc
     )
```

- 92 -

```
    {
        int         nVRetVal;           // Voysys return value
        long        lFileSize;
        FCHAN       MHandle, FHandle;
        long        lStartPos;

// open the temporary file
        FHandle = _FOpen ( ( char far * ) filename, FO_READONLY );
        if ( FHandle == -1 ) {
            nVRetVal = RC_FOXPROERROR;
            goto done;
        }

// find the size of the file
        lFileSize = _FSeek ( FHandle, 0L, FS_FROMEOF );

// get the file channel for memo field
        MHandle = ( FCHAN ) val.ev_width;

        if ( ( lStartPos = _AllocMemo ( ( Locator FAR * ) &loc,
                                                    lFileSize ) ) == -1 ) {
            nVRetVal = RC_FOXPROERROR;
            goto finish;
        }
        // position the file pointer on the beginning of the section
        // that belongs to the current record
        _FSeek ( MHandle, lStartPos, FS_FROMBOF );

        // do the copy from temporary file to memo field
        nVRetVal = _FCopy(MHandle, lStartPos, FHandle, 0L, lFileSize);
        if ( nVRetVal == 0 ) {
            nVRetVal = RC_FOXPROERROR;
            goto finish;
        } nVRetVal = RC_SUCCEED;

finish:
        _FClose ( FHandle );

done:
        return ( nVRetVal );

    }   /* function GetMemoDataFromTmpFile */

/***************************************************************
    Startup the system:             START This routine is called automatically when the library is loaded.
    It does the "init" and "connect" calls.
    &&& We may want to leave "connect" to the user.

***************************************************************/ void FAR start ( )
    {
        int             nVRetVal;       // Voysys return value
```

ATTORNEY DOCKET NO: VOYS2220WSW
wsw/voys/2220.001

- 93 -

```
            struct line_t    *sp;            // ptr to slot in line table
            int              nSlot;          // slot in line table
            char             szProgramName[MAX_PN + 1];
            ulong            dwFileFormat;
            char             szDir[MAX_DN];

// send a beep to the PC speaker to indicate this "start"
            //function has been called
            MessageBeep ( (UINT)-1 );
if     !NO_DEBUGGING_AT_ALL define DEBUG_INTO_FILE      1
if DEBUG_INTO_FILE
            /* delete, create and open debug file */
            {
                int          i, j;
                char         name[13];
                int          filehdl;

i = 0;
                j = 0;

// debug file name: vcdbug00.txt, vcdbug01.txt, ... ,\
                // vcdbug98.txt, vcdbug99.txt
                //              012345678901
                strcpy ( name, "vcdbug00.txt" );
                while ( TRUE ) {
                    if ( i > 9 ) {
                        // check to see there is a need to increment the
                        // 1st digit of the filename
                        i = 0;                  // reset the 2nd digit to 0
                        j++;                    // increment 1st digit
                        name[6] = '0' + j;
                    } name[7] = '0' + i;

// if exists, use another name
                    filehdl = open (
                                name,
                                O_TEXT | O_RDONLY,    // |O_EXCL,
                                S_IREAD
                                );
                    if ( filehdl != -1 ) {
                        // open success, the file exist and can be openned
                        // so we should try the next sequence number
                        close ( filehdl );

if ( ( i != 9 ) || ( j != 9 ) ) {
                            // not reach the last file "vcdbug99.txt" in
                            // the sequence yet
                            // so go back and try the next sequence number
                            i++;    // increment the 2nd digit of the flname
                            continue;
                        }
                        else {
                            // reach the last file "vcdbug99.txt"
                            // so start from "vcdbug00.txt" again
                            name[6] = '0';
                            name[7] = '0';
```

ATTORNEY DOCKET NO: VOYS2220WSW
wsw/voys/2220.001

```
                            - 94 -
                i = 0;
                j = 0;
            }
        }
        // open fail, the file does not exist OR
        // file exist but we already reach the last file
        // "vcdbug99.txt"
        // so we try to create/truncate the file and start a
        // new debug file
        debugfile = open ( name, O_CREAT | O_TRUNC | O_TEXT |
                                 O_WRONLY,// |O_EXCL, S_IWRITE );
        if ( debugfile != -1 )
            break;          // success, file is created
        if ( errno != EACCES ) {
            // failure other than "busy"
            nVRetVal = RC_OSERROR;
            goto done;
        }

// failure is "busy" so that means the file is being
        // used right now
        // go back to try the next sequence number
        i++;        // increment the 2nd digit of the filename
    }
}
endif Debug_flag = 3;
endif GetProgramName( szProgramName );

// find slot in the line table
    nVRetVal = FindSlot( GetCurrentTask ( ), &sp );
    if ( nVRetVal == RC_SUCCEED ) {
        Debug ( 1, sprintf ( Debug_buf, "DB_Fox/start: task has
                                                already started" ) );
        nVRetVal = RC_ALREADYINITIALIZED;
        goto done;
    }

// find a free slot in the line table
    for ( nSlot = 0 ; nSlot < MAX_LINES ; nSlot++ ) {
        if (!line[nSlot].bInUse)
            break;
    }
    if ( nSlot >= MAX_LINES ) {
        Debug ( 5, sprintf ( Debug_buf, "DB_Fox/start: line table
                                                is full" ) );
        nVRetVal = RC_SWLIMIT;
        goto done;
    } sp = &line[nSlot];
    sp->bInUse = TRUE;

sp->hTask = GetCurrentTask();
    sp->nLineNum = MAX_LINES;

sp->handlerid = _ActivateHandler ( EvtHandler );
```

- 95 -

```
          if ( sp->handlerid == 0 ) {
              nVRetVal = RC_OSERROR;
              sp->bInUse = FALSE;
              goto done;
          } sp->whandleClientDDE = _WOpenP (
                              10, 10,          // top, left
                              20, 20,          // bottom, right
                              WEVENT,          // gets events ?
                              WINDOW_SCHEME,   // default color scheme
                              ( Scheme FAR * ) 0,// ignored
                              WO_DOUBLEBOX     // border type
                              );
          if ( sp->whandleClientDDE == 0 ) {
              Debug ( 1, sprintf ( Debug_buf, "DB_Fox/start: _WOpenP
      failed" ) );
              nVRetVal = RC_OSERROR;
              _DeActivateHandler ( sp->handlerid );
              sp->handlerid = 0;
              sp->bInUse = FALSE;
              goto done;
          }

          sp->hwndClientDDE = _WhToHwnd ( sp->whandleClientDDE );
          if ( !sp->hwndClientDDE ) {
              nVRetVal = RC_OSERROR;
              _DeActivateHandler ( sp->handlerid );
              sp->handlerid = 0;
              _WClose ( sp->whandleClientDDE );
              sp->whandleClientDDE = 0;
              sp->bInUse = FALSE;
              goto done;
          }
          /*
           * Call the init routine.
           */
          nVRetVal = com_Initialize ( sp->hTask, 0, sp->hwndClientDDE );
          if ( nVRetVal != RC_SUCCEED ) {
              Debug ( 1, sprintf ( Debug_buf, "DB_Fox/start: init
                                              routine failed" ) );
              _DeActivateHandler ( sp->handlerid );
              sp->handlerid = 0;
              _WClose ( sp->whandleClientDDE );
              sp->whandleClientDDE = 0;
              sp->bInUse = FALSE;
              goto done;
          }
          /*
           * Call the "connect" routine.
           */
          nVRetVal = com_Connect (
                        sp->hTask,
                        MAX_LINES,       /* request any line */
                        &(sp->nLineNum)  /* retval -- line we got */
                        );
          if ( nVRetVal != RC_SUCCEED ) {
              Debug ( 1, sprintf ( Debug_buf, "DB_Fox/start: connect
                                              routine failed" ) );
```

- 96 -

```
        _DeActivateHandler ( sp->handlerid );
        sp->handlerid = 0;
        _WClose ( sp->whandleClientDDE );
        sp->whandleClientDDE = 0;
        sp->bInUse = FALSE;
        goto done;
    }

// find out the file format
    szDir[0] = (char) NULL;
    nVRetVal = com_Get ( sp->hTask, GET_FILEFORMATS, ( char far *)
                                        &szDir, &dwFileFormat );
    if ( nVRetVal != RC_SUCCEED )
        Debug ( 1, sprintf ( Debug_buf, "DB_Fox/start: cannot get
                                         FILEFORMATS" ) );
    strcpy ( szDir, DEF_DIR_SYSPROMPTS );
    if ( dwFileFormat & FM_VOX )
        strcat ( szDir, FM_VOX_STR );
    else
        if ( dwFileFormat & FM_WAV )
            strcat ( szDir, FM_WAV_STR );

/*
     * Initialize the default voice directories.
     * Ignore any failures.
     */
    nVRetVal = com_Set_Directory (sp->hTask, "SYSPROMPTS", szDir);
    if ( nVRetVal != RC_SUCCEED )
        Debug ( 1, sprintf ( Debug_buf, "DB_Fox/start: cannot set
                             SYSPROMPTS to DEF_DIR_SYSPROMPTS" ) );
    nVRetVal = com_Set_Directory ( sp->hTask, "APPPROMPTS",
                                        DEF_DIR_APPPROMPTS );
    if ( nVRetVal != RC_SUCCEED )
        Debug ( 1, sprintf ( Debug_buf, "DB_Fox/start: cannot set
                             APPPROMPTS to DEF_DIR_APPPROMPTS" ) );
    nVRetVal = com_Set_Directory ( sp->hTask, "RECORDINGS", "." );
    if ( nVRetVal != RC_SUCCEED )
        Debug ( 1, sprintf ( Debug_buf, "DB_Fox/start: cannot set
                                        RECORDINGS to ." ) );
    nVRetVal = com_Set_Directory ( sp->hTask, "FAXFILES", "." );
    if ( nVRetVal != RC_SUCCEED )
        Debug ( 1, sprintf ( Debug_buf, "DB_Fox/start: cannot set
                                        FAXFILES to ." ) );
    nVRetVal = com_Set_Directory ( sp->hTask, "TEMPFILES", "." );
    if ( nVRetVal != RC_SUCCEED )
        Debug ( 1, sprintf ( Debug_buf, "DB_Fox/start: cannot set
                                        TEMPFILES to ." ) );
    nVRetVal = com_Set_Vocabulary ( sp->hTask, DEF_DIR_VOCABS );
    if ( nVRetVal != RC_SUCCEED )
        Debug ( 1, sprintf ( Debug_buf, "DB_Fox/start: cannot set
                             Vocabulary to DEF_DIR_VOCABS" ) );

/*
     * Set the voice recognition vocabulary.
     * Ignore any failure.
     */
//  nVRetVal = com_Set_Vocabulary ( sp->hTask, "demo" );

nVRetVal = RC_SUCCEED;
    // send a beep to the PC speaker to indicate this "start"
```

- 97 -

```
        // function has been initialized
        MessageBeep ( (UINT)-1 );

done:
         // No return code; return back to FoxPro.
         return;

}   /* function start */

/*****************************************************************
     Shut down the system:  STOP
     This routine is called automatically when the library is unloaded
     or a QUIT is done out of FoxPro.  It does the "disconnect" and
     "shutdown" calls.  &&& We may want to leave "disconnect" to the
     user.

     *****************************************************************/ void FAR stop ( )
     {
        struct line_t    *sp;          // ptr to slot in line table
25      int              nVRetVal;     // Voysys return value // find slot in the line table
        nVRetVal = FindSlot( GetCurrentTask ( ), &sp );
        if ( nVRetVal != RC_SUCCEED )
            goto done;

com_Disconnect ( sp->hTask );
        com_Shutdown ( sp->hTask );

        if ( sp->handlerid != 0 ) {
            _DeActivateHandler ( sp->handlerid );
            sp->handlerid = 0;
        }

        if ( sp->whandleClientDDE != 0 ) {
            _WClose ( sp->whandleClientDDE );
            sp->whandleClientDDE = 0;
        }

        sp->nLineNum = MAX_LINES;
        sp->bInUse = FALSE;

done:
     #if     !NO_DEBUGGING_AT_ALL
     #if     DEBUG_INTO_FILE
        close ( debugfile );
     #endif
     #endif
        // No return code; return back to FoxPro.
        // no debug stmt; debug file is closed
        return;

}   /* function stop */
60
```

ATTORNEY DOCKET NO: VOYS2220WSW
wsw/voys/2220.001

- 98 -

```
/*****************************************************************
Wait for Ring: VWAITRING retcode = VWAITRING( [<num_rings>(I)] [,<timeout>(I)>] )

Returns:
        0       = Success
        -1      = Timeout
        -11     = Invalid number of rings (must be positive integer)
        -12     = Invalid timeout (must be non-negative integer)
        -10X    = Standard error codes (from dVR.h)

*****************************************************************
/ void FAR vwaitring (
    ParamBlk FAR   *parm
)
{
    int        num_rings;     // number of rings before answer
    int        timeout;       // timeout value in seconds
    int        nVRetVal;      // Voysys return value
    Value      result;        // FoxPro return structure
    struct line_t *sp;        // ptr to slot in line table // find slot in the line table
    nVRetVal = FindSlot( GetCurrentTask ( ), &sp );
    if ( nVRetVal != RC_SUCCEED )
        goto done;

/*
     * Extract the arguments to the function.  Remember that both
     *     arguments are optional. &&& This does not yet take
     *     into account the default settings.
     */
    if ( parm->pCount >= 1 )
        num_rings = ( ( int ) parm->p[0].val.ev_long );
    else
        num_rings = DEF_WAITRING_NUM_RINGS;

if ( parm->pCount >= 2 )
        timeout = ( (int) parm->p[1].val.ev_long);
    else
        timeout = DEF_WAITRING_TIMEOUT;

/*
     * Call the "answer" function.
     */
    nVRetVal = com_Answer ( sp->hTask, num_rings, timeout );
    if (nVRetVal == RC_TOTALTIMEOUT)
        nVRetVal = RC_WAITRINGTIMEOUT;

done:
    // Send the return code back to FoxPro.
    _MemFill ( &result, 0, sizeof ( result ) );
    result.ev_type = 'I';
    result.ev_long = nVRetVal;
    _RetVal ( &result );
    return;
}   /* function vwaitring */
```

ATTORNEY DOCKET NO: VOYS2220WSW
wsw/voys/2220.001

```
/*****************************************************************
Hang up:        VHANGUP retcode = VHANGUP()

Returns:
    0    = Success
    -10X = Standard error codes (from dVR.h)

*****************************************************************/ void FAR vhangup ( )
{
    int             nVRetVal;      // Voysys return value
    Value           result;        // FoxPro return structure
    struct line_t *sp;             // ptr to slot in line table // find slot in the line table
    nVRetVal = FindSlot( GetCurrentTask ( ), &sp );
    if ( nVRetVal != RC_SUCCEED )
        goto done;

/*
     * Call the hangup routine.
     */
    nVRetVal = com_Hangup ( sp->hTask );

done:
    // Send the return code back to FoxPro.
    _MemFill ( &result, 0, sizeof ( result ) );
    result.ev_type = 'I';
    result.ev_long = nVRetVal;
    _RetVal ( &result );
    return;

} /* function vhangup */

/*****************************************************************
Check for hangup:   VCHKHANGUP retcode = VCHKHANGUP()

Returns:
    1    = Success, hangup detected
    0    = Success, no hangup detected
    -10X = Standard error codes (from dVR.h)

*****************************************************************/ void FAR vchkhangup ( )
{
    int             nVRetVal;      // Voysys return value
    Value           result;        // FoxPro return structure
    struct line_t *sp;             // ptr to slot in line table // find slot in the line table
    nVRetVal = FindSlot( GetCurrentTask ( ), &sp );
```

- 100 -

```
        if ( nVRetVal != RC_SUCCEED )
            goto done;

/*
         * Call the check for hangup routine.
         */
        nVRetVal = com_Hangup_Detect ( sp->hTask );

done:
        // Send the return code back to FoxPro.
        _MemFill ( &result, 0, sizeof ( result ) );
        result.ev_type = 'I';
        result.ev_long = nVRetVal;
        _RetVal ( &result );
        return;

}   /* function vchkhangup */

    /*****************************************************************
    Speak: VSPEAK retcode = VSPEAK(<value>(?) [,<value>(?)] ... [,<value>(?)])
        Takes up to 10 parameters.  Parameters may be character
    strings (names of prompt files), numbers, or dates.  The strings
    "DIGITS", "DOLLARS", or "DAY" may be put into the parameter list
    to indicate SPEAK variations.
    Returns:
        1       = Speak interrupted by DTMF (still a success)
        0       = Success
        -21..-30 = Prompt file not found (argnum is -(errcode + 20))
        -10X    = Standard error codes (from dVR.h)

*****************************************************************/ void FAR vspeak (
        ParamBlk FAR   *parm
    )
    {
        int        nVRetVal;      // Voysys return value
        Value      result;        // use to check memo field and
                                      FoxPro return structure <<<<<
        int        play_type;     // Play type (DIGITS, DOLLARS, etc
        int        interrupt_mode;   // 0=no interrupt, 1=interrupt OK
    //  char       text[MAX_DN + MAX_FN];
        char       text[MAX_FN + 1];
        int        arg_count;
        int        play_flag;     // Should this argument be played?
        int        list_started;  // have we started a play list yet?
        double     dval;
        long       lval1, lval2;
        struct line_t *sp;                // ptr to slot in line table
        int        nCount;
        boolean    bMemoField = FALSE;
        Locator    loc;
        int        nNumMemoField = 0;
        int        nPlayListLen = 1;
        char       *pFileName;
```

ATTORNEY DOCKET NO: VOYS2220WSW
wsw/voys/2220.001

- 101 -

```
        MHANDLE    mh[MAX_PLISTLENGTH];
        char FAR   *lpName;

// find slot in the line table
        nVRetVal = FindSlot( GetCurrentTask ( ), &sp );
        if ( nVRetVal != RC_SUCCEED )
           goto done;

/*
         * Initialize the play type to AS_NUMBER (the default).
         */
        play_type = AS_NUMBER;

/*
         * Set the interruptibility (default is ON) &&& Need to check
         *     a table here
         */
        interrupt_mode = 1;

        /*
         * Set list_started to FALSE; we have not yet initialized a
         *     play list.
         * Set the return code to 0 (success).
         */
        list_started = FALSE;

/*
         * Process the arguments one at a time.
         */
        for ( arg_count = 0; arg_count < parm->pCount; arg_count++ ) { if ( nPlayListLen > MAX_PLISTLENGTH ) {
              nVRetVal = RC_PLISTLENGTH;
              goto done;
           } pFileName = text;

/*
            * Set the "play flag" for this argument to TRUE.
            */
           play_flag = TRUE;

/*
            * For each argument, check the type. If it is a string,
            *     we need to extract it, which involves conversion to
            *     a far pointer followed by a copy to our 'text'
            *     buffer.
            */
           if ( parm->p[arg_count].val.ev_type == 'C' ) {
              nCount = min(MAX_FN,parm->p[arg_count].val.ev_length);
              _fstrncpy ( ( char far * ) text,
                 _HandToPtr ( parm->p[arg_count].val.ev_handle ),
                 nCount );
              text[nCount] = ( char ) NULL;
              trim_trailing ( text );

/*
               * Now capitalize the string.
               */
              strupr ( text );
```

ATTORNEY DOCKET NO: VOYS2220WSW
wsw/voys/2220.001

- 102 -

```
/*
 * Check if the string is really one of our modifiers
 *      (DOLLARS, DIGITS, DAY). If it is, set the
 *      "play_type" to the correct value, and turn off
 *      the "play flag".
 */
if ( !strcmp ( text, "DIGITS" ) ) {
    play_flag = FALSE;
    play_type = AS_DIGITS;
}
else if ( !strcmp ( text, "DOLLARS" ) ) {
    play_flag = FALSE;
    play_type = AS_DOLLARS;
}
else if ( !strcmp ( text, "DAY" ) ) {
    play_flag = FALSE;
    play_type = AS_DAY;
}
else {
    // try to find out if this is a memo field
    nVRetVal = IsMemoField (   text, &bMemoField,
                                &result, &loc );
    if ( nVRetVal != RC_SUCCEED )
        goto done;

if ( bMemoField ) {
        // allocate memory for filename
        mh[nNumMemoField] =  _AllocHand ( MAX_DN +
                                           MAX_FN );
        if ( mh[nNumMemoField] == 0 ) {
            nVRetVal = RC_RAMFULL;
            goto done;
        } lpName = _HandToPtr ( mh[nNumMemoField] );

nVRetVal =   PutMemoDataInTmpFile ( sp->hTask,
                        ( char * ) lpName, result );
        if ( nVRetVal != RC_SUCCEED )
            goto done;
        pFileName =  ( char * ) _fstrrchr ( lpName,
                        '\\' );      // get the
                                     filename only
        pFileName++;         // skip the '\' char nNumMemoField++;
    }
}
else if ( parm->p[arg_count].val.ev_type == 'I' ) {
    /*
     * If the argument is of some other type, convert it
     *      to text. &&& Always using two decimal places
     *      for type N. &&&
     */
    sprintf (text, "%ld", parm->p[arg_count].val.ev_long);
}
else if ( parm->p[arg_count].val.ev_type == 'N' ) {
    /*
     * The Fox LCK has a bug that freezes if "sprintf" is
     *      used with a "%f". This code is a work-around.
```

- 103 -

```
            */
            dval  =     parm->p[arg_count].val.ev_real;
            lval1 =     ( long ) floor ( dval );
            lval2 =     ( long ) (100. *( dval - floor ( dval ) ) +
                        .5);

sprintf ( text, "%ld.%ld", lval1, lval2 );
        }
        /*
         * If the play flag is on, play this argument.  If it is
         *     the first one (list_started = FALSE), then we need
         *     to start a play list.
         */
        if ( play_flag ) {
            if ( !list_started ) {
                nVRetVal = com_Play (
                                sp->hTask,
                                START_PLAY_LIST,
                                pFileName,
                                play_type,
                                interrupt_mode
                                );
                if ( nVRetVal != RC_SUCCEED )
                    goto done;
                list_started = TRUE;
            }
            else {
                nVRetVal = com_Play (
                                sp->hTask,
                                ADD_PLAY_LIST,
                                pFileName,
                                play_type,
                                interrupt_mode
                        );
                if ( nVRetVal != RC_SUCCEED )
                    goto done;
            } nPlayListLen++;
        }
    }   /* for loop - go to next argument */

/*
     * Now play the whole list, as long as the return code is
     *     still zero.
     */
    nVRetVal = com_Play (
                    sp->hTask,
                    PLAY_PLAY_LIST,
                    "NONE",
                    play_type,
                    interrupt_mode
                    );
done:
    if ( nNumMemoField > 0 ) {
        // delete the temporary file(s)
        for ( nCount = 0; nCount < nNumMemoField; nCount++ ) {
            if ( remove ( ( char * ) _HandToPtr ( mh[nCount] ) ) <
                                                                0 ) {
```

ATTORNEY DOCKET NO: VOYS2220WSW
wsw/voys/2220.001

```
                    // may not need to return error code
                    Debug ( 1, sprintf ( Debug_buf,
                    "DB_Fox/vspeak: cannot remove temporary file '%s'",
                            ( char * ) _HandToPtr ( mh[nCount] ) ) );
  //                goto done;        just continue
                }
                _FreeHand( mh[nCount] );
            }
        }

// Send the return code back to FoxPro.
        _MemFill ( &result, 0, sizeof ( result ) );
        result.ev_type = 'I';
        result.ev_long = nVRetVal;
        _RetVal ( &result );
        return;

}   /* function vspeak */

/*****************************************************************
    Get touch tones (DTMF): VGETTONES retcode = VGETTONES( @<variable>(C) [,<number_of_digits>(I)]
                        [,<key_to_terminate_on>(C)]
                            [,<interdigit_timeout>(I)] )

The first (mandatory) parameter is a character variable to put
    the received keys (0-9, #, *) into.  The next three parameters
    (optional) set the termination conditions.  This can be one of
    more of:

-   a set number of digits (0=any number of digits)
        -   a key to terminate on (like #) which is not to be included
            in the output (" " = no key)
        -   an interdigit timeout (0=no interdigit timeout)

The absolute defaults are 1 keystroke, no terminating key, 10
    second interdigit timeout.  These defaults can be overridded by
    the use of another function.  THOSE defaults, in turn, are
    overridden by any use of the optional arguments to this function.

Returns:
         2          = Terminated on interdigit timeout (success)
         1          = Terminated on specified key (success)
         0          = Terminated on number of digits (success)
        -1          = Terminated on timeout (failure)
        -2          = Terminated on hangup (failure)
        -11         = Bad termination digits (must be 0-MAX_DIGITS)
        -12         = Bad termination key (must be 0-9, #, or *, or blank)
        -13         = Bad interdigit timeout (must be non-negative)
        -10X        = Standard error codes (from dVR.h)

*****************************************************************/ void FAR vgettones (
        ParamBlk FAR    *parm
    )
    {
        int     term_digits;        // number of digits to terminate on
```

- 105 -

```
            char    term_key;           // key to terminate on
            int     term_id_timeout;    // interdigit timeout to terminate
                                                           on in seconds
            int     retries;            // number of retries
            char    text[MAX_DIGITS + 1];    // digits buffer
            Value   val;                // value struct for digits buf
            int     nVRetVal;           // Voysys return value
            Value   result;             // FoxPro return structure
            struct line_t *sp;          // ptr to slot in line table
10
            // find slot in the line table
            nVRetVal = FindSlot( GetCurrentTask ( ), &sp );
            if ( nVRetVal != RC_SUCCEED )
                goto done;
15
            /*
             * Set the default values of the parameters here
             */
            term_digits = DEF_GETTONES_NUM_DIGITS;
20          term_key = DEF_GETTONES_KEY_TO_TERMINATE;
            term_id_timeout = DEF_GETTONES_INTERDIGIT_TIMEOUT;
            retries = 1;

/*
25           * Check to see if any of the local overrides have been used.
             *      If ANY of the three conditions has been used, this
             *      overrides ALL of the defaults.
             */
            if ( parm->pCount > 1 ) {
30              term_digits = 0;
                term_key = ' ';
                term_id_timeout = 0;
            }

35          /*
             * Now get the values of the parameters if they exist.  Start
             *      with the number of digits.
             */
            if ( parm->pCount >= 2 ) {
40              term_digits = ( ( int ) ( parm->p[1].val.ev_long ) );
            }

/*
             * Now get the termination key (if any).  This involves
45           *      resolving the handle to a string and copying the value
             *      to the 'text' buffer.
             */
            if ( parm->pCount >= 3 ) {
                _fstrncpy ( ( char far * ) text,
50                          _HandToPtr ( parm->p[2].val.ev_handle ),
                            min ( MAX_DIGITS, parm->p[2].val.ev_length ) );
                term_key = text[0];
            }

55          /*
             * Get the inter-digit timeout if any.
             */
            if ( parm->pCount >= 4 ) {
                term_id_timeout = (int) parm->p[3].val.ev_long;
60          }
```

ATTORNEY DOCKET NO: VOYS2220WSW
wsw/voys/2220.001

- 106 -

```
        /*
         * Call get_tones with our arguments.
         */
        nVRetVal = com_Get_Tones (
                                sp->hTask,
                                FALSE,
                                term_digits,
                                term_key,
                                term_id_timeout,
                                retries,
                                text
                                );
        if (nVRetVal == RC_DATALENGTH)
            nVRetVal = RC_SUCCEED;
        else if (nVRetVal == RC_ENDFLAG)
            nVRetVal = RC_TERMONSPECKEY;

/*
         * If the operation was successful, put the string in "text"
         *      into the variable that was passed in.
         */
        if ( nVRetVal >= 0 ) {

/*
             * Allocate space for the "Value" structure to be put into
             *      variable, and for the text (handle). &&& Check for
             *      bad retcodes!
             */
            val.ev_type = 'C';
            val.ev_handle = _AllocHand ( strlen ( text ) + 1 );

/*
             * Put the text value into the handle, and set the length
             *      in the value buffer.
             */
            _StrCpy ( _HandToPtr ( val.ev_handle ), ( char far * )
                                                                text );
            val.ev_length = _StrLen ( ( char far * ) text );

/*
             * Now store the value into the variable.
             */
            _Store ( ( Locator FAR * ) & ( parm->p[0].loc ), &val );
        }
done:
        // Send the return code back to FoxPro.
        _MemFill ( &result, 0, sizeof ( result ) );
        result.ev_type = 'I';
        result.ev_long = nVRetVal;
        _RetVal ( &result );
        return;

}   /* function vgettones */

/****************************************************************
Get touch tones (DTMF) macro: vgettonesm retcode = vgettonesm( <voice_prompt> (C), <tries> (I),
```

- 107 -

```
                        @<variable>(C) [,<number_of_digits>(I)]
                        [,<key_to_terminate_on>(C)]
                        [,<interdigit_timeout>(I)]
                        [,<valid_list>(C))
``` vgettonesm is a "macro" combination of VSpeak and VGetTones.
It allows the programmer to specify a prompt, a number of
retries, and a validation list in addition to the standard
parameters of VGetTones.

The first parameter, which is mandatory, specifies a voice
prompt to be spoken to the caller. The second parameter (also
mandatory) specifies the total number of "tries" (including the
first try) that are to be done.

The third (mandatory) parameter is a character variable to put
the received keys (0-9, #, *) into. The next three parameters
(optional) set the termination conditions. This can be one of
more of:

- a set number of digits (0=any number of digits)
- a key to terminate on (like #) which is not to be included
in the output (" " = no key)
- an interdigit timeout (0=no interdigit timeout)

The absolute defaults are 1 keystroke, no terminating key, 10
second interdigit timeout. These defaults can be overridded by
the use of the &&&&& function. THOSE defaults, in turn, are
overriden by any use of the optional arguments to this function.

The final parameter (optional) is a validation list. This
list, in character form, contains all the valid choices,
separated by commas.

Returns:
    2       = Terminated on interdigit timeout (success)
    1       = Terminated on specified key (success)
    0       = Terminated on number of digits (success)
    -2      = Terminated on hangup (failure)
    -3      = Terminated; ran out of tries (failure)
    -11     = Bad termination digits (must be 0-MAX_DIGITS)
    -12     = Bad termination key (must be 0-9, #, or *, or blank)
    -13     = Bad interdigit timeout (must be non-negative)
    -10X = Standard error codes (from dVR.h)

**************************************************************/ void FAR vgettonesm (
    ParamBlk FAR   *parm
)
{

/*
     *   This procedure is not complete.
     */ int     term_digits;    // number of digits to terminate on
    char    term_key;       // key to terminate on
    int     term_id_timeout; // interdigit timeout to terminate
                                                on in seconds
    int           retries;  // number of retries
```

ATTORNEY DOCKET NO: VOYS2220WSW
wsw/voys/2220.001

- 108 -

```
         char        text[MAX_DIGITS + 1];    // digits buffer
         Value       val;          // value struct for digits buf
         int         nVRetVal;     // Voysys return value
         Value       result;       // FoxPro return structure
 5       struct line_t *sp;        // ptr to slot in line table // find slot in the line table
         nVRetVal = FindSlot( GetCurrentTask ( ), &sp );
         if ( nVRetVal != RC_SUCCEED )
10           goto done;

/*
          * Set the default values of the parameters here
          */
15       term_digits = DEF_GETTONES_NUM_DIGITS;
         term_key = DEF_GETTONES_KEY_TO_TERMINATE;
         term_id_timeout = DEF_GETTONES_INTERDIGIT_TIMEOUT;
         retries = 1;

20       /*
          * Check to see if any of the local overrides have been used.
          *     If ANY of the three conditions has been used, this
          *     overrides ALL of the defaults.
          */
25       if ( parm->pCount > 1 ) {
             term_digits = 0;
             term_key = ' ';
             term_id_timeout = 0;
         }
30
         /*
          * Now get the values of the parameters if they exist.  Start
          *     with the number of digits.
          */
35       if ( parm->pCount >= 2 ) {
             term_digits = ( ( int ) ( parm->p[1].val.ev_long ) );
         }

/*
40        * Now get the termination key (if any).  This involves
          *     resolving the handle to a string and copying the value
          *     to the 'text' buffer.
          */
         if ( parm->pCount >= 3 ) {
45           _fstrncpy ( ( char far * ) text,
                         _HandToPtr ( parm->p[2].val.ev_handle ),
                         min ( MAX_DIGITS, parm->p[2].val.ev_length ) );
             term_key = text[0];
         }
50
         /*
          * Get the inter-digit timeout if any.
          */
         if ( parm->pCount >= 4 ) {
             term_id_timeout = (int) parm->p[3].val.ev_long;
         }

/*
          * Call get_tones with our arguments.
          */
         nVRetVal = com_Get_Tones (
```

- 109 -

```
                                  sp->hTask,
                                  FALSE,
                                  term_digits,
                                  term_key,
                                  term_id_timeout,
                                  retries,
                                  text
                                  );

if (nVRetVal == RC_DATALENGTH)
            nVRetVal = RC_SUCCEED;
        else if (nVRetVal == RC_ENDFLAG)
            nVRetVal = RC_TERMONSPECKEY;

/*
         * If the operation was successful, put the string in "text"
         *     into the variable that was passed in.
         */
        if ( nVRetVal >= 0 ) {

/*
             * Allocate space for the "Value" structure to be put into
             *     variable,
             * and for the text (handle). &&& Check for bad retcodes!
             */
            val.ev_type = 'C';
            val.ev_handle = _AllocHand ( strlen ( text ) + 1 );

/*
             * Put the text value into the handle, and set the length
             *     in the value buffer.
             */
            _StrCpy ( _HandToPtr ( val.ev_handle ), ( char far * )
                                                                    text );
            val.ev_length = _StrLen ( ( char far * ) text );

/*
             * Now store the value into the variable.
             */
            _Store ( ( Locator FAR * ) & ( parm->p[0].loc ), &val );
        } done:
        // Send the return code back to FoxPro.
        _MemFill ( &result, 0, sizeof ( result ) );
        result.ev_type = 'I';
        result.ev_long = nVRetVal;
        _RetVal ( &result );
        return;

}   /* function vgettonesm */

/****************************************************************
Get words (voice recognition): VGETWORDS retcode = VGETWORDS( @<variable>(C)
                    [,<sub-vocabulary_name>(C)]
                    [,<number_of_words>(I)]
                    [,<word_to_terminate_on>(C)]
```

- 110 -

[,<interword_timeout>(I)] )

The first (mandatory) parameter is a character variable to put the received words (0-9, yes, no) into. The second (optional) parameter specifies the sub-vocabulary name. Valid choices are:

```
all         (default - the list of 0-9, oh, yes, no)
numbers     (0-9 and oh)
yes/no      (yes and no only)
```

The next three parameters (optional) set the termination conditions. This can be one of more of:

- a set number of words (0=any number of words)
- a word to terminate on which is not to be included in the output (" " = no word)
- an interword timeout (0=no interword timeout)

The absolute defaults are 1 word, no terminating word, no interword timeout. These defaults can be overridded by the use of another function. THOSE defaults, in turn, are overriden by any use of the optional arguments to this function.

Returns:
```
2       = Terminated on interword timeout (success)
1       = Terminated on specified word (success)
0       = Terminated on number of words (success)
-1      = Terminated on timeout (failure)
-2      = Terminated on hangup (failure)
-11     = Bad termination number of words (must be
          0-MAX_DIGITS)
-13     = Bad interword timeout (must be non-negative)
-10X    = Standard error codes (from dVR.h)
```

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*/

```c
void FAR vgetwords (
    ParamBlk FAR   *parm
)
{
    int     num_words;      /* number of words to terminate on */
    char    term_word;      /* word to terminate on */
    ulong   term_iw_timeout; // interword timeout to terminate on
    int     retries;        /* number of retries */
    char    subvocab[10];   /* buffer for sub-vocab name &&& NEED
                                                          CONSTANT */
    char    text[MAX_DIGITS + 1];   /* digits buffer */
    Value   val;            /* value struct for digits buf */
    int     nVRetVal;       // Voysys return value
    Value   result;         // FoxPro return structure
    struct line_t *sp;      // ptr to slot in line table
    int     nCount;

// find slot in the line table
    nVRetVal = FindSlot( GetCurrentTask ( ), &sp );
    if ( nVRetVal != RC_SUCCEED )
        goto done;

/*
     * Set the default values of the parameters &&& Need to
     *     consult a table here
```

- 111 -

```
            */
            num_words = DEF_GETWORDS_NUM_WORDS;
            term_word = DEF_GETWORDS_WORD_TO_TERMINATE;
            term_iw_timeout = DEF_GETWORDS_INTERWORD_TIMEOUT;
            retries = 1;

/*
             * Get the sub-vocab name if one has been used.  Otherwise,
             *      use "ALL"
             */
            if ( parm->pCount >= 2 ) {
                _fstrncpy ( ( char far * ) subvocab,
                            _HandToPtr ( parm->p[1].val.ev_handle ),
                            parm->p[1].val.ev_length );
                subvocab[parm->p[1].val.ev_length] = ( char ) NULL;
                trim_trailing ( subvocab );
                strupr ( subvocab );
            }
            else
                strcpy ( subvocab, "ALL" );

/*
             * Check to see if any of the local overrides have been used.
             *      If ANY of the three conditions has been used, this
             *      overrides ALL of the defaults.
             */
            if ( parm->pCount > 2 ) {
                num_words = 0;
                term_word = ' ';
                term_iw_timeout = 10;      /* &&& KLUDGE */
            }

/*
             * Now get the values of the parameters if they exist.  Start
             *      with the number of words.  Also check the values of the
             *      parameters as we go.
             */
            if ( parm->pCount >= 3 ) {
                num_words = ( ( int ) ( parm->p[2].val.ev_long ) );
                if ( ( num_words < 0 ) || ( num_words > MAX_DIGITS ) ) {
                    nVRetVal = -11;
                    goto done;
                }
            }
            /*
             * Now get the termination word (if any).  This involves
             *      resolving the handle to a string and copying the value
             *      to the 'text' buffer.
             */
            if ( parm->pCount >= 4 ) {
                nCount = min ( MAX_DIGITS, parm->p[3].val.ev_length );
                _fstrncpy ( ( char far * ) text,
                            _HandToPtr ( parm->p[3].val.ev_handle ),
                            nCount );
                text[nCount] = ( char ) NULL;
                trim_trailing ( text );
                term_word = text[0];

                if ( !strchr ( " 0123456789oynOYN", term_word ) ) {
                    Debug ( 1, sprintf ( Debug_buf, "DB_Fox/vgetwords: bad
```

- 112 -

```
                                                       termination word" ) );
                nVRetVal = -12;
                goto done;
            }
        }

/*
         * Get the inter-word timeout if any.
         */
        if ( parm->pCount >= 5 )
            term_iw_timeout = parm->p[4].val.ev_long;

/*
         * Convert the timeouts to milliseconds.
         */
        term_iw_timeout *= 1000;

/*
         * Call get_words with our arguments.      &&& NOTE:
         *      termination word not used!
         */
        nVRetVal = com_Get_Words (
                            sp->hTask,
                            FALSE,
                            subvocab,
                            num_words,
                            term_iw_timeout,
                            retries,
                            text
                            );

/*
         * If the operation was successful, put the string in "text"
         *      into the variable that was passed in.
         */
        if ( nVRetVal >= 0 ) {

/*
             * Allocate space for the text (handle). &&& Check for bad
             *      retcode!
             */
            val.ev_type = 'C';
            val.ev_handle = _AllocHand ( strlen ( text ) + 1 );

           /*
             * Put the text value into the handle, and set the length
             *      in the value buffer.
             */
            _StrCpy ( _HandToPtr ( val.ev_handle ), ( char far * )
 50                                                              text );
            val.ev_length = _StrLen ( ( char far * ) text );

/*
             * Now store the value into the variable.
 55          */
            _Store ( ( Locator FAR * ) & ( parm->p[0].loc ), &val );
        } done:
 60     // Send the return code back to FoxPro.
        _MemFill ( &result, 0, sizeof ( result ) );
```

ATTORNEY DOCKET NO: VOYS2220WSW
wsw/voys/2220.001

- 113 -

```
        result.ev_type = 'I';
        result.ev_long = nVRetVal;
        _RetVal ( &result );
        return;
    } /* function vgetwords */

/****************************************************************
Record: VRECORD retcode = VRECORD( <string_or_variable>(C/R)
                      [,<max_recording_length>(I)] )

Play a beep and record a message from the caller.  The first
parameter must be either a character string containing the file
name to be recorded to, or a character variable passed by
reference into which a unique file name will be placed.

The timeout and termination keypress will be gotten from the
defaults table.

Returns:
    0       = Successful record
    -1      = Failure - timeout
    -11     = Invalid input (not a char or char variable)
    -12     = Invalid file name
    -13     = Invalid recording length; must be a positive integer
    -10X    = Standard error codes (from dVR.h)

****************************************************************/ void FAR vrecord (
    ParamBlk FAR   *parm
)
{
    char    filename[MAX_DN + MAX_FN];
    ulong   timeout;        // silence timeout value for record
    char    term_key;       // termination key for record
    Value   val;            // value struct for filename
    int     nVRetVal;       // Voysys return value
    Value   result;         // FoxPro return structure & used by
                            //     MemoField operation too <<<<<
    int     max_recording_len;   // maximum length of the
                                 //            recording in seconds
    struct line_t *sp;      // ptr to slot in line table
    int        nCount;
    boolean    bMemoField = FALSE;
    Locator    loc;
    char       *pFileName;

// find slot in the line table
    nVRetVal = FindSlot( GetCurrentTask ( ), &sp );
    if ( nVRetVal != RC_SUCCEED )
        goto done;

/*
     * Check that the first parameter is a string, or a variable
     *      passed by reference.
     */
```

ATTORNEY DOCKET NO: VOYS2220WSW
wsw/voys/2220.001

- 114 -

```
        if ( parm->p[0].val.ev_type != 'C' && parm->p[0].loc.l_type !=
                                                                'R' ) {
            nVRetVal = RC_RECORDINVALIDINPUT;
            Debug ( 1, sprintf ( Debug_buf, "DB_Fox/vrecord: invalid
     input (not a character string or character variable passed by
     reference)" ) );
            goto done;
        }

        /*
         * Set the defaults for the timeout and termination keys &&&
         *      Need to check a table here.
         */
        timeout = DEF_RECORD_TIMEOUT;
        term_key = DEF_RECORD_TERM_KEY;
        max_recording_len = DEF_RECORD_MAX_LENGTH;

pFileName = filename;

        /*
         * Now get the file name into the proper buffer.  If there is
         *      no filename (call by reference), set a zero-length
         *      string).
         */
        if ( parm->p[0].val.ev_type == 'C' ) {
            nCount = min( MAX_FN, parm->p[0].val.ev_length );
            _fstrncpy ( ( char far * ) filename,
                        _HandToPtr ( parm->p[0].val.ev_handle ),
                        nCount );
            filename[nCount] = ( char ) NULL;
            trim_trailing ( filename );

// try to find out if this is a memo field
            nVRetVal = IsMemoField ( filename, &bMemoField, &result,
                                                            &loc );
            if ( nVRetVal != RC_SUCCEED )
                goto done;

if ( bMemoField ) {
                nVRetVal = GetTmpFilename ( sp->hTask, GET_RECORDINGS,
                                                         filename );
                if ( nVRetVal != RC_SUCCEED )
                    goto done;

                // put data into temporary file filename
                // get the filename only
                pFileName = strrchr ( filename, '\\' );
                pFileName++;                        // skip the '\' char
            }
        }
        else {
            *filename = ( char ) NULL;
        }

        /*
         * Get the "max_recording_length" parameter if there is one.
         */
        if ( parm->pCount > 1 ) {
            max_recording_len = ( ( int ) parm->p[1].val.ev_long );
60      }
```

ATTORNEY DOCKET NO: VOYS2220WSW
wsw/voys/2220.001

- 115 -

```
             /*
              * Call the 'record' function.
              */
             /* &&& timeout is not used !!! */
             nVRetVal = com_Record (
                          sp->hTask,
                          pFileName,
                          FALSE,
                          term_key,
                          timeout * 1000,
                          max_recording_len
                          );

            if ( nVRetVal >= 0 ) {
                 // successful record to filename /*
                  * If the argument was a variable passed by reference, we
                  *     need to put "filename" back into it.
                  */
                 if ( parm->p[0].loc.l_type == 'R' ) {

/*
                      * Allocate space for the filename (handle). &&& Check
                      *     for bad retcode!
                      */
                     val.ev_type = 'C';
                     val.ev_handle = _AllocHand ( strlen ( filename ) + 1);
                     /*
                      * Put the filename into the handle, and set the
                      *     length in the value buffer.
                      */
                     _StrCpy ( _HandToPtr ( val.ev_handle ), ( char far * )
                                                                  filename );
                     val.ev_length = _StrLen ( ( char far * ) filename );

/*
                      * Now store the value into the variable.
                      */
                     _Store (( Locator FAR * ) & ( parm->p[0].loc ), &val);
                 }
                 else if ( bMemoField ) {
                     nVRetVal = GetMemoDataFromTmpFile ( filename, result,
                                                                     loc );
                     if ( nVRetVal != RC_SUCCEED )
                         goto finish;
                     Debug ( 2, sprintf ( Debug_buf, "DB_Fox/vrecord: fill
                         memo field with data from file '%s'", filename ) );
                 }

// always return success, no matter how the recording is done
                 nVRetVal = RC_SUCCEED;
             } finish:
             if ( bMemoField ) {
                 // delete the temporary file
                 if ( remove ( filename ) < 0 ) {
                     // may not need to return error code
```

ATTORNEY DOCKET NO: VOYS2220WSW
wsw/voys/2220.001

- 116 -

```
              Debug ( 1, sprintf ( Debug_buf, "DB_Fox/vrecord:
                    cannot remove temporary file '%s'", filename ) );
              goto done;
           }
       } done:
       // Send the return code back to FoxPro.
       _MemFill ( &result, 0, sizeof ( result ) );
       result.ev_type = 'I';
       result.ev_long = nVRetVal;
       _RetVal ( &result );
       return;

}   /* function vrecord */

/*******************************************************************
    *
    Dial an outside number: VDIAL retcode = VDIAL( <phone_number>(C) [,<num_rings>(I)]
                    [,@<greeting_length>(R)] )

Go offhook, wait for dial tone, and dial the number passed (as a
    character string). Only the characters "0123456789*#ABCD" will be
    dialed; special chars allowed are:

T      use tone dialing (default)
         P      use pulse dialing
         W      wait for dial tone
         ,      pause 2 seconds
         !      do a switch hook The "rings" parameter indicates the number of rings to wait until
    deciding there is no answer. "rings" is optional, defaults to 6.
    If a "predictive dialing" effect is desired, the third parameter
    may be used. It must contain a numeric variable passed by
    reference. Upon exit, this variable will contain the length (in
    seconds) of the user's greeting.

Returns:
         0       = Success
         -3      = Busy
         -4      = RNA
         -9      = Other failure
         -11     = Bad "rings" parameter; must be greater than 0
         -10X    = Standard error codes (from dVR.h)

*******************************************************************/ void FAR vdial (
        ParamBlk FAR   *parm
    )
    {
        char    text[MAX_DIGITS + 1];   /* text from Foxpro for
                                                          digits */
        char    digits[MAX_DIGITS + 1]; /* digits buffer */
        int     rings;                  /* number of rings to wait */
        boolean do_predictive;          /* do predictive dialing? */
```

ATTORNEY DOCKET NO: VOYS2220WSW
wsw/voys/2220.001

- 117 -

```
            ulong       greeting_length;    /* if so, length of greeting
                                                            in millisecs */
            Value       val;                /* value struct for greeting len */
            int         nVRetVal;           // Voysys return value
            Value       result;             /* FoxPro return structure */
            int         count;
            char        *chrptr;
            struct line_t *sp;              // ptr to slot in line table
            int         nCount;
            // find slot in the line table
            nVRetVal = FindSlot( GetCurrentTask ( ), &sp );
            if ( nVRetVal != RC_SUCCEED )
                goto done;
 15
            /*
             * Set the default values of the parameters &&& Need to
             *     consult a table here
             */
            rings = DEF_DIAL_NUM_RINGS;

do_predictive = FALSE;

/*
             * Get the dial string (first parameter) into "text", then
             *     convert it to upper-case.
             */
            nCount = min ( MAX_DIGITS - 1, parm->p[0].val.ev_length );
                        // we always add one character as the 1st one
            _fstrncpy ( ( char far * ) text,
                        _HandToPtr ( parm->p[0].val.ev_handle ),
                        nCount );
            text[nCount] = ( char ) NULL;
            trim_trailing ( text );
            strupr ( text );

/*
             * Start the digits string with a "W" (wait for ring). Then
             *     move only those digits that are recognized into the
             *     digits string.
             */
            digits[0] = 'W';
            count = 1;
            chrptr = text;
            while ( chrptr = strpbrk ( chrptr, "0123456789*#ABCDTPW,!" ) )
                digits[count++] = *chrptr++;
            digits[count] = ( char ) NULL;

/*
             * Get the "rings" parameter if there is one.
             */
            if ( parm->pCount > 1 ) {
                rings = ( ( int ) parm->p[1].val.ev_long );
            }
            /*
             * Check if there is a "predictive" parameter.
             */
            if ( parm->pCount > 2 )
                do_predictive = TRUE;
```

```
        /*
         * Call the compute-layer routine.
         */
        nVRetVal = com_Callout ( sp->hTask, digits, rings,
                                 do_predictive, &greeting_length );

/*
         * If the operation was successful, and predictive dialing was
         *      on, we want to put the result of the operation back
         *      into the variable passed in by reference.
         */
        if ( do_predictive && ( nVRetVal >= 0 ) ) {
           val.ev_type = 'I';

           /*
            * Put the greeting length into the structure (dividing by
            *      1000, rounded up, to convert the milliseconds to
            *      seconds).
            */
           val.ev_long = ( greeting_length + 500 ) / 1000;

/*
            * Now store the value into the variable.
            */
           _Store ( ( Locator FAR * ) & ( parm->p[2].loc ), &val );
        } done:
        // Send the return code back to FoxPro.
        _MemFill ( &result, 0, sizeof ( result ) );
        result.ev_type = 'I';
        result.ev_long = nVRetVal;
        _RetVal ( &result );
        return;
35
    } /* function vdial */

    /******************************************************************
    Set Debug Level: VDEBUG retcode = VDEBUG(<level>(I))

    Debug levels:
        0       = No debug printouts
        1       = Standard debug printouts
        2       = Extended debug printouts
    Returns:
        0       = Success

******************************************************************
    /
    void FAR vdebug (
        ParamBlk FAR  *parm
    )
    {
        int          level;        /* debug level */
        int          nVRetVal;     // Voysys return value
```

ATTORNEY DOCKET NO: VOYS2220WSW
wsw/voys/2220.001

- 119 -

```
              Value       result;      /* FoxPro return structure */
              struct line_t *sp;       // ptr to slot in line table // find slot in the line table
              nVRetVal = FindSlot( GetCurrentTask ( ), &sp );
              if ( nVRetVal != RC_SUCCEED )
                  goto done;

if !NO_DEBUGGING_AT_ALL
           /*
            * Extract the <level> argument. &&& Should we validate this
            *      param?
            */
              level = ( ( int ) parm->p[0].val.ev_long );
           /*
            * Set the debug flag to this level.
            */
              Debug_flag = level;
       #else
              nVRetVal = RC_UNSUPCOMMAND;
       #endif done:
           // Send the return code back to FoxPro.
              _MemFill ( &result, 0, sizeof ( result ) );
              result.ev_type = 'I';
              result.ev_long = nVRetVal;
              _RetVal ( &result );
30            return;

}   /* function vdebug */

       /****************************************************************
       Set the directories for voice files:   VSETDIR retcode = VSETDIR(<voice_file_type>(C), <directory>(C))
       Valid voice file types:
              SysPrompts    (old form: sys_prompts)    system prompts
              AppPrompts    (old form: app_prompts)    application prompts
              Recordings                               user recordings
       Returns:
              0       = Success
              -71     = failure: invalid voice file type

       ****************************************************************/ void FAR vsetdir (
           ParamBlk FAR   *parm
       )
       {
           int    nVRetVal;       // Voysys return value
           Value  result;         // FoxPro return structure
           char   dir_type[MAX_DN + 1];
           char   text[MAX_DN + 1];
           struct line_t *sp;     // ptr to slot in line table
           int    nCount;
```

ATTORNEY DOCKET NO: VOYS2220WSW
wsw/voys/2220.001

- 120 -

```
       char    szLibraryName[MAX_LN + 1];

// find slot in the line table
       nVRetVal = FindSlot( GetCurrentTask ( ), &sp );
       if ( nVRetVal != RC_SUCCEED )
           goto done;

// Note: cannot call this in start as the library is not
       // finished loading so the library name is not available yet
       GetLibraryName( szLibraryName );

/*
        * Get the text of the first argument.
        */
       nCount = min ( MAX_DN, parm->p[0].val.ev_length );
       _fstrncpy ( ( char far * ) dir_type,
                  _HandToPtr ( parm->p[0].val.ev_handle ),
                  nCount );
       dir_type[nCount] = ( char ) NULL;
       trim_trailing ( dir_type );

/*
        * Get the text of the second argument, and capitalize it.
        */
       _fstrncpy ( ( char far * ) text,
                  _HandToPtr ( parm->p[1].val.ev_handle ),
                  parm->p[1].val.ev_length );
       text[parm->p[1].val.ev_length] = ( char ) NULL;
       trim_trailing ( text );
       /*
        * Call com_Set_Directory to set the directory.
        */
       nVRetVal = com_Set_Directory ( sp->hTask, dir_type, text );
       done:
       // Send the return code back to FoxPro.
       _MemFill ( &result, 0, sizeof ( result ) );
       result.ev_type = 'I';
 40    result.ev_long = nVRetVal;
       _RetVal ( &result );
       return;

} /* function vsetdir */

/****************************************************************
    Set the speak mode for dates: VSetDateSpeak
        retcode = VSetDateSpeak ("mmddyy" | "mmdd" | "ddmmyy" | "ddmm"
    )

      Returns:
        0       = Success
        -72     = failure: invalid date speak type

****************************************************************/
       void FAR vsetdatespeak (
```

- 121 -

```
        ParamBlk FAR   *parm
    )
    {
        int          nVRetVal;         // Voysys return value
        Value        result;           // FoxPro return structure
        char         text[MAX_DN + 1];
        struct line_t *sp;             // ptr to slot in line table
        int          nCount;

        // find slot in the line table
        nVRetVal = FindSlot( GetCurrentTask ( ), &sp );
        if ( nVRetVal != RC_SUCCEED )
            goto done;

15      /*
         * Get the text of the first argument.
         */
        nCount = min( MAX_DN, parm->p[0].val.ev_length );
        _fstrncpy ( ( char far * ) text,
20                  _HandToPtr ( parm->p[0].val.ev_handle ),
                    nCount );
        text[nCount] = ( char ) NULL;
        trim_trailing ( text );

        /*
         * Set the global speak type
         */
        nVRetVal = com_Set_Date_Speak ( sp->hTask, text );

    done:
        // Send the return code back to FoxPro.
        _MemFill ( &result, 0, sizeof ( result ) );
        result.ev_type = 'I';
        result.ev_long = nVRetVal;
35      _RetVal ( &result );
        return;

}   /* function vsetdatespeak */

/*****************************************************************
     *
    Set default timeouts:   VSetTimeout
         retcode = VSetTimeout("VGetTones" | "VGetWords, <timeout> )

Sets the default first-key/first-word timeouts for GetTones
    and GetWords
    Returns:
         0       = Success
         -76     = failure: invalid keyword (first argument)
         -77     = failure: invalid timeout (must be positive integer)
    *****************************************************************/ void FAR vsettimeout (
         ParamBlk FAR  *parm
60  )
    {
```

- 122 -

```
            int     nVRetVal;           // Voysys return value
            Value   result;             // FoxPro return structure
            int     timeout;
            char    text[MAX_DN + 1];
            struct  line_t *sp;         // ptr to slot in line table
            int     nCount;

// find slot in the line table
            nVRetVal = FindSlot( GetCurrentTask ( ), &sp );
10          if ( nVRetVal != RC_SUCCEED )
                goto done;

/*
             * Get the text of the first argument.
15           */
            nCount = min( MAX_DN, parm->p[0].val.ev_length );
            _fstrncpy ( ( char far * ) text,
                        _HandToPtr ( parm->p[0].val.ev_handle ),
                        nCount );
            text[nCount] = ( char ) NULL;
            trim_trailing ( text );

/*
             * Get the timeout value
             */
            timeout = (int) parm->p[1].val.ev_long;

nVRetVal = com_Set_Timeout ( sp->hTask, text, timeout );

        done:
            // Send the return code back to FoxPro.
            _MemFill ( &result, 0, sizeof ( result ) );
            result.ev_type = 'I';
            result.ev_long = nVRetVal;
35          _RetVal ( &result );
            return;

}   /* function vsettimeout */

40
        #if DO_FAX

/*****************************************************************
         *
        Setup Fax Cover Page : VFaxCover retcode = VFaxCover( C, <string_or_variable>(C/R) )

            Specify the cover page being used for faxes.

Returns:
            0       = Success
            -11     = Invalid input
            -10X    = Standard error codes (from dVR.h)

*****************************************************************/ void FAR vfaxcover (
            ParamBlk FAR   *parm
        )
```

```
{
    char    cText[MAX_FAXCN + 1];
    char    cParm[MAX_FAXPARM + 1];     // Buffer for file name
    int     nVRetVal;                    // Voysys return value
    Value   result;                      // FoxPro return structure
    int     nFaxCoverCmdType;            // fax cover page command
    int     nCount;                      // temporary counter
    LPVOID  lpParm;                      // command parameter pointer
    struct line_t *sp;                   // ptr to slot in line table // find slot in the line table
    nVRetVal = FindSlot( GetCurrentTask ( ), &sp );
    if ( nVRetVal != RC_SUCCEED )
        goto done;

// Verify if the first parameter is of proper type
    if ( parm->p[0].val.ev_type != 'C' ) {
        nVRetVal = -11;
        Debug ( 1, sprintf ( Debug_buf, "DB_Fox/vfaxcover: invalid
                             input (not a character string)" ) );
        goto done;
    }

// Get the text of the first argument and make the string
    // uppercase.
    nCount = min( MAX_FAXCN, parm->p[0].val.ev_length );
    _fstrncpy ( (char far *) cText,  HandToPtr(
                            parm->p[0].val.ev_handle ), nCount );
    cText[nCount] = ( char ) NULL;
    trim_trailing ( cText );
    strupr ( cText );

// Parse the fax cover page setup command.
    if ( !strcmp ( cText, "NEW" ) )
        nFaxCoverCmdType = FAX_COVER_NEW;
    else if ( !strcmp ( cText, "NOTEXT" ) )
        nFaxCoverCmdType = FAX_COVER_NOTEXT;
    else if ( !strcmp ( cText, "LOGOTOP" ) )
        nFaxCoverCmdType = FAX_COVER_LOGOTOP;
    else if ( !strcmp ( cText, "LOGOBOTTOM" ) )
        nFaxCoverCmdType = FAX_COVER_LOGOBOTTOM;
    else if ( !strcmp ( cText, "RECNAME" ) )
        nFaxCoverCmdType = FAX_COVER_RECNAME;
    else if ( !strcmp ( cText, "RECCONAME" ) )
        nFaxCoverCmdType = FAX_COVER_RECCONAME;
    else if ( !strcmp ( cText, "SENDERNAME" ) )
        nFaxCoverCmdType = FAX_COVER_SENDERNAME;
    else if ( !strcmp ( cText, "SENDERPHONE" ) )
        nFaxCoverCmdType = FAX_COVER_SENDERPHONE;
    else if ( !strcmp ( cText, "SENDERCONAME" ) )
        nFaxCoverCmdType = FAX_COVER_SENDERCONAME;
    else if ( !strcmp ( cText, "COVERTEXT" ) )
        nFaxCoverCmdType = FAX_COVER_COVERTEXT;
    else if ( !strcmp ( cText, "COVERTEXTFILE" ) )
        nFaxCoverCmdType = FAX_COVER_COVERTEXTFILE;

// Get 2nd parameter if there need to be one
    switch ( nFaxCoverCmdType ) {
        case FAX_COVER_NEW:
        case FAX_COVER_NOTEXT:
            lpParm = 0;
```

```
                    - 124 - break;
        case FAX_COVER_LOGOTOP:
        case FAX_COVER_LOGOBOTTOM:
        case FAX_COVER_COVERTEXTFILE:
        case FAX_COVER_RECNAME:
        case FAX_COVER_RECCONAME:
        case FAX_COVER_SENDERNAME:
        case FAX_COVER_SENDERPHONE:
        case FAX_COVER_SENDERCONAME:
        case FAX_COVER_COVERTEXT:
            if ( parm->p[1].val.ev_type == 'C' ) {
                nCount = min(MAX_FAXPARM,parm->p[1].val.ev_length);
                _fstrncpy ( ( char far * ) cParm, _HandToPtr (
                            parm->p[1].val.ev_handle ), nCount );
                cParm[nCount] = ( char ) NULL;
                trim_trailing ( cParm );
                lpParm = (void far *)cParm;
            }
            else {
                nVRetVal = -11;
                Debug ( 1, sprintf ( Debug_buf, "DB_Fox/vfaxcover:
                                    invalid second parameter" ) );
                goto done;
            }
            break;
        default:
            nVRetVal = -11;
            Debug ( 1, sprintf ( Debug_buf, "DB_Fox/vfaxcover:
                                    invalid command" ));
            goto done;
        }

// Call the faxcover function.

nVRetVal = com_Faxcover (sp->hTask, nFaxCoverCmdType, lpParm);
        if ( nVRetVal >= 0 )
            Debug ( 3, sprintf ( Debug_buf, "DB_Fox/vfaxcover:
                                    successful set cover page" ) );

done:
        // Send the return code back to FoxPro.
        _MemFill ( &result, 0, sizeof ( result ) );
        result.ev_type = 'I';
        result.ev_long = nVRetVal;
        _RetVal ( &result );
        return;

}   /* function vfaxcover */

/****************************************************************
    Add pages to fax document to be sent : VFaxDoc retcode = VFaxDoc( C )

Specify the fax pages being used for faxes.

Returns:
        0       = Success
        -11     = Invalid input
```

- 125 -

```
        -10X = Standard error codes (from dVR.h)

**************************************************************/

    void FAR vfaxdoc (
        ParamBlk FAR   *parm
    )
    {
        char    cPageName[MAX_FN +1 ];    // Buffer for file name
        int     nVRetVal;                 // Voysys return value
        Value   result;                   // FoxPro return structure
        int     nFaxDocCmdType;           // fax document command
        int     nCount;                   // temporary counter
        LPVOID  lpParm;                   // command parameter pointer
        struct line_t *sp;                // ptr to slot in line table // find slot in the line table
        nVRetVal = FindSlot( GetCurrentTask ( ), &sp );
        if ( nVRetVal != RC_SUCCEED )
20          goto done;

// Verify if the first parameter is of proper type
        if ( parm->p[0].val.ev_type != 'C' ) {
            nVRetVal = -11;
            Debug ( 1, sprintf ( Debug_buf, "DB_Fox/vfaxdoc: invalid
                                    input (not a character string)" ) );
            goto done;
        }

        // Get the text of the first argument and make the string
        // uppercase.
        nCount = min( MAX_FN, parm->p[0].val.ev_length );
        _fstrncpy ( (char far *) cPageName,_HandToPtr(
                                parm->p[0].val.ev_handle ), nCount );
        cPageName[nCount] = ( char ) NULL;
        trim_trailing ( cPageName );
        strupr ( cPageName );

// Parse the fax cover page setup command.
        if ( !strcmp ( cPageName, "NEW" ) ) {
            nFaxDocCmdType = FAX_DOC_NEW;
            lpParm = 0;
        }
        else if ( !strcmp ( cPageName, "PAGEBREAK" ) ) {
            nFaxDocCmdType = FAX_DOC_PAGEBREAK;
            lpParm = 0;
        }
        else {
            nFaxDocCmdType = FAX_DOC_FILE_BY_EXT;
            lpParm = cPageName;
        }

// Call the fax doc function.
        nVRetVal = com_Faxdoc ( sp->hTask, nFaxDocCmdType, lpParm );
        if ( nVRetVal >= 0 )
            Debug ( 3, sprintf ( Debug_buf, "DB_Fox/vfaxdoc:
                                    successfully set document page" ) );
    done:
        // Send the return code back to FoxPro.
```

ATTORNEY DOCKET NO: VOYS2220WSW
wsw/voys/2220.001

```
        _MemFill ( &result, 0, sizeof ( result ) );
        result.ev_type = 'I';
        result.ev_long = nVRetVal;
        _RetVal ( &result );
5       return;

}   /* function vfaxdoc */

    /*******************************************************************
    *
    Send fax document to the specified number : VFaxSend
        retcode = VFaxSend( C [,C] )

Send the active fax document or the specified document.

Returns:
        0       = Success
        -11     = Invalid input
        -10X    = Standard error codes (from dVR.h)

*******************************************************************/
    void FAR vfaxsend (
        ParamBlk FAR   *parm
    )
    {
        char    cDocName[MAX_FN + 1];      // Buffer for file name
        char    cDialStr[MAX_DIGITS + 1];
        int     nVRetVal;                  // Voysys return value
        Value   result;                    // FoxPro return structure
        int     nFaxSendCmdType;           // fax send command
        int     nCount;                    // temporary counter
        LPVOID  lpParm;                    // command parameter pointer
        struct  line_t *sp;                // ptr to slot in line table // find slot in the line table
40      nVRetVal = FindSlot( GetCurrentTask ( ), &sp );
        if ( nVRetVal != RC_SUCCEED )
            goto done;

// Verify if the first parameter is of proper type
        if ( parm->p[0].val.ev_type != 'C' ) {
            nVRetVal = -11;
            Debug ( 1, sprintf ( Debug_buf, "DB_Fox/vfaxsend: invalid
                                  input (not a character string)" ) );
            goto done;
        }

// Get the text of the first argument and make the string
        // uppercase.
        nCount = min( MAX_DIGITS, parm->p[0].val.ev_length );
        _fstrncpy ( (char far *)cDialStr, _HandToPtr(
                                  parm->p[0].val.ev_handle ), nCount );
        cDialStr[nCount] = ( char ) NULL;
        trim_trailing ( cDialStr );
        strupr ( cDialStr );
        // Get the optional document file name
```

- 127 -

```
        if ( parm->pCount == 1 ) {
            nFaxSendCmdType = FAX_SEND_ACTIVE_DOC;
            lpParm = 0;
        }
        else {
            nCount = min( MAX_FN, parm->p[1].val.ev_length );
            _fstrncpy ( (char far *)cDocName, _HandToPtr(
                                parm->p[1].val.ev_handle ), nCount );
            cDocName[nCount] = ( char ) NULL;
            trim_trailing ( cDocName );
            strupr ( cDocName );
            nFaxSendCmdType = FAX_SEND_FILE_BY_EXT;
            lpParm = cDocName;
        }

// Call the fax send function.

nVRetVal = com_Faxsend ( sp->hTask, cDialStr, nFaxSendCmdType,
                                                            lpParm );

if ( nVRetVal >= 0 )
            Debug ( 3, sprintf ( Debug_buf, "DB_Fox/vfaxsend:
                    successfully queue fax document for sending out" ) );

done:
        // Send the return code back to FoxPro.
        _MemFill ( &result, 0, sizeof ( result ) );
        result.ev_type = 'I';
        result.ev_long = nVRetVal;
        _RetVal ( &result );
        return;

} /* function vfaxsend */

/****************************************************************
    Setup fax options and parameters : VFaxSetup retcode = VFaxSetup( C [,?] )

Setup fax options such as fax channel, send time, retry
    counts, etc.

Returns:
        0       = Success
        -11     = Invalid input
        -10X    = Standard error codes (from dVR.h)

****************************************************************/ void FAR vfaxsetup (
        ParamBlk FAR    *parm
    )
    {
        char    cOptName[MAX_FAXCN +1 ];   // buffer for option name
        char    cOptVal[MAX_FAXPARM + 1];    // buffer for string
                                                        option value
        int     nOptVal;                   // integer option value
        int     nVRetVal;                  // Voysys return value
        Value   result;                    // FoxPro return structure
        int     nFaxSetupCmdType;          // fax send command
```

ATTORNEY DOCKET NO: VOYS2220WSW
wsw/voys/2220.001

- 128 -

```
           int    nCount;                  // temporary counter
           LPVOID lpParm;                  // command parameter pointer
           struct line_t *sp;              // ptr to slot in line table 5         // find slot in the line table
           nVRetVal = FindSlot( GetCurrentTask ( ), &sp );
           if ( nVRetVal != RC_SUCCEED )
               goto done;

           // Verify if the first parameter is of proper type
           if ((parm->p[0].val.ev_type != 'C') || (parm->pCount != 2)) {
               nVRetVal = -11;
               Debug ( 1, sprintf ( Debug_buf, "DB_Fox/vfaxsetup: invalid
                                                             input" ) );
               goto done;
           }

// Get the text of the option name and make the string
           // uppercase.
           nCount = min( MAX_FAXCN, parm->p[0].val.ev_length );
           _fstrncpy ( (char far *)cOptName, _HandToPtr(
                                  parm->p[0].val.ev_handle ), nCount );
           cOptName[nCount] = ( char ) NULL;
           trim_trailing ( cOptName );
           strupr ( cOptName );

// Convert the option name to option code
           if ( !strcmp( cOptName, "TRIES" ) )
               nFaxSetupCmdType = FAX_SETUP_TRYCOUNT;
           else if ( !strcmp( cOptName, "TRYINTERVAL" ) )
               nFaxSetupCmdType = FAX_SETUP_TRYINTERVAL;
           else if ( !strcmp( cOptName, "TIMEFROM" ) )
               nFaxSetupCmdType = FAX_SETUP_TIMEFROM;
           else if ( !strcmp( cOptName, "TIMETO" ) )
               nFaxSetupCmdType = FAX_SETUP_TIMETO;
           else if ( !strcmp( cOptName, "FINEMODE" ) )
               nFaxSetupCmdType = FAX_SETUP_FINEMODE;
           else if ( !strcmp( cOptName, "PAGESIZE" ) )
               nFaxSetupCmdType = FAX_SETUP_PAGESIZE;
           else if ( !strcmp( cOptName, "STATIONID" ) )
               nFaxSetupCmdType = FAX_SETUP_STATIONID;
           else if ( !strcmp( cOptName, "FAXCHANNEL" ) )
               nFaxSetupCmdType = FAX_SETUP_FAXCHANNEL;
           else if ( !strcmp( cOptName, "SENDHEADER" ) )
               nFaxSetupCmdType = FAX_SETUP_SENDHEADER;
           else {
               nVRetVal = -11;
               Debug ( 1, sprintf ( Debug_buf, "DB_Fox/vfaxsetup: invalid
                                              input (Unknown Option)" ) );
               goto done;
           }

// Get the option value according to the option type
           switch ( nFaxSetupCmdType ) {
               case FAX_SETUP_TRYCOUNT:
               case FAX_SETUP_TRYINTERVAL:
               case FAX_SETUP_FAXCHANNEL:
                   if ( parm->p[1].val.ev_type != 'I' ) {
                       nVRetVal = -11;
                       Debug ( 1, sprintf ( Debug_buf, "DB_Fox/vfaxsetup:
                                       invalid input (option must be INT)" ) );
```

ATTORNEY DOCKET NO: VOYS2220WSW
wsw/voys/2220.001

- 129 -

```
                        goto done;
                    }
                    nOptVal = (int)(parm->p[1].val.ev_long);
                    lpParm = 0;
                    break;
                case FAX_SETUP_TIMEFROM:
                case FAX_SETUP_TIMETO:
                case FAX_SETUP_FINEMODE:
                case FAX_SETUP_PAGESIZE:
                case FAX_SETUP_STATIONID:
                case FAX_SETUP_SENDHEADER:
                    if ( parm->p[1].val.ev_type != 'C' ) {
                        nVRetVal = -11;
                        Debug ( 1, sprintf ( Debug_buf, "DB_Fox/vfaxsetup:
                                    invalid input (option must be CHAR)" ) );
                        goto done;
                    }
                    nCount = min( MAX_FAXPARM, parm->p[1].val.ev_length );
                    _fstrncpy ( (char far *)cOptVal, _HandToPtr(
                                    parm->p[1].val.ev_handle ), nCount );
                    cOptVal[nCount] = ( char ) NULL;
                    trim_trailing ( cOptVal );
                    strupr ( cOptVal );
                    lpParm = cOptVal;
                    nOptVal = 0;
                    break;
                default:
                    // Impossible !
                    break;
            }

// Call the fax setup function.

nVRetVal = com_Faxsetup ( sp->hTask, nFaxSetupCmdType, lpParm,
                                                                nOptVal );

if ( nVRetVal >= 0 )
                Debug ( 3, sprintf ( Debug_buf, "DB_Fox/vfaxsetup:
                                    successfully setup fax options" ) );
        done:
            // Send the return code back to FoxPro.
            _MemFill ( &result, 0, sizeof ( result ) );
            result.ev_type = 'I';
            result.ev_long = nVRetVal;
            _RetVal ( &result );
            return;

}   /* function vfaxsetup */ endif /* DO_FAX */

/****************************************************************
Set options and parameters : VSet retcode = VSet( C [,?] )

Set options such as test mode, etc.

Returns:
```

ATTORNEY DOCKET NO: VOYS2220WSW
wsw/voys/2220.001

- 130 -

```
        0      = Success
        -11    = Invalid input
        -10X   = Standard error codes (from dVR.h)

        ****************************************************************/ void FAR vset (
            ParamBlk FAR  *parm
        )
        {
            char    cOptName[MAX_SETCN + 1];  // buffer for option name
            char    cOptVal[MAX_SETPARM + 1];    // buffer for string
                                                            option value
            ulong   dwOptVal;                 // unsigned long option value
            int     nVRetVal;                 // Voysys return value
            Value   result;                   // FoxPro return structure
            int     nSetCmdType;              // set command
            int     nCount;                   // temporary counter
            LPVOID  lpParm;                   // command parameter pointer
            struct line_t *sp;                // ptr to slot in line table // find slot in the line table
            nVRetVal = FindSlot( GetCurrentTask ( ), &sp );
            if ( nVRetVal != RC_SUCCEED )
25              goto done;

// Verify if the first parameter is of proper type
            if ((parm->p[0].val.ev_type != 'C') || (parm->pCount != 2)) {
                nVRetVal = -11;
                Debug ( 1, sprintf ( Debug_buf, "DB_Fox/vset: invalid
                                                            input" ) );
                goto done;
            }

            // Get the text of the option name and make the string
            // uppercase.
            nCount = min( MAX_SETCN, parm->p[0].val.ev_length );
            _fstrncpy ( (char far *)cOptName, _HandToPtr(
                                    parm->p[0].val.ev_handle ), nCount );
            cOptName[nCount] = ( char ) NULL;
            trim_trailing ( cOptName );
            strupr ( cOptName );

/* Note: to support a new option, add the defines for command
               type and option value in command.h also you may use some
               of the defines in compute.h (or add new ones) for option
               values (e.g. for DateSpeak - DS_MMDDYY, DS_MMDD, etc.) */

// Convert the option name to option code
            if ( !strcmp( cOptName, "TESTMODE" ) ) nSetCmdType =
                                                            SET_TESTMODE;
            else {
                nVRetVal = -11;
                Debug ( 1, sprintf ( Debug_buf, "DB_Fox/vset: invalid
                                                input (Unknown Option)" ) );
                goto done;
            }

// Get the option value according to the option type
            switch ( nSetCmdType ) {
                case SET_TESTMODE:
```

- 131 -

```
            if ( parm->p[1].val.ev_type != 'C' ) {
                nVRetVal = -11;   // need a new error code (LML)
                Debug ( 1, sprintf ( Debug_buf, "DB_Fox/vset:
                                invalid input (option must be CHAR)" ) );
                goto done;
            }
            nCount = min( MAX_SETPARM, parm->p[1].val.ev_length );
            _fstrncpy ( (char far *)cOptVal, _HandToPtr(
                                parm->p[1].val.ev_handle ), nCount );
            cOptVal[nCount] = ( char ) NULL;
            trim_trailing ( cOptVal );
            strupr ( cOptVal );

/*
             * Check through the list of allowable test mode
             *     types.  Return an error if the user specified
             *     an illegal test mode type.
             */
            if ( !strcmp ( cOptVal, "ON" ) ) {
                dwOptVal = SET_TM_ON;
            }
            else if ( !strcmp ( cOptVal, "OFF" ) ) {
                dwOptVal = SET_TM_OFF;
            }
            else {
                nVRetVal = -81;   // error code
                Debug ( 1, sprintf ( Debug_buf, "DB_Fox/vset:
                            Illegal test mode type >%s<", cOptVal ) );
                goto done;
            } lpParm = 0;
            break;

default:
            // Impossible !
            break;
        }

// Call the set function nVRetVal = com_Set (sp->hTask, nSetCmdType, lpParm, dwOptVal);

if ( nVRetVal >= 0 )
            Debug ( 3, sprintf ( Debug_buf, "DB_Fox/vset: successfully
                                                    set options" ) );

done:
        // Send the return code back to FoxPro.
        _MemFill ( &result, 0, sizeof ( result ) );
        result.ev_type = 'I';
        result.ev_long = nVRetVal;
        _RetVal ( &result );
        return;

}   /* function vset */

/*****************************************************************
    Linkage information for FoxPro.
*****************************************************************/
```

ATTORNEY DOCKET NO: VOYS2220WSW
wsw/voys/2220.001

```
      /* &&& this should be static; next one can't be ? */
      /* function names (the 1st column of data) must be in all */
      /* capitals */
      FoxInfo myFoxInfo[] = {
          {"START",    ( FPFI ) start, CALLONLOAD, ""},
          {"STOP",     ( FPFI ) stop, CALLONUNLOAD, ""},
          {"VWAITRING",( FPFI ) vwaitring, 2, ".I,.I"},
          {"VHANGUP",  ( FPFI ) vhangup, 0, ""},
          {"VCHKHANGUP",( FPFI ) vchkhangup, 0, ""},
10        {"VSPEAK",   ( FPFI ) vspeak, 10,
             ".?,.?,.?,.?,.?,.?,.?,.?,.?,.?"},
          {"VGETTONES",( FPFI ) vgettones, 4, "R,.I,.C,.I"},
          {"VGETTONESM",( FPFI ) vgettonesm, 7,
             "C, I, R, .I, .C, .I, .C"},
15        {"VGETWORDS",( FPFI ) vgetwords, 5, "R,.C,.I,.C,.I"},
          {"VRECORD",  ( FPFI ) vrecord, 2, "?,.I"},
          {"VDIAL",    ( FPFI ) vdial, 3, "C,.I,.R"},
          {"VDEBUG",   ( FPFI ) vdebug, 1, "I"},
          {"VSETDIR",  ( FPFI ) vsetdir, 2, "C,C"},
20        {"VSETDSPEAK",( FPFI ) vsetdatespeak, 1, "C"},
          {"VSETTMOUT",( FPFI ) vsettimeout, 2, "C, I"},
       // {"VFAXCOVER",( FPFI ) vfaxcover, 2, "C,.?"},
       // {"VFAXDOC",  ( FPFI ) vfaxdoc, 1, "C"},
       // {"VFAXSEND", ( FPFI ) vfaxsend, 2, "C,.C"},
25     // {"VFAXSETUP",( FPFI ) vfaxsetup, 2, "C,?"},
          {"VSET",     ( FPFI ) vset, 2, "C,?"},
      };

FoxTable _FoxTable = {
30        ( FoxTable FAR * ) 0,
          sizeof ( myFoxInfo ) / sizeof ( FoxInfo ),
          myFoxInfo
      };

35    /***********************************************/
```

APPENDIX D
Compute.c
Copyright 1992-1994 Voysys Corporation

```
/**************************************************************
 *
 * File:   Compute.c
 *
 * Purpose:
 *     Computation layer.
 *     Does generic stuff needed for most applications, such as
 *     translating numbers and dates into play-lists.
 *     Independent of OS, line card type.
 *
 * $Log: /VoysAccess/core/compute/COMPUTE.C $
 *
 *
 **************************************************************/ include <stdio.h>
include <stdlib.h>
include <string.h>

// if define equals to 1, enable fax support
// need to define this before the .h files as it could be used in
// the .h header files
define DO_FAX       0 include "OS.h"
include "dVR.h"
include "Command.h"
include "Compute.h"
include "IPC.h"

define BASEDIALTIME_W            3000        // 3 seconds
define BASEDIALTIME_COMMA        2000        // 2 seconds
define BASEDIALTIME_DEFAULT      200         // .2 seconds define MAX_CHRBUF                20

// list of prompt files defines define PF_0              "0"
define PF_1              "1"
define PF_2              "2"
define PF_3              "3"
define PF_4              "4"
define PF_5              "5"
define PF_6              "6"
define PF_7              "7"
define PF_8              "8"
define PF_9              "9"
//#define PF_MINUS        "minus"
define PF_MINUS          "sign3"
define PF_POINT          "point"

define PF_HUNDRED        "hundred"

define PF_BILLION        "billion"
```

- 134 -

```
define PF_MILLION        "million"
define PF_THOUSAND       "thousand"

define PF_DOLLARAND      "dolland"
define PF_DOLLARSAND     "dollsand"
define PF_DOLLAR         "dollar"
define PF_DOLLARS        "dollars"
define PF_CENT           "cent"
define PF_CENTS          "cents"

define PF_THE            "the"
define PF_OF             "of"
define PF_1990           "1990"
define PF_1994           "1994"
define PF_1995           "1995"
define PF_1996           "1996"
define PF_1997           "1997"
define PF_1998           "1998"
define PF_1999           "1999"
define PF_2000           "2000"
define PF_19             "19"

/*
 * Information about state of each active instance.
 *
 * This data is shared by all client processes, but each process
 * looks only at the data for itself.
 *
 * Processes find a free slot by looking at the bInUse field.
 */
struct line_t { boolean         bInUse;           // is this table slot in use?
    unsigned int    hTask;            // Windows task handle
    int             nLineNum;         // line number
    boolean         bConnected;       // connected to a line ?
    boolean         bOnLine;          // com_answer called ?
    int             nDateSpeakType;   // Current Set_Date_Speak
                                                        setting /* Start (first key/first word) timeouts for GetTones and
     *      GetWords, in milliseconds */
    ulong           lGetTonesStartTimeout;
    ulong           lGetWordsStartTimeout;

short           nNumItemsInPlayList;  // number of items added
                                          to play list (used by
                                          com_play)
};

static
struct line_t line[MAX_LINES] = {0};

/**********************************************/
// Find line table slot that is being used by task handle hTask
static
```

- 135 -

```
     int     FindSlot (
         const  unsigned int    hTask,   // task handle (Windows only)
                struct line_t   **psp    // ptr to ptr to slot in line
                                                                      table
     )
     {
         int      nVRetVal;      // Voysys return value
         int      nSlot;         // slot in line table 10       // find slot in the line table by using hTask
         for ( nSlot = 0 ; nSlot < MAX_LINES ; nSlot++) {
             if ( line[nSlot].bInUse &&
                  ( line[nSlot].hTask == hTask ) )
                 break;
         } if ( nSlot >= MAX_LINES ) {
             nVRetVal = RC_NOTINITIALIZED;     // best guess
             goto done;
         }
         *psp = &line[nSlot];

nVRetVal = RC_SUCCEED;

25   done:
         return nVRetVal;

}   /* function FindSlot */

30
     /**********************************************/ static
     int add_voice (
35       const   struct line_t  *sp,     // ptr to slot in line table
         const   char            *voice_file,
         const   int             path[MAX_DIRS]
     )
     {
40       int              nVRetVal;              // Voysys return value
         struct command   cmd;                   // command to send
         struct event     event;                 // event received
         int              i;

         Debug ( 4, sprintf ( Debug_buf, "Compute/add_voice: called,
     voice_file '%s'", voice_file ) );

if ( strlen ( voice_file ) >= ( MAX_DN + MAX_FN ) ) {
             nVRetVal = RC_BADFILENAME;
             goto done;
         } cmd.nCommand = DVRC_ADDPLAY;
         cmd.nLine = sp->nLineNum;
55       for ( i = 0; i < MAX_DIRS; i++ )
             cmd.path[i] = path[i];
         cmd.play_item.type = PI_SINGLE_FILE;
         strcpy ( cmd.play_item.fname, voice_file );
         cmd.play_item.index = -1;
60       cmd.play_item.vdata = ( void * ) 0xFFFFFFFF;
```

ATTORNEY DOCKET NO: VOYS2220WSW
wsw/voys/2220.001

- 136 -

```
        nVRetVal = ipc_Do_Command ( sp->hTask, cmd, &event );

done:
        Debug ( 4, sprintf ( Debug_buf, "Compute/add_voice: ret %d",
    nVRetVal ) );
        return ( nVRetVal );

}   /* function add_voice */

/*********************************************/ static int addp (
        const   struct line_t *sp,     // ptr to slot in line table
        const   char          *voice_file
    )
    {
        int        nVRetVal;
        int        path[MAX_DIRS];
        int        i;

path[0] = DIR_SYSPROMPTS;
        for ( i = 1; i < MAX_DIRS; i++ )
            path[i] = DIR_END;

nVRetVal = add_voice ( sp, voice_file, path );

return ( nVRetVal );

}   /* function addp */

/*********************************************/ static
    int addu (
        const   struct line_t *sp,     // ptr to slot in line table
        const   char          *voice_file
    )
    {
        int        nVRetVal;
        int        path[MAX_DIRS];
        int        i;

// Note: remember to add more DIR_ if new ones have been created path[0] = DIR_APPPROMPTS;
        path[1] = DIR_USERVOICE;
        path[2] = DIR_TEMPFILES;
        for ( i = 3; i < MAX_DIRS; i++ )
            path[i] = DIR_END;

nVRetVal = add_voice ( sp, voice_file, path );

return ( nVRetVal );

}   /* function addu */

/***************************************************************
```

- 137 -

```
The "speak as" routines assume the existence of the following
prompts:

1       10      11      hundred
2       20      12      thousand
3       30      13      million     billion
4       40      14      the         sign3 (minus)
5       50      15      point       of
6       60      16      dollar      dolland ("dollar and")
7       70      17      dollars     dollsand ("dollars and")
8       80      18      cent        cents
9       90      19      0

1990    1994    1995    1996    1997    1998    1999    2000 monday tuesday    wednesdy    thursday    friday saturday
sunday january     february    march           april
may         june        july            august
september   october     november        december 1st     2nd     3rd     4th     5th     6th     7th     8th     9th
10th    11th    12th    13th    14th    15th    16th    17th    18th
19th    20th    21st    22nd    23rd    24th    25th    26th    27th
28th    29th    30th    31st
***********************************************************/
/*
 * Special prompt lists. Remember that in C, the first element
 *     in an array has the index 0.
 */
static const
char *Days[] = {
    "sunday",
    "monday",
    "tuesday",
    "wednesdy",
    "thursday",
    "friday",
    "saturday"
};

static const
char *Months[] = {
    "january",
    "february",
    "march",
    "april",
    "may",
    "june",
    "july",
    "august",
    "septembr",
    "october",
    "november",
    "december"
};

static const
char *Ordinals[] = {
```

```
        "1st", "2nd", "3rd", "4th", "5th",
        "6th", "7th", "8th", "9th", "10th",
        "11th", "12th", "13th", "14th", "15th",
        "16th", "17th", "18th", "19th", "20th",
        "21st", "22nd", "23rd", "24th", "25th",
        "26th", "27th", "28th", "29th", "30th",
        "31st"
    };

/************************************************************ speak_as_digits: Take the character input, and speak out the
        different digit prompts.  If preceded with a minus, speak
        that. Also allow for decimal points and digits after that.
        Ignore all characters other than '0'-'9', '-', and '.'.
        This procedure can handle any number of digits.  This
        procedure will ignore any characters that are not digits.

returns:     0 = success

************************************************************/ static int     speak_as_digits (
    const  struct  line_t   *sp,          // ptr to slot in line table
    const  char             *numbuf
)
{
    int            nVRetVal;
    const  char    *chrptr;

chrptr = numbuf;

while ( *chrptr != ( char ) NULL ) {
        switch ( *chrptr ) {
            case '0':
                nVRetVal = addp ( sp, PF_0 );
                break;
            case '1':
                nVRetVal = addp ( sp, PF_1 );
                break;
            case '2':
                nVRetVal = addp ( sp, PF_2 );
                break;
            case '3':
                nVRetVal = addp ( sp, PF_3 );
                break;
            case '4':
                nVRetVal = addp ( sp, PF_4 );
                break;
            case '5':
                nVRetVal = addp ( sp, PF_5 );
                break;
            case '6':
                nVRetVal = addp ( sp, PF_6 );
                break;
            case '7':
                nVRetVal = addp ( sp, PF_7 );
                break;
            case '8':
                nVRetVal = addp ( sp, PF_8 );
```

```
                break;
            case '9':
                nVRetVal = addp ( sp, PF_9 );
                break;
            case '-':
                nVRetVal = addp ( sp, PF_MINUS );
                break;
            case '.':
                nVRetVal = addp ( sp, PF_POINT );
                break;
            default:
                nVRetVal = -1;
                Debug ( 1, sprintf ( Debug_buf,
    "Compute/speak_as_digits: invalid character #%d '%c' (0x%02X)",
    ( int) ( chrptr - numbuf ), *chrptr, *chrptr ) );
                break;
        } if ( nVRetVal != RC_SUCCEED )
            goto done;

chrptr++;
    } done:
    return ( nVRetVal );

}   /* function speak_as_digits */

/************************************************************ speak_as_day:  Take the input, and convert it to integer.  If
        the integer is in the range 1..7, speak the corresponding
        day of the week (where Sunday=1).  Otherwise, return an
        error.

returns:    0 = success
                           -1 = improper day number

************************************************************/ static int speak_as_day (
    const   struct line_t   *sp,        // ptr to slot in line table
    const   char            *numbuf
)
{
    int     dayval;
    int     nVRetVal;       // Voysys return value dayval = atoi ( numbuf );
    if ( ( dayval < 1 ) || ( dayval > 7 ) ) {
        nVRetVal = -1;              // need a error code ?
        Debug ( 1, sprintf ( Debug_buf, "Compute/speak_as_day:
                    value for day must be between 1 and 7" ) );
        goto done;
    } nVRetVal = addp ( sp, Days[dayval - 1] );
done:
```

ATTORNEY DOCKET NO: VOYS2220WSW
wsw/voys/2220.001

- 140 -

```
       return ( nVRetVal );

}   /* function speak_as_day */

   /************************************************************** speak_0_to_999: Speak numbers in the range of 0-999.  This is
           a utility routine for "speak_as_number". Note that this
           routine takes an integer as an argument, not a character
           string.
   **************************************************************/ static int speak_0_to_999 (
       const   struct line_t      *sp,     // ptr to slot in line table
       const   int                intval
   )
   {
       int     nVRetVal;                   // Voysys return value
       int     hundreds, tens, ones;
       char    chrbuf[MAX_CHRBUF];

/*
        * Break the number into hundreds, tens, and ones.
        */
       hundreds = intval / 100;
       tens = ( intval - ( hundreds * 100 ) ) / 10;
       ones = intval % 10;

       /*
        * Speak the hundreds if they are greater than zero.
        */
       if ( hundreds > 0 ) {
           sprintf ( chrbuf, "%ld", hundreds );
           nVRetVal = addp ( sp, chrbuf );
           if ( nVRetVal != RC_SUCCEED )
               goto done;

nVRetVal = addp ( sp, PF_HUNDRED );
           if ( nVRetVal != RC_SUCCEED )
               goto done;
       }

/*
        * If the tens digit is one, speak the appropriate "teens"
        *     prompt.
        */
       if ( tens == 1 ) {
           sprintf ( chrbuf, "1%ld", ones );
           nVRetVal = addp ( sp, chrbuf );
           if ( nVRetVal != RC_SUCCEED )
               goto done;
       }

       /*
        * Otherwise, look for both a tens prompt and a ones prompt.
        */
       else {

           /*
            * If the tens digit is greater than 1, speak the
```

- 141 -

```
            *     appropriate tens prompt.
            */
            if ( tens > 1 ) {
                sprintf ( chrbuf, "%1d0", tens );
                nVRetVal = addp ( sp, chrbuf );
                if ( nVRetVal != RC_SUCCEED )
                    goto done;
            }

/*
             * Then speak the ones prompt, even if it is zero but only
             *     if tens and hundreds are zero.
             */
            if (( ones != 0 ) || (( tens == 0 ) && ( hundreds == 0))){
                sprintf ( chrbuf, "%1d", ones );
                nVRetVal = addp ( sp, chrbuf );
                if ( nVRetVal != RC_SUCCEED )
                    goto done;
            }
        } done:
        return ( nVRetVal );

}   /* function speak_0_to_999 */

/************************************************************* speak_as_number: Take in a character string, and speak it as a
            number. If it has a decimal point, speak that and speak
            the numbers after it as digits. This procedure can handle
            the range:
                    -999999999999 to 999999999999   (999 billion)

This procedure will ignore all extraneous characters
            before the first number (or minus or point).

Returns:    0 = success
                               -1 = no numeric characters
                               -2 = number is too large

*************************************************************/ static int    speak_as_number (
        const  struct line_t  *sp,         // ptr to slot in line table
        const  char           *numbuf
    )
    {
        int     numlen, count;
        char    chrbuf[MAX_CHRBUF];
        int     nVRetVal;                  // Voysys return value
        char    *chrptr;

/*
         * Find the first character that is a minus, point, or 0-9.
         *     Return an error if there weren't any.
         */
        chrptr = strpbrk ( numbuf, "0123456789-." );
        if ( chrptr == ( char * ) NULL ) {
```

- 142 -

```
            nVRetVal = -1;        // may need an error code
            Debug ( 1, sprintf ( Debug_buf, "Compute/speak_as_number:
                                  cannot find any valid character" ) );
            goto done;
        }

/*
         * If the first character is a minus, add that prompt to the
         *    list, and move on.
         */
        if ( *chrptr == '-' ) {
           nVRetVal = addp ( sp, PF_MINUS );
           if ( nVRetVal != RC_SUCCEED )
              goto done;
15
           chrptr++;
        }

/*
         * Find the number of consecutive numeric characters.  If the
         *    number of digits is greater than twelve (999 billion)
         *    return an error.
         */
        numlen = strspn ( chrptr, "0123456789" );
        if ( ( numlen > 12 ) || ( numlen > MAX_CHRBUF ) ) {
           nVRetVal = -2;        // may need an error code
           Debug ( 1, sprintf ( Debug_buf, "Compute/speak_as_number:
                                  number is too large" ) );
           goto done;
        }

/*
         * If the number of digits is greater than 9, we have a
         *    billions value. Break off the billions digits and
         *    speak them, as long as they aren't all zeros.
         */
        if ( numlen > 9 ) {
           count = numlen - 9;
           chrbuf[count] = (char) NULL;
           strncpy ( chrbuf, chrptr, count );

if ( atoi ( chrbuf ) > 0 ) {
              nVRetVal = speak_0_to_999 ( sp, atoi ( chrbuf ) );
45            if ( nVRetVal != RC_SUCCEED )
                 goto done;

nVRetVal = addp ( sp, PF_BILLION );
              if ( nVRetVal != RC_SUCCEED )
                 goto done;
           }
           chrptr += count;
           numlen = 9;
        }
        /*
         * If the number of digits remaining is greater than 6, we
         *    have a millions value. Break off the millions digits
         *    and speak them, as long as they aren't all zeros.
         */
        if ( numlen > 6 ) {
```

- 143 -

```
            count = numlen - 6;
            chrbuf[count] = (char) NULL;
            strncpy ( chrbuf, chrptr, count );

            if ( atoi ( chrbuf ) > 0 ) {
                nVRetVal = speak_0_to_999 ( sp, atoi ( chrbuf ) );
                if ( nVRetVal != RC_SUCCEED )
                    goto done;

                nVRetVal = addp ( sp, PF_MILLION );
                if ( nVRetVal != RC_SUCCEED )
                    goto done;
            }
            chrptr += count;
            numlen = 6;
        }
        /*
         * If the number of digits remaining is greater than 3, we
         *      have a thousands value.  Break off the thousands
         *      digits and speak them, as long as they aren't all
         *      zeros.
         */
        if ( numlen > 3 ) {
            count = numlen - 3;
            chrbuf[count] = (char) NULL;
            strncpy ( chrbuf, chrptr, count );

if ( atoi ( chrbuf ) > 0 ) {
                nVRetVal = speak_0_to_999 ( sp, atoi ( chrbuf ) );
30              if ( nVRetVal != RC_SUCCEED )
                    goto done;

nVRetVal = addp ( sp, PF_THOUSAND );
                if ( nVRetVal != RC_SUCCEED )
                    goto done;
            }
            chrptr += count;
            numlen = 3;
        }
        /*
         * Now speak the remaining digits.  If the value is zero, and
         *      there were thousands+ digits, do not speak the zero.
         *      If the value is zero, and there were no thousands
         *      digits, do speak the zero.
         */
        chrbuf[numlen] = (char) NULL;
        strncpy ( chrbuf, chrptr, numlen );

        if ( ( atoi ( chrbuf ) > 0 ) || ( numlen < 3 ) ) {
            nVRetVal = speak_0_to_999 ( sp, atoi ( chrbuf ) );
            if ( nVRetVal != RC_SUCCEED )
                goto done;
        }
        chrptr += numlen;

/*
         * If the next character is a point ('.'), speak it and the
         *      next digits. Speak the digits after the decimal point
         *      as digits (10.23 = "ten point two three").
```

ATTORNEY DOCKET NO: VOYS2220WSW
wsw/voys/2220.001

```
                                - 144 -
            */
            if ( *chrptr == '.' ) {
                nVRetVal = addp ( sp, PF_POINT );
                if ( nVRetVal != RC_SUCCEED )
                    goto done;

chrptr++;
                nVRetVal = speak_as_digits ( sp, chrptr );
                if ( nVRetVal != RC_SUCCEED )
                    goto done;
            } done:
            return ( nVRetVal );
15
        }   /* function speak_as_number */

        /************************************************************* speak_as_dollars: Speak a numeric amount as dollars and cents
                (or dollars only, if the cents value is zero.) This
                procedure can handle the range:
                -999999999 to 999999999   (999 million)

This procedure will ignore all extraneous characters
                before the first number (or minus or point).
                        Returns:    0 = success
                                   -1 = no numeric characters
                                   -2 = number is too large

        *************************************************************/ static int speak_as_dollars (
            const   struct line_t   *sp,        // ptr to slot in line table
            const   char            *numbuf
        )
        {
            char    *decptr;
            char    *chrptr;
            long    dollars;
            int     cents;
            char    chrbuf[MAX_CHRBUF];
            int     nVRetVal;                   // Voysys return value
            char    *nums = "0123456789-.";

            /*
             * Find the first character that is a minus, point, or 0-9.
             *      Return an error if there weren't any.
             */
            chrptr = strpbrk ( numbuf, nums );
            if ( chrptr == ( char * ) NULL ) {
                nVRetVal = -1;
                Debug ( 1, sprintf ( Debug_buf, "Compute/speak_as_number:
                                    cannot find any valid character" ) );
                goto done;
60          }
```

- 145 -

```
         /*
          * Find the decimal point, if any.  If there is one, stick a
          *     null there.
          */
         decptr = strchr ( chrptr, '.' );
         if ( decptr ) {
             *decptr = (char) NULL;
         }

         /*
          * If there are any digits before the decimal point, send them
          *     off to 'speak_as_number'.  If the return code is
          *     non-zero, exit with the same return code.
          */
         if ( chrptr != decptr ) {
             nVRetVal = speak_as_number ( sp, chrptr );
             if ( nVRetVal != RC_SUCCEED )
                 goto done;
             dollars = atol( chrptr );
         }
         else
             dollars = 0;

/*
          * Now find out if there is a 'cents' value to speak.  We want
          *     to speak a 'cents' if there is a decimal point, and if
          *     the two digits after it are non-zero.  Remember to
          *     restore the decimal point to the buffer, so as not to
          *     modify it.
          */
         cents = 0;
         if ( decptr ) {
             *decptr = '.';
             decptr++;
             chrbuf[2] = (char) NULL;
             strncpy ( chrbuf, decptr, 2 );
             cents = atoi ( chrbuf );
         }

         /*
          * If there is a cents value, we now want to speak the prompt
          *     "dollars and" (or "dollar and").  Otherwise, just speak
          *     "dollars" (or "dollar").  If there is a cents value,
          *     speak it, and speak the "cents" (or "cent") prompt.
          */
         if ( cents > 0 ) {
             if ( dollars > 0 ) {
                 if (dollars == 1)
                     nVRetVal = addp ( sp, PF_DOLLARAND );
                 else
                         nVRetVal = addp ( sp, PF_DOLLARSAND );
                 if ( nVRetVal != RC_SUCCEED )
                     goto done;
             }
             nVRetVal = speak_0_to_999 ( sp, cents );
             if ( nVRetVal != RC_SUCCEED )
                 goto done;

             if (cents == 1)
                 nVRetVal = addp ( sp, PF_CENT );
```

- 146 -

```
            else
                nVRetVal = addp ( sp, PF_CENTS );
            if ( nVRetVal != RC_SUCCEED )
                goto done;
        }
        else if ( dollars > 0 ) {
            if (dollars == 1)
                nVRetVal = addp ( sp, PF_DOLLAR );
            else
                nVRetVal = addp ( sp, PF_DOLLARS );
            if ( nVRetVal != RC_SUCCEED )
                goto done;
        }
    done:
        return ( nVRetVal );

}   /* function speak_as_dollars */

/************************************************************** speak_as_date: Speak a date.  Assume the date is in the format
            Mm/Dd/YY (lower cases not required).  Speak the date in
            the format specified by the current setting of
            nDateSpeakType:

MMDDYY:     "July 14th, 1980" (month name, ordinal number,
                    19XX; only 20th Century dates)

MMDD:       "July 14th"

DDMMYY:     "the 14th of July, 1980"

DDMM:       "the 14th of July"

Returns:    0   success
                           -1   improper format for a date (month)
                           -2   improper format for a date (day)
                           -3   improper format for a date (year)
                           -4   improper format (cannot find '/')

Note:  only MMDDYY and MMDD is supported for now !!!!!

**************************************************************/ static int speak_as_date (
        const   struct line_t   *sp,        // ptr to slot in line table
        const   char            *numbuf
    )
    {
        int     month, day, year;
        char    *startptr;
        int     nVRetVal;                   // Voysys return value /*
         * Extract the month, day, and year from the date.  Return -1
         *      if anything at all goes wrong.  The month must be at
         *      the beginning of the date.
         */
```

ATTORNEY DOCKET NO: VOYS2220WSW
wsw/voys/2220.001

- 147 -

```
         startptr = ( char * ) numbuf;
         month = atoi ( startptr );
         if ( ( month < 1 ) || ( month > 12 ) ) {
            nVRetVal = -1;
            Debug ( 1, sprintf ( Debug_buf, "Compute/speak_as_date:
                                                 invalid month %d", month ) );
            goto done;
         }

        /*
          * The day should start after the first slash
          */
         startptr = strchr ( startptr, '/' );
         if ( startptr == ( char * ) NULL ) {
            nVRetVal = -4;
            Debug ( 1, sprintf ( Debug_buf, "Compute/speak_as_date:
                                                 cannot find '/'" ) );
            goto done;
         }
         startptr++;
         day = atoi ( startptr );
         if ( ( day < 1 ) || ( day > 31 ) ) {
            nVRetVal = -2;
            Debug ( 1, sprintf ( Debug_buf, "Compute/speak_as_date:
                                                 invalid day %d", day ) );
            goto done;
         }

        /*
          * The year should start after the next slash.
          *
          * &&& Note that dBase date is the same as DOS format, which
          *     means no provision is made for dates not matching
          *     19**.  When they get around to fixing this, we will
          *     too.
          */
         startptr = strchr ( startptr, '/' );
         if ( startptr == ( char * ) NULL ) {
            nVRetVal = -4;
            Debug ( 1, sprintf ( Debug_buf, "Compute/speak_as_date:
                                                 cannot find '/'" ) );
            goto done;
         }
         startptr++;
         year = atoi ( startptr );
         if ( ( year < 0 ) || ( year > 99 ) ) {
            nVRetVal = -3;
            Debug ( 1, sprintf ( Debug_buf, "Compute/speak_as_date:
                                                 invalid year %d", year ) );
            goto done;
         }

        /*
          * Now add prompts to the prompt list.  Start by adding the
          *    month and ordinal day prompts, in the order specified
          *    by nDateSpeakType.
          */
         if ( ( sp->nDateSpeakType == DS_MMDDYY ) ||
              ( sp->nDateSpeakType == DS_MMDD ) ) {
```

- 148 -

```
            nVRetVal = addp ( sp, Months[month - 1] );
            if ( nVRetVal != RC_SUCCEED )
                goto done;

nVRetVal = addp ( sp, Ordinals[day - 1] );
            if ( nVRetVal != RC_SUCCEED )
                goto done;
        }
        else {
            nVRetVal = addp ( sp, PF_THE );
            if ( nVRetVal != RC_SUCCEED )
                goto done;

nVRetVal = addp ( sp, Ordinals[day - 1] );
            if ( nVRetVal != RC_SUCCEED )
                goto done;

nVRetVal = addp ( sp, PF_OF );
            if ( nVRetVal != RC_SUCCEED )
                goto done;

nVRetVal = addp ( sp, Months[month - 1] );
            if ( nVRetVal != RC_SUCCEED )
                goto done;
        }
        /*
         * Now add the year prompts, if the nDateSpeakType specifies
         *      it.  Start with "nineteen", and then speak the year
         *      (XX) number as a number - three cases: 00 - speak the
         *      prompt "hundred" only 0X - speak the prompt "zero"
         *      then speak the number. XX - simply speak the number.
         *      If the year is in the range 1994..2000 and 1990, we
         *      have a special prompt for it.
         */
        // Note: year 2000 not currently supported.
        if ( ( sp->nDateSpeakType == DS_MMDDYY ) ||
             ( sp->nDateSpeakType == DS_DDMMYY ) ) { if ( year == 90 )
                nVRetVal = addp ( sp, PF_1990 );
            else if ( year == 94 )
                nVRetVal = addp ( sp, PF_1994 );
            else if ( year == 95 )
                nVRetVal = addp ( sp, PF_1995 );
            else if ( year == 96 )
                nVRetVal = addp ( sp, PF_1996 );
            else if ( year == 97 )
                nVRetVal = addp ( sp, PF_1997 );
            else if ( year == 98 )
                nVRetVal = addp ( sp, PF_1998 );
            else if ( year == 99 )
                nVRetVal = addp ( sp, PF_1999 );
            else {
                nVRetVal = addp ( sp, PF_19 );
                if ( nVRetVal != RC_SUCCEED )
                    goto done;

if ( year == 0 ) {
                    nVRetVal = addp ( sp, PF_HUNDRED );
                    if ( nVRetVal != RC_SUCCEED )
```

```
                        goto done;
                }
                else {
                    if ( year < 10 ) {
                        nVRetVal = addp ( sp, PF_0 );
                        if ( nVRetVal != RC_SUCCEED )
                            goto done;
                    }
                    nVRetVal = speak_0_to_999 ( sp, year );
                    if ( nVRetVal != RC_SUCCEED )
                        goto done;
                }
            }
            if ( nVRetVal != RC_SUCCEED )
                goto done;
        } done:
        return ( nVRetVal );

} /* function speak_as_date */

/*********************************************/ static void init_play_list (
        struct line_t *sp        // ptr to slot in line table
    )
    {
        struct command  cmd;     // command to send
        struct event    event;   // event received
        int             nVRetVal; // Voysys return value cmd.nCommand = DVRC_INITPLAY;
        cmd.nLine = sp->nLineNum;
        cmd.play_item.type = PI_NONE;
        sp->nNumItemsInPlayList = 0;

nVRetVal = ipc_Do_Command ( sp->hTask, cmd, &event );

} /* function init_play_list */

/*********************************************/ static int add_to_play_list (
        const   struct line_t   *sp,       // ptr to slot in line table
        const   char            *voice_file,
        const   int             play_type
    )
    {
        int     nVRetVal;
        int     i, vfile_len;
        char    non_digit_char = ( char ) NULL;

/*
         * Find the first non-digit, non-blank symbol in the string.
         *      If there isn't any, speak it as a number.  If there is
         *      one, and it's a slash (/), speak the string as a date.
         *      Otherwise, treat the string as a file name.
```

- 150 -

```
        */
        vfile_len = strlen ( voice_file );
        for ( i = 0; i < vfile_len; i++ ) {
            if ( ( (voice_file[i] < '0') || (voice_file[i] > '9') ) &&
                                                    // not a digit
                ( voice_file[i] != ' ' ) &&         // space
                ( voice_file[i] != '-' ) &&         // minus sign
                ( voice_file[i] != '.' ) ) {        // dot
                non_digit_char = voice_file[i];
                break;
            }
        } if ( non_digit_char == ( char ) NULL ) {
            /* voice file contains a number value */
            /* Adding number type */
            switch ( play_type ) {
                case AS_NUMBER:
                    nVRetVal = speak_as_number ( sp, voice_file );
                    break;
                case AS_DIGITS:
                    nVRetVal = speak_as_digits ( sp, voice_file );
                    break;
                case AS_DOLLARS:
                    nVRetVal = speak_as_dollars ( sp, voice_file );
                    break;
                case AS_DAY:
                    nVRetVal = speak_as_day ( sp, voice_file );
                    break;
                default:
                    nVRetVal = -2;
                    break;
            }
        }
        else if ( non_digit_char == '/' ) {
            nVRetVal = speak_as_date ( sp, voice_file );
        }
        else {
        /* voice file contains the name of the voice file to play */
            nVRetVal = addu ( sp, voice_file );
        } return ( nVRetVal );

}   /* function add_to_play_list */

/*********************************************/ static int play_play_list (
        const  struct line_t *sp,          // ptr to slot in line table
        const  boolean  interrupt_mode     // end play if DTMF received?
    )
    {
        struct command  cmd;               // command to send
        struct event    event;             // event received
        int    nVRetVal = RC_INTERNAL;     // Voysys return value cmd.nCommand = DVRC_PLAY;
        cmd.nLine = sp->nLineNum;
        cmd.play_item.type = PI_NONE;
```

- 151 -

```
          cmd.flush_digits_at_start = TRUE;
          cmd.end_voice_on_any_digit = interrupt_mode;
          cmd.end_voice_on_digit_end = FALSE;
          cmd.end_oper_on_any_digit = FALSE;
5         cmd.end_oper_on_digit_end = TRUE;
          cmd.end_oper_on_voice_end = ( !interrupt_mode );
          cmd.max_digits = 0;
          cmd.end_digit = '#';
          cmd.get_digits_at_end = FALSE;
10        cmd.start_timeout = 0;
          cmd.total_timeout = 0;
          cmd.interdigit_to = 0;
          cmd.end_silence = ( unsigned ) NOT_APPLIC;
          cmd.total_recording = ( unsigned ) NOT_APPLIC;
15
          nVRetVal = ipc_Do_Command ( sp->hTask, cmd, &event );

return ( nVRetVal );

20    }   /* function play_play_list */

/*******************************************/
      int com_Initialize (
          const   unsigned int    hTask,      // task handle (Windows only)
          const   unsigned int    hInstance,  // instance handle
                                                              (Windows only)
30        const   unsigned long   hWnd        // hidden window handle
                                                              (Windows only)
      )
      {
          int    nVRetVal;       // Voysys return value
          int    nSlot;          // slot in line table
          struct line_t *sp;     // ptr to slot in line table nVRetVal = CheckDebugSanity( );
          if (nVRetVal != RC_SUCCEED) {
              Debug ( 1, sprintf ( Debug_buf, "Compute/com_Initialize:
                                                  debug sanity failure" ) );
              goto done;
          }

          // find slot in the line table
          nVRetVal = FindSlot( hTask, &sp );
          if ( nVRetVal == RC_SUCCEED ) {
              nVRetVal = RC_ALREADYINITIALIZED;
              goto done;
50        }

// find a free slot in the line table
          for ( nSlot = 0 ; nSlot < MAX_LINES ; nSlot++ ) {
              if (!line[nSlot].bInUse)
                  break;
          }
          if ( nSlot >= MAX_LINES ) {
              Debug ( 5, sprintf ( Debug_buf, "Compute/com_Initialize:
                                                  line table is full" ) );
              nVRetVal = RC_SWLIMIT;
              goto done;
```

ATTORNEY DOCKET NO: VOYS2220WSW
wsw/voys/2220.001

- 152 -

```
        }
        sp = &line[nSlot];
        sp->bInUse = TRUE;

       sp->hTask = hTask;
        sp->bConnected = FALSE;
        sp->nLineNum = MAX_LINES;
        sp->bOnLine = FALSE;

        /* initialize lower layer(s) */
        nVRetVal = ipc_Initialize ( sp->hTask, hInstance, hWnd );
        if ( nVRetVal < RC_SUCCEED ) {
            sp->bInUse = FALSE;
            goto done;
        }

/*
         * Set defaults for the various functions.
         */
        sp->nDateSpeakType = DS_MMDDYY;
        sp->lGetWordsStartTimeout = DEF_GETWORDS_START_TIMEOUT;
        sp->lGetTonesStartTimeout = DEF_GETTONES_START_TIMEOUT;

nVRetVal = RC_SUCCEED;
    done:
        return ( nVRetVal );

}   /* function com_Initialize */

/**********************************************************
     * arguments have following meaning:
     *
     *   - if rline_num is < MAX_LINES, means try for that line only.
     *   - if rline_num == MAX_LINES, means try for any line.
     *
     *   - if oline_num is < MAX_LINES, means got that line.
     *   - if oline_num == MAX_LINES, means did not get a line.
     **********************************************************/ int com_Connect (
        const    unsigned int   hTask,       // task handle (Windows only)
        const    int            rline_num,   // requested line number
                 int            *oline_num   // obtained line number
    )
    {
        int             nVRetVal = RC_INTERNAL;  // Voysys return value
        struct command  cmd;                     // command to send
        struct event    event;                   // event received
        int             curlinenum;              // line number
        struct line_t   *sp;                     // ptr to slot in line table
        *oline_num = MAX_LINES;

// find slot in the line table
        nVRetVal = FindSlot( hTask, &sp );
        if (nVRetVal != RC_SUCCEED)
60          goto done;
```

- 153 -

```
        if ( sp->bConnected ) {
            /* we are already connected to a line; disconnect */
            cmd.nCommand = DVRC_DISCONNECT;
            cmd.nLine = sp->nLineNum;
            cmd.play_item.type = PI_NONE;

nVRetVal = ipc_Do_Command ( sp->hTask, cmd, &event );

if ( nVRetVal >= RC_SUCCEED )
                sp->bConnected = FALSE;
            else
                goto done;
        }

        if ( rline_num < MAX_LINES ) {
            /* try just one line */

/* connect to a line */
            cmd.nCommand = DVRC_CONNECT;
            cmd.nLine = rline_num;
            cmd.play_item.type = PI_NONE;

nVRetVal = ipc_Do_Command ( sp->hTask, cmd, &event );

            if ( nVRetVal >= RC_SUCCEED ) {
                sp->bConnected = TRUE;
                sp->nLineNum = rline_num;
                *oline_num = sp->nLineNum;
            } else
                *oline_num = MAX_LINES;
        }
        else {
            /* find first free line */
            for (curlinenum = 0; curlinenum< MAX_LINES; curlinenum++){
                /* connect to a line */
                cmd.nCommand = DVRC_CONNECT;
                cmd.nLine = curlinenum;
                cmd.play_item.type = PI_NONE;
                nVRetVal = ipc_Do_Command ( sp->hTask, cmd, &event );

if ( nVRetVal >= RC_SUCCEED ) {
                    sp->bConnected = TRUE;
                    sp->nLineNum = curlinenum;
                    *oline_num = sp->nLineNum;
                    goto done;
                }
            }
            /* failed to find a line */
            *oline_num = MAX_LINES;
        } done:
        return ( nVRetVal );

}   /* function com_Connect */

60
    /*************************************************************
```

ATTORNEY DOCKET NO: VOYS2220WSW
wsw/voys/2220.001

```
 *
 * Tricky: if dir_name == ".", this means client current
 *   directory, not server current directory.
 *
 **********************************************************/
int com_Set_Directory (
    const  unsigned int  hTask,       // task handle (Windows only)
           char          *dir_type_str, // directory type string
           char          *dir_name      // name (no '\' on end)
)
{
    int    nVRetVal = RC_INTERNAL;  // Voysys return value
    struct command  cmd;            // command to send
    struct event    event;          // event received
    struct line_t *sp;              // ptr to slot in line table
    int    dir_type;

// find slot in the line table
    nVRetVal = FindSlot( hTask, &sp );
    if (nVRetVal != RC_SUCCEED)
        goto done;

/* tricky: must be connected to a line before can do a SETDIR */
    if ( !sp->bConnected ) {
        nVRetVal = RC_NOTCONNECTED;
        goto done;
    } if ( strlen ( dir_name ) > MAX_DN ) {
        nVRetVal = RC_BADFILENAME;
        goto done;
    }

/*
     * Now capitalize the string.
     */
    strupr ( dir_type_str );

/*
     * Check through the list of allowable file types.  Return an
     *    error if the user specified an illegal file type.
     */
    if ( !strcmp ( dir_type_str, "SYSPROMPTS" ) || !strcmp (
                              dir_type_str, "SYS_PROMPTS" ) ) {
        dir_type = DIR_SYSPROMPTS;
    }
    else if ( !strcmp ( dir_type_str, "APPPROMPTS" ) || !strcmp (
                              dir_type_str, "APP_PROMPTS" ) ) {
        dir_type = DIR_APPPROMPTS;
    }
    else if ( !strcmp ( dir_type_str, "RECORDINGS" ) ) {
        dir_type = DIR_USERVOICE;
    }
    else if ( !strcmp ( dir_type_str, "FAXFILES" ) ) {
        dir_type = DIR_APPFAXFILES;
    }
    else if ( !strcmp ( dir_type_str, "TEMPFILES" ) ) {
        dir_type = DIR_TEMPFILES;
    }
    else {
```

```
          nVRetVal = RC_SETDIRINVALIDFILETYPE;
          goto done;
      }

     strupr ( dir_name );

/* convert directory name to full path name */
      dname_partial_to_full ( dir_name, cmd.name );

      /* better late than never ... */
      if ( strlen ( cmd.name ) > MAX_DN ) {
          nVRetVal = RC_BADFILENAME;
          goto done;
      }
      cmd.nCommand = DVRC_SETDIR;
      cmd.nLine = sp->nLineNum;
      cmd.dir_num = dir_type;
      cmd.play_item.type = PI_NONE;
      nVRetVal = ipc_Do_Command ( sp->hTask, cmd, &event );

done:
      return ( nVRetVal );
25
  }  /* function com_Set_Directory */

   /****************************************************************
   *
   *  com_Set_Input: Set the input device (phone/microphone)
   *
   ****************************************************************/
   int com_Set_Input (
       const  unsigned int   hTask,     // task handle (Windows only)
       const  int            dev_num    // device number
   )
   {
       int    nVRetVal = RC_INTERNAL;   // Voysys return value
       struct command  cmd;             // command to send
       struct event    event;           // event received
       struct line_t  *sp;              // ptr to slot in line table
45
       // find slot in the line table
       nVRetVal = FindSlot( hTask, &sp );
       if (nVRetVal != RC_SUCCEED)
           goto done;
50
       if ( !sp->bConnected ) {
           nVRetVal = RC_NOTCONNECTED;
           goto done;
       }
55
       if ( sp->bOnLine ) {
           nVRetVal = RC_OFFLINEONLY;
           goto done;
       }
60
       cmd.nCommand = DVRC_SETINPUT;
```

- 156 -

```
        cmd.nLine = sp->nLineNum;
        cmd.io_location = dev_num;
        cmd.play_item.type = PI_NONE;

5      nVRetVal = ipc_Do_Command ( sp->hTask, cmd, &event );

done:
        return ( nVRetVal );

10  }       /* function com_Set_Input */

/***************************************************************
     *
     *  com_Set_Output: Set the output device (phone/speaker)
     *
     ***************************************************************/

    int com_Set_Output (
        const   unsigned int    hTask,      // task handle (Windows only)
        const   int             dev_num     // device number
    )
    {
        int     nVRetVal = RC_INTERNAL;     // Voysys return value
        struct  command    cmd;             // command to send
        struct  event      event;           // event received
        struct  line_t     *sp;             // ptr to slot in line table 30      // find slot in the line table
        nVRetVal = FindSlot( hTask, &sp );
        if (nVRetVal != RC_SUCCEED)
            goto done;

35      if ( !sp->bConnected ) {
            nVRetVal = RC_NOTCONNECTED;
            goto done;
        }

40      if ( sp->bOnLine ) {
            nVRetVal = RC_OFFLINEONLY;
            goto done;
        }

        cmd.nCommand = DVRC_SETOUTPUT;
        cmd.nLine = sp->nLineNum;
        cmd.io_location = dev_num;
        cmd.play_item.type = PI_NONE;

        nVRetVal = ipc_Do_Command ( sp->hTask, cmd, &event );

done:
        return ( nVRetVal );

55  }       /* function com_Set_Output */

/***************************************************************
     *
     *  com_Set_Date_Speak: Set the date speak type.
```

ATTORNEY DOCKET NO: VOYS2220WSW
wsw/voys/2220.001

- 157 -

```
     *
     ***********************************************************/ int com_Set_Date_Speak (
         const   unsigned int   hTask,      // task handle (Windows only)
                 char           *date_type   // date speak type
     )
     {
         int       nVRetVal = RC_INTERNAL;   // Voysys return value
         struct line_t *sp;                  // ptr to slot in line table
         int           speak_type;

// find slot in the line table
         nVRetVal = FindSlot( hTask, &sp );
         if (nVRetVal != RC_SUCCEED)
             goto done;

if ( !sp->bConnected ) {
             nVRetVal = RC_NOTCONNECTED;
20           goto done;
         }

/*
          * Now capitalize the string.
          */
         strupr ( date_type );

/*
          * Check through the list of allowable date speak types.
          *      Return an error if the user specified an illegal type.
          */
         if ( !strcmp ( date_type, "MMDDYY" ) ) {
             speak_type = DS_MMDDYY;
         }
         else if ( !strcmp ( date_type, "MMDD" ) ) {
             speak_type = DS_MMDD;
         }
         else if ( !strcmp ( date_type, "DDMMYY" ) ) {
             speak_type = DS_DDMMYY;
         }
         else if ( !strcmp ( date_type, "DDMM" ) ) {
             speak_type = DS_DDMM;
         }
         else {
             nVRetVal = RC_SETDSPEAKINVALIDARG;
             goto done;
         }

/*
          * Assume that the nDateSpeakType sent by the upper level is
          *      legitimate.
          */
         sp->nDateSpeakType = speak_type;
         nVRetVal = RC_SUCCEED;
     done:
         return ( nVRetVal );

}   /* function com_Set_Date_Speak */
60
```

- 158 -

```
/*************************************************************
 *
 * com_Set_Timeout: set various timeouts
 *
 *************************************************************/ int com_Set_Timeout (
    const unsigned int   hTask,           // task handle (Windows only)
              char       *timeout_type_str,    // timeout type
    const     int        timeout          // timeout in seconds
)
{
    int         nVRetVal = RC_INTERNAL;   // Voysys return value
    struct line_t *sp;                    // ptr to slot in line table
    int         timeout_type;
    ulong       dwTimeout;

// find slot in the line table
    nVRetVal = FindSlot( hTask, &sp );
    if (nVRetVal != RC_SUCCEED)
        goto done;

if ( !sp->bConnected ) {
        nVRetVal = RC_NOTCONNECTED;
        goto done;
    }

/*
     * Make sure the timeout is valid (positive integer).
     */
    if ( timeout <= 0 ) {
       nVRetVal = RC_SETTMOUTBADTIMEOUT;
       goto done;
    }

/*
     * Convert the timeout to milliseconds.
     */
    dwTimeout = (ulong) timeout * 1000;

/*
     * Now capitalize the string.
     */
    strupr ( timeout_type_str );

/*
     * Check through the list of allowable timeout types.  Return
     *     an error if the user specified an illegal output type.
     */
    if ( !strcmp ( timeout_type_str, "VGETTONES" ) ) {
        timeout_type = TO_VGETTONES;
        sp->lGetTonesStartTimeout = dwTimeout;
    }
    else if ( !strcmp ( timeout_type_str, "VGETWORDS" ) ) {
        timeout_type = TO_VGETWORDS;
        sp->lGetWordsStartTimeout = dwTimeout;
    }
    else {
        nVRetVal = RC_SETTMOUTBADKEYWORD;
        goto done;
```

ATTORNEY DOCKET NO: VOYS2220WSW
wsw/voys/2220.001

- 159 -

```
        } nVRetVal = RC_SUCCEED;
    done:
        return ( nVRetVal );

}   /* function com_Set_Timeout */

/***********************************************************
     *
     *      Open an indexed prompt file
     *
     ***********************************************************/ int com_Set_Indexed_File (
        const   unsigned int    hTask,      // task handle (Windows only)
        const   char            *base_name  // base filename (no
                                            //      '.ext' on end)
    )
    {
        int     nVRetVal = RC_INTERNAL;     // Voysys return value
        int             i;
        struct command  cmd;                // command to send
        struct event    event;              // event received
        struct line_t   *sp;                // ptr to slot in line table // find slot in the line table
        nVRetVal = FindSlot( hTask, &sp );
        if (nVRetVal != RC_SUCCEED)
            goto done;

if ( !sp->bConnected ) {
            nVRetVal = RC_NOTCONNECTED;
            goto done;
        } if ( strlen ( base_name ) >= MAX_FN - 4 ) {
            nVRetVal = RC_BADCOMMAND;
            goto done;
        } cmd.nCommand = DVRC_SETIFILE;
        cmd.nLine = sp->nLineNum;
        cmd.play_item.type = PI_NONE;
        strcpy ( cmd.play_item.fname, base_name );
        strcpy ( cmd.name, base_name );
        strcat ( cmd.name, ".map" );
        cmd.play_item.index = -1;
        cmd.play_item.vdata = ( void * ) 0xFFFFFFFF;
        cmd.path[0] = DIR_SYSPROMPTS;
        for ( i = 1; i < MAX_DIRS; i++ )
            cmd.path[i] = DIR_END;

nVRetVal = ipc_Do_Command ( sp->hTask, cmd, &event );

done:
        return ( nVRetVal );
```

```
}   /* function com_Set_Indexed_File */

/*************************************************************
 *
 *  Tell lower levels what vocabulary we are using for
 *  voice-recognition. There are 3 relevant data files, all with
 *  the same base name:
 *
 *  basename.va    Vocabulary file. Rhetorex proprietary format.
 *                 Name is specified in driver config file; driver
 *                 reads in this file.
 *
 *  basename.vmp   Vocabulary "word map" file. One word-name per
 *                 line. Line number == word index in vocabulary
 *                 file (first line == 1). File must be in
 *                 SYSPROMPTS directory.
 *
 *  basename.vsm   Vocabulary "syntax map" file. One syntax-name
 *                 per line. Line number == syntax mask value
 *                 (first line == 0). File must be in SYSPROMPTS
 *                 directory.
 *
 *************************************************************/ int com_Set_Vocabulary (
    const   unsigned int    hTask,       // task handle (Windows only)
    const   char *base_name               // base filename (no '.ext' on end)
)
{
    int      nVRetVal = RC_INTERNAL;     // Voysys return value
    int      i;
    struct command  cmd;                  // command to send
    struct event    event;                // event received
    struct line_t *sp;                    // ptr to slot in line table // find slot in the line table
    nVRetVal = FindSlot( hTask, &sp );
    if (nVRetVal != RC_SUCCEED)
        goto done;

if ( !sp->bConnected ) {
        nVRetVal = RC_NOTCONNECTED;
        goto done;
    } if ( strlen ( base_name ) >= MAX_FN - 4 ) {
        nVRetVal = RC_BADCOMMAND;
        goto done;
    } cmd.nCommand = DVRC_SETVOCAB;
    cmd.nLine = sp->nLineNum;
    cmd.play_item.type = PI_NONE;
    strcpy ( cmd.play_item.fname, base_name );
    strcat ( cmd.play_item.fname, ".vmp" );
    strcpy ( cmd.name, base_name );
    strcat ( cmd.name, ".vsm" );
    cmd.play_item.index = -1;
    cmd.play_item.vdata = ( void * ) 0xFFFFFFFF;
```

- 161 -

```
        cmd.path[0] = DIR_VOCABS;
        for ( i = 1; i < MAX_DIRS; i++ )
            cmd.path[i] = DIR_END;

5       nVRetVal = ipc_Do_Command ( sp->hTask, cmd, &event );

done:
        return ( nVRetVal );

    }   /* function com_Set_Vocabulary */

/*********************************************/
    int com_Disconnect (
        const  unsigned int   hTask       // task handle (Windows only)
    )
    {
20      int       nVRetVal = RC_INTERNAL;   // Voysys return value
        struct command     cmd;             // command to send
        struct event       event;           // event received
        struct line_t     *sp;              // ptr to slot in line table 25      // find slot in the line table
        nVRetVal = FindSlot( hTask, &sp );
        if (nVRetVal != RC_SUCCEED)
            goto done;

30      if ( !sp->bConnected ) {
            nVRetVal = RC_NOTCONNECTED;
            goto done;
        }

35      if ( sp->bOnLine ) {
            nVRetVal = RC_CARDOFFHOOK;
            goto done;
        }

40      cmd.nCommand = DVRC_DISCONNECT;
        cmd.nLine = sp->nLineNum;
        cmd.play_item.type = PI_NONE;

nVRetVal = ipc_Do_Command ( sp->hTask, cmd, &event );
        if ( nVRetVal >= RC_SUCCEED ) {
            sp->bConnected = FALSE;
            sp->nLineNum = MAX_LINES;
            sp->bOnLine = FALSE;
50      } done:
        return ( nVRetVal );

55  }   /* function com_Disconnect */

/*********************************************/
60
    int com_Shutdown (
```

ATTORNEY DOCKET NO: VOYS2220WSW
wsw/voys/2220.001

- 162 -

```
            const    unsigned int    hTask        // task handle (Windows only)
        )
        {
            struct command    cmd;                // command to send
5           struct event      event;              // event received
            int       nVRetVal = RC_INTERNAL;     // Voysys return value
            struct line_t *sp;                    // ptr to slot in line table // find slot in the line table
10          nVRetVal = FindSlot( hTask, &sp );
            if (nVRetVal != RC_SUCCEED)
                goto done;

if ( sp->bConnected ) {
                if ( sp->bOnLine ) {
                    // should hang up here !!!
                }
                /* we are connected to a line; disconnect */
                cmd.nCommand = DVRC_DISCONNECT;
                cmd.nLine = sp->nLineNum;
                cmd.play_item.type = PI_NONE;

nVRetVal = ipc_Do_Command ( sp->hTask, cmd, &event );
                /* ignore return code */
                sp->bConnected = FALSE;
                sp->bOnLine = FALSE;
                sp->nLineNum = MAX_LINES;
            }

            nVRetVal = ipc_Shutdown ( sp->hTask );

sp->bInUse = FALSE;

done:
return ( nVRetVal );

}  /* function com_Shutdown */

        /*******************************************/ int com_Answer (
            const    unsigned int    hTask,       // task handle (Windows only)
            const    int     num_rings,           // answer incoming after X rings
            const    int     total_timeout        // seconds
        )
        {
            struct command    cmd;                // command to send
            struct event      event;              // event received
            int       nVRetVal = RC_INTERNAL;     // Voysys return value
            struct line_t *sp;                    // ptr to slot in line table // find slot in the line table
55          nVRetVal = FindSlot( hTask, &sp );
            if (nVRetVal != RC_SUCCEED)
                goto done;

if ( !sp->bConnected ) {
60              nVRetVal = RC_NOTCONNECTED;
                goto done;
```

ATTORNEY DOCKET NO: VOYS2220WSW
wsw/voys/2220.001

- 163 -

```
        } if ( sp->bOnLine ) {
            nVRetVal = RC_CARDOFFHOOK;
            goto done;
        }

/*
         * Validate the parameters.
         */
        if ( num_rings < 1 ) {
            nVRetVal = RC_WAITRINGINVALIDNUMRINGS;
            goto done;
        } if ( total_timeout < 0 ) {
            nVRetVal = RC_WAITRINGINVALIDTIMEOUT;
            goto done;
        } cmd.nCommand = DVRC_WAITFORCALL;
        cmd.nLine = sp->nLineNum;
        cmd.play_item.type = PI_NONE;
        cmd.answer_rings = num_rings;
        cmd.total_timeout = total_timeout * 1000;   // convert to
                                                    milliseconds nVRetVal = ipc_Do_Command ( sp->hTask, cmd, &event );

if ( nVRetVal == RC_SUCCEED )
            sp->bOnLine = TRUE;

done:
        return ( nVRetVal );

}   /* function com_Answer */

/**********************************************/

/* Go off-hook, dial number, wait for answer */

/*
 * syntax inside outdialnum is:
 *
 * 0123456789#*ABCD         digit to dial
 * T                        use tone dialing (default)
 * P                        use pulse dialing
 * W                        wait for dial tone, pause 2 seconds
 * !                        flash the switch-hook
 */ int com_Callout (
    const  unsigned int  hTask,  // task handle (Windows only)
    /*
     * syntax inside outdialnum is:
     *
     * 0123456789#*ABCD         digit to dial
     * T                        use tone dialing (default)
     * P                        use pulse dialing
```

```
             - 164 -
         * W                wait for dial tone
         * ,                pause 2 seconds
         * !                flash the switch-hook
         */
         const   char      *outdialnum,
         const   int        num_rings,      // give up after X rings
         const   boolean    wait_for_silence, // TRUE if predictive
                                                                dialing
                 ulong     *voice_after_answer  // noise after answer
                                                                   (msec)
         )
         {
             struct command  cmd;         // command to send
             struct event    event;       // event received
             int     nVRetVal = RC_INTERNAL;  // Voysys return value
             ulong   basedialtime;        // time (msec) to dial dialstring
             const char      *p;
             struct line_t *sp;           // ptr to slot in line table 20           // find slot in the line table
             nVRetVal = FindSlot( hTask, &sp );
             if (nVRetVal != RC_SUCCEED)
                 goto done;

25           if ( !sp->bConnected ) {
                 nVRetVal = RC_NOTCONNECTED;
                 goto done;
             }

30           if ( sp->bOnLine ) {
                 nVRetVal = RC_CARDOFFHOOK;
                 goto done;
             }

             if (num_rings < 1) {
                 nVRetVal = RC_DIALBADNUMRINGS;
                 goto done;
             }

             if ( strlen ( outdialnum ) >= MAX_DIGITS ) {
                 nVRetVal = RC_BADCOMMAND;   // Note: need a new error
                                                                      code
                 goto done;
             }
             /* see if there are any illegal characters in outdialnum */
             if ( strspn ( outdialnum, "0123456789#*ABCDTPW,!" ) != strlen
         ( outdialnum ) ) {
                 nVRetVal = RC_BADCOMMAND;   // Note: need a new error
                                                                      code
                 goto done;
             } basedialtime = BASEDIALTIME_W;
             p = outdialnum;
             while ( *p != '\0' ) {
                 switch ( *p++ ) {
                     case 'W':
                         basedialtime += BASEDIALTIME_W;
                         break;    // wait for dialtone == 3 secs ?
                     case ',':
```

- 165 -

```
                basedialtime += BASEDIALTIME_COMMA;
                break;         // pause == 2 secs
            default:
                basedialtime += BASEDIALTIME_DEFAULT;
                break;         // digit == 0.2 secs ?
        }
    } cmd.nCommand = DVRC_CALLOUT;
        cmd.nLine = sp->nLineNum;
        cmd.play_item.type = PI_NONE;
        cmd.answer_rings = num_rings;
        cmd.wait_for_silence = wait_for_silence;
        strcpy ( cmd.string, outdialnum );
        cmd.total_timeout = basedialtime + ( 6000L * ( ( long )
                                                    (num_rings + 1) ) );

nVRetVal = ipc_Do_Command ( sp->hTask, cmd, &event );
        *voice_after_answer = event.voice_after_answer;
        if (nVRetVal >= RC_SUCCEED)
            sp->bOnLine = TRUE;

// convert return code
        if (nVRetVal == RC_BUSYDEST)
            nVRetVal = RC_DIALGOTBUSYDEST;
        else if (nVRetVal == RC_NOANSWER)
            nVRetVal = RC_DIALGOTNOANSWER;

done:
return ( nVRetVal );

}   /* function com_Callout */

/*********************************************/

/* Just send digits out; no fancy stuff */

    int com_Dial (
        const   unsigned int    hTask,      // task handle (Windows only)
        const   char            *digits
    )
    {
        struct command      cmd;            // command to send
        struct event        event;          // event received
        int                 nVRetVal = RC_INTERNAL;  // Voysys return value
        struct line_t       *sp;            // ptr to slot in line table 50      // find slot in the line table
        nVRetVal = FindSlot( hTask, &sp );
        if (nVRetVal != RC_SUCCEED)
            goto done;

55      if ( !sp->bConnected ) {
            nVRetVal = RC_NOTCONNECTED;
            goto done;
        }

60      if ( !sp->bOnLine ) {
            nVRetVal = RC_CARDONHOOK;
```

ATTORNEY DOCKET NO: VOYS2220WSW
wsw/voys/2220.001

- 166 -

```
        goto done;
    } if ( strlen ( digits ) >= MAX_DIGITS ) {
        nVRetVal = RC_BADCOMMAND;    // Note: need a new error
                                                                code
        goto done;
    }

/* see if there are any illegal characters in digits */
    /* note: can not do "W" in this function */
    if ( strspn ( digits, "0123456789#*ABCDTP,!" ) != strlen (
                                                        digits ) ) {
        nVRetVal = RC_BADCOMMAND;    // Note: need a new error
                                                                code
        goto done;
    } cmd.nCommand = DVRC_SENDDTMF;
    cmd.nLine = sp->nLineNum;
    cmd.play_item.type = PI_NONE;
    strcpy ( cmd.string, digits );

nVRetVal = ipc_Do_Command ( sp->hTask, cmd, &event );
done:
    return ( nVRetVal );

}   /* function com_Dial */

/*******************************************/

/*
 * Get DTMF digits entered by user.
 *
 * Does not flush digits at start, so any digits left around from
 *     a previous operation will be seen.
 */ int com_Get_Tones (
    const  unsigned int  hTask,        // task handle (Windows only)
    const  boolean       play_playlist,   // play playlist ?
    /*
     * Values of term_digits:
     * ==0     unlimited (limited only by line card).
     * >0      limited to term_digits digits.
     */
    const  int       term_digits,      // end op after X keys recvd
    /*
     * Values of term_key:
     * '?'      any digit terminates operation.
     * ' '      no term digit; end by timeout or term_after_x_keys.
     * 'x'      terminate operation if digit 'x' input.
     */
    const  char      term_key,         // end op if this key recvd
    const  int       interdigit_timeout,  // seconds
    const  int       retries,          // if timeout, retry N times
           char      *outval           // retval -- digits received
)
```

ATTORNEY DOCKET NO: VOYS2220WSW
wsw/voys/2220.001

- 167 -

```
        {
                struct command  cmd;            // command to send
                struct event    event;          // event received
                int     nVRetVal = RC_INTERNAL; // Voysys return value
                int             i;
                char            *cptr;    // used to strip off terminating key
                struct line_t *sp;              // ptr to slot in line table
                ulong           term_id_timeout;  // interdigit timeout to
                                                  terminate on in msec
                *outval = '\0';

// find slot in the line table
                nVRetVal = FindSlot( hTask, &sp );
 15             if (nVRetVal != RC_SUCCEED)
                        goto done;

if ( !sp->bConnected ) {
                        nVRetVal = RC_NOTCONNECTED;
 20                     goto done;
                } if ( !sp->bOnLine ) {
                        nVRetVal = RC_CARDONHOOK;
 25                     goto done;
                } if ( retries < 0 ) {
                        nVRetVal = RC_BADCOMMAND;
                        goto done;
                } if ( ( term_digits < 0 ) || ( term_digits > MAX_DIGITS ) ) {
                        Debug ( 1, sprintf ( Debug_buf, "Compute/com_Get_Tones:
                                    bad number of digits for termination" ) );
                        nVRetVal = RC_GETTONESBADTERMDIGITS;
                        goto done;
                }

               if ( !strchr ( "0123456789#* ", term_key ) ) {
                        Debug ( 1, sprintf ( Debug_buf, "Compute/com_Get_Tones:
                                                bad termination key" ) );
                        nVRetVal = RC_GETTONESBADTERMKEY;
                        goto done;
                } if ( interdigit_timeout < 0 ) {
                        Debug ( 1, sprintf ( Debug_buf, "Compute/com_Get_Tones:
                                                bad interdigit timeout value" ) );
                        nVRetVal = RC_GETTONESBADINTDIGITTIMEOUT;
                        goto done;
                }

/*
                 * Convert the timeouts to milliseconds.
                 */
                term_id_timeout = interdigit_timeout * 1000;

for ( i = 0; i < retries + 1; i++ ) {
                        if ( play_playlist ) {
```

ATTORNEY DOCKET NO: VOYS2220WSW
wsw/voys/2220.001

- 168 -

```
                cmd.nCommand = DVRC_PLAY;
                cmd.nLine = sp->nLineNum;
                cmd.play_item.type = PI_NONE;
                cmd.flush_digits_at_start = FALSE;
 5              cmd.end_voice_on_any_digit = TRUE;
                cmd.end_voice_on_digit_end = FALSE;
                cmd.end_oper_on_any_digit = TRUE;
                cmd.end_oper_on_digit_end = FALSE;
                cmd.end_oper_on_voice_end = TRUE;
                cmd.max_digits = term_digits;
                cmd.end_digit = term_key;
                cmd.get_digits_at_end = FALSE;
                cmd.start_timeout = sp->lGetTonesStartTimeout;
                cmd.total_timeout = 0;
                cmd.interdigit_to = term_id_timeout;
                cmd.end_silence = ( unsigned ) NOT_APPLIC;
                cmd.total_recording = ( unsigned ) NOT_APPLIC;

nVRetVal = ipc_Do_Command ( sp->hTask, cmd, &event );
20
                if ( nVRetVal < RC_SUCCEED )
                    break;
            }

            cmd.nCommand = DVRC_GETDTMF;
            cmd.nLine = sp->nLineNum;
            cmd.play_item.type = PI_NONE;
            cmd.flush_digits_at_start = FALSE;
            cmd.end_voice_on_any_digit = FALSE;
            cmd.end_voice_on_digit_end = FALSE;
            cmd.end_oper_on_any_digit = ( term_key == '?' );
            cmd.end_oper_on_digit_end = ( ( term_key != '?' ) && (
                                                    term_key != ' ' ) );
            cmd.end_oper_on_voice_end = FALSE;
            cmd.max_digits = term_digits;
            cmd.end_digit = term_key;
            cmd.get_digits_at_end = TRUE;
            cmd.start_timeout = sp->lGetTonesStartTimeout;
            cmd.total_timeout = 0;
            cmd.interdigit_to = term_id_timeout;
            cmd.end_silence = ( unsigned ) NOT_APPLIC;
            cmd.total_recording = ( unsigned ) NOT_APPLIC;

nVRetVal = ipc_Do_Command ( sp->hTask, cmd, &event );
            if ( nVRetVal < RC_SUCCEED )
                break;
            if ( event.string[0] != '\0' ) {
            /* if string ends with term_key, strip it off */
            /* this also could be done by checking for RC_ENDFLAG */
                cptr = event.string;
                while ( *cptr != '\0' )
                    cptr++;
                cptr--;
                if ( *cptr == term_key )
                    *cptr = '\0';
                break;
            }
        }

60      if ( nVRetVal >= RC_SUCCEED )
            strcpy ( outval, event.string );
```

ATTORNEY DOCKET NO: VOYS2220WSW
wsw/voys/2220.001

```
done:
    return ( nVRetVal );

}   /* function com_Get_Tones */

/*********************************************/

/*
 * Get words spoken by the user and voice-recognized.
 */

/*
 * Values of term_after_x_words: ==0 unlimited (limited only by
 * line card). >0 limited to term_after_x_words words.
 */ int com_Get_Words (
    const   unsigned int  hTask,       // task handle (Windows only)
    const   boolean       play_playlist,    // play playlist ?
    const   char          *sub_vocab_name,
    /*
     * Values of term_after_x_words:
     * ==0      unlimited (limited only by line card).
     * >0       limited to term_after_x_words words.
     */
    const   int     term_after_x_words,   // end op after X words
                                                             recvd
    const   ulong   interword_timeout,    // msec
    const   int     retries,              // if timeout, retry N times
            char    *outval               // retval -- words received
)
{
    struct command cmd;                    // command to send
    struct event   event;                  // event received
    int            nVRetVal = RC_INTERNAL; // Voysys return value
    int            i;
    struct line_t *sp;                     // ptr to slot in line table

*outval = '\0';

// find slot in the line table
    nVRetVal = FindSlot( hTask, &sp );
    if (nVRetVal != RC_SUCCEED)
        goto done;

if ( !sp->bConnected ) {
        nVRetVal = RC_NOTCONNECTED;
        goto done;
    } if ( !sp->bOnLine ) {
        nVRetVal = RC_CARDONHOOK;
        goto done;
    } if ( retries < 0 ) {
        nVRetVal = RC_BADCOMMAND;
        goto done;
    }
```

- 170 -

```
       for ( i = 0; i < retries + 1; i++ ) {
           if ( play_playlist ) {
               cmd.nCommand = DVRC_PLAY;
 5             cmd.nLine = sp->nLineNum;
               cmd.play_item.type = PI_NONE;
               cmd.flush_digits_at_start = FALSE;
               cmd.end_voice_on_any_digit = TRUE;
               cmd.end_voice_on_digit_end = FALSE;
               cmd.end_oper_on_any_digit = TRUE;
               cmd.end_oper_on_digit_end = FALSE;
               cmd.end_oper_on_voice_end = TRUE;
               cmd.max_digits = 1;
               cmd.end_digit = '?';
               cmd.get_digits_at_end = FALSE;
               cmd.start_timeout = 0;
               cmd.total_timeout = 0;
               cmd.interdigit_to = 0;
               cmd.end_silence = ( unsigned ) NOT_APPLIC;
20             cmd.total_recording = ( unsigned ) NOT_APPLIC;

nVRetVal = ipc_Do_Command ( sp->hTask, cmd, &event );

if ( nVRetVal < RC_SUCCEED )
                   break;
           } cmd.nCommand = DVRC_GETWORDS;
           cmd.nLine = sp->nLineNum;
           cmd.play_item.type = PI_NONE;
           cmd.max_digits = term_after_x_words;
           cmd.start_timeout = sp->lGetWordsStartTimeout;
           cmd.total_timeout = 0;
           cmd.interdigit_to = interword_timeout;
           cmd.end_silence = ( unsigned ) NOT_APPLIC;
           cmd.total_recording = ( unsigned ) NOT_APPLIC;
           cmd.max_score = 400;
           cmd.min_ambiguity = 20;
           cmd.input_gain = 0x7000;
           strcpy ( cmd.name, sub_vocab_name );

nVRetVal = ipc_Do_Command ( sp->hTask, cmd, &event );
           if ( nVRetVal < RC_SUCCEED )
               goto done;
           for ( i = 0; i < MAX_WORDS; i++ ) {
               strcat ( outval, event.words[i] );
               // strcat(outval," ");   /* separate the words with
                                                       spaces */
           }
           goto done;
       } done:
       return ( nVRetVal );
55 }   /* function com_Get_Words */

60 //*******************************************/
```

ATTORNEY DOCKET NO: VOYS2220WSW
wsw/voys/2220.001

```
    int com_Hangup (
        const   unsigned int    hTask       // task handle (Windows only)
    )
    {
        struct command  cmd;                // command to send
        struct event    event;              // event received
        int     nVRetVal = RC_INTERNAL;     // Voysys return value
        struct line_t *sp;                  // ptr to slot in line table 10      // find slot in the line table
        nVRetVal = FindSlot( hTask, &sp );
        if (nVRetVal != RC_SUCCEED)
            goto done;

15      if ( !sp->bConnected ) {
            nVRetVal = RC_NOTCONNECTED;
            goto done;
        }

        if ( !sp->bOnLine ) {
            nVRetVal = RC_SUCCEED;
            goto done;
        }

        cmd.nCommand = DVRC_HANGUP;
        cmd.nLine = sp->nLineNum;
        cmd.play_item.type = PI_NONE;

nVRetVal = ipc_Do_Command ( sp->hTask, cmd, &event );
30
        if ( nVRetVal >= RC_SUCCEED )
            sp->bOnLine = FALSE;

done:
return ( nVRetVal );

}   /* function com_Hangup */

    /*******************************************/ int com_Hangup_Detect (
        const   unsigned int    hTask       // task handle (Windows only)
    )
    {
        struct command  cmd;                // command to send
        struct event    event;              // event received
        int     nVRetVal = RC_INTERNAL;     // Voysys return value
50      struct line_t *sp;                  // ptr to slot in line table // find slot in the line table
        nVRetVal = FindSlot( hTask, &sp );
        if (nVRetVal != RC_SUCCEED)
55          goto done;

if ( !sp->bConnected ) {
            nVRetVal = RC_NOTCONNECTED;
            goto done;
60      }
```

- 172 -

```
        cmd.nCommand = DVRC_GETSTATE;
        cmd.nLine = sp->nLineNum;
        cmd.play_item.type = PI_NONE;

       nVRetVal = ipc_Do_Command ( sp->hTask, cmd, &event );

if ( nVRetVal >= RC_SUCCEED ) {
            if ( event.user_off_hook )
                nVRetVal = RC_OFFHOOK;
            else
                nVRetVal = RC_ONHOOK;
        } done:
        return ( nVRetVal );

}  /* function com_Hangup_Detect */

    /*******************************************/ int com_Play (
        const  unsigned int  hTask,      // task handle (Windows only)
        const  int           call_type,
        const  char          *voice_file,  // one filename, a num, or a date
        const  int           play_type,
        const  int           interrupt_mode
    )
30  {
        int    nVRetVal = RC_INTERNAL;   // Voysys return value
        struct line_t *sp;                // ptr to slot in line table // find slot in the line table
35      nVRetVal = FindSlot( hTask, &sp );
        if (nVRetVal != RC_SUCCEED)
            goto done;

// Note: to support speak for online and not online
40      // should not check for bOnLine here and it will be checked
        // in the line driver layer of the server if ( !sp->bConnected ) {
            nVRetVal = RC_NOTCONNECTED;
45          goto done;
        } if ( ( play_type < AS_NUMBER ) || ( play_type > AS_DAY ) ) {
            nVRetVal = -10;
50          goto done;
        } switch ( call_type ) {

55          case IMMEDIATE:       // not use for now
                init_play_list ( sp );
    //          if ( add_to_play_list ( sp, voice_file, play_type ) ==
                                                             RC_NOFILE )
                if ( add_to_play_list ( sp, voice_file, play_type ) !=
60                                                           RC_SUCCEED )
                    nVRetVal = RC_SPEAKPROMPTFILENOTFOUND;
```

ATTORNEY DOCKET NO: VOYS2220WSW
wsw/voys/2220.001

- 173 -

```
                else
                    nVRetVal = play_play_list ( sp, interrupt_mode );
                break;

5           case START_PLAY_LIST:
                init_play_list ( sp );
                if ( add_to_play_list ( sp, voice_file, play_type ) !=
                                                        RC_SUCCEED )
                    nVRetVal = RC_SPEAKPROMPTFILENOTFOUND;
10              break;

case ADD_PLAY_LIST:
                sp->nNumItemsInPlayList++;
                if ( add_to_play_list ( sp, voice_file, play_type ) !=
15                                                      RC_SUCCEED )
                    nVRetVal = RC_SPEAKPROMPTFILENOTFOUND -
                                            sp->nNumItemsInPlayList;
                break;

20          /*
             * PLAY_PLAY_LIST no longer adds to the play list -
             *      just plays the list
             */
            case PLAY_PLAY_LIST:
25              nVRetVal = play_play_list ( sp, interrupt_mode );
                break;

default:
                nVRetVal = -12;
30      } done:
        return ( nVRetVal );

35  }   /* function com_Play */

/*********************************************/
    int    com_Record (
          const  unsigned int  hTask,       // task handle (Windows only)
                 char          *msgname,    // null == generate name;
                                                            also retval
          const  boolean       play_playlist,  // play playlist before
                                                                record ?
          /*
           * Values of term_key:
           *  '?'     any digit terminates operation.
           *  ' '     no term digit; end by timeout or term_after_x_keys.
           *  'x'     terminate operation if digit 'x' input.
           */
          const  char    term_key,        // end op if this key recvd
          const  ulong   silence_timeout, // msec
          const  int     max_recording    // maximum length of the
                                                        recording in seconds
       )
       {
           struct command  cmd;            // command to send
           struct event    event;          // event received
           int    nVRetVal = RC_INTERNAL;  // Voysys return value
```

```
                int             i;
                struct line_t   *sp;            // ptr to slot in line table // find slot in the line table
                nVRetVal = FindSlot( hTask, &sp );
                if (nVRetVal != RC_SUCCEED)
                    goto done;

// Note: to support record for online and not online
                // should not check for bOnLine here and it will be checked
                // in the line driver layer of the server if ( !sp->bConnected ) {
                    nVRetVal = RC_NOTCONNECTED;
                    goto done;
                } if ( strlen ( msgname ) >= ( MAX_DN + MAX_FN ) ) {
                    nVRetVal = RC_RECORDINVALIDFILENAME;
                    goto done;
                }

/*
                 * Validate the "max_recording_length" parameter.
                 */
                if ( max_recording < 1 ) {
                    nVRetVal = RC_RECORDINVALIDRECLEN;   // need to match
                                                        whatever is defined in
                                                        the ERS
                    goto done;
                } if ( play_playlist ) {
                    cmd.nCommand = DVRC_PLAY;
                    cmd.nLine = sp->nLineNum;
                    cmd.play_item.type = PI_NONE;
                    cmd.flush_digits_at_start = TRUE;
                    cmd.end_voice_on_any_digit = ( term_key == '?' );
                    cmd.end_voice_on_digit_end = ( ( term_key != '?' ) && (
                                                    term_key != ' ' ) );
                    cmd.end_oper_on_any_digit = ( term_key == '?' );
                    cmd.end_oper_on_digit_end = ( ( term_key != '?' ) && (
                                                    term_key != ' ' ) );
                    cmd.end_oper_on_voice_end = TRUE;
                    cmd.max_digits = 8;
                    cmd.end_digit = term_key;
                    cmd.get_digits_at_end = FALSE;
                    cmd.start_timeout = 0;
                    cmd.total_timeout = 0;
 50                 cmd.interdigit_to = 0;
                    cmd.end_silence = ( unsigned ) NOT_APPLIC;
                    cmd.total_recording = ( unsigned ) NOT_APPLIC;

nVRetVal = ipc_Do_Command ( sp->hTask, cmd, &event );
 55
                    if ( nVRetVal < RC_SUCCEED )
                        goto done;
                }

               cmd.nCommand = DVRC_RECORD;
                cmd.nLine = sp->nLineNum;
```

- 175 -

```
            cmd.path[0] = DIR_USERVOICE;
            for ( i = 1; i < MAX_DIRS; i++ )
                cmd.path[i] = DIR_END;
            cmd.play_item.type = PI_SINGLE_FILE;
            strcpy ( cmd.play_item.fname, msgname );
            cmd.flush_digits_at_start = TRUE;
            cmd.end_voice_on_any_digit = ( term_key == '?' );
            cmd.end_voice_on_digit_end = ( ( term_key != '?' ) && (
                                                    term_key != ' ' ) );
            cmd.end_oper_on_any_digit = ( term_key == '?' );
            cmd.end_oper_on_digit_end = ( ( term_key != '?' ) && (
                                                    term_key != ' ' ) );
            cmd.end_oper_on_voice_end = ( term_key == ' ' );
            cmd.max_digits = 8;
            cmd.end_digit = term_key;
            cmd.get_digits_at_end = FALSE;
            cmd.start_timeout = 0;
            cmd.total_timeout = 0;
            cmd.interdigit_to = 0;
            cmd.end_silence = silence_timeout;
            cmd.total_recording = max_recording;

nVRetVal = ipc_Do_Command ( sp->hTask, cmd, &event );

        done:
            msgname[0] = '\0';
            if ( nVRetVal >= RC_SUCCEED )
                strcpy ( msgname, event.filename );

            return ( nVRetVal );

}   /* function com_Record */

35
        #if DO_FAX

/*******************************************/

        int    com_Faxcover (
            const  unsigned int   hTask,       // task handle (Windows only)
            const  int            op_type,     // cover page options
            const  void far       *lpParm      // parameter string
        )
        {
            struct command  cmd;              // command to send
            struct event    event;            // event received
            int     nVRetVal = RC_INTERNAL;   // Voysys return value
            struct line_t   *sp;              // ptr to slot in line table
50
            // find slot in the line table
            nVRetVal = FindSlot( hTask, &sp );
            if (nVRetVal != RC_SUCCEED)
                goto done;
55
            if ( !sp->bConnected ) {
                nVRetVal = RC_NOTCONNECTED;
                goto done;
            }
60
            cmd.nCommand = DVRC_FAXCOVER;
```

ATTORNEY DOCKET NO: VOYS2220WSW
wsw/voys/2220.001

```
            cmd.nLine = sp->nLineNum;
            cmd.nFaxOpCode = op_type;
            cmd.nFaxParm = 0;

5          if ( lpParm )
                _fstrncpy( cmd.cFaxParm, lpParm, MAX_FAXPARM );
            else
                cmd.cFaxParm[0] = '\0';

10          nVRetVal = ipc_Do_Command ( sp->hTask, cmd, &event );
        done:
            return ( nVRetVal );

15      }   /* function com_Faxcover */

/*********************************************/
        int     com_Faxdoc (
            const   unsigned int    hTask,      // task handle (Windows only)
            const   int             op_type,    // document page options
            const   void far        *lpParm     // parameter string
        )
        {
            struct command  cmd;                                // command to send
            struct event    event;                              // event received
            int             nVRetVal = RC_INTERNAL;             // Voysys return value
30          struct line_t   *sp;                                // ptr to slot in line table // find slot in the line table
            nVRetVal = FindSlot( hTask, &sp );
            if (nVRetVal != RC_SUCCEED)
35              goto done;

if ( !sp->bConnected ) {
                nVRetVal = RC_NOTCONNECTED;
                goto done;
            } cmd.nCommand = DVRC_FAXDOC;
            cmd.nLine = sp->nLineNum;
            cmd.nFaxOpCode = op_type;
            cmd.nFaxParm = 0;

if ( lpParm )
                _fstrncpy( cmd.cFaxParm, lpParm, MAX_FAXPARM );
            else
50              cmd.cFaxParm[0] = '\0';

nVRetVal = ipc_Do_Command ( sp->hTask, cmd, &event );
        done:
55          return ( nVRetVal );

}   /* function com_Faxdoc */

60
        /*********************************************/
```

ATTORNEY DOCKET NO:   VOYS2220WSW
wsw/voys/2220.001

- 177 -

```
      int     com_Faxsend (
          const   unsigned int   hTask,       // task handle (Windows only)
          const   char far       *lpDialStr,  // the destination fax number
          const   int            op_type,     // document page options
          const   void far       *lpParm      // parameter string
      )
      {
          struct command  cmd;                // command to send
          struct event    event;              // event received
10        int    nVRetVal = RC_INTERNAL;      // Voysys return value
          struct line_t *sp;                  // ptr to slot in line table // find slot in the line table
          nVRetVal = FindSlot( hTask, &sp );
15        if (nVRetVal != RC_SUCCEED)
              goto done;

if ( !sp->bConnected ) {
              nVRetVal = RC_NOTCONNECTED;
              goto done;
          } cmd.nCommand = DVRC_FAXSEND;
          cmd.nLine = sp->nLineNum;
          cmd.nFaxOpCode = op_type;
          cmd.nFaxParm = 0;

_fstrncpy ( cmd.string, lpDialStr, MAX_DIGITS );
          if ( lpParm )
              _fstrncpy( cmd.cFaxParm, lpParm, MAX_FAXPARM );
          else
              cmd.cFaxParm[0] = '\0';

nVRetVal = ipc_Do_Command ( sp->hTask, cmd, &event );
35    done:
          return ( nVRetVal );

40    } /* function com_Faxsend */

/**********************************************/

      int    com_Faxsetup (
          const   unsigned int   hTask,       // task handle (Windows only)
          const   int            op_type,     // fax setup options
          const   void far       *lpParm,     // string parameter
          const   int            nParm        // integer parameter
      )
      {
          struct command  cmd;                // command to send
          struct event    event;              // event received
          int    nVRetVal = RC_INTERNAL;      // Voysys return value
55        struct line_t *sp;                  // ptr to slot in line table // find slot in the line table
          nVRetVal = FindSlot( hTask, &sp );
          if (nVRetVal != RC_SUCCEED)
60            goto done;
```

- 178 -

```
            if ( !sp->bConnected ) {
                nVRetVal = RC_NOTCONNECTED;
                goto done;
            }
            cmd.nCommand = DVRC_FAXSETUP;
            cmd.nLine = sp->nLineNum;
            cmd.nFaxOpCode = op_type;
            cmd.nFaxParm = nParm;
            if ( lpParm )
                _fstrncpy( cmd.cFaxParm, lpParm, MAX_FAXPARM );
            else
                cmd.cFaxParm[0] = '\0';

15          nVRetVal = ipc_Do_Command ( sp->hTask, cmd, &event );

done:
            return ( nVRetVal );

        }   /* function com_Faxsetup */ endif /* DO_FAX */

        /**********************************************/ int    com_Set (
            const   unsigned int    hTask,      // task handle (Windows only)
            const   int             op_type,    // set options
            const   void far        *lpParm,    // string parameter
            const   ulong           dwParm      // unsigned long parameter
        )
        {
            struct command  cmd;                // command to send
            struct event    event;              // event received
            int     nVRetVal = RC_INTERNAL;     // Voysys return value
            struct line_t *sp;                  // ptr to slot in line table // find slot in the line table
40          nVRetVal = FindSlot( hTask, &sp );
            if (nVRetVal != RC_SUCCEED)
                goto done;

if ( !sp->bConnected ) {
                nVRetVal = RC_NOTCONNECTED;
                goto done;
            } cmd.nCommand = DVRC_SET;
            cmd.nLine = sp->nLineNum;
            cmd.nSetGetOpCode = op_type;
            cmd.dwSetParm = dwParm;
            if ( lpParm )
                _fstrcpy( cmd.cSetParm, lpParm );
            else
                cmd.cSetParm[0] = ( char ) NULL;

nVRetVal = ipc_Do_Command ( sp->hTask, cmd, &event );

        done:
            return ( nVRetVal );
```

```
}   /* function com_Set */

/*******************************************/
int     com_Get (
    const   unsigned int    hTask,      // task handle (Windows only)
    const   int             op_type,    // get options
            void far        *lpParm,    // string parameter
            ulong           *dwParm     // unsigned long parameter
)
{
    struct command  cmd;                // command to send
    struct event    event;              // event received
    int     nVRetVal = RC_INTERNAL;     // Voysys return value
    struct line_t *sp;                  // ptr to slot in line table // find slot in the line table
    nVRetVal = FindSlot( hTask, &sp );
    if (nVRetVal != RC_SUCCEED)
        goto done;

if ( !sp->bConnected ) {
        nVRetVal = RC_NOTCONNECTED;
        goto done;
    } cmd.nCommand = DVRC_GET;
    cmd.nLine = sp->nLineNum;
    cmd.nSetGetOpCode = op_type;
    cmd.dwSetParm = *dwParm;
    cmd.cSetParm[0] = ( char ) NULL;

switch ( op_type ) {
        case GET_RECORDINGS:
            cmd.dir_num = DIR_USERVOICE;
            break;

case GET_TMPFILES:
            cmd.dir_num = DIR_TEMPFILES;
            break;
    } nVRetVal = ipc_Do_Command ( sp->hTask, cmd, &event );

if ( nVRetVal >= RC_SUCCEED ) {
        *dwParm = event.dwGetParm;
        if ( event.cGetParm[0] != ( char ) NULL )
            _fstrcpy( lpParm, event.cGetParm );
        else
            lpParm = ( char * ) NULL;

}
done:
    return ( nVRetVal );

}   /* function com_Get */
```

- 180 -

```
/****************************************************************
        FUNCTION: com_ProcessEvent
        PURPOSE: Handles all messages received by the client
        application.
        ****************************************************************/
        int com_ProcessEvent (
            const   unsigned int   hTask,  // task handle (Windows only)
            const   struct event   event   // event from above
        )
        {
            int     nVRetVal;              // Voysys return value
            // don't even try to find table slot !

nVRetVal = ipc_ProcessEvent ( hTask, event );
return ( nVRetVal );

}   /* function com_ProcessEvent */
        /*********************************************/
25
```

ATTORNEY DOCKET NO: VOYS2220WSW
wsw/voys/2220.001

APPENDIX E
IPC_WD_C.c
Copyright 1992-1994 Voysys Corporation

```
/*****************************************************************
 *
 * File:   IPC_WD_C.c
 *
 * Top part of InterProcess Communication layer for multiple-line
 *     system. Independent of line card type.
 *
 * Bottom layer of Client Task for multiple-line system using
 *     Windows + DDE. Sends commands from upper layers to Server
 *     Task (via DDE), and returns events to the upper layers.
 *
 *
 * $Log: /VoysAccess/core/ipc/IPC_WD_C.C $
 *
 *****************************************************************/ include <stdio.h>
include <string.h> include <windows.h>
include <windowsx.h>
include <dde.h> include "OS.h"
include "dVR.h"
include "Command.h"
include "IPC.h"

/***************************************************/

/*frequency at which to poll for incoming DDE messages (events)*/
define    RESPONSE_POLL_DELAY    200    /* msec between polls */ define    MY_TIMER_ID        1

// The timeout value for client to wait for VoysAccess server to
// respond with any event.
define    CLIENT_WAIT_LIMIT    0    // wait forever /***************************************************/
/*
 * Information about state of each active task.
 *
 * This data is shared by all client processes, but each process
 * looks only at the data for its line.
 *
 * Processes find a free slot by looking at the bInUse field.
 */ struct line_t {

BOOL    bInUse;            // is this table slot in use ?
```

- 182 -

```
            unsigned int   hTask;       // Windows task handle define    EVENTQ_SIZE       10
            struct event        eventq[EVENTQ_SIZE];
            int        nEQNextFree;      // next empty slot
            int        nEQNextUnread;    // next full (unread) slot HWND       hwndClientDDE;    // hidden client window (in this
                                                                     process)
            HWND       hwndServerDDE;    // hidden server window (in server
                                                                     process)
            BOOL       bConvInTerminateState;
            BOOL       bCWinCreatedInIPC;   // client window created in IPC
                                                                     layer ?
            UINT       timerID;
            char       szCWClassName[40];   // name of client window class
            };

// ptr to array[MAX_AL] of line_t structures
        static
        struct line_t *line;

// has this layer been initialized yet ?
        static
        boolean    bInitialized = FALSE;

/****************************************************/
        // Find line table slot that is being used by task handle hTask
       static int    FindSlot (
            const unsigned int   hTask,  // task handle (Windows only)
            struct line_t        **psp   // ptr to ptr to slot in line
                                         table
                         )
 35     {
            int               nVRetVal;     // Voysys return value
            int               nSlot;        // slot in line table // find slot in the line table by using hTask
 40         for (nSlot=0 ; nSlot<MAX_AL ; nSlot++) {
                if (line[nSlot].bInUse
                        && (line[nSlot].hTask == hTask))
                    break;
            }
            if (nSlot >= MAX_AL) {
                nVRetVal = RC_NOTINITIALIZED;     // best guess
                goto done;
            }
            *psp = &line[nSlot];
 50
            nVRetVal = RC_SUCCEED;

done:
            return nVRetVal;
        }

/************************************************************
        *  wait_for_wmessage  --  wait for Windows message (DDE_ACK
        *    or DDE_DATA)
```

ATTORNEY DOCKET NO:  VOYS2220WSW
wsw/voys/2220.001

```
                                ****************************************************/
        static
        int     wait_for_wmessage (
                struct line_t * const sp,     // ptr to slot in line table
                const   UINT    wmsgtype,     /* WM_* value */
                const   int     timelimit,    /* msec */
                        MSG     *theMesg      /* message gotten */
                )
        {
            unsigned long   endtime;
            BOOL            notquit;
            int             nVRetVal;         // Voysys return value
            BOOL            bSuccess;
            int             nShuffleCount;

sp->timerID = SetTimer ( sp->hwndClientDDE, MY_TIMER_ID,
                                     RESPONSE_POLL_DELAY, NULL );
            if (sp->timerID == 0) {
                nVRetVal = RC_OSERROR;
                goto done;
            } endtime = GetCurrentTime() + timelimit;
            nShuffleCount = 0;
            while ( GetCurrentTime() < endtime ) {
                notquit = GetMessage (
                                      theMesg,
                                      (HWND)NULL,     // any window
                                      0,              // all messages
                                      0
                                      );

if (theMesg->hwnd != sp->hwndClientDDE) {
                    // not for us; send to owner
                    TranslateMessage ( theMesg );    // Translates virtual
                                                                key codes
                    DispatchMessage ( theMesg );     // Dispatches message
                                                                to window
                    continue;
                }
                if (theMesg->message == WM_TIMER) {
        // ignore; we just want this to send us around the loop again
                    continue;
                }
                if (theMesg->message != wmsgtype) {
        // not the one we are waiting for; stuff back into queue
        // dangerous ?  reorders events
                    bSuccess = PostMessage(
                                    sp->hwndClientDDE,
                                    theMesg->message,
                                    theMesg->wParam,
                                    theMesg->lParam
                                    );
                    if (!bSuccess)
                        Debug ( 1, sprintf ( Debug_buf,
                                "IPC_WD_C/wait_for_wmessage:
                                lost message 0x%04X", theMesg->message ) );
                    if (theMesg->message == WM_DDE_TERMINATE) {
                        /* remove timer */
                        KillTimer ( sp->hwndClientDDE, MY_TIMER_ID );
```

```
                        - 184 -
                // server has gone away
                sp->hwndServerDDE = (HWND)NULL;
                nVRetVal = RC_SERVERSHUTDOWN;
                goto done;
            }
            nShuffleCount++;
            if (nShuffleCount > 20) {
                /* remove timer */
                KillTimer ( sp->hwndClientDDE, MY_TIMER_ID );
                nVRetVal = RC_INTERNAL;
                goto done;
            }
            continue;
        }
        // got it
        /* remove timer */
        KillTimer ( sp->hwndClientDDE, MY_TIMER_ID );
        nVRetVal = RC_SUCCEED;
        goto done;
    }

/* remove timer */
    KillTimer ( sp->hwndClientDDE, MY_TIMER_ID );
    nVRetVal = RC_TOTALTIMEOUT;
done:
    return nVRetVal;
}

/****************************************************************

FUNCTION: ClientReceiveData

PURPOSE:  Called when client application receives WM_DDE_DATA
              message.

****************************************************************/ static int   ClientReceiveData (
        struct line_t * const sp,     // ptr to slot in line table
        const  LONG   lParam
                )
{
    DDEDATA FAR    *lpDDEData;
    BOOL            bRelease;
    BOOL            bAck;
    int             nVRetVal;  // Voysys return value
    boolean         bSuccess;
    HGLOBAL         GFRetVal;  // return value from GlobalFree bAck = TRUE;

if ( sp->bConvInTerminateState ) {  /* Terminate in progress:
                                           do not receive data */
        GFRetVal = GlobalFree ( LOWORD ( lParam ) );   // hData
                                                       from Server
        if (GFRetVal != (HGLOBAL)NULL)
            nVRetVal = RC_INTERNAL;
        goto done;
    }
```

ATTORNEY DOCKET NO: VOYS2220WSW
wsw/voys/2220.001

- 185 -

```
        if (!(lpDDEData = (DDEDATA FAR *) GlobalLock (LOWORD(lParam)))
                                || ( lpDDEData->cfFormat != CF_TEXT ) ) {
            bSuccess = PostMessage (
                                    sp->hwndServerDDE,
                                    WM_DDE_ACK,
                                    sp->hwndClientDDE,
                                    MAKELONG ( 0, HIWORD ( lParam ) )
                                    );              /* Negative ACK */
            if (!bSuccess)
                Debug ( 1, sprintf    ( Debug_buf,
                                        "IPC_WD_C/ClientReceiveData:
                                        PostMessage(hwndServerDDE 0x%04X)
                                            failed", sp->hwndServerDDE ) );
        }
    #if 0
        /* check for correct length */
        if ( mlng != sizeof ( struct event ) ) {
            sprintf (
                    info,
                    "got msg with bad length %d (should be %d)",
                    mlng,
                    sizeof ( struct command )
                    );
            if ( logging_on )
                print_info (
                    -1,         /* not associated with particular line
                                                                number */
                    info,       /* info to print */
                    logfile     /* file to print to */
                    );
            if ( tracing_on )
                print_info (
                    -1,         /* not associated with particular line
                                                                number */
                    info,       /* info to print */
                    tracefile   /* file to print to */
                    );
            bSuccess = PostMessage (
                                    sp->hwndServerDDE,
                                    WM_DDE_ACK,
                                    sp->hwndClientDDE,
                                    MAKELONG ( 0, 0 )
                                    );              /* Negative ACK */
            if (!bSuccess)
                nVRetVal = RC_INTERNAL;  /* PostMessage() failed */ goto done;
        }
    #endif

/* do something with data received */
        /* put event in queue to be sent up */
        sp->eventq[sp->nEQNextFree] =
                        *( ( struct event * ) ( lpDDEData->Value ) );
        sp->nEQNextFree++;
        if ( sp->nEQNextFree >= EVENTQ_SIZE )
            sp->nEQNextFree = 0;

        if ( lpDDEData->fAckReq ) {
            /* return ACK or NACK */
```

ATTORNEY DOCKET NO: VOYS2220WSW
wsw/voys/2220.001

- 186 -

```
            bSuccess = PostMessage (
                                sp->hwndServerDDE,
                                WM_DDE_ACK,
                                sp->hwndClientDDE,
                                MAKELONG ( ( bAck ? 0x8000 : 0 ), 0
      )
                                );
            if (!bSuccess)
                Debug ( 1, sprintf    ( Debug_buf,
                                      "IPC_WD_C/ClientReceiveData:
                                      PostMessage(hwndServerDDE 0x%04X)
                                      failed", sp->hwndServerDDE ) );
        }
        bRelease = lpDDEData->fRelease;
        lpDDEData = NULL;
        GlobalUnlock ( LOWORD ( lParam ) );
        if ( bRelease ) {
            GFRetVal = GlobalFree ( LOWORD ( lParam ) );   // hData
                                                           from Server
            if (GFRetVal != (HGLOBAL)NULL)
                Debug ( 1, sprintf    ( Debug_buf,
                                      "IPC_WD_C/ClientReceiveData:
                                      GlobalFree(0x%04X) failed",
                                      LOWORD ( lParam ) ) );
        } nVRetVal = RC_SUCCEED;

done:
30      return nVRetVal;
    }

/**************************************************************
        FUNCTION: ClientTerminate PURPOSE:   Called when client application receives
                   WM_DDE_TERMINATE message.
    **************************************************************/ static int    ClientTerminate (
            struct line_t * const sp    // ptr to slot in line table
            )
    {
        int           nVRetVal;         // Voysys return value
        boolean       bSuccess;

        if ( (!sp->bConvInTerminateState)
                            && (sp->hwndServerDDE != (HWND)NULL) ) {
        /* Server has requested terminate: respond with terminate */
            bSuccess = PostMessage (
                                sp->hwndServerDDE,
                                WM_DDE_TERMINATE,
                                sp->hwndClientDDE,
                                0L
                                );
            if (!bSuccess)
60              Debug ( 1,    sprintf ( Debug_buf,
                              "IPC_WD_C/ClientTerminate:
```

- 187 -

```
                            PostMessage(hwndServerDDE 0x%04X)
                            failed", sp->hwndServerDDE ) );
            sp->hwndServerDDE = (HWND)NULL;
        }
5
        nVRetVal = RC_SUCCEED;

//done:
        return nVRetVal;
10  }

/************************************************************
     *  get_message
     ************************************************************/
    static
    int     get_message (
            struct line_t * const sp,    // ptr to slot in line table
                    struct event   *event  /* event received */
                    )
    {
        MSG             mesg;
        int             nVRetVal;    // Voysys return value
        int             limit;       // prevent infinite waiting /* wait until there is an event in the queue */
        limit = CLIENT_WAIT_LIMIT;
        while ( sp->nEQNextUnread == sp->nEQNextFree ) {
            /* handle any DDE_DATA messages coming up from server */
            nVRetVal = wait_for_wmessage ( sp, WM_DDE_DATA, 10000,
                                                            &mesg );
            if ( nVRetVal == RC_SUCCEED ) {
                ClientReceiveData ( sp, mesg.lParam );
                limit = CLIENT_WAIT_LIMIT;
            } else if (nVRetVal != RC_TOTALTIMEOUT) {
                goto done;
            } else {
    // timeout only if limit != 0 ( i.e., not to wait forever )
                if ( limit ) {
                    limit--;
                    if (limit <= 0) {
                        nVRetVal = RC_SERVERCOMMFAIL;
                        goto done;
                    }
                }
            }
        }

        /* get event from queue */
        *event = sp->eventq[sp->nEQNextUnread];
        sp->nEQNextUnread++;
        if ( sp->nEQNextUnread >= EVENTQ_SIZE )
            sp->nEQNextUnread = 0;
        nVRetVal = RC_SUCCEED;

done:
        return ( nVRetVal );
    }
```

```
/*************************************************************
     FUNCTION: SendPoke PURPOSE:  Send poke message to server.

Tricky:  We don't care about the "item name", so we will
violate DDE protocol by sending 0 for the name.
*************************************************************/
static int     SendPoke (
    struct line_t * const sp,    // ptr to slot in line table
    const  void    *ItemValue,
    const  int     ItemSize
         )
{
    HANDLE        hPokeData;
    DDEPOKE FAR   *lpPokeData;
    int           nVRetVal;      // Voysys return value
    MSG           mesg;
    boolean       bSuccess;
    HGLOBAL       GFRetVal;      // return value from GlobalFree if ( sp->hwndServerDDE == (HWND)NULL ) {
        nVRetVal = RC_SERVERSHUTDOWN;
        goto done;
    }

/* Allocate size of DDE data header, plus the data */
    hPokeData = GlobalAlloc ( ( GMEM_MOVEABLE | GMEM_DDESHARE ),
                        ( LONG ) sizeof ( DDEPOKE ) + ItemSize );
    if ( hPokeData == (HANDLE)NULL ) {
        nVRetVal = RC_RAMFULL;
        goto done;
    } lpPokeData = ( DDEPOKE FAR * ) GlobalLock ( hPokeData );
    if ( lpPokeData == (DDEPOKE FAR *)NULL ) {
        GFRetVal = GlobalFree ( hPokeData );
        if (GFRetVal != (HGLOBAL)NULL)
            nVRetVal = RC_OSERROR;
        goto done;
    } lpPokeData->fRelease = TRUE;/* destination should free mem */
    lpPokeData->cfFormat = CF_TEXT;

memcpy ( lpPokeData->Value, ItemValue, ItemSize );
    lpPokeData = NULL;
    GlobalUnlock ( hPokeData );

bSuccess = PostMessage (
                        sp->hwndServerDDE,
                        WM_DDE_POKE,
                        sp->hwndClientDDE,
                        MAKELONG ( hPokeData, 0 )
                        );
    if (!bSuccess) {
        Debug ( 1, sprintf ( Debug_buf, "IPC_WD_C/SendPoke:
```

- 189 -

```
                                    PostMessage(hwndServerDDE 0x%04X) failed",
                                                        sp->hwndServerDDE ) );
                GFRetVal = GlobalFree ( hPokeData );
                if (GFRetVal != (HGLOBAL)NULL)
                    Debug ( 1, sprintf ( Debug_buf, "IPC_WD_C/SendPoke:
                                        GlobalFree(0x%08lX) failed", hPokeData ) );
                nVRetVal = RC_SERVERCOMMFAIL;
            } else {
                nVRetVal = wait_for_wmessage ( sp, WM_DDE_ACK, 10000,
                                                                    &mesg );
                if ( nVRetVal != RC_SUCCEED )
                    nVRetVal = RC_SERVERCOMMFAIL;
            }

        done:
            return nVRetVal;
        }

20

/************************************************************
         *  send_message
         ************************************************************/
        static int    send_message (
                struct line_t * const sp,    // ptr to slot in line table
                const  struct command    cmd    /* command to send */
                )
        {
            int             retval;

retval = SendPoke (
                            sp,
                            ( void * ) &cmd,
                            sizeof ( cmd )
                            );

//done:
40          return ( retval );
        }

        /************************************************************

FUNCTION: SendTerminate

PURPOSE:  Send terminate message to server.
                      This is called when client decides to terminate
                      conversation.

************************************************************/

        static int    SendTerminate (
                struct line_t * const sp    // ptr to slot in line table
                )
        {
            boolean         bSuccess;
            sp->bConvInTerminateState = TRUE;
```

ATTORNEY DOCKET NO: VOYS2220WSW
wsw/voys/2220.001

- 190 -

```
        if (sp->hwndServerDDE != (HWND)NULL) {
            bSuccess = PostMessage (
                                    sp->hwndServerDDE,
                                    WM_DDE_TERMINATE,
                                    sp->hwndClientDDE,
                                    0L
                                    );
            if (!bSuccess)
                Debug ( 1,    sprintf ( Debug_buf,
                              "IPC_WD_C/SendTerminate:
                              PostMessage(hwndServerDDE 0x%04X)
                              failed", sp->hwndServerDDE ) );
            sp->hwndServerDDE = (HWND)NULL;
            // there will not be an acknowledge from server
        } return RC_SUCCEED;
    }

/****************************************************************

FUNCTION: DDEWndProc

PURPOSE: Handles all DDE messages received by the client
    application. Tricky: should be virtually identical to
    ipc_ProcessEvent. This function is used if client DDE window was
    created by this layer; ipc_ProcessEvent is used if window created
    by higher level.

****************************************************************/

    long FAR PASCAL __export DDEWndProc (
                        HWND    hwnd,
                        UINT    message,
                        WPARAM  wParam,
                        LPARAM  lParam
40                      )
    {
        int           nSlot;      // slot in line table
        struct line_t *sp;        // ptr to slot in line table
        // find slot in the line table by using hwnd
        for (nSlot=0 ; nSlot<MAX_AL ; nSlot++) {
            if (line[nSlot].bInUse
                    && (line[nSlot].hwndClientDDE == hwnd))
                break;
        }
        if (nSlot >= MAX_AL) {
            Debug ( 5, sprintf ( Debug_buf, "IPC_WD_C/DDEWndProc:
                                 couldn't find slot in line table" ) );
            return ( DefWindowProc ( hwnd, message, wParam, lParam )
    );
        } sp = &line[nSlot];

60      switch ( message ) {
            case WM_DDE_ACK:       /* shouldn't happen */
```

- 191 -

```
                return ( 0L );

case WM_TIMER:
                return ( 0L );

case WM_DDE_DATA:
                ClientReceiveData ( sp, lParam );
                return ( 0L );

case WM_DDE_TERMINATE:
                ClientTerminate ( sp );
                return ( 0L );

default:
                return ( DefWindowProc ( hwnd, message, wParam, lParam
                                                                   ) );
        }
    }

/***************************************************************

FUNCTION: ipc_ProcessEvent

PURPOSE:  Handles all async DDE messages received by the
client application. Tricky: should be virtually identical to
DDEWndProc. This function is used if client DDE window was
created by higher level; DDEWndProc is used if window was created
by this layer.

***************************************************************/ int     ipc_ProcessEvent (
            const   unsigned int   hTask,  // task handle (Windows only)
            const   struct event   event   // event from above
                    )
    {
        int             nVRetVal;   // Voysys return value
        UINT            message;    // component of Windows message
        WPARAM          wParam;     // component of Windows message
        LPARAM          lParam;     // component of Windows message
        struct line_t   *sp;        // ptr to slot in line table nVRetVal = RC_SUCCEED;

if ( event.nEvent != EV_DDE ) {
            nVRetVal = RC_INTERNAL;
            goto done;
        }

// find slot in the line table
        nVRetVal = FindSlot( hTask, &sp );
        if (nVRetVal != RC_SUCCEED)
            goto done;

// extract fields from VA form to Windows form
        message = ( UINT )   ( event.dde[0] );
        wParam  = ( WPARAM ) ( event.dde[1] );
        lParam  = ( LPARAM ) ( event.dde[2] );

switch ( message ) {
```

- 192 -

```
        case WM_DDE_ACK:
            goto done;

case WM_DDE_DATA:
            ClientReceiveData ( sp, lParam );
            goto done;

case WM_DDE_TERMINATE:
            ClientTerminate ( sp );
            goto done;

default:
            nVRetVal = RC_INTERNAL;
            goto done;
    } done:
    return ( nVRetVal );
}

/***************************************************************

FUNCTION: SendInitiate

PURPOSE:  Sends initiate message to all windows.  By the time
    this function returns, all servers matching the app/topic will
    have acknowledged, and this client application will have
    temporarily registered the new conversations.  If more than one
    server responded, then this client application asks the user
    which conversation to keep; all other conversations will then be
    terminated.  This function returns the handle of the hidden DDE
    window used to initiate the conversation with server(s).

Note:  Deletes the atoms it creates and the ones sent to it.

***************************************************************/ static
HWND    SendInitiate (
        struct line_t * const sp,    // ptr to slot in line table
        const   char    *szApplication,
        const   char    *szTopic
        )
{
    ATOM    atomApplication;
    ATOM    atomTopic;
    int     nVRetVal;       // Voysys return value
    MSG     mesg;
    ATOM    GDARetVal;      // GlobalDeleteAtom return value nVRetVal = RC_SUCCEED;

atomApplication = GlobalAddAtom ( ( LPSTR ) szApplication );
    if (atomApplication == 0) {
        nVRetVal = RC_OSERROR;
        goto done;
    } atomTopic = GlobalAddAtom ( ( LPSTR ) szTopic );
```

- 193 -

```
        if (atomTopic == 0) {
            Debug ( 1, sprintf ( Debug_buf, "IPC_WD_C/SendInitiate:
                                            GlobalAddAtom failed" ) );
            GDARetVal = GlobalDeleteAtom ( atomApplication );
            if (GDARetVal != 0)
                Debug ( 1,sprintf ( Debug_buf, "IPC_WD_C/SendInitiate:
                                    GlobalDeleteAtom(0x%04X) failed",
                                    atomApplication ) );
            nVRetVal = RC_OSERROR;
            goto done;
        }

SendMessage(
                ( HWND ) -1,
                WM_DDE_INITIATE,
                sp->hwndClientDDE,
                MAKELONG ( atomApplication, atomTopic )
                );

GDARetVal = GlobalDeleteAtom ( atomApplication );
        if (GDARetVal != 0)
            Debug ( 1, sprintf    ( Debug_buf, "IPC_WD_C/SendInitiate:
                                    GlobalDeleteAtom(0x%04X) failed",
                                    atomApplication ) );
        GDARetVal = GlobalDeleteAtom ( atomTopic );
        if (GDARetVal != 0)
            Debug ( 1, sprintf    ( Debug_buf, "IPC_WD_C/SendInitiate:
                                    GlobalDeleteAtom(0x%04X) failed",
                                    atomTopic ) );

nVRetVal = wait_for_wmessage ( sp, WM_DDE_ACK, 10000, &mesg );
        if ( nVRetVal != RC_SUCCEED ) {
            nVRetVal = RC_NOSERVER;
            goto done;
        } sp->hwndServerDDE = mesg.wParam;

// delete atomApplicationReturn and atomTopicReturn from Server
        GDARetVal = GlobalDeleteAtom ( LOWORD ( mesg.lParam ) );
        if (GDARetVal != 0)
            Debug ( 1, sprintf    ( Debug_buf, "IPC_WD_C/SendInitiate:
                                    GlobalDeleteAtom(0x%04X) failed",
                                    LOWORD ( mesg.lParam ) ) );
        GDARetVal = GlobalDeleteAtom ( HIWORD ( mesg.lParam ) );
        if (GDARetVal != 0)
            Debug ( 1, sprintf    ( Debug_buf, "IPC_WD_C/SendInitiate:
                                    GlobalDeleteAtom(0x%04X) failed",
                                    HIWORD ( mesg.lParam ) ) );
    done:
        return ( nVRetVal );
    }

/****************************************************/ int     ipc_Initialize (
            const  unsigned int  hTask,  // task handle (Windows only)
```

ATTORNEY DOCKET NO: VOYS2220WSW
wsw/voys/2220.001

- 194 -

```
                const   unsigned int   hInstance,    // instance handle
                                                     (Windows only)
                const   unsigned long  hWnd   // hidden window handle
                                              (Windows only)
 5      )
    {
        int        nVRetVal;      // Voysys return value
        WNDCLASS   wc;
        ATOM       wrval;
        int        nSlot;         // slot in line table
        struct line_t *sp;        // ptr to slot in line table nVRetVal = RC_SUCCEED;

        if (!bInitialized) {
            line = (void *) GlobalAllocPtr(
                                  GMEM_MOVEABLE | GMEM_ZEROINIT,
                                  (MAX_AL * sizeof(struct line_t))
                                );
            if ( line == NULL ) {
                nVRetVal = RC_RAMFULL;
                goto done;
            }
            bInitialized = TRUE;
        }

// find slot in the line table
        nVRetVal = FindSlot( hTask, &sp );
        if (nVRetVal == RC_SUCCEED) {
30          nVRetVal = RC_ALREADYINITIALIZED;
            goto done;
        }

// find a free slot in the line table
        for (nSlot=0 ; nSlot<MAX_AL ; nSlot++) {
            if (!line[nSlot].bInUse)
                break;
        }
        if (nSlot >= MAX_AL) {
            Debug ( 5, sprintf ( Debug_buf, "IPC_WD_C/ipc_Initialize:
                                              line table is full" ) );
            nVRetVal = RC_SWLIMIT;
            goto done;
        }
        sp = &line[nSlot];
        sp->bInUse = TRUE;

sp->hTask = hTask;
        if ( hWnd != ( long ) NULL ) {

// client window was created up in Database Interface layer
            sp->hwndClientDDE = ( HWND ) hWnd;
            sp->bCWinCreatedInIPC = FALSE;

} else {

// we have to create client window in this layer
            wc.style = 0;
            wc.lpfnWndProc = DDEWndProc;
```

ATTORNEY DOCKET NO: VOYS2220WSW
wsw/voys/2220.001

- 195 -

```
            wc.cbClsExtra = 0;
            wc.cbWndExtra = 0;
            wc.hInstance = hInstance;
            wc.hIcon = ( HICON ) NULL;
            wc.hCursor = ( HCURSOR ) NULL;
            wc.hbrBackground = ( HBRUSH ) NULL;
            wc.lpszMenuName = NULL;
            sprintf ( sp->szCWClassName, "ClientDDEWndClass%u",
                                        GetCurrentTask ( ) );
            wc.lpszClassName = sp->szCWClassName;

wrval = RegisterClass ( &wc );

if ( wrval == 0 ) {
                sp->bInUse = FALSE;
                nVRetVal = RC_OSERROR;
                goto done;
            }
            sp->hwndClientDDE = CreateWindow (
                    sp->szCWClassName,
                    "ClientDDE",
                    0,   /* not visible */
                    0, 0, 0, 0,    /* no position or dimensions */
                    ( HWND ) NULL, /* no parent */
                    ( HMENU ) NULL,   /* no menu */
                    ( HINSTANCE ) hInstance,
                    NULL
            );
            if ( !sp->hwndClientDDE ) {
                Debug ( 1, sprintf    ( Debug_buf,
                                        "IPC_WD_C/ipc_Initialize:
                                        CreateWindow failed hwndClient
                                        0x%04X", sp->hwndClientDDE ) );
                sp->bInUse = FALSE;
                nVRetVal = RC_INTERNAL;
                goto done;
            } sp->bCWinCreatedInIPC = TRUE;
        } nVRetVal = SendInitiate (
                        sp,
                        VA_DDE_SERVER_APP_NAME,
                        VA_DDE_TOPIC
                        );

done:
        return ( nVRetVal );
     }

/**************************************************/
     int ipc_Shutdown (
            const  unsigned int   hTask   // task handle (Windows only)
                    )
     {
60      int           nVRetVal;      // Voysys return value
        int           wrval;
```

ATTORNEY DOCKET NO: VOYS2220WSW
wsw/voys/2220.001

- 196 -

```
        int         nSlot;          // slot in line table
        struct line_t *sp;          // ptr to slot in line table if (!bInitialized) {
            nVRetVal = RC_NOTINITIALIZED;
            goto done;
        }

// find slot in the line table
        nVRetVal = FindSlot( hTask, &sp );
        if (nVRetVal != RC_SUCCEED)
            goto done;

nVRetVal = SendTerminate(sp);
        if ( sp->bCWinCreatedInIPC ) {
            // client window was created in this layer
            wrval = DestroyWindow ( sp->hwndClientDDE );
            wrval = UnregisterClass ( sp->szCWClassName, sp->hTask );
        } sp->nEQNextFree = 0;
        sp->nEQNextUnread = 0;
        sp->hwndClientDDE = (HWND)NULL;
        sp->hwndServerDDE = (HWND)NULL;
        sp->bConvInTerminateState = FALSE;
        sp->timerID = 0;

sp->bInUse = FALSE;
        // if there are no more used slots, really shut down
        for (nSlot=0 ; nSlot<MAX_AL ; nSlot++) {
            if (line[nSlot].bInUse)
                goto done;
        }
        GlobalFreePtr ( line );
        line = NULL;
        bInitialized = TRUE;

    done:
        return ( nVRetVal );
    }

    /***********************************************/ int     ipc_Do_Command (
        const   unsigned int    hTask,  // task handle (Windows only)
        const   struct command  cmd,    // command to execute
                struct event    *event  // result of command
                )
    {
        int             nVRetVal;       // Voysys return value
55      struct line_t   *sp;            // ptr to slot in line table if !NO_DEBUGGING_AT_ALL
        if ( Debug_flag >= 2 )
            print_command ( cmd, debugfile );
60  #endif
```

- 197 -

```
            if (!bInitialized) {
                nVRetVal = RC_NOTINITIALIZED;
                goto done;
            }
            event->nEvent = EV_NONE;
            event->nLine = cmd.nLine;
            event->C_error = 0;
            event->DV_error = 0;
            event->DOS_error = 0;
            event->string[0] = '\0';
            event->filename[0] = '\0';

// find slot in the line table
            nVRetVal = FindSlot( hTask, &sp );
            if (nVRetVal != RC_SUCCEED)
                goto done;

nVRetVal = send_message ( sp, cmd );
            if ( nVRetVal < RC_SUCCEED ) {
                event->result = nVRetVal;
                goto done;
            }

            /* wait for event back */
            nVRetVal = get_message ( sp, event );
            if ( nVRetVal < RC_SUCCEED ) {
                event->result = nVRetVal;
                goto done;
            } done:

if !NO_DEBUGGING_AT_ALL
            if ( Debug_flag >= 2 )
                print_event ( *event, debugfile );
        #endif return ( event->result );
40      }
        /*************************************************/
```

ATTORNEY DOCKET NO: VOYS2220WSW
wsw/voys/2220.001

- 198 -

APPENDIX F
IPC_WD_S.c
Copyright 1992-1994 Voysys Corporation

```
/****************************************************
 *
 * Name: IPC_WD_S.c
 *
 * Description:
 *     Server Task for multiple-line system using Windows + DDE.
 *     Accepts commands from Client Tasks (sent via DDE),
 *     calls Driver Interface layer to execute commands on phone
 *     lines, and returns events to the Line Tasks (via DDE).
 *
 * Usage:
 *     IPC_WD_S [ /debugN ] [ /ldhiX ] [ /ldsiXX ]
 *
 * $Log: /VoysAccess/core/ipc/IPC_WD_S.C $
 *
 ****************************************************/ include <ctype.h>
include <dos.h>
include <fcntl.h>
include <io.h>
include <sys\stat.h>
include <stdio.h>
include <stdlib.h>
include <string.h> include <windows.h>
include <dde.h>
include <mmsystem.h> define    IN_MAIN    1
include "OS.h"
include "dVR.h"
include "Command.h"
include "IPC.h"
include "TM.h"

include "srv_wrc.h"

/*******************************/

/* default interrupt level and number for line driver card */
define    DEF_LD_HW_IRQ  3
define    DEF_LD_SW_INT  0x62

/* frequency at which to poll for events from below */
/* only polls on lines that have a command in progress */
define    EV_POLL_DELAY       400    /* msec between polls */

/*******************************/

/* interrupt level and number for line driver card */
static int    ld_hw_irq = DEF_LD_HW_IRQ;
static int    ld_sw_int = DEF_LD_SW_INT;
```

ATTORNEY DOCKET NO: VOYS2220WSW
wsw/voys/2220.001

- 199 -

```
     /* filename extensions */
     static char    promptext[4];   /* extension for prompt files */
     static char    ifileext[4];    /* extension for indexed prompt
     files */
     struct line_t {
        struct command  cmd;           // command
        boolean    bCmdInProgress;     // is there a command in
                                                                progress?
10      boolean    bConnected;         // is there a task attached to line?
        HWND       serverwnd;          // server window handle for line
        HWND       clientwnd;          // client window handle for line
        boolean    bTestMode;          // is the test mode on for this
                                                                     line?
        /* stuff set from dvrc_setdir commands */
        /* dirs voice files are in */
        /* tricky: these names have '\' on the end */
        char            dirname[MAX_DIRS][MAX_DN+1];
     };

static
     struct line_t line[MAX_AL];

     /* stuff used to generate unique user file names */
     static
     int       next_user_filename;

define   USER_FNAME_FORMAT "V%07d"
     #define   WINMAIN_TIMER_ID  1 define SERVER_TITLE "voysAccess Server"

     static
     boolean   bShuttingDown = FALSE;

/* variables used by all functions in this file */
     /* they are set to point to current line[] */
     static
     struct line_t *lp = 0;   /* ptr to "line[]" structure */

     /**************************************/
     // DDE conversation stuff

/* Maximum values */

     #define APP_MAX_SIZE          18
     #define TOPIC_MAX_SIZE        11
     #define ITEM_NAME_MAX_SIZE    8
     #define ITEM_VALUE_MAX_SIZE   8
     #define CONV_MAX_COUNT        MAX_AL
     typedef struct CONV {
        HWND    hWndServerDDE;
        HWND    hWndClientDDE;
        BOOL    bInClientRequestedTerminate;
     };
```

ATTORNEY DOCKET NO: VOYS2220WSW
wsw/voys/2220.001

- 200 -

```
      static
      struct CONV    Conv[CONV_MAX_COUNT];
      static
      int     nConvCount = 0;

define DEF_ACK_TIME_OUT_MILLISEC   10000
      #define PEEK_MSG_COUNT              200 static
      int     nAckTimeOut;

      static
      BOOL    bTerminating = FALSE;

      /**************************************/
      /* Global data */ static
      HWND            hWndMain;
      static
      HANDLE          hInst;

static
      RECT            rect;
      static
      short           nCharW, nCharH;

      /*******************************************************
       * parse_arguments  -  parse command-line
       *******************************************************/
      static
      int parse_arguments (
          const  char   *cmdline
      )
      {
          boolean         bad_args;
          const char      *p;

bad_args = FALSE;

p = cmdline;
          while ( *p != '\0' )
          {
              switch ( *p )
              {
                  case '/':
                      p++;
                      if ( strnicmp ( p, "debug", 5 ) == 0 )
                      {
                          /* note: only support single digit, 0-9 */
                          if ( !isdigit ( *( p + 5 ) ) )
                          {
                              bad_args = TRUE;
```

ATTORNEY DOCKET NO: VOYS2220WSW
wsw/voys/2220.001

- 201 -

```
              }
              Debug_flag = ( ( *( p + 5 ) ) - '0' );
              p += 6;
              Debug ( 1,    sprintf ( Debug_buf,
                            "IPC_WD_S/parse_arguments:
                            Debug_flag %d", Debug_flag ) );
          }
          else if ( strnicmp ( p, "ldhi", 4 ) == 0 )
          {
              /* note: only support single digit, 0-9 */
              if ( !isdigit ( *( p + 4 ) ) )
              {
                  bad_args = TRUE;
              }
              ld_hw_irq = ( ( *( p + 4 ) ) - '0' );
              p += 5;
          }
          else if ( strnicmp ( p, "ldsi", 4 ) == 0 )
          {
              /* note: only support two hex digits */
              if ( !isxdigit ( *( p + 4 ) ) )
              {
                  bad_args = TRUE;
              }
              if ( !isxdigit ( *( p + 5 ) ) )
              {
                  bad_args = TRUE;
              }
              if ( isalpha ( *( p + 4 ) ) )
                  ld_sw_int = ( tolower ( *( p + 4 ) ) - 'a' +
                                                     10 ) * 16;
              else
                  ld_sw_int = ( ( *( p + 4 ) ) - '0' ) * 16;
              if ( isalpha ( *( p + 5 ) ) )
                  ld_sw_int += ( tolower ( *( p + 5 ) ) - 'a'
                                                      + 10 );
              else
                  ld_sw_int += ( ( *( p + 5 ) ) - '0' );
              p += 6;
          }
          else
          {
              bad_args = TRUE;
          }
          break;
      case ' ':
      case '\t':
          p++;
          break;
      default:
          p++;
          bad_args = TRUE;
          break;
    }
} if ( bad_args )
{
    return 1;
}
```

ATTORNEY DOCKET NO: VOYS2220WSW
wsw/voys/2220.001

- 202 -

```
       return 0;

}   /* function parse_arguments */

/*******************************************/
   void ShowTestMode (
       void
   )
   {
       HDC     hDC;
       char    szBuffer[30];
       short   nY;
       int     nLine;

hDC = GetDC ( hWndMain );

SelectObject ( hDC, GetStockObject ( SYSTEM_FIXED_FONT ) );

for ( nLine = 0; nLine < MAX_AL; nLine++ )
       {
           if ( line[nLine].bTestMode )
           {
               nY = nLine * nCharH;
               TextOut ( hDC, 0, nY, szBuffer, wsprintf ( szBuffer,
                           "Line #%c is in Test Mode.", ( (char) (
                           (int) '0' - nLine ) ) ) );
           }
       }

ReleaseDC ( hWndMain, hDC );
   // ValidateRect ( hWndMain, NULL );

}   /* function ShowTestMode */

/*************************************************************
       FUNCTION: SendData PURPOSE:  Send data to client.

Tricky:  We don't care about the "item name", so we will
   violate DDE protocol by sending 0 for the name.

*************************************************************/
   static
   int SendData (
       const   HWND    hWndServerDDE,
       const   HWND    hWndClientDDE,
       const   void    *ItemValue,
       const   int     ItemSize,
       const   BOOL    bAckRequest,
       const   BOOL    bRequestData
   )
   {
       HANDLE      hData;
       DDEDATA FAR *lpData;
```

ATTORNEY DOCKET NO: VOYS2220WSW
wsw/voys/2220.001

- 203 -

```
            int         nVRetVal;       // Voysys return value
            boolean     bSuccess;
            HGLOBAL     GFRetVal;       // return value from GlobalFree
        /* Allocate size of DDE data header, plus the data. */ hData = GlobalAlloc ( GMEM_MOVEABLE | GMEM_DDESHARE,
                                  ( LONG ) sizeof ( DDEDATA ) + ItemSize );
            if ( hData == (HANDLE)NULL ) {
                nVRetVal = RC_RAMFULL;
                goto done;
            }
            lpData = ( DDEDATA FAR * ) GlobalLock ( hData );
            if ( lpData == NULL ) {
                Debug ( 1, sprintf ( Debug_buf, "IPC_WD_S/SendData:
                                                GlobalLock failed" ) );
                GFRetVal = GlobalFree ( hData );
                if (GFRetVal != (HGLOBAL)NULL)
                    Debug ( 1, sprintf ( Debug_buf, "IPC_WD_S/SendData:
                                        GlobalFree(0x%04X) failed", hData ) );
                nVRetVal = RC_OSERROR;
                goto done;
            }

         lpData->fAckReq = bAckRequest;
            lpData->cfFormat = CF_TEXT;
            lpData->fResponse = bRequestData;
            lpData->fRelease = TRUE; /* client releases memory */
            memcpy ( lpData->Value, ItemValue, ItemSize );
            lpData = NULL;
            GlobalUnlock ( hData );
            bSuccess = PostMessage (
                            hWndClientDDE,
                            WM_DDE_DATA,
                            hWndServerDDE,
                            MAKELONG ( hData, 0 )
                            );
            if (!bSuccess) {
                /* postmessage failed, so we have to deallocate data */
                GFRetVal = GlobalFree ( hData );
                if (GFRetVal != (HGLOBAL)NULL)
                    Debug ( 1, sprintf ( Debug_buf, "IPC_WD_S/SendData:
                                        GlobalFree(0x%04X) failed", hData ) );
                nVRetVal = RC_OSERROR;       /* !!! */
                goto done;
            }
            /* client will deallocate data */ nVRetVal = RC_SUCCEED;
        done:
            return nVRetVal;

}   /* function SendData */

/*********************************************************/

FUNCTION:  AtLeastOneConvActive
```

ATTORNEY DOCKET NO: VOYS2220WSW
wsw/voys/2220.001

- 204 -

```
       PURPOSE:  Used during termination of application, to
                 determine whether any conversations are still active
                 while the conversations are being terminated.

      ****************************************************/ static
       BOOL AtLeastOneConvActive (
           void
       )
       {
           return ( nConvCount ? TRUE : FALSE );

}   /* function AtLeastOneConvActive */

/*************************************************************

FUNCTION: FindConv

PURPOSE:  Find the conversation for a specified server DDE
       window.

       ****************************************************/ static
       struct CONV    *NEAR  FindConv (
           const  HWND    hWndServerDDE
       )
       {
           struct CONV    *pConv;
           int            nConvIndex;

35         for ( nConvIndex = 0, pConv = Conv;
                 nConvIndex < nConvCount;
                 nConvIndex++, pConv++ )
           {
               if ( pConv->hWndServerDDE == hWndServerDDE )
                   return ( pConv );
           }
           return ( NULL );

}   /* function FindConv */

/*************************************************************

FUNCTION: GetNextConv
           PURPOSE:  Get next client in list of conversations.  To get
       the first hWndServerDDE in the conversation list, pass in a NULL
       value for hWndServerDDE.

       ****************************************************/ static
       HWND GetNextConv (
           const  HWND    hWndServerDDE
60     )
       {
```

- 205 -

```
            struct CONV     *pConv;
            int             nConvIndex;

if ( hWndServerDDE )
            {
                for ( nConvIndex = 0, pConv = Conv;
                      nConvIndex < nConvCount;
                      nConvIndex++, pConv++ )
                {
                    if ( pConv->hWndServerDDE == hWndServerDDE )
                    {
                        if ( ++nConvIndex < nConvCount )
                            return ( ++pConv )->hWndServerDDE;
                        else
                            return ( ( HWND ) NULL );
                    }
                }
                return ( ( HWND ) NULL );
            }
            if ( nConvCount > 0 )
                return ( Conv[0].hWndServerDDE );
            else
                return ( ( HWND ) NULL );

       }   /* function GetNextConv */

/***************************************************************
            FUNCTION: AddConv PURPOSE:  Register a new conversation with a client window
       ***************************************************************/
        static
        BOOL AddConv (
            const  HWND    hWndServerDDE,
            const  HWND    hWndClientDDE
        )
        {
            struct CONV    *pConv;

           if ( nConvCount >= CONV_MAX_COUNT ) {
                return ( FALSE );
            } if ( FindConv ( hWndServerDDE ) != NULL ) {
                return ( FALSE );    /* conversation already added */
            } pConv = Conv + nConvCount++;
            pConv->hWndServerDDE = hWndServerDDE;
            pConv->hWndClientDDE = hWndClientDDE;
            pConv->bInClientRequestedTerminate = FALSE;

return ( TRUE );

}   /* function AddConv */
```

ATTORNEY DOCKET NO: VOYS2220WSW
wsw/voys/2220.001

- 206 -

```
/***************************************************************

FUNCTION: GetHwndClientDDE

PURPOSE:  Get the hWnd of the client in conversation with a
specified server DDE window.

***************************************************************/ static
HWND GetHwndClientDDE (
    const   HWND    hWndServerDDE
)
{
    struct CONV    *pConv;

if ( !( pConv = FindConv ( hWndServerDDE ) ) )
        return ( ( HWND ) NULL );
    return ( pConv->hWndClientDDE );

}   /* function GetHwndClientDDE */

/***************************************************************

FUNCTION: IsConvInTerminateState

PURPOSE:  Terminate whether conversation with specified
client is in process of being terminated.

***************************************************************/ static
BOOL IsConvInTerminateState (
    const   HWND    hWndServerDDE
)
{
    struct CONV    *pConv;

if ( pConv = FindConv ( hWndServerDDE ) )
        return ( pConv->bInClientRequestedTerminate );
    else
        return ( FALSE );

}   /* function IsConvInTerminateState */

/***************************************************************

FUNCTION: RemoveConv

PURPOSE:  Remove conversation from conversation list.

***************************************************************/ static
void RemoveConv (
    const   HWND    hWndServerDDE
```

ATTORNEY DOCKET NO:   VOYS2220WSW
wsw/voys/2220.001

- 207 -

```
    )
    {
        struct CONV    *pConv;
        int            nConvIndex;

for ( nConvIndex = 0, pConv = Conv;
              nConvIndex < nConvCount;
              nConvIndex++, pConv++ )
        {
            if ( pConv->hWndServerDDE == hWndServerDDE )
                break;
        }
        nConvCount--;
        while ( nConvIndex < nConvCount )
        {
            *pConv = *( pConv + 1 );
            nConvIndex++;
            pConv++;
        } return;

}   /* function RemoveConv */

/***************************************************************

FUNCTION: SetConvInTerminateState

PURPOSE:  Set conversations's terminate state to TRUE.

***************************************************************/ static
    void SetConvInTerminateState (
        const HWND    hWndServerDDE
    )
    {
        struct CONV    *pConv;

if ( pConv = FindConv ( hWndServerDDE ) )
            pConv->bInClientRequestedTerminate = TRUE;
        return;

}   /* function SetConvInTerminateState */

/***************************************************************

FUNCTION: InitAckTimeOut

PURPOSE:  Get DDE timeout value from win.ini.  Value is in
    milliseconds.

***************************************************************/ static
    void InitAckTimeOut (
        void
```

- 208 -

```
    )
    {
        /* Finds value in win.ini section corresponding to application
        name */ nAckTimeOut = GetPrivateProfileInt (
                        "voysAccess Server",
                        "DDETimeOut",
                        DEF_ACK_TIME_OUT_MILLISEC,
        #if defined(TYIN4000)
                        "voysrvt.ini"  // may need to use different name
                                       for different server
        #else
                        "voysrvd.ini"  // may need to use different name
                                       for different server
        #endif
                                    );
        return;

}   /* function InitAckTimeOut */

/******************************************************
     *   send_event
     *
     * Note: deliberately don't check line[].bConnected, because if we
     * just had a DVRC_DISCONNECT, it will be set to FALSE even though
     * all of the other line[] info is still valid.
     ******************************************************/ static
    void send_event (
        const  struct event   event,      /* event to send */
               int           *nVRetVal  /* return value; 0 == okay
        */
    )
    {
        if ( Debug_flag >= 2 )
            print_event ( event, debugfile );

/* send the resulting message to the other task */
        if (line[event.nLine].serverwnd == (HWND)NULL) {
            *nVRetVal = RC_SERVERCOMMFAIL;   // could use better error
                                               code here
            goto done;
        }
        *nVRetVal = SendData (
                        line[event.nLine].serverwnd,
                        line[event.nLine].clientwnd,
                        &event,
                        sizeof ( event ),
                        TRUE, /* request an ACK */
                        FALSE /* client did not request this data */
                );

done:
    }   /* function send_event */
```

ATTORNEY DOCKET NO: VOYS2220WSW
wsw/voys/2220.001

```
/********************************************************
 * do_polling - call line driver to have it check for events.
 ********************************************************/
static
void do_polling (
        void
)
{
    struct event    ev;         // outgoing event allocation
    int             nVRetVal;   // Voysys return value
    int             nLine;

for ( nLine = 0; nLine < MAX_AL; nLine++ )
    {
        if ( line[nLine].bCmdInProgress )
        {
            nVRetVal = tm_Do_Command (
                            line[nLine].cmd,
                            FALSE,  /* not start of command */
                            &ev
                    );
            if ( nVRetVal != RC_CMDNOTDONE ) {
                /* send event back to Client */
                send_event (
                            ev,
                            &nVRetVal
                        );
                line[nLine].bCmdInProgress = FALSE;
            }
        }
    }

}   /* function do_polling */

/********************************************************
 * do_command - execute a command.
 ********************************************************/
static
void do_command (
        struct command  tcmd,       // incoming command (same name as
                                    //   in IPC_1)
        const   HWND    hWndClientDDE,
        const   HWND    hWndServerDDE
)
{
    struct event    *event;     // outgoing event (same name as in
                                //   IPC_1)
    struct event    ev;         // outgoing event allocation
    int             i;
    int             nVRetVal;   // Voysys return value
    int             nFRetVal;   // file operation return value
    int             nLine;
    char            errmsg[140];
    struct stat     statbuf;    // buffer of information about a
                                //   directory
```

- 210 -

```
               char    tmpbname[MAX_FN + 5];      // base filename (include the
                                                     dot and 3 chars for file
                                                     extension
               char    tmpfname[MAX_DN + MAX_FN + 5];   // full filename
                                                      (include the dot and 3
                                                     chars for file
                                                     extension
               boolean   foundfile;               // was file found ?

               if ( Debug_flag >= 2 )
                   print_command ( tcmd, debugfile );

event = &ev;          /* to match IPC_1 */

               nLine = tcmd.nLine;
               event->nEvent = EV_NONE;
               event->nLine = nLine;
               event->C_error = 0;
               event->DV_error = 0;
               event->DOS_error = 0;
               event->string[0] = '\0';
               event->filename[0] = '\0';
               event->bInTestMode[nLine] = line[nLine].bTestMode;

               if ( ( tcmd.nCommand != DVRC_CONNECT ) &&
                    ( tcmd.nCommand != DVRC_SETDIR ) &&
                    ( tcmd.nCommand != DVRC_GETSTATE ) &&
                    ( tcmd.nCommand != DVRC_GETSYSSTAT ) &&
                    ( !line[nLine].bConnected ) ) {
                   event->nEvent = EV_NONE; /* lazy */
                   event->result = RC_NOTCONNECTED;
                   nVRetVal = event->result;
                   goto finish;
               }
               switch ( tcmd.nCommand ) { case DVRC_CONNECT:
                       if (line[nLine].serverwnd != (HWND)NULL) {
                   // previous owner did a disconnect, but DDE conversation
                   // has not been torn down yet.
                           event->result = RC_BUSYLINE;
                           nVRetVal = event->result;
                           goto finish;
                       }
                       line[nLine].bConnected = TRUE;
                       line[nLine].clientwnd = hWndClientDDE;
                       line[nLine].serverwnd = hWndServerDDE;
                       line[nLine].bTestMode = FALSE;
                       goto senddown;

case DVRC_DISCONNECT:
                       line[nLine].bConnected = FALSE;
                       line[nLine].bTestMode = FALSE;
                       UpdateWindow ( hWndMain );
                   /* note: other line[] info still valid, for send_event */
                   // note: DDE conversation still active (will be torn
                   // down when get DDE_TERMINATE event).
                       goto senddown;
                   case DVRC_GETSTATE:
```

- 211 -

```
            event->nEvent = EV_GOTSTATE;
            event->has_task[nLine] = line[nLine].bConnected;
            event->bInTestMode[nLine] = line[nLine].bTestMode;
            if ( !line[nLine].bCmdInProgress )
                event->nCommand[nLine] = DVRC_NONE;
            else
                event->nCommand[nLine] = line[nLine].cmd.nCommand;
            if ( !line[nLine].bCmdInProgress )
                goto senddown;
            else
            {
                event->user_off_hook = TRUE;    /* can't tell */
                event->result = RC_SUCCEED;
                nVRetVal = event->result;
                goto finish;
            }
            /* never get here */ case DVRC_GETSYSSTAT:
            event->nEvent = EV_GOTSYSSTAT;
            for ( i = 0; i < MAX_LINES; i++ ) {
                if (i < MAX_AL) {
                    event->has_task[i] = line[i].bConnected;
                    event->bInTestMode[i] = line[i].bTestMode;
                } else {
                    event->has_task[i] = FALSE;
                    event->bInTestMode[i] = FALSE;
                }
            }
            for ( i = 0; i < MAX_LINES; i++ ) {
                if (i < MAX_AL) {
                    if ( !line[i].bCmdInProgress )
                        event->nCommand[i] = DVRC_NONE;
                    else
                        event->nCommand[i] = line[i].cmd.nCommand;
                } else {
                    event->nCommand[i] = DVRC_NONE;
                }
            }
            event->result = RC_SUCCEED;
            goto finish;

/*
             * TRICKY: FROM HERE ON DOWN, CODE IS IDENTICAL IN
             *      IPC_1 AND IPC_*_S
             */

/* command that can be executed in this layer */
        case DVRC_SETDIR:
            event->nEvent = EV_SETDIR;
            if ( ( ( tcmd.dir_num < 0 ) || ( tcmd.dir_num >=
                                                    MAX_DIRS ) ) {
                event->result = RC_BADCOMMAND;
                nVRetVal = event->result;
                goto finish;
            }
            if ( strlen ( tcmd.name ) > MAX_DN ) {
                event->result = RC_BADCOMMAND;
                nVRetVal = event->result;
                goto finish;
            }
```

- 212 -

```
            /*
             * tricky:  even if directory does not exist or is not
             * accessible, record its name (and return error code,
             * of course).
             */
            strcpy (line[nLine].dirname[tcmd.dir_num], tcmd.name);
            strcat ( line[nLine].dirname[tcmd.dir_num], "\\" );
            /* see if dir exists and is readable and writable */
    #if defined(E_F)
            nFRetVal = open ( tcmd.name, O_RDONLY );
            if ( nFRetVal >= 0 ) {
                close ( nFRetVal );
                event->result = RC_BADCOMMAND;
                nVRetVal = event->result;
                goto finish;
            }
            /* eisdir not found in watcom ERRNO.H
                            if (errno != EISDIR) {
                                event->result = RC_BADCOMMAND;
                                nVRetVal = event->result;
                                goto finish;
                            }
            */

    #else
            nFRetVal = stat ( tcmd.name, &statbuf );
            if ( nFRetVal != 0 ) {
                event->C_error = errno;
                event->DOS_error = _doserrno;
                sprintf (
                        errmsg,
                        "Could not get status of directory '%s'; ",
                        tcmd.name
                );
                event->result = RC_BADCOMMAND;
                nVRetVal = event->result;
                goto finish;
            }
            if ( ( statbuf.st_mode & S_IFDIR ) == 0 ) {
                Debug ( 6, sprintf ( Debug_buf, "IPC: '%s' is not a
                                              directory", tcmd.name ) );
                event->result = RC_BADCOMMAND;
                nVRetVal = event->result;
                goto finish;
            }
         /* apparently directories are never "writable" in DOS */
            if ( ( ( statbuf.st_mode & S_IREAD ) == 0 ) ||
                FALSE /* ((statbuf.st_mode & S_IWRITE) ==0) */ ) {
                Debug ( 6, sprintf ( Debug_buf, "IPC: Directory
                '%s' is not readable and writable", tcmd.name ) );
                event->result = RC_BADCOMMAND;
                nVRetVal = event->result;
                goto finish;
            }
    #endif
            event->result = RC_SUCCEED;
            nVRetVal = event->result;
            goto finish;

        case DVRC_DELETEFILE:
            event->nEvent = EV_DELETEFILE;
```

- 213 -

```
        if ( ( tcmd.dir_num < 0 ) || ( tcmd.dir_num >=
                                                    MAX_DIRS ) )
        {
            event->result = RC_BADCOMMAND;
            nVRetVal = event->result;
            goto finish;
        }
        if ( strlen ( tcmd.play_item.fname ) > MAX_FN )
        {
            event->result = RC_BADCOMMAND;
            nVRetVal = event->result;
            goto finish;
        }

/* prepend appropriate directory name to filename */
        strcpy ( tmpfname, line[nLine].dirname[tcmd.dir_num]);
        strcat ( tmpfname, tcmd.play_item.fname );
        if ( !fname_has_extension ( tcmd.play_item.fname ) )
        {
            /* append appropriate extension to filename */
            strcat ( tmpfname, "." );
            strcat ( tmpfname, promptext );
        }
        event->nEvent = EV_DELETEFILE;
        nFRetVal = remove ( tmpfname );
        if ( nFRetVal < 0 )
        {
            Debug ( 6, sprintf ( Debug_buf, "IPC: remove failed
                                                %d", nFRetVal ) );
            event->result = RC_NOFILE;
            event->C_error = errno;
if !defined(E_F)
            event->DOS_error = _doserrno;
endif
            nVRetVal = event->result;
            goto finish;
        }
        event->result = RC_SUCCEED;
        nVRetVal = event->result;
        goto finish;

/* Note: command that has to be sent down to lower layer */
/*
 * tricky:  for some commands, change command slightly before
 * sending it down.
 */
    case DVRC_RECORD:
        tcmd.dir_num = tcmd.path[0];
        if ( ( tcmd.dir_num < 0 ) || ( tcmd.dir_num >=
                                                    MAX_DIRS ) )
        {
            event->result = RC_BADCOMMAND;
            nVRetVal = event->result;
            goto finish;
        }
        if ( strlen ( tcmd.play_item.fname ) > MAX_FN )
        {
            event->result = RC_BADCOMMAND;
            nVRetVal = event->result;
            goto finish;
        }
```

- 214 -

```
            /* if upper layer gave filename, use it, else generate */
                if ( tcmd.play_item.fname[0] != '\0' )
                {
                    /* prepend appropriate directory name to filename */
                    strcpy(tmpfname,line[nLine].dirname[tcmd.dir_num]);
                    strcat ( tmpfname, tcmd.play_item.fname );
                    if ( !fname_has_extension ( tcmd.play_item.fname ))
                    {
                        /* append appropriate extension to filename */
                        strcat ( tmpfname, "." );
                        strcat ( tmpfname, promptext );
                    }
                }
                else
                {
                    /* generate unique filename */
                    while ( TRUE )
                    {
                        sprintf (
                                tcmd.play_item.fname,
                                USER_FNAME_FORMAT,
                                next_user_filename
                            );
                        next_user_filename++;
                /* prepend appropriate directory name to filename */
                        strcpy( tmpfname,
                                line[nLine].dirname[tcmd.dir_num] );
                        strcat ( tmpfname, tcmd.play_item.fname );
                        strcat ( tmpfname, "." );
                        strcat ( tmpfname, promptext );
                        /* see if the file exists */
if defined(E_F)
                        nFRetVal = open ( tmpfname, O_RDONLY );
                        if ( nFRetVal == -1 )
                            break; /* file does not exist */
                        close ( nFRetVal );
else
                        nFRetVal = stat ( tmpfname, &statbuf );
                        if ( nFRetVal != 0 )
                            break; /* file does not exist */
endif
                    }
                }
                strcpy ( tcmd.play_item.fname, tmpfname );
                Debug ( 6, sprintf ( Debug_buf, "IPC: full filename
                                    '%s'", tcmd.play_item.fname ) );
                goto senddown;

case DVRC_ADDPLAY:
            case DVRC_SETIFILE:
            case DVRC_SETVOCAB:
                if ( strlen ( tcmd.play_item.fname ) > MAX_FN )
                {
                    event->result = RC_BADCOMMAND;
                    nVRetVal = event->result;
                    goto finish;
                }
                strcpy ( tmpbname, tcmd.play_item.fname );
                if ( !fname_has_extension ( tcmd.play_item.fname ) )
                {
                    /* append appropriate extension to filename */
```

- 215 -

```
            if ( tcmd.nCommand == DVRC_ADDPLAY )
            {
                strcat ( tmpbname, "." );
                strcat ( tmpbname, promptext );
            }
            else if ( tcmd.nCommand == DVRC_SETIFILE )
            {
                strcat ( tmpbname, "." );
                strcat ( tmpbname, ifileext );
            }
        }
        Find_File (
            tmpbname,         /* base file name */
            tcmd.path,        /* path to look through */
            line[nLine].dirname, /* names of dirs */
            &foundfile,       /* was file found ? */
            tmpfname          /* full file name */
            );
        if ( foundfile )
        {
            /* file exists */
            strcpy ( tcmd.play_item.fname, tmpfname );
            if ( tcmd.nCommand == DVRC_ADDPLAY )
                goto senddown;
            /* do same for map file */
            Find_File (
                tcmd.name,    /* base file name */
                tcmd.path,    /* path to look through */
                line[nLine].dirname, /* names of dirs */
                &foundfile,   /* was file found ? */
                tmpfname      /* full file name */
                );
            if ( foundfile )
            {
                /* file exists */
                strcpy ( tcmd.name, tmpfname );
                goto senddown;
            }
            else
            {
                event->result = RC_NOFILE;
                nVRetVal = event->result;
                goto finish;
            }
        }
        else
        {
            event->result = RC_NOFILE;
            nVRetVal = event->result;
            goto finish;
        } case DVRC_SETINPUT:
    case DVRC_SETOUTPUT:
    case DVRC_FAXCOVER:
    case DVRC_FAXDOC:
    case DVRC_FAXSEND:
    case DVRC_FAXSETUP:
        goto senddown;
```

- 216 -

```
        /* Note: command that has to be or not to be sent down to
   lower layer */ case DVRC_SET:
             switch ( tcmd.nSetGetOpCode ) {
                case SET_TESTMODE:
                    if ( tcmd.dwSetParm == SET_TM_ON ) {
                        line[nLine].bTestMode = TRUE;
                        event->bInTestMode[nLine] = TRUE;
                    }
                    else {
                        line[nLine].bTestMode = FALSE;
                        event->bInTestMode[nLine] = FALSE;
                    }
                    event->result = RC_SUCCEED;
                    nVRetVal = event->result;

UpdateWindow ( hWndMain );
                    goto finish;
             }   /* end of switch for tcmd.nSetGetOpCode */
             goto senddown;

case DVRC_GET:
             switch ( tcmd.nSetGetOpCode ) {
                case GET_FILEFORMATS:
                    goto senddown;

case GET_RECORDINGS:
                case GET_TMPFILES:
                    event->nEvent = EV_GET;
                    if ( ( tcmd.dir_num < 0 ) || ( tcmd.dir_num >=
                                                       MAX_DIRS ) ) {
                        event->result = RC_BADCOMMAND;
                        nVRetVal = event->result;
                        goto finish;
                    } strcpy ( event->cGetParm,
                                 line[nLine].dirname[tcmd.dir_num] );
                    event->result = RC_SUCCEED;
                    nVRetVal = event->result;
                    goto finish;

             }   /* end of switch for tcmd.nSetGetOpCode */
             goto senddown;

default:
             goto senddown;
             /* TRICKY: FROM HERE UP, CODE IS IDENTICAL IN IPC_1
             AND IPC_*_S */

}
         /* never get here */ senddown:
         line[nLine].cmd = tcmd;
         line[nLine].bCmdInProgress = TRUE;
         nVRetVal = tm_Do_Command (
                         tcmd,
```

ATTORNEY DOCKET NO: VOYS2220WSW
wsw/voys/2220.001

- 217 -

```
                              TRUE,
                              event
                    );
      finish:
          if ( nVRetVal != RC_CMDNOTDONE )
          {
              /* send event back to Client */
              send_event (
                          *event,
                          &nVRetVal
                   );
              line[nLine].bCmdInProgress = FALSE;
          }
      }

/***************************************************************

FUNCTION: SendTerminate

PURPOSE:  Post terminate message and indicate that
conversation is in process of being terminated.

***************************************************************/
      static
      int SendTerminate (
          const   HWND    hWndServerDDE,
          const   HWND    hWndClientDDE
      )
      {
          boolean         bSuccess;

SetConvInTerminateState ( hWndServerDDE );
          bSuccess = PostMessage ( hWndClientDDE, WM_DDE_TERMINATE,
                                                  hWndServerDDE, 0L );
          if (!bSuccess) {
              Debug ( 1, sprintf ( Debug_buf, "IPC_WD_S/SendTerminate:
              PostMessage(hWndClientDDE 0x%04X) failed", hWndClientDDE ) );
          }
          return RC_SUCCEED;
      }   /* function SendTerminate */

/***************************************************************
          FUNCTION: ServerAcknowledge PURPOSE:  Called when server application receives ACK or
      NACK, or when server receives time out waiting for response to
      WM_DDE_DATA.

***************************************************************/ static
      int ServerAcknowledge (
          const   HWND    hWndServerDDE,
```

ATTORNEY DOCKET NO: VOYS2220WSW
wsw/voys/2220.001

```
                    - 218 - const   HWND    hWndClientDDE,
        const   LONG    lParam
    )
    {
        char        szItemName[ITEM_NAME_MAX_SIZE + 1];
        ATOM        GDARetVal;      // GlobalDeleteAtom return value if ( !( LOWORD ( lParam ) & 0x8000 ) ) {
            Debug ( 1, sprintf ( Debug_buf,
                "IPC_WD_S/ServerAcknowledge: DDE send data failed" ) );
            /* timeout after DDE_SEND_DATA */ if (HIWORD ( lParam ) != 0) {
                GlobalGetAtomName ( HIWORD ( lParam ), szItemName,
                                                ITEM_NAME_MAX_SIZE );
                /* free the data here */
            }
        }
        if ( HIWORD ( lParam ) != 0 ) { /* 0 if time-out, so don't
                                                    try to delete */
            GDARetVal = GlobalDeleteAtom ( HIWORD ( lParam ) );
            if (GDARetVal != 0)
                Debug(1,sprintf(Debug_buf,"IPC_WD_S/ServerAcknowledge:
                                        GlobalDeleteAtom(0x%04X) failed",
                                                HIWORD ( lParam ) ) );
        } return RC_SUCCEED;

    }   /* function ServerAcknowledge */

/************************************************************
        FUNCTION: ServerInitiate PURPOSE: Called when server application receives
    WM_DDE_INITIATE message.
        Note: Client will delete atoms it created and the ones we
    create here.

************************************************************/
    static
    int ServerInitiate (
        const   HWND    hWndClientDDE,
        const   LONG    lParam
    )
    {
        HWND        hWndServerDDE;
        ATOM        atomApplicationRcvd;
        ATOM        atomTopicRcvd;
        ATOM        atomApplicationReturn;
        ATOM        atomTopicReturn;
        char        szApplication[APP_MAX_SIZE + 1];
        char        szTopic[TOPIC_MAX_SIZE + 1];
        int         nVRetVal;       // Voysys return value
        boolean     bSuccess;
        ATOM        GDARetVal;      // GlobalDeleteAtom return value
```

- 219 -

```
          atomApplicationRcvd = LOWORD ( lParam );
          if ( atomApplicationRcvd != 0 ) {
              GlobalGetAtomName ( atomApplicationRcvd, szApplication,
          }                                               APP_MAX_SIZE );
          if ( atomApplicationRcvd
                 && strcmpi ( szApplication, VA_DDE_SERVER_APP_NAME ) )
      {
              /* application was specified but it wasn't right */
              nVRetVal = RC_BADCOMMAND;
              goto done;
          } atomTopicRcvd = HIWORD ( lParam );
          if ( atomTopicRcvd != 0 ) {
              GlobalGetAtomName (atomTopicRcvd, szTopic,TOPIC_MAX_SIZE);
              if ( strcmpi ( szTopic, VA_DDE_TOPIC ) ) {
                  /* topic wasn't right */
                  nVRetVal = RC_BADCOMMAND;
                  goto done;
              }
          } hWndServerDDE = CreateWindow (
                        "voysServerDDEWndClass",
                        "voysServerDDE",
                        WS_CHILD,       /* not visible */
                        0, 0, 0, 0,     /* no position or dimensions */
                        hWndMain,       /* parent */
                        ( HMENU ) NULL, /* no menu */
                        hInst,
                        NULL
                        );
          if ( hWndServerDDE == (HWND)NULL) {
              Debug ( 1, sprintf ( Debug_buf, "IPC_WD_S/ServerInitiate:
                                              CreateWindow failed" ) );
              nVRetVal = RC_OSERROR;
              goto done;
          }
          bSuccess = AddConv ( hWndServerDDE, hWndClientDDE );
          if ( !bSuccess ) {
              DestroyWindow ( hWndServerDDE );
              nVRetVal = RC_SWLIMIT;
              goto done;
          } atomApplicationReturn = GlobalAddAtom(VA_DDE_SERVER_APP_NAME);
          if (atomApplicationReturn == 0) {
              Debug ( 1, sprintf ( Debug_buf, "IPC_WD_S/ServerInitiate:
                                              GlobalAddAtom failed" ) );
              RemoveConv ( hWndServerDDE );
              DestroyWindow ( hWndServerDDE );
              nVRetVal = RC_OSERROR;
              goto done;
          }
          atomTopicReturn = GlobalAddAtom ( VA_DDE_TOPIC );
          if (atomTopicReturn == 0) {
              Debug ( 1, sprintf ( Debug_buf, "IPC_WD_S/ServerInitiate:
                                              GlobalAddAtom failed" ) );
              GDARetVal = GlobalDeleteAtom ( atomApplicationReturn );
```

- 220 -

```
            if (GDARetVal != 0)
                Debug (1,sprintf ( Debug_buf,"IPC_WD_S/ServerInitiate:
                                             GlobalDeleteAtom(0x%04X) failed",
                                             atomApplicationReturn ) );
            RemoveConv ( hWndServerDDE );
            DestroyWindow ( hWndServerDDE );
            nVRetVal = RC_OSERROR;
            goto done;
        }

// Send ACK to hWndClientDDE from hWndServerDDE
        // supposed to use SendMessage here, but if we do client won't
        // unblock, because it is in SendMessage sending to us !
        bSuccess = PostMessage (
                   hWndClientDDE,
                   WM_DDE_ACK,
                   hWndServerDDE,
                   MAKELONG ( atomApplicationReturn, atomTopicReturn )
                   );
        if (!bSuccess) {
            Debug ( 1, sprintf ( Debug_buf, "IPC_WD_S/ServerInitiate:
                                             PostMessage failed" ) );
            GDARetVal = GlobalDeleteAtom ( atomApplicationReturn );
            if (GDARetVal != 0)
                Debug (1,sprintf( Debug_buf, "IPC_WD_S/ServerInitiate:
                                             GlobalDeleteAtom(0x%04X) failed",
                                             atomApplicationReturn ) );
            GDARetVal = GlobalDeleteAtom ( atomTopicReturn );
            if (GDARetVal != 0)
                Debug (1,sprintf( Debug_buf, "IPC_WD_S/ServerInitiate:
                                             GlobalDeleteAtom(0x%04X) failed",
                                             atomTopicReturn ) );
            RemoveConv ( hWndServerDDE );
            DestroyWindow ( hWndServerDDE );
            nVRetVal = RC_OSERROR;
            goto done;
        } nVRetVal = RC_SUCCEED;
    done:
        return nVRetVal;

} /* function ServerInitiate */

/*************************************************************

FUNCTION: ServerPoke

PURPOSE: Called when server application receives WM_DDE_POKE
    message, which is a command from a client application.

Tricky: Ignore "item name" portion of message; it will be 0.

*************************************************************/ static
    int ServerPoke (
        const  HWND    hWndServerDDE,
```

- 221 -

```
            const   HWND       hWndClientDDE,
            const   LONG       lParam
        )
        {
            HANDLE             hPokeData;
            DDEPOKE FAR        *lpPokeData;
            BOOL               bRelease;
            struct command     tcmd;       /* incoming command */
            struct event       event;      /* event to send */
            char               info[80];   /* info message */
            BOOL               sendevent;
            int                nVRetVal;   // Voysys return value
            boolean            bSuccess;
            HGLOBAL            GFRetVal;   // return value from GlobalFree
            hPokeData = LOWORD ( lParam );   /* handle to command */ if ( !( lpPokeData = ( DDEPOKE FAR * ) GlobalLock (hPokeData))
                                || ( lpPokeData->cfFormat != CF_TEXT ) ) {
                Debug ( 1, sprintf ( Debug_buf, "IPC_WD_S/ServerPoke: data
                                       lock failed, or wrong data format" ) );
                bSuccess = PostMessage (
                                hWndClientDDE,
                                WM_DDE_ACK,
                                hWndServerDDE,
                                MAKELONG ( 0, 0 )
                                );       /* negative acknowledgement */
                if (!bSuccess) {
                    Debug ( 1, sprintf ( Debug_buf, "IPC_WD_S/ServerPoke:
                                                    PostMessage failed" ) );
                }
                nVRetVal = RC_OSERROR;
                goto done;
            }
            memcpy ( &tcmd, lpPokeData->Value, sizeof ( tcmd ) );

sendevent = FALSE;

            /* check for valid line number */
            if ( ( tcmd.nLine < 0 ) || ( tcmd.nLine >= MAX_AL ) )
            {
                sprintf (
                    info,
                    "got msg with bad line num %d (should be in range
                                                                   %d-%d)",
                    tcmd.nLine,
                    0,
                    MAX_LINES - 1
                );

/* send an event back to the sender */
                memset ( &event, 0, sizeof ( event ) );
                event.nEvent = EV_BADCOMMAND;
                event.nLine = -1;
                event.result = RC_INTERNAL;
                sendevent = TRUE;
                goto skipcmd;
            }
            /* check for task A connected to line but command is from task
```

- 222 -

```
                                                                          B */
        if ( line[tcmd.nLine].bConnected &&
                   ( line[tcmd.nLine].clientwnd != hWndClientDDE ) )
        {
            sprintf (
                info,
                "got msg for line num %d from task != owner of line",
                tcmd.nLine
                );

/* send an event back to the sender */
            memset ( &event, 0, sizeof ( event ) );
            event.nEvent = EV_BADCOMMAND;
            event.nLine = tcmd.nLine;
            event.result = RC_BUSYLINE;
            sendevent = TRUE;
            goto skipcmd;
        }

// check for server shutting down
        if ( bShuttingDown &&
             ( tcmd.nCommand != DVRC_HANGUP ) &&
             ( tcmd.nCommand != DVRC_DISCONNECT ) ) {
            sprintf (
                    info,
                    "got msg for line num %d during shutdown",
                    tcmd.nLine
                );

/* send an event back to the sender */
            memset ( &event, 0, sizeof ( event ) );
            event.nEvent = EV_BADCOMMAND;
            event.nLine = tcmd.nLine;
            event.result = RC_SERVERSHUTDOWN;
            sendevent = TRUE;
            goto skipcmd;
        } do_command ( tcmd, hWndClientDDE, hWndServerDDE );
    skipcmd:
        /* Save value of fRelease, since ptr invalidated by
                                                        GlobalUnlock() */
        bRelease = lpPokeData->fRelease;
        lpPokeData = NULL;
        GlobalUnlock ( hPokeData );

if ( bRelease ) {
            GFRetVal = GlobalFree ( hPokeData );
            if (GFRetVal != (HGLOBAL)NULL)
                Debug ( 1, sprintf ( Debug_buf, "IPC_WD_S/ServerPoke: 
                                GlobalFree(0x%04X) failed", hPokeData ) );
        } bSuccess = PostMessage (
                          hWndClientDDE,
                          WM_DDE_ACK,
                          hWndServerDDE,
                          MAKELONG ( 0x8000, 0 )
                          ); /* positive acknowledgement */
        if (!bSuccess) {
```

ATTORNEY DOCKET NO: VOYS2220WSW
wsw/voys/2220.001

- 223 -

```
              Debug ( 1, sprintf ( Debug_buf, "IPC_WD_S/ServerPoke:
                                                    PostMessage failed" ) );
          }

         if ( sendevent )
          {
              /* send the resulting message to the other task */
              SendData (
                      hWndServerDDE,
                      hWndClientDDE,
                      &event,
                      sizeof ( event ),
                      TRUE,   /* request an ACK */
                      FALSE   /* client did not request this data */
                  );
          } nVRetVal = RC_SUCCEED;

20    done:
          return nVRetVal;

}   /* function ServerPoke */

/****************************************************************

FUNCTION: ServerTerminate
          PURPOSE:  Called when server application receives
      WM_DDE_TERMINATE message.

****************************************************************/
      static
      int ServerTerminate (
          const   HWND    hWndServerDDE,
          const   HWND    hWndClientDDE
      )
      {
          int             nLine;
          int             nVRetVal;       // Voysys return value
          nVRetVal = RC_SUCCEED;

if ( FindConv ( hWndServerDDE ) == NULL )
              goto done;

          RemoveConv ( hWndServerDDE );
          DestroyWindow ( hWndServerDDE );

for ( nLine = 0; nLine < MAX_AL; nLine++ ) {
              if ( line[nLine].serverwnd == hWndServerDDE ) {
                  line[nLine].serverwnd = (HWND)NULL;
                  line[nLine].clientwnd = (HWND)NULL;
                  goto done;
              }
          }
          nVRetVal = RC_INTERNAL;
```

ATTORNEY DOCKET NO: VOYS2220WSW
wsw/voys/2220.001

```
                                - 224 - done:
        return nVRetVal;

}   /* function ServerTerminate */

/****************************************************************
        FUNCTION: TerminateConversations PURPOSE:  Processes WM_DESTROY message, terminates all
    conversations.

    ****************************************************************/
    static
    int TerminateConversations (
        void
    )
    {
        HWND            hWndServerDDE;
        LONG            lTimeOut;
        MSG             msg;
        /* Terminate each active conversation */
        hWndServerDDE = ( HWND ) NULL;
        while ( hWndServerDDE = GetNextConv ( hWndServerDDE ) ) {
            SendTerminate ( hWndServerDDE, GetHwndClientDDE (
                                                             hWndServerDDE ) );
        }

/* Wait for all conversations to terminate OR for time out */
        lTimeOut = GetTickCount() + ( LONG ) nAckTimeOut;
        while ( PeekMessage ( &msg, ( HWND ) NULL, WM_DDE_FIRST,
                                            WM_DDE_LAST, PM_REMOVE ) ) {
            DispatchMessage ( &msg );
            if ( msg.message == WM_DDE_TERMINATE ) {
                if ( !AtLeastOneConvActive ( ) )
                    break;
            }
            if ( GetTickCount ( ) > ( DWORD ) lTimeOut )
                break;
        }
        return RC_SUCCEED;

}   /* function TerminateConversations */
50

/****************************************************************
        FUNCTION: DDEWndProc
        PURPOSE:  Handles all DDE messages received by the server
    application.

****************************************************************/
    long FAR PASCAL __export DDEWndProc (
        HWND    hWnd,
```

- 225 -

```
         UINT    message,
         WPARAM  wParam,
         LPARAM  lParam
     )
 5   { switch ( message ) { case MM_WOM_OPEN:
10           case MM_WOM_CLOSE:
             case MM_WOM_DONE:
             case MM_WIM_OPEN:
             case MM_WIM_CLOSE:
             case MM_WIM_DATA:
15               // pass down to line driver to handle
                 tm_Process_Event(message,wParam,lParam);
                 return ( 0L );

case WM_DDE_ACK:
                 ServerAcknowledge ( hWnd, ( HWND ) wParam, lParam );
                 return ( 0L );

case WM_TIMER:
                 // pass down to line driver to handle
                 tm_Process_Event(message,wParam,lParam);
                 return ( 0L );

case WM_DDE_ADVISE:
                 ServerAcknowledge ( hWnd, ( HWND ) wParam, 0L );
                                                    /* simulates NACK */
                 return ( 0L );

case WM_DDE_POKE: /* client sending command to server */
                 ServerPoke ( hWnd, ( HWND ) wParam, lParam );
                 return ( 0L );

case WM_DDE_TERMINATE:
                 ServerTerminate ( hWnd, ( HWND ) wParam );
                 return ( 0L );
             case WM_DDE_UNADVISE:
                 ServerAcknowledge ( hWnd, ( HWND ) wParam, 0L );
                                                     /* simulates NACK */
                 return ( 0L );
             case WM_DDE_REQUEST:
                 ServerAcknowledge ( hWnd, ( HWND ) wParam, 0L );
                                                     /* simulates NACK */
                 return ( 0L );
             case WM_DDE_EXECUTE:
                 ServerAcknowledge ( hWnd, ( HWND ) wParam, 0L );
                                                     /* simulates NACK */
                 return ( 0L );
55
             default:
                 return (DefWindowProc(hWnd, message, wParam, lParam));
         }

60   }   /* function DDEWndProc */
```

ATTORNEY DOCKET NO: VOYS2220WSW
wsw/voys/2220.001

```
/*************************************************************
       FUNCTION: AboutDlgProc(HWND, UINT, WPARAM, LPARAM)

PURPOSE:  Processes messages for "About" dialog box

*************************************************************/

BOOL FAR PASCAL __export AboutDlgProc (
    HWND    hDlg,
    UINT    message,
    WPARAM  wParam,
    LPARAM  lParam
)
{
    switch ( message )
    {
        case WM_INITDIALOG:
            return ( TRUE );

case WM_COMMAND:
            if ( ( wParam == IDOK ) || ( wParam == IDCANCEL ) )
            {
                EndDialog ( hDlg, TRUE );
                return ( TRUE );
            }
            break;
    }
    return ( FALSE );

}   /* function AboutDlgProc */

/*************************************************************
       FUNCTION: MainWndProc(HWND, UINT, WPARAM, LPARAM)

PURPOSE:  Processes messages for server

*************************************************************/ long FAR PASCAL __export MainWndProc (
    HWND    hWnd,
    UINT    message,
    WPARAM  wParam,
    LPARAM  lParam
)
{
    HDC             hDC;
    TEXTMETRIC      tm;
    PAINTSTRUCT     ps;

switch ( message ) { case MM_WOM_OPEN:
        case MM_WOM_CLOSE:
        case MM_WOM_DONE:
        case MM_WIM_OPEN:
        case MM_WIM_CLOSE:
```

- 227 -

```
            case MM_WIM_DATA:
                // pass down to line driver to handle
                tm_Process_Event ( message, wParam, lParam );
                break;

case WM_CREATE:
                hDC = GetDC ( hWnd );

SelectObject (hDC, GetStockObject(SYSTEM_FIXED_FONT));
                GetTextMetrics ( hDC, &tm );
                nCharW = tm.tmAveCharWidth;
                nCharH = tm.tmHeight;

ReleaseDC ( hWnd, hDC );

rect.top = 3 * nCharH / 2;

break;

case WM_SIZE:
                rect.right = LOWORD ( lParam );
                rect.bottom = HIWORD ( lParam );
                UpdateWindow ( hWnd );
                break;

case WM_SETFOCUS:
                SetFocus ( GetDlgItem ( hWnd, IDOK ) );
                break;

case WM_PAINT:
                InvalidateRect ( hWnd, NULL, TRUE );

hDC = BeginPaint ( hWnd, &ps );
                /* do any painting here */
//              SetBkMode ( hDC, TRANSPARENT );

ShowTestMode ( );

EndPaint ( hWnd, &ps );
                break;

case WM_COMMAND:
                switch ( wParam )
                {
                    case IDM_ABOUT:
                        DialogBox ( hInst,
                            MAKEINTRESOURCE(IDD_ABOUT),
//                          "ABOUT",   // this name must match the one
                                                     used in the RC file
                            hWnd,
                            MakeProcInstance ( AboutDlgProc, hInst ) );
                        break;

case ID_TAB:
                    case ID_SHIFT_TAB:
                        break;
                }
                break;
            case WM_DDE_INITIATE:
```

ATTORNEY DOCKET NO: VOYS2220WSW
wsw/voys/2220.001

- 228 -

```
              ServerInitiate ( ( HWND ) wParam, lParam );
              break;

case WM_DESTROY:
              break;

case WM_SYSCOMMAND:
              if ( ( wParam == SC_CLOSE ) && ( !bShuttingDown ) )  {
              // tricky: don't let Windows process this message yet
              // we will shut down first, then tell Windows about it
                  PostQuitMessage ( 0 );    // to pop us out of main
                                                           message loop
                 break;
              } else
                 return ( DefWindowProc ( hWnd, message, wParam,
                                                             lParam ) );

case WM_TIMER:
              if (wParam == WINMAIN_TIMER_ID) {
                 // time to do polling
                 do_polling();
              } else {
                 // pass down to line driver to handle
                 tm_Process_Event(message,wParam,lParam);
              }
              break;

default:
              return (DefWindowProc(hWnd, message, wParam, lParam));
       }
       return ( 0L );

}   /* function MainWndProc */

/***************************************************************

FUNCTION: InitApplication(HANDLE)

PURPOSE: Initializes window data and registers window class

***************************************************************/ static
  BOOL InitApplication (
      const  HANDLE hInstance
  )
  {
      WNDCLASS        wc;

wc.style = 0;
      wc.lpfnWndProc = MainWndProc;
      wc.cbClsExtra = 0;
      wc.cbWndExtra = 0;
      wc.hInstance = hInstance;
      // wc.hIcon = LoadIcon((HINSTANCE)NULL, IDI_APPLICATION);
      wc.hIcon = LoadIcon ( hInstance, MAKEINTRESOURCE (IDI_ICON1));
      wc.hCursor = LoadCursor ( ( HINSTANCE ) NULL, IDC_ARROW );
      wc.hbrBackground = COLOR_WINDOW + 1;
      wc.lpszMenuName = "ServerMenu";  // this name must match the
```

ATTORNEY DOCKET NO: VOYS2220WSW
wsw/voys/2220.001

```
                                                       one used in the RC file
       wc.lpszClassName = "voysServerWClass";

if ( !RegisterClass ( &wc ) )
return ( FALSE );

wc.style = 0;
       wc.lpfnWndProc = DDEWndProc;
       wc.cbClsExtra = 0;
       wc.cbWndExtra = 0;
       wc.hInstance = hInstance;
       wc.hIcon = ( HICON ) NULL;
       wc.hCursor = ( HCURSOR ) NULL;
       wc.hbrBackground = 0;
       wc.lpszMenuName = NULL;
       wc.lpszClassName = "voysServerDDEWndClass";

return ( RegisterClass ( &wc ) );

}   /* function InitApplication */

/*************************************************************
        FUNCTION: InitInstance(HANDLE, int)

PURPOSE: Saves instance handle, creates main window, and
     creates 3 child edit controls with id's 1, 2, and 3.
     *************************************************************/ static
     BOOL InitInstance (
        const   HANDLE  hInstance,
        const   int     nCmdShow
     )
     {
        HDC         hDC;
        TEXTMETRIC  tm;
        int         nHorzRes, nVertRes;
        int         xDelta, yDelta;

InitAckTimeOut ( );     /* in module SERVDDE */
        hInst = hInstance;

hWndMain = CreateWindow (
                            "voysServerWClass",
                            SERVER_TITLE,
                            WS_OVERLAPPEDWINDOW | WS_CLIPCHILDREN,
                            CW_USEDEFAULT,
                            CW_USEDEFAULT,
                            CW_USEDEFAULT,
                            CW_USEDEFAULT,
                            ( HWND ) NULL,
                            ( HMENU ) NULL,
                            hInstance,
                            NULL
 60             );
```

- 230 -

```
       if ( !hWndMain )
           return ( FALSE );

hDC = GetDC ( hWndMain );
       hWinDisplay = hDC;
       GetTextMetrics ( hDC, ( LPTEXTMETRIC ) & tm );
       xDelta = tm.tmAveCharWidth;
       yDelta = tm.tmHeight + tm.tmExternalLeading;
       nHorzRes = GetDeviceCaps ( hDC, HORZRES );
       nVertRes = GetDeviceCaps ( hDC, VERTRES );
       ReleaseDC ( hWndMain, hDC );

MoveWindow ( hWndMain,
                    nHorzRes / 2 + xDelta * 6,
                    nVertRes / 2 + yDelta,
                    xDelta * 35,
                    yDelta * 12,
                    FALSE );

    //  ShowWindow(hWndMain, nCmdShow);
    //  ShowWindow(hWndMain, SW_SHOWMINIMIZED);
        ShowWindow ( hWndMain, SW_SHOWMINNOACTIVE );
        UpdateWindow ( hWndMain );

        return ( TRUE );

}  /* function InitInstance */

    /********************************************************
    *app_startup - parse command-line, initialize data, register DDE
    ********************************************************/
    static
    int app_startup (
        const  char       *cmdline,
        const  HINSTANCE  hInstance,
        const  HWND       hWnd
    )
    {
        int       nVRetVal;     // Voysys return value
        int       nLine;
        int       dir_num;
        DWORD     dwVersion;

Debug_flag = 3;

nVRetVal = parse_arguments ( cmdline );
        if ( nVRetVal != RC_SUCCEED )
            goto done;

nVRetVal = CheckDebugSanity();
        if ( nVRetVal != RC_SUCCEED ) {
            Debug ( 1, sprintf ( Debug_buf, "IPC_WD_S/app_startup:
                                             debug sanity failure" ) );
            goto done;
        }

        dwVersion = GetVersion();    /* get Windows, DOS versions */
```

ATTORNEY DOCKET NO: VOYS2220WSW
wsw/voys/2220.001

- 231 -

```
        nVRetVal = tm_Initialize (
                            ld_hw_irq,
                            ld_sw_int,
                            hInstance,
                            hWnd,
                            promptext,
                            ifileext
                );
        if ( nVRetVal != RC_SUCCEED )
            goto done;

/* initialize array of line states */
        for ( nLine = 0; nLine < MAX_AL; nLine++ )
        {
            line[nLine].bConnected = FALSE;
            line[nLine].bCmdInProgress = FALSE;
            line[nLine].bTestMode = FALSE;

/* initialize voice file directory names */
            for ( dir_num = 0; dir_num < MAX_DIRS; dir_num++ )
                line[nLine].dirname[dir_num][0] = '\0';
        } next_user_filename = 0;

nVRetVal = RC_SUCCEED;

done:
        return nVRetVal;

}   /* function app_startup */

/**********************************************************
    *   app_shutdown
    **********************************************************/
    static
    int app_shutdown (
        void
    )
    {
        int             nVRetVal;       // Voysys return value
        int             nLineNum;
        struct command  cmd;            // command to execute
        struct event    event;          // event received
        int             count;
        boolean         gotone;
        MSG             msg;
        HANDLE          hAccel;
        boolean         bSuccess;

bShuttingDown = TRUE;

nVRetVal = tm_Shutdown();
        if (nVRetVal != RC_BUSYLINE)
            goto finish;

// some line is connected or has a command in progress
        // give it some time to abort or disconnect
```

- 232 -

```
            count = PEEK_MSG_COUNT;
            while ( count-- ) {
                gotone = PeekMessage ( &msg, ( HWND ) NULL, 0, 0,
                                                             PM_REMOVE );
                if ( gotone ) {
                    if ( !TranslateAccelerator ( hWndMain, hAccel, &msg)){
                        TranslateMessage ( &msg );
                        DispatchMessage ( &msg );
                    }
                }
                do_polling();
            } nVRetVal = tm_Shutdown();
            if (nVRetVal != RC_BUSYLINE)
                goto finish;

// for any lines connected but not in progress, inject a
                                                         disconnect command
            for ( nLineNum = 0; nLineNum < MAX_AL; nLineNum++ ) {
                lp = &line[nLineNum];
                if ( lp->bConnected ) {
                    cmd.nCommand = DVRC_DISCONNECT;
                    cmd.nLine = nLineNum;
                    lp->bCmdInProgress = TRUE;
                    nVRetVal = tm_Do_Command (
                                    cmd,
                                    TRUE,   // start of command
                                    &event
                                    );
                    if ( nVRetVal != RC_CMDNOTDONE ) {
                        /* send event back to Client */
                        send_event (
                                    event,
                                    &nVRetVal
                                    );
                        lp->bCmdInProgress = FALSE;
                    }
                }
            }

// give commands time to work
            count = PEEK_MSG_COUNT;
            while ( count-- ) {
                gotone = PeekMessage ( &msg, ( HWND ) NULL, 0, 0,
                                                             PM_REMOVE );
                if ( gotone ) {
                    if ( !hDlgCurrent || !IsDialogMessage ( hDlgCurrent,
                                                               &msg ) ) {
50                      if ( !TranslateAccelerator ( hWndMain, hAccel, &msg
                                                                   ) ) {
                            TranslateMessage ( &msg );
                            DispatchMessage ( &msg );
                        }
55                  }
                }
                do_polling();
            }

            // try one more time
            // if it doesn't work, give up
```

ATTORNEY DOCKET NO:  VOYS2220WSW
wsw/voys/2220.001

- 233 -

```
            nVRetVal = tm_Shutdown();

finish:
                /* Terminate all DDE conversations before destroying
                   client window */
            TerminateConversations ( );

// now tell Windows to close our windows
            bSuccess = PostMessage (
                                hWndMain,
                                WM_SYSCOMMAND,
                                SC_CLOSE,
                                0
                                );
            if (!bSuccess) {
                Debug ( 1, sprintf ( Debug_buf, "IPC_WD_S/app_shutdown:
                                                PostMessage failed" ) );
            }

            // chew up messages that close windows
            count = PEEK_MSG_COUNT;
            while ( count-- ) {
                gotone = PeekMessage ( &msg, ( HWND ) NULL, 0, 0,
                                                        PM_REMOVE );
                if ( gotone ) {
                    if ( !hDlgCurrent || !IsDialogMessage ( hDlgCurrent,
                                                        &msg ) ) {
                        if ( !TranslateAccelerator ( hWndMain, hAccel, &msg
30                                                                ) ) {
                            TranslateMessage ( &msg );
                            DispatchMessage ( &msg );
                        }
                    }
                }
            }

Debug ( 5, sprintf (Debug_buf, "IPC_WD_S/app_shutdown: ret"));
            return RC_SUCCEED;

        }   /* function app_shutdown */

/************************************************************
            FUNCTION: WinMain(HANDLE, HANDLE, LPSTR, int)

PURPOSE: Calls initialization function, processes message
        loop
        ************************************************************/ int PASCAL WinMain (
                            HANDLE  hInstance,
                            HANDLE  hPrevInstance,
                            LPSTR   lpCmdLine,
                            int     nCmdShow
                            )
        {
            MSG         msg;
            HANDLE      hAccel;
```

- 234 -

```
            BOOL            done;
            BOOL            gotone;
            int             nVRetVal;       // Voysys return value
            int             retval;
            UINT            timerID;
            BOOL            bAnyError;

retval = 0;
            bAnyError = FALSE;
            if ( !hPrevInstance ) {
                /* delete, create and open debug file */
                debugfile = open (
                                "vsdbug.txt",
                                O_CREAT | O_TRUNC | O_TEXT | O_WRONLY,
                                S_IWRITE
                            );
                if ( debugfile == -1 )
                    return ( 0 ); // error to open the debug file
                if ( !InitApplication ( hInstance ) ) {
                    bAnyError = TRUE;
                    goto stop3;
                }
            } else {
                /* Another Server is running; abort */
                goto stop4;
            }

            if ( !InitInstance ( hInstance, nCmdShow ) ) {
                bAnyError = TRUE;
                goto stop3;
            }

            hAccel = LoadAccelerators(
                            hInstance,
                            "ServerAcc"   // must match name in RC file
                            );

            nVRetVal = app_startup ( lpCmdLine, hInstance, hWndMain );
            if ( nVRetVal != RC_SUCCEED ) {
                bAnyError = TRUE;
                goto stop3;
            }
            /* start polling timer */
            timerID = SetTimer ( hWndMain, WINMAIN_TIMER_ID,
                                                EV_POLL_DELAY, NULL );
            if ( timerID != WINMAIN_TIMER_ID ) {
                bAnyError = TRUE;
                goto stop2;
            } done = FALSE;
            while ( !done ) {
                gotone = PeekMessage ( &msg, ( HWND ) NULL, 0, 0,
                                                        PM_REMOVE );
                if ( gotone ) {
                    if ( !hDlgCurrent || !IsDialogMessage ( hDlgCurrent,
60                                                          &msg ) ) {
                        if(!TranslateAccelerator(hWndMain, hAccel, &msg)) {
```

ATTORNEY DOCKET NO: VOYS2220WSW
wsw/voys/2220.001

- 235 -

```
                TranslateMessage ( &msg );
                DispatchMessage ( &msg );
            }
            if ( msg.message == WM_QUIT )
                done = TRUE;
        }
      }
    }
    retval = msg.wParam;
//stop1:
    /* remove timer */
    KillTimer ( hWndMain, timerID );

stop2:
    app_shutdown ( );

stop3:
    close ( debugfile );

if ( bAnyError )
        MessageBox( hWndMain, "Server cannot be started.\nPlease
                    see output debug file for more error message.",
                    SERVER_TITLE, MB_ICONSTOP | MB_OK );
stop4:
    return ( retval );

}   /* function WinMain */

/*******************************************/
```

ATTORNEY DOCKET NO: VOYS2220WSW
wsw/voys/2220.001

- 236 -

APPENDIX G
LD_Dial.c
Copyright 1992-1994 Voysys Corporation

```
/****************************************************
 *
 * Name:  LD_Dial.c
 *
 * Description:
 *     Line Driver layer for 4-channel Dialogic line card.
 *
 *     Accepts commands from InterProcess Communication layer and
 *     executes them on the Dialogic lines.
 *
 *     Supports Dialogic line card models D4x (D41B, D41D, D21D
 *     tested so far).
 *
 * $Log: /VoysAccess/core/ld/LD_DIAL.C $
 *
 ****************************************************/ include <ctype.h>
include <dos.h>
include <errno.h>
include <fcntl.h>
include <io.h>
include <sys\stat.h>
include <stdio.h>
include <stdlib.h>
include <string.h>
include <time.h>

// stuff from windows.h; needed for ld_Process_Event
// can't just include the file; would have conflict defining
struct      DCB     // Dialogic Control Block
typedef     unsigned long   DWORD;
typedef     unsigned int    UINT;
typedef     signed long     LONG;
typedef     UINT            WPARAM;
typedef     LONG            LPARAM;

define WM_TIMER        0x0113
define PROMPT_FEXT     "VOX"
define INDEX_FEXT      "VOI"

include "d40.h"
include "d40lib.h"
include "vfcns.h"

extern int      int_level;      /* software interrupt level */ include "OS.h"
include "dVR.h"
include "Command.h"
include "LD.h"
include "VR.h"

/********************************/
```

- 237 -

```c
define DO_SETXPARM         0

// after determining real lines, fill up array with fake lines ?
define DO_FAKE_LINES       0

/*********************************/

/* we number lines from 0 thru N-1; Dialogic numbers channels 1
                                                              thru N */
define CHANNEL(LINE)       ((LINE)+1)
define LINE(CHANNEL)       ((CHANNEL)-1)

/* actual number of lines present */
static
unsigned int nActualLines = 0;

/*********************************/

/* in-memory struct to access an indexed prompt file */
struct ifmap {
    int         ifhandle;       /* handle to indexed file */
    struct {
        char        fname[MAX_FN];  /* base file name */
        long        start;      /* starting byte in file */
        long        length;     /* length in bytes */
    } indextab[MAX_PHRASE];
    int         num_phrases;    /* number of phrases in indextab */
};

/* struct that specifies a play-list, to xplayf */
struct findex {
    int     type;           /* type of i/o transfer */
    int     FileHandle;     /* DOS file handle */
    long    BlockPosition;  /* offset of block relative to start
                                                        of file */
    long    BlockLength;    /* length of block */
};

/*********************************/ define     SET_TIMEOUT_TO(N)  lp->timeout = (N)

// Timeout for operations that should never fail.
// Actually, timeout for events that should come almost
// immediately; if they don't, something is broken.
define     TIMEOUT_FOR_BROKEN      (time_in_msec() + (10*1000))

// Timeout for N seconds from now.
define     TIMEOUT_FOR_SEC(N)      (time_in_msec() + ((N)*1000))

// Timeout after going on-hook.
// Makes sure that CO sees that we are on-hook.
// If we didn't wait, there is a chance that we would immediately
// try to initiate another call, and CO might see such a quick
// on-and-then-off-hook that it looks like a wink or something.
define     TIMEOUT_AFTER_ONHOOK    (time_in_msec() + (3*1000))

/*********************************/
```

- 238 -

```
        /*
         * Information about state of each active line.
         */
        struct line_t {
           boolean   bExists;    /* is this entry used for a line ? */
           int       nLineNum;   /* line number (0 to MAX_AL-1) */
           boolean   bConnected; /* is a client connected to line? */
           boolean   bCmdInProgress;    /* is there a cmd in progress? */
           int       nCmdStage;         /* current step of command being
                                                                  executed */
           struct command   cmd;     /* command that is in progress */
           struct event     event;   /* event being constructed */
           clock_t          timeout; /* if != 0, time to abort cmd */
           int              nMaxDTMF; /* end play or record if this many
                                                              digits received */
           int       nTempVRetVal; /* ultimate value of ep->result */
           boolean   bSendEvent;   /*event filled in; ready to return*/ int       num_events;   // number of queued events for line
20         struct {
              boolean    bIsWinEvent;   // is this a Windows event ?
              // fields for Windows event
              DWORD      dwMsg;
              DWORD      dwParam1;
25            DWORD      dwParam2;
              DWORD      dwDevice;
              // fields for Dialogic event
              int        nDialEvent;     // Dialogic event number
              int        nDialCallState; // Dialogic call state number
           } queued_ev[MAX_EVENTS_PER_LINE];
        #define    IS_AN_EVENT     (lp->num_events > 0)
        #define    NEXT_EVENT      (lp->queued_ev[0])
        #define    TIMEOUT_EVENT ((lp->queued_ev[0].bIsWinEvent)
                                 &&(lp->queued_ev[0].dwMsg == WM_TIMER))
        #define    REMOVE_EVENT    {int i; \
                                 for(i=0 ; i<(lp->num_events)-1 ; i++) \
                                    lp->queued_ev[i] = lp->queued_ev[i+1]; \
                                    lp->num_events--; }
        #define    REMOVE_ALL_EVENTS lp->num_events = 0
        #define    EVENTQ_FULL     (lp->num_events >=
                                                    MAX_EVENTS_PER_LINE)
        #define    ADD_EVENT(MSG,P1,P2,DEV)
        {lp->queued_ev[lp->num_events].bIsWinEvent = TRUE; \
                  lp->queued_ev[lp->num_events].dwMsg = (MSG); \
                  lp->queued_ev[lp->num_events].dwParam1 = (P1); \
                  lp->queued_ev[lp->num_events].dwParam2 = (P2); \
                  lp->queued_ev[lp->num_events].dwDevice = (DEV); \
                  lp->num_events++; }
        #define    ADD_DIALOGIC_EVENT(EV,CS) \
                  {lp->queued_ev[lp->num_events].bIsWinEvent =FALSE;\
                  lp->queued_ev[lp->num_events].nDialEvent = (EV); \
                  lp->queued_ev[lp->num_events].nDialCallState =
                                                              (CS); \
                  lp->num_events++; }
           boolean   bUserIsOffHook;  /* is user/caller off-hook ? */
           boolean   bCardIsOffHook;  /* card has line off-hook ? */
           boolean   silent;   /* for callout, is person silent ? */
        #if defined(E_W)                /* Windows */
60         // The following pointer variables should be initialized to
           // all zeros.
```

ATTORNEY DOCKET NO: VOYS2220WSW
wsw/voys/2220.001

- 239 -

```
            long    rwb_DosPointer;
            short   rwb_ProtectedSelector;
            long    rwb_ProtectedPointer;
            long    xrwb_DosPointer;
 5          short   xrwb_ProtectedSelector;
            long    xrwb_ProtectedPointer;
            long    fi_DosPointer;
            short   fi_ProtectedSelector;
            long    fi_ProtectedPointer;
10          long    dtmf_DosPointer;
            short   dtmf_ProtectedSelector;
            long    dtmf_ProtectedPointer;
            long    cpb_DosPointer;
            short   cpb_ProtectedSelector;
15          long    cpb_ProtectedPointer;
            long    csb_DosPointer;
            short   csb_ProtectedSelector;
            long    csb_ProtectedPointer;
       #endif
20          int     open_file;    /* for play/rec, voice file handle */
            struct findex Files_Index[MAX_PF];  /* for play, for playing
                                                              playlist */
            boolean close_after[MAX_PF]; /* close file after play
                                                              finishes */
25          boolean voice_has_ended;  /* for play/rec, voice data done?
                                                                    */
            boolean digits_have_ended;  /* for play/rec, DTMF string
                                                              done ? */
            struct ifmap ifile[MAX_IFILE]; /* for play, indexed voice
30                                                              files */
            int     num_openifile;  /* for play, num open indexed files
                                                                    */

/* stuff set from initplay, addplay, play commands */
35          struct pitem plist[MAX_PF];  /* play list items */
            int          plist_count;    /* num files in play list */
       };

static
struct line_t line[MAX_AL] = {0};

/* variables used by all functions in this file */
       /* they are set to point to current line[] */
       static struct line_t *lp = 0;  /* ptr to "line[aline_num]"
                                                             structure */
       static struct command *cp = 0;  /* ptr to "line[aline_num].cmd"
                                                              struct */
       static struct event *ep = 0;    /* ptr to "line[aline_num].event"
                                                              struct */
       /* buffers used for DTMF input */
       /* must be in global (can't be static ?) */
       /* must not be inside a structure */
       /* must be compiling program in large memory model */
       char    dial_dtmfbuf[MAX_AL][MAX_DIGITS + 1] = {0};

static
       boolean Initialized = FALSE;   /* ld_initialize called ? */

       #if defined(E_W)              /* Windows */
       /* variables for Check_For_Event */
```

ATTORNEY DOCKET NO: VOYS2220WSW
wsw/voys/2220.001

- 240 -

```
        long            cfe_DosPointer = 0L;
        short           cfe_ProtectedSelector = 0;
        long            cfe_ProtectedPointer = 0L;
        char            cDosMemErr[] = " failed to allocate DOS memory ";
5       #endif /*********************************/
        /* standard setting for Call Status Transition mask */
        #define   CEM_STANDARD   (C_LC + C_LCON + C_OFFH + C_ONH)

/* Dialogic channel status block LineState mask bits */
        #define   LS_WE_ON_HOOK      0x08/* we have the line on-hook */
        #define   LS_NO_RINGING      0x10/* no in-bound ring detected */
        #define   LS_LOOP_CURR_ON    0x20/* caller has the line on-hook*/
        #define   LS_DTMF_DETECTED   0x40/* DTMF detected */
        #define   LS_SILENCE_DETECTED   0x80/* silence detected */

        /*********************************/

// stuff to map Dialogic event numbers to names
        // dangerous: if numbering in d40.h changes, this is affected
        // will do limited sanity-check in ld_Initialize
        char    *DialEventNumToName[] = {
           "T_NOTERM",
           "T_MAXDT",
           "T_TERMDT",
           "T_STOP",
           "T_DOSERR",
           "T_MAXBYT",
           "T_HFAIL",
           "T_TIME",
           "T_OFFH",
           "T_DIAL",
           "T_SIL",
           "T_EOF",
           "T_LCTERM",
           "T_DFULL",
           "T_ONH",
           "15",
           "16",
           "T_MDTERM",
           "T_CATERM",
           "T_LCREV",
           "T_LC",
           "T_RING",
           "T_SILOFF",
           "T_SILON",
           "T_AMXCON",
           "T_AMXDIS",
           "T_LCON",
           "T_MAXRNG",
           "T_MCTERM",
           "T_MDTMF",
           "T_IDTIME",
           "T_NSIL",
           "T_BUFFUL",
           "T_BUFEMP",
           "T_EMSERR",
           "T_EMSLOW",
```

- 241 -

```
            "T_EMSHI",
            "T_STPARM",
            "T_WINK",
            "T_WKRECV",
            "T_DTMF",
            "T_TONEON",
            "T_TONEOFF",
            "T_BADTERM",
            "T_MTONEON",
            "T_MTONEOFF",
            "T_CAERROR",
            "T_TGERR",
            "T_TGCMPLT",
            "T_ADSIERR"
            };

    /***********************************************
     *  Find_Phrase_In_IFile  --  See if phrase can be obtained from
     an indexed file. Convert the play item if possible.
     ***********************************************/

    static
    void   Find_Phrase_In_IFile (
                struct pitem  * playitem    /* play item to convert */
                            )
    {
        int    ifile_num;   /* indexed file number (0 to
                                                    MAX_IFILE-1) */
        int    pcount;      /* phrase count */
        char   basename[MAX_FN]; /* base file name */

        /* extract base filename from full filename */
        fname_full_to_base (
                    playitem->fname,   /* input -- full filename */
                    basename           /* retval -- base fname */
                    );
        playitem->ifnum = ( -1 );    /* not found in ifile */ for ( ifile_num = 0; ifile_num < lp->num_openifile;
                                                    ifile_num++ ) {
            for ( pcount = 0; pcount <
                        lp->ifile[ifile_num].num_phrases; pcount++ ) {
                if ( strcmp ( basename,
                        lp->ifile[ifile_num].indextab[pcount].fname
                                                    ) == 0 ) {
                    /* found prompt in indexed file */
                    playitem->ifnum = ifile_num;
                    playitem->index = pcount;
                    return;
                }
            }
        }
        /* didn't find prompt in indexed file */
    }

60
```

ATTORNEY DOCKET NO: VOYS2220WSW
wsw/voys/2220.001

- 242 -

```c
/********************************************************
 * Get_Line_Status -- See if current line is on or off hook,
 * etc.
 ********************************************************/
static
int     Get_Line_Status ( CSB *lpCSB )
{
    CSB    My_csb;       /* Channel status block */
    int    nDialRetVal;  // Dialogic return value
    int    nVRetVal = 0;

/*
     * Get Channel Status
     */
if defined(E_W)                /* Windows */
    alloc_DOS_mem (
                    sizeof ( My_csb ),
                    &( lp->csb_DosPointer ),
                    &( lp->csb_ProtectedSelector ),
                    &( lp->csb_ProtectedPointer )
                  );
    if ( lp->csb_ProtectedSelector == 0 ) {
        nVRetVal = RC_RAMFULL;
        goto done;
    }
endif
    nDialRetVal = getcstat (                 /* Get Channel Status */
                    CHANNEL ( lp->nLineNum ),
if defined(E_W)
                    ( CSB * ) ( lp->csb_DosPointer )  /* Windows */
else
                    &My_csb
endif
                  );
if defined(E_W)                /* Windows */
    memcpy ( &My_csb, ( void * ) lp->csb_ProtectedPointer,
                                                sizeof ( My_csb ) );
    free_DOS_mem ( &(lp->csb_DosPointer),
                                    &(lp->csb_ProtectedSelector),
                                    &(lp->csb_ProtectedPointer) );
endif
    switch ( nDialRetVal ) {
        case 0:                 /* request complete */
            break;
        case 4:                 /* system not initialized */
        case 9:                 /* invalid channel number */
            nVRetVal = RC_BADLINE;
            break;
        default:                /* some unknown error */
            nVRetVal = RC_BADLINE;
            break;
    } done:
    *lpCSB = My_csb;
    return( nVRetVal );
}
```

ATTORNEY DOCKET NO: VOYS2220WSW
wsw/voys/2220.001

```
/***********************************************************
 *  Flush_All_DTMF  --  flush all DTMF on current line.
 ***********************************************************/
static
void    Flush_All_DTMF ( void )
{
    int     nDialRetVal;    // Dialogic return value /*
     * Flush all DTMF on this channel.
     */
    nDialRetVal = clrdtmf (
                    CHANNEL ( lp->nLineNum )
                    );

switch ( nDialRetVal ) {
        case E_SUCC:        /* Function was successful. */
        case E_NODT:        /* Dtmf buffer empty. */
            /* success */
            lp->bSendEvent = FALSE;
            break;
        case E_BADDL:       /* D4x hardware error. */
            ep->result = RC_BADLINE;
            lp->bSendEvent = TRUE;
            break;
        default:            /* some unknown error */
            ep->result = RC_INTERNALLINE;
            lp->bSendEvent = TRUE;
            break;
    }
}

/***********************************************************
 *  Set_Channel_Mask  --  set event mask on a line.
 ***********************************************************/
static
void    Set_Channel_Mask (
            int     mask,   /* event mask (sum of CEM_*'s) */
            int     rings   /* number of rings for inbound call */
            )
{
    int             nDialRetVal;    // Dialogic return value nDialRetVal = setcst (
                    CHANNEL ( lp->nLineNum ),
                    mask,
                    rings
                    );

switch ( nDialRetVal ) {
        case E_SUCC:        /* Function was successful. */
            /* success */
            lp->bSendEvent = FALSE;
            break;
        case E_BADDL:       /* D4x hardware error. */
            ep->result = RC_BADLINE;
            lp->bSendEvent = TRUE;
```

- 244 -

```
              break;
          default:              /* some unknown error */
              ep->result = RC_INTERNALLINE;
              lp->bSendEvent = TRUE;
              break;
       }
   }

/**********************************************************
 *  Check_User_Connection  --  check if user is still on-line
 **********************************************************/
static
int     Check_User_Connection(
                              )
{
    CSB    My_csb;
    int    nLineStatus;
    int    nDialRetVal;   // Dialogic return value nDialRetVal = Get_Line_Status( &My_csb );
    if ( nDialRetVal ) return( nDialRetVal );

nLineStatus = My_csb.linestat;
    if ( nLineStatus & LS_LOOP ) {
        Debug  ( 3, sprintf ( Debug_buf, "%d:
                LD_Dial/Check_User_Connection: user on hook
                                    (linestat = %x)", nLineStatus )
             );
        lp->bUserIsOffHook = FALSE;
        nDialRetVal = RC_USERONHOOK;
    }
    if ( nLineStatus & LS_HOOK ) {
        Debug ( 3, sprintf ( Debug_buf,
                 "%d:  LD_Dial/Check_User_Connection: card on hook
                                    (linestat = %x)", nLineStatus )
             );
        lp->bCardIsOffHook = FALSE;
        nDialRetVal = RC_CARDONHOOK;
    } return( nDialRetVal );
}

/**********************************************************
 *
 *  Macros that only work inside the Do*Command functions
 *
 **********************************************************/ define IF_NO_EVENT_THEN_BREAK   \
            if (!IS_AN_EVENT) \
                break;

define IF_TIMEOUT_THEN_INTERNALFAIL              \
            if (TIMEOUT_EVENT) {                  \
                REMOVE_EVENT;                     \
```

- 245 -

```
                    ep->result = RC_INTERNALLINE;      \
                    lp->bSendEvent = TRUE;              \
                    goto done;                          \
                }
    #define IF_WRONG_EVENT_THEN_INTERNALFAIL(EV)        \
                if (NEXT_EVENT.dwMsg != (EV)) {         \
                    REMOVE_EVENT;                       \
                    ep->result = RC_INTERNALLINE;       \
                    lp->bSendEvent = TRUE;              \
                    goto done;                          \
                } define IF_WINDOWS_EVENT_THEN_INTERNALFAIL          \
                if (NEXT_EVENT.bIsWinEvent) {           \
                    REMOVE_EVENT;                       \
                    ep->result = RC_INTERNALLINE;       \
                    lp->bSendEvent = TRUE;              \
                    goto done;                          \
                } define  REMOVE_TIMEOUT_EVENTS   {while (TRUE) {\
                    IF_NO_EVENT_THEN_BREAK;  \
                    if (!TIMEOUT_EVENT) break;  \
                    REMOVE_EVENT; } }

// stage value that means we want to abort the command
    #define   ABORT_STAGE      98
    // stage value that means we want to abort the command because of
    // server shutdown
    #define   SHUTDOWN_STAGE   99

/**********************************************************
    * Check_For_Event - see if driver has an event for any line.
    **********************************************************/
    static
    void   Check_For_Event (
                    boolean   *GotEvent
                    )
    {
        int       nDialRetVal;    // Dialogic return value
        int       nLineNum;       /* line number (0 to MAX_AL-1) */
        int       channel;
        int       nDialEvent;     // Dialogic event number
        int       nDialCallState;// Dialogic call state number
        char      info[80];       /* info message */
        EVTBLK    My_event;       /* event block */
        boolean   got_vr_event;

*GotEvent = FALSE;

nDialCallState = 0;

/* try to get an event */
    #if defined(E_W)
        if ( cfe_DosPointer == 0L ) {
            Debug ( 1, sprintf ( Debug_buf, "LD_Dial/Check_For_Event:
```

- 246 -

```
                                cfe_DosPointer corrupted" ) );
            goto done;
        }
    #endif
        nDialRetVal = gtevtblk (
    #if defined(E_W)
                            ( EVTBLK * ) cfe_DosPointer
    #else
                            &My_event
    #endif
                        );
    #if defined(E_W)
        memcpy ( &My_event, ( void * ) cfe_ProtectedPointer,
                                            sizeof ( My_event ) );
    #endif if ( nDialRetVal > 0 ) {
            /* "get event" function failed ! */
            Debug ( 1, sprintf ( Debug_buf, "LD_Dial/Check_For_Event: "
                                    gtevtblk() ret %d", nDialRetVal ) );
            goto done;
        }

/* if we didn't get a line event, check for a voice
         *      recognition event */ if ( nDialRetVal == 0 ) {
            vr_Check_For_Event (
                                &got_vr_event,
                                &nLineNum,
                                &nDialEvent,
                                &nDialCallState
                                );
        }

/* if we didn't get an event, return */
        if ( ( nDialRetVal == 0 ) && ( !got_vr_event ) )
            goto done;

/* we got an event, handle it */
        if ( nDialRetVal != 0 ) {
            nLineNum = LINE ( My_event.devchan );
            nDialEvent = My_event.evtcode;
            nDialCallState = My_event.evtdata;
        }               /* no else clause; already put info in
                         * variables */

/* if event for disallowed line, ignore */
        if ( nLineNum >= MAX_AL )
            goto done;

lp = &line[nLineNum];
        if ( Debug_flag > 2 ) {
            if ( ( nDialEvent == T_SILOFF )
                || ( nDialEvent == T_SILON )
                || ( nDialEvent == T_LCON )
                || ( nDialEvent == T_LC )
                || ( nDialEvent == T_DTMF )
                || ( nDialEvent == T_DOSERR )
                || ( nDialEvent == T_CATERM ) )
                sprintf (
```

ATTORNEY DOCKET NO: VOYS2220WSW
wsw/voys/2220.001

```
                                - 247 -
                            info,
                            "received Dialogic event %d ('%s') callstate %d",
                            nDialEvent,
                            DialEventNumToName[nDialEvent],
                            nDialCallState
                        );
                else
                    sprintf (
                            info,
                            "received Dialogic event %d ('%s')",
                            nDialEvent,
                            DialEventNumToName[nDialEvent]
                        );
            }
        if ( nLineNum >= ( int ) nActualLines ) {
            if ( Debug_flag > 0 ) {
                sprintf (
                        info,
                        "received Dialogic event %d from out-of-range
                                                             channel %d",
                        nDialEvent,
                        channel
                        );
            }
            goto done;
        }
        /* check for illegal event number */
        else if (
                ((nDialEvent < T_VR_FIRST) || (nDialEvent > T_VR_LAST))
            && ((nDialEvent < T_NOTERM) || (nDialEvent > MAXTERM))) {
            if ( Debug_flag > 0 ) {
                sprintf (
                        info,
                        "received out-of-range Dialogic event %d",
                        nDialEvent
                    );
            }
            goto done;
        } else {
            /* events that tell whether caller is on- or off-hook;
    don't pass in */
            if ( nDialEvent == T_LC ) {
                /* call_state gives duration in 10 ms ticks */
                /* on-hook for more than 4.8 seconds ? */
                if ( nDialCallState > 480 )
                    lp->bUserIsOffHook = FALSE;
            }
            else if ( nDialEvent == T_LCON )
                ;                   /* do nothing */
            else {
                if ( nDialEvent == T_ONH )
                    lp->bCardIsOffHook = FALSE;
                /* put info into line[] array */
                ADD_DIALOGIC_EVENT(nDialEvent,nDialCallState)
                *GotEvent = TRUE;
                goto done;
            }
            goto done;
60      }
```

ATTORNEY DOCKET NO: VOYS2220WSW
wsw/voys/2220.001

- 248 -

```
    done:
        return;
    }

/*********************************************************
     *
     * Set_End_Conditions  --  Check and set up end conditions for
     *   play or record, according to spec in command.
     *
     *********************************************************/
    static
    void Set_End_Conditions (
        void
    )
    {
        char    cstr[2];

if (
             ( cp->end_voice_on_any_digit && cp->end_voice_on_digit_end )
          || ( cp->end_oper_on_any_digit && cp->end_oper_on_digit_end )
                                                                   ) {
           Debug ( 4, sprintf ( Debug_buf,
                   "LD_Dial/Set_End_Conditions: bad digit mixture" ) );
           ep->result = RC_BADCOMMAND;
           lp->bSendEvent = TRUE;
           goto done;
        }
        if ( cp->max_digits < 0 ) {
           ep->result = RC_BADMAXDIGS;
           lp->bSendEvent = TRUE;
           goto done;
        }
        if ( cp->end_voice_on_digit_end ) {
           /* if end_digit is not valid, error */
           cstr[0] = cp->end_digit;
           cstr[1] = '\0';
           if ( strpbrk ( "#*0123456789", ( char * ) cstr ) == NULL){
               ep->result = RC_BADCOMMAND;
               lp->bSendEvent = TRUE;
               goto done;
           }
        }

/* tricky:  0==unlimited(MAX_DIGITS); also handle too big */
        lp->nMaxDTMF =
                    ( ( ( cp->max_digits == 0 ) || ( cp->max_digits >
                        MAX_DIGITS ) ) ? MAX_DIGITS : cp->max_digits );

done:
        return;
    }   /* function Set_End_Conditions */

/*********************************************************
     *
     * DoPlayCommand  --  Play the playlist associated with the
```

```
 *       current line.
 *
 ************************************************/ static
void DoPlayCommand (void)
{
    int     ifile_num;      // indexed file number (0 to
                                                    MAX_IFILE-1)
    int     pcount;         // phrase count
    RWB     My_xrwb;        // read/write block
    RWB     My_rwb;         // read/write block
    int     item;
    long    size;           // file size, for single-prompt file
    struct  findex far *fptr;
    int     nDialRetVal;    // Dialogic return value
    int     nDialEvent;     // Dialogic event number switch (lp->nCmdStage) { case 0:             // start of command
            ep->nEvent = EV_PLAY;
            ep->string[0] = '\0';
            /*
             * Do error-checking.
             */
            if ( lp->plist_count == 0 ) {
                ep->result = RC_EMPTYPLIST;
                lp->bSendEvent = TRUE;
                goto done;
            }
            if ( !lp->bCardIsOffHook ) {
                ep->result = RC_CARDONHOOK;
                lp->bSendEvent = TRUE;
                goto done;
            }
            if ( !lp->bUserIsOffHook ) {
                ep->result = RC_USERONHOOK;
                lp->bSendEvent = TRUE;
                goto done;
            }

/*
            nDialRetVal = Check_User_Connection();
            if ( nDialRetVal ) {
                ep->result = nDialRetVal;
                lp->bSendEvent = TRUE;
                goto done;
            }
            */

Set_End_Conditions ( );
            if ( lp->bSendEvent )
                goto done;

if ( cp->flush_digits_at_start ) {
                Flush_All_DTMF ( );
                if ( lp->bSendEvent )
                    goto done;
            }
```

- 250 -

```c
/*
 * Build play-list in lp->Files_Index[].
 */
for ( item = 0; item < lp->plist_count; item++ ) {
    /* see if play-item is indexed file or
                            single-prompt file */
    ifile_num = lp->plist[item].ifnum;
    pcount = lp->plist[item].index;
    if ( ifile_num >= 0 ) {
        /* indexed file */
        lp->Files_Index[item].type = 0;
        lp->Files_Index[item].FileHandle =
            lp->ifile[ifile_num].ifhandle;
        lp->Files_Index[item].BlockPosition =
            lp->ifile[ifile_num].indextab[pcount].start;
        lp->Files_Index[item].BlockLength =
            lp->ifile[ifile_num].indextab[pcount].length;
        lp->close_after[item] = FALSE;
    } else {
        /* single-prompt file */
        /* open the file */
        lp->Files_Index[item].FileHandle = open (
            lp->plist[item].fname, O_BINARY | O_RDONLY );
        if ( lp->Files_Index[item].FileHandle < 0 ) {
            ep->result = RC_NOFILE;
            ep->C_error = errno;
            ep->DOS_error = _doserrno;
            Debug ( 3, sprintf ( Debug_buf,
                "LD_Dial/DoPlayCommand: open failed %d",
                lp->Files_Index[item].FileHandle ) );
            /* close all files (except indexed files) in list */
            while ( --item >= 0 )
                if ( lp->close_after[item] )
                    close (
                        lp->Files_Index[item].FileHandle );
            lp->bSendEvent = TRUE;
            goto done;
        }
        lp->Files_Index[item].type = 0;
        lp->Files_Index[item].BlockPosition = 0;
        size = lseek (
                lp->Files_Index[item].FileHandle,
                0L,
                SEEK_END
                );
        if ( size < 0 ) {
            ep->result = RC_BADFILE;
            ep->C_error = errno;
            ep->DOS_error = _doserrno;
            /* close all files (except indexed files) in list */
            while ( --item >= 0 )
                if ( lp->close_after[item] )
                    close (
                        lp->Files_Index[item].FileHandle );
            lp->bSendEvent = TRUE;
            goto done;
        }
        lp->Files_Index[item].BlockLength = size;
        lp->close_after[item] = TRUE;
    }
}
```

ATTORNEY DOCKET NO: VOYS2220WSW
wsw/voys/2220.001

- 251 -

```
                    lp->Files_Index[lp->plist_count].BlockPosition = (-1);
                    lp->Files_Index[lp->plist_count].BlockLength = ( -1 );

/*
                     * Build read/write Block.
                     */
                    clrrwb ( &My_rwb );
    #if defined(E_W)           /* Windows */
                    alloc_DOS_mem (
                        ((lp->plist_count + 1 ) * sizeof ( struct findex)),
                        &( lp->fi_DosPointer ),
                        &( lp->fi_ProtectedSelector ),
                        &( lp->fi_ProtectedPointer )
                        );
                    if ( lp->fi_ProtectedSelector == 0 ) {
                        ep->result = RC_RAMFULL;
                        lp->bSendEvent = TRUE;
                        goto done;
                    }
                    memcpy (
                        ( void * ) lp->fi_ProtectedPointer,/* dest */
                        ( void * ) lp->Files_Index,        /* source */
                        ((lp->plist_count + 1 ) * sizeof ( struct findex))
                        );
                    fptr = ( void * ) ( lp->fi_DosPointer );
    #else
                    fptr = lp->Files_Index;
    #endif
                    My_rwb.indexseg = FP_SEG ( fptr );
                    My_rwb.indexoff = FP_OFF ( fptr );

/* set parameters */
                    if ( cp->end_voice_on_any_digit )
                        My_rwb.termdtmf = '@';
                    else if ( cp->end_voice_on_digit_end )
                        My_rwb.termdtmf = cp->end_digit;
                    else
                        My_rwb.termdtmf = '\0';
                    My_rwb.maxdtmf = lp->nMaxDTMF;
                    My_rwb.rwbflags = 0;
                    My_rwb.loopsig = 1;   /* terminate on hangup */
    #if defined(E_W)           /* Windows */
                    alloc_DOS_mem (
                            sizeof ( My_rwb ),
                            &( lp->rwb_DosPointer ),
                            &( lp->rwb_ProtectedSelector ),
                            &( lp->rwb_ProtectedPointer )
                        );
                    if ( lp->rwb_ProtectedSelector == 0 ) {
                        ep->result = RC_RAMFULL;
                        lp->bSendEvent = TRUE;
                        goto done;
                    }
                    memcpy ( ( void * ) lp->rwb_ProtectedPointer,
                                 ( void * ) &My_rwb, sizeof ( My_rwb ) );
    #endif /*
                     * Start playing play-list.
                     */
                    nDialRetVal = xplayf (
```

ATTORNEY DOCKET NO: VOYS2220WSW
wsw/voys/2220.001

```
                                            - 252 -

CHANNEL ( lp->nLineNum ),
                                    ( PM_FILES | PM_NDX ),
        #if defined(E_W)                                    /* Windows */
                                    ( RWB * ) lp->rwb_DosPointer
        #else                                               /* non-Windows */
                                    &My_rwb
        #endif
                          );
                  switch ( nDialRetVal ) {
                      case E_SUCC:   /* Function was successful. */
                          break;
                      case E_BADDL:  /* D4x hardware error. */
                          ep->result = RC_BADLINE;
                          lp->bSendEvent = TRUE;
                          goto done;
                      case E_BADPAR:    /* Bad parameter. */
                          ep->result = RC_INTERNAL;
                          lp->bSendEvent = TRUE;
                          goto done;
20                    default:       /* some unknown error */
                          ep->result = RC_INTERNALLINE;
                          lp->bSendEvent = TRUE;
                          goto done;
                  }
                  lp->voice_has_ended = FALSE;
                  lp->digits_have_ended = FALSE;
                  lp->nCmdStage = 1;
                  break;

             case 1:            /* we expect an end-of-playing event */
                  IF_NO_EVENT_THEN_BREAK;
                  IF_WINDOWS_EVENT_THEN_INTERNALFAIL;
                  nDialEvent = NEXT_EVENT.nDialEvent;
                  REMOVE_EVENT;
                  switch ( nDialEvent ) {
                      case T_SILOFF:   /* Silence off. */
                      case T_SILON:    /* Silence on. */
                          goto done;   // ignore; remain in same state
                  }
             /* close all files (except indexed files) in play-list */
                  for ( item = 0; item < lp->plist_count; item++ )
                      if ( lp->close_after[item] )
                          close ( lp->Files_Index[item].FileHandle );
        #if defined(E_W)
                  free_DOS_mem ( &(lp->fi_DosPointer),
                                        &(lp->fi_ProtectedSelector),
                                        &(lp->fi_ProtectedPointer) );
                  free_DOS_mem ( &(lp->rwb_DosPointer),
                                        &(lp->rwb_ProtectedSelector),
                                        &(lp->rwb_ProtectedPointer) );
        #endif
                  switch ( nDialEvent ) {
                      case T_MAXDT: /* Maximum DTMF digits received. */
                      case T_TERMDT:/* Terminating DTMF digit received.
                                                                      */
                      case T_MDTMF: /* Terminated by masked DTMF digit
                                                                      */
                          lp->nTempVRetVal = RC_ENDFLAG;
                          break;
                      case T_EOF:       /* Eof reached on playback. */
                          // Get_Line_Status();
```

- 253 -

```
                lp->nTempVRetVal = RC_SUCCEED;
                break;
            case T_LCTERM:    /* Terminate by drop in loop
                                                    signal */
                ep->result = RC_USERHUNGUP;
    // don't bother getting any digits they may have entered (?)
                lp->bSendEvent = TRUE;
                goto done;
            case T_STOP:    /* Rec/play/getdtmf stopped. */
            case T_HFAIL:   /* Hardware failure. */
                ep->result = RC_BADLINE;
                lp->bSendEvent = TRUE;
                goto done;
            default:         /* some unknown event */
                ep->result = RC_INTERNALLINE;
                lp->bSendEvent = TRUE;
                goto done;
        }
        if ( !cp->get_digits_at_end ) {
            ep->result = lp->nTempVRetVal;
            lp->bSendEvent = TRUE;
            goto done;
        }

// get digits
        clrxrwb ( &My_xrwb );
        /* set parameters */
        if ( cp->end_oper_on_any_digit )
            My_xrwb.termdtmf = '@';
        else if ( cp->end_oper_on_digit_end )
            My_xrwb.termdtmf = cp->end_digit;
        else
            My_xrwb.termdtmf = '\0';
/* tricky:  0==unlimited(MAX_DIGITS); also handle too big */
        My_xrwb.maxdtmf = lp->nMaxDTMF;
        My_xrwb.isxrwb = 1;
        cp->total_timeout = SEC_TO_MSEC ( 1 );/* don't wait */
        My_xrwb.maxsec = ( word ) MSEC_TO_SEC (
                                            cp->total_timeout );
        /*
         * maxsil == add up all silence between digits -- not
         *    what we want
         */
        /* My_xrwb.maxsil = MSEC_TO_SEC(cp->start_timeout); */
        My_xrwb.intrdig = ( byte ) MSEC_TO_SEC (
                                            cp->interdigit_to );
        My_xrwb.rwbflags = 0;

My_xrwb.loopsig = 1;  /* terminate on hangup */
if defined(E_W)                /* Windows */
        alloc_DOS_mem (
                    MAX_DIGITS + 1,
                    &( lp->dtmf_DosPointer ),
                    &( lp->dtmf_ProtectedSelector ),
                    &( lp->dtmf_ProtectedPointer )
                );
        if ( lp->dtmf_ProtectedSelector == 0 ) {
            ep->result = RC_RAMFULL;
            lp->bSendEvent = TRUE;
            goto done;
```

```
                    }
                    fptr = ( void * ) lp->dtmf_DosPointer;
else
                    fptr = dial_dtmfbuf[lp->nLineNum];
endif
                    My_xrwb.xferseg = FP_SEG ( fptr );
                    My_xrwb.xferoff = FP_OFF ( fptr );
                    My_xrwb.maxbyteh = 0;
                    My_xrwb.maxbyte = MAX_DIGITS;
if defined(E_W)            /* Windows */
                    alloc_DOS_mem (
                            sizeof ( My_xrwb ),
                            &( lp->xrwb_DosPointer ),
                            &( lp->xrwb_ProtectedSelector ),
                            &( lp->xrwb_ProtectedPointer )
                        );
                    if ( lp->xrwb_ProtectedSelector == 0 ) {
                        ep->result = RC_RAMFULL;
                        lp->bSendEvent = TRUE;
                        goto done;
                    }
                    memcpy ( ( void * ) lp->xrwb_ProtectedPointer,
                             ( void * ) &My_xrwb, sizeof ( My_xrwb ) );
endif
                    /* start recording data */
                    nDialRetVal = getdtmfs (
                            CHANNEL ( lp->nLineNum ),
if defined(E_W)
                            ( RWB * ) lp->xrwb_DosPointer   /* Windows */
else
                            &My_xrwb    /* non-Windows */
endif
                        );
                    switch ( nDialRetVal ) {
                        case E_SUCC:    /* Function was successful. */
                            break;
                        default:        /* some unknown error */
                            ep->result = RC_INTERNALLINE;
                            lp->bSendEvent = TRUE;
                            goto done;
                    }
                    /* now wait until we get an event */
                    lp->nCmdStage = 2;
                    goto done;

case 2:     /* we expect an end-of-input event */
                    IF_NO_EVENT_THEN_BREAK;
                    IF_WINDOWS_EVENT_THEN_INTERNALFAIL;
                    nDialEvent = NEXT_EVENT.nDialEvent;
                    REMOVE_EVENT;
                    switch ( nDialEvent ) {
                        case T_SILOFF:  /* Silence off. */
                        case T_SILON:   /* Silence on. */
                            goto done;  // ignore; remain in same state
                    }
if defined(E_W)
                    memcpy ( dial_dtmfbuf[lp - line], ( void * )
                                                    lp->dtmf_ProtectedPointer,
                                                    MAX_DIGITS + 1 );
                    free_DOS_mem ( &(lp->xrwb_DosPointer),
                                    &(lp->xrwb_ProtectedSelector),
```

- 255 -

```
                                            &(lp->xrwb_ProtectedPointer) );
                        free_DOS_mem ( &(lp->dtmf_DosPointer),
                                            &(lp->dtmf_ProtectedSelector),
                                            &(lp->dtmf_ProtectedPointer) );
endif
                    switch ( nDialEvent ) {
                        case T_MAXDT:  /* Maximum DTMF digits received. */
                            ep->result = RC_DATALENGTH;
                            strcpy ( ep->string, dial_dtmfbuf[lp - line] );
                            lp->bSendEvent = TRUE;
                            goto done;
                        case T_TERMDT:    /* Terminating DTMF digit
                                                            received. */
                        case T_MDTMF: /* Terminated by masked DTMF digit*/
                            ep->result = RC_ENDFLAG;
                            strcpy ( ep->string, dial_dtmfbuf[lp - line] );
                            lp->bSendEvent = TRUE;
                            goto done;
                        case T_TIME:   /* Rec/play/getdtmf timed out. */
                        case T_SIL:       /* Maximum silence received. */
                        case T_IDTIME:    /* Interdigit delay exceeded. */
                            strcpy ( ep->string, dial_dtmfbuf[lp - line] );
                            if ( ep->string[0] == '\0' )
                                ep->result = RC_STARTTIMEOUT;
                            else
                                ep->result = RC_INTERDIGITTIMEOUT;
                            lp->bSendEvent = TRUE;
                            goto done;
                        case T_LCTERM:    /* Terminate by drop in loop
                                                    signal */
                            ep->result = RC_USERHUNGUP;
                            strcpy ( ep->string, dial_dtmfbuf[lp - line] );
                            lp->bSendEvent = TRUE;
                            goto done;
                        case T_STOP:   /* Rec/play/getdtmf stopped. */
                        case T_HFAIL: /* Hardware failure. */
                            ep->result = RC_BADLINE;
                            lp->bSendEvent = TRUE;
                            goto done;
                        default:          /* some unknown event */
                            ep->result = RC_INTERNALLINE;
                            lp->bSendEvent = TRUE;
                            goto done;
                    }
                    /* never get here */
                    break;

case SHUTDOWN_STAGE: // server is shutting down
                    ep->result = RC_SERVERSHUTDOWN;
                    lp->bSendEvent = TRUE;
                    goto done;

default:        // unknown command stage
                    ep->result = RC_INTERNAL;
                    lp->bSendEvent = TRUE;
                    goto done;
            } done:
            // if complete, check to see if we have to do clean up
            if (lp->bSendEvent) {
```

- 256 -

```
            // If exception happens while we are processing command,
            // free allocated DOS memory blocks.  If the pointer
            // variables point to zeros, free_DOS_mem() will just
            // return without doing anything.
            free_DOS_mem ( &(lp->fi_DosPointer),
                                        &(lp->fi_ProtectedSelector),
                                        &(lp->fi_ProtectedPointer) );
            free_DOS_mem ( &(lp->rwb_DosPointer),
                                        &(lp->rwb_ProtectedSelector),
                                        &(lp->rwb_ProtectedPointer) );
            free_DOS_mem ( &(lp->xrwb_DosPointer),
                                        &(lp->xrwb_ProtectedSelector),
                                        &(lp->xrwb_ProtectedPointer) );
            free_DOS_mem ( &(lp->dtmf_DosPointer),
                                        &(lp->dtmf_ProtectedSelector),
                                        &(lp->dtmf_ProtectedPointer) );
    }
    return;
}       // end function (DoPlayCommand)

/************************************************************
 *
 *  DoHangupCommand  --  Hang up the current line.
 *
 ************************************************************/
static
void DoHangupCommand (void)
{
    int     nDialRetVal;    // Dialogic return value
    int     nDialEvent;     // Dialogic event number switch (lp->nCmdStage) { case 0:             /* start of command */
            REMOVE_ALL_EVENTS;
            ep->nEvent = EV_HUNGUP;
            if ( !lp->bCardIsOffHook ) {
                ep->result = RC_CARDONHOOK;
                lp->bSendEvent = TRUE;
                goto done;
            }

/*
             * Ask channel to go on-hook.
             */
            nDialRetVal = sethook (
                            CHANNEL ( lp->nLineNum ),
                            H_ONH
                        );

switch ( nDialRetVal ) {
                case E_SUCC:    /* Function was successful. */
                    /* success */
                    break;
                case E_BADDL:   /* D4x hardware error. */
                    ep->result = RC_BADLINE;
```

```
                    lp->bSendEvent = TRUE;
                    goto done;
                default:/* some unknown error */
                    ep->result = RC_INTERNALLINE;
                    lp->bSendEvent = TRUE;
                    goto done;
            }
            lp->nCmdStage = 1;
            /* now wait until we get an on-hook-complete event */
            goto done;

case 1:
            IF_NO_EVENT_THEN_BREAK;
            IF_WINDOWS_EVENT_THEN_INTERNALFAIL;
            nDialEvent = NEXT_EVENT.nDialEvent;
            REMOVE_EVENT;
            switch ( nDialEvent ) {
                case T_SILOFF:  /* Silence off. */
                case T_SILON:   /* Silence on. */
                    goto done;  // ignore; remain in same state
                case T_ONH:     /* Onhook complete. */
                    break;
                default:        /* some unknown event */
                    ep->result = RC_INTERNALLINE;
                    lp->bSendEvent = TRUE;
                    goto done;
            }
            // hung up successfully
            // wait a few seconds to make sure CO sees we are hung up
            lp->timeout = TIMEOUT_AFTER_ONHOOK;
            REMOVE_TIMEOUT_EVENTS;
            lp->nCmdStage = 2;
            /* now wait until we get a timeout event */
            goto done;

case 2:
            IF_NO_EVENT_THEN_BREAK;
            if (!TIMEOUT_EVENT) {
                REMOVE_EVENT;
                // ignore it and keep waiting
                goto done;
            }
            REMOVE_EVENT;
            /* make assumption */
            lp->bUserIsOffHook = FALSE;
            /* success */
            lp->bCardIsOffHook = FALSE;
            ep->result = RC_SUCCEED;
            lp->bSendEvent = TRUE;
            goto done;

case SHUTDOWN_STAGE:  // server is shutting down
            ep->result = RC_SERVERSHUTDOWN;
            lp->bSendEvent = TRUE;
            goto done;

default:        // unknown command stage
            ep->result = RC_INTERNAL;
            lp->bSendEvent = TRUE;
            goto done;
    }
```

```
    done:
        return;
    }       // end function (DoHangupCommand)

/************************************************************
 *
 * DoSendDTMFCommand  --  Send DTMF digits out on the current
 *      line.
 *
 ***********************************************************/ static
void DoSendDTMFCommand (void)
{
    int     nDialRetVal;    // Dialogic return value
    char    *ptr;
    int     nDialEvent;     // Dialogic event number
if defined(E_W)            // Windows */
    long    call_DosPointer = 0L;
    short   call_ProtectedSelector = 0;
    long    call_ProtectedPointer = 0L;
endif switch (lp->nCmdStage) { case 0:             /* start of command */
            ep->nEvent = EV_SENTDTMF;
            if ( !lp->bCardIsOffHook ) {
                ep->result = RC_CARDONHOOK;
                lp->bSendEvent = TRUE;
                goto done;
            }
            if ( !lp->bUserIsOffHook ) {
                ep->result = RC_USERONHOOK;
                lp->bSendEvent = TRUE;
                goto done;
            }
            /*
            nDialRetVal = Check_User_Connection();
            if ( nDialRetVal ) {
                ep->result = nDialRetVal;
                lp->bSendEvent = TRUE;
                goto done;
            }
            */

/*
             * Convert string to dial from Hayes format to Dialogic.
             */
            ptr = cp->string;
            while ( *ptr != '\0' ) {
                if ( *ptr == 'A' )
                    *ptr = 'a';
                else if ( *ptr == 'B' )
                    *ptr = 'b';
                else if ( *ptr == 'C' )
                    *ptr = 'c';
                else if ( *ptr == 'D' )
                    *ptr = 'd';
                else if ( *ptr == '!' )
```

- 259 -

```
                *ptr = '&';
            ptr++;
        }
        /*
         * Ask channel to send digits
         */
if defined(E_W)                /* Windows */
        alloc_DOS_mem (
                        strlen ( cp->string ) + 1,
                        &call_DosPointer,
                        &call_ProtectedSelector,
                        &call_ProtectedPointer
                );
        if ( call_ProtectedSelector == 0 ) {
            ep->result = RC_RAMFULL;
            lp->bSendEvent = TRUE;
            goto done;
        }
        memcpy (
                ( void * ) call_ProtectedPointer,  /* dest */
                ( void * ) cp->string,   /* source */
                strlen ( cp->string ) + 1
            );
endif
        nDialRetVal = dial (
                    CHANNEL ( lp->nLineNum ),
if defined(E_W)
                    ( void * ) call_DosPointer
else
                    cp->string   /* dial string */
endif
                );
if defined(E_W)                /* Windows */
        free_DOS_mem ( &call_DosPointer,
                        &call_ProtectedSelector,
                        &call_ProtectedPointer );
endif
        switch ( nDialRetVal ) {
            case E_SUCC:   /* Function was successful. */
                /* success */
                break;
            case E_BADDL:  /* D4x hardware error. */
                ep->result = RC_BADLINE;
                lp->bSendEvent = TRUE;
                goto done;
            default:/* some unknown error */
                ep->result = RC_INTERNALLINE;
                lp->bSendEvent = TRUE;
                goto done;
        }
        lp->nCmdStage = 1;
        /* now wait until we get an event */
        goto done;

case 1:        /* we expect a digit-string-dialed event */
        IF_NO_EVENT_THEN_BREAK;
        IF_WINDOWS_EVENT_THEN_INTERNALFAIL;
        nDialEvent = NEXT_EVENT.nDialEvent;
        REMOVE_EVENT;
```

- 260 -

```
                switch ( nDialEvent ) {
                    case T_SILOFF:    /* Silence off. */
                    case T_SILON: /* Silence on. */
                        goto done;    // ignore; remain in same state
                    case T_DIAL:  /* Dialing complete. */
                        /* success */
                        ep->result = RC_SUCCEED;
                        lp->bSendEvent = TRUE;
                        goto done;
10                  default:/* some unknown event */
                        ep->result = RC_INTERNALLINE;
                        lp->bSendEvent = TRUE;
                        goto done;
                }
15              /* never get here */
                break;

case SHUTDOWN_STAGE:  // server is shutting down
                ep->result = RC_SERVERSHUTDOWN;
20              lp->bSendEvent = TRUE;
                goto done;

default:       // unknown command stage
                ep->result = RC_INTERNAL;
25              lp->bSendEvent = TRUE;
                goto done;
        } done:
30      // if complete, check to see if we have to do clean up
        if (lp->bSendEvent) {
            // do something here !!!
        }
        return;
    }       // end function (DoSendDTMFCommand)

/********************************************************
    *
    * DoCallOutCommand  --  Dial out on the current line.
    *
    ********************************************************/

    static
    void DoCallOutCommand (void)
    {
        CPB     My_cpb;            // Channel parameters
        CAR     My_car;            // Call Analysis Results
        int     nDialRetVal;       // Dialogic return value
        char    *ptr;
        int     nDialEvent;        // Dialogic event number
        int     nDialCallState;    // Dialogic call state number
    #if defined(E_W)               // Windows */
        long    call_DosPointer = 0L;
        short   call_ProtectedSelector = 0;
        long    call_ProtectedPointer = 0L;
    #endif
60
        switch (lp->nCmdStage) {
```

ATTORNEY DOCKET NO: VOYS2220WSW
wsw/voys/2220.001

- 261 -

```
            case 0:       // start of command
                REMOVE_ALL_EVENTS;
                ep->nEvent = EV_CALLOUT;
                ep->voice_after_answer = 0;
                lp->silent = TRUE;
                if ( lp->bCardIsOffHook ) {
                    ep->result = RC_CARDOFFHOOK;
                    lp->bSendEvent = TRUE;
                    goto done;
                }

/*
                 * Convert string to dial from Hayes format to
                 *      Dialogic.
                 * Note: Dialogic doesn't support "wait for dial-tone"
                 */
                ptr = cp->string;
                while ( *ptr != '\0' ) {
                    if ( *ptr == 'A' )
                        *ptr = 'a';
                    else if ( *ptr == 'B' )
                        *ptr = 'b';
                    else if ( *ptr == 'C' )
                        *ptr = 'c';
                    else if ( *ptr == 'D' )
                        *ptr = 'd';
                    else if ( *ptr == '!' )
                        *ptr = '&';
                    /* turn "wait for dial-tone" into "pause" */
                    else if ( *ptr == 'W' )
                        *ptr = ',';
                    ptr++;
                }

/* set channel parameters */
                Set_Channel_Mask ( ( C_SILOFF + C_SILON + C_LC +
                                                    C_LCON ), 1 );
                if ( lp->bSendEvent )
                    goto done;
                clrcpb ( &My_cpb );
                /* after this many RINGBACKs, give up */
                My_cpb.nbrdna = cp->answer_rings;
                My_cpb.ansrdgl = 150;
    #if defined(E_W)              /* Windows */
                alloc_DOS_mem (
                            sizeof ( My_cpb ),
                            &( lp->cpb_DosPointer ),
                            &( lp->cpb_ProtectedSelector ),
                            &( lp->cpb_ProtectedPointer )
                        );
                if ( lp->cpb_ProtectedSelector == 0 ) {
                    Debug (
                        3, sprintf ( Debug_buf,
                        "LD_Dial/DoCallOutCommand:%s(PCB, %d bytes)",
                        cDosMemErr, sizeof ( My_cpb ) )
                        );
                    ep->result = RC_RAMFULL;
                    lp->bSendEvent = TRUE;
                    goto done;
                }
                memcpy (
```

ATTORNEY DOCKET NO: VOYS2220WSW
wsw/voys/2220.001

- 262 -

```
                        ( void * ) lp->cpb_ProtectedPointer, /*dest */
                        ( void * ) &My_cpb,   /* source */
                        sizeof ( My_cpb )
                        );
    #endif
            nDialRetVal = setcparm (
                    CHANNEL ( lp->nLineNum ),
    #if defined(E_W)
                    ( void * ) lp->cpb_DosPointer    /* Windows */
    #else
                    &My_cpb
    #endif
                    );

15  #if defined(E_W)
            free_DOS_mem ( &(lp->cpb_DosPointer),
                                    &(lp->cpb_ProtectedSelector),
                                    &(lp->cpb_ProtectedPointer) );
    #endif
20          switch ( nDialRetVal ) {
                case E_SUCC:   /* Function was successful. */
                    /* success */
                    break;
                case E_BADDL: /* D4x hardware error. */
25                  ep->result = RC_BADLINE;
                    lp->bSendEvent = TRUE;
                    goto done;
                default:/* some unknown error */
                    ep->result = RC_INTERNALLINE;
30                  lp->bSendEvent = TRUE;
                    goto done;
            }

/*
             * Ask channel to call out
             */
    #if defined(E_W)              /* Windows */
            alloc_DOS_mem (
                    strlen ( cp->string ) + 1,
                    &call_DosPointer,
                    &call_ProtectedSelector,
                    &call_ProtectedPointer
                    );
            if ( call_ProtectedSelector == 0 ) {
45              ep->result = RC_RAMFULL;
                lp->bSendEvent = TRUE;
                goto done;
            }
            memcpy (
50              ( void * ) call_ProtectedPointer,   /* dest */
                ( void * ) cp->string,   /* source */
                strlen ( cp->string ) + 1
                );
    #endif
            nDialRetVal = callp (
                    CHANNEL ( lp->nLineNum ),
    #if defined(E_W)
                    ( void * ) call_DosPointer
    #else
60                  cp->string /* dial string */
    #endif
```

- 263 -

```
                );
if defined(E_W)            /* Windows */
        free_DOS_mem ( &call_DosPointer,
                                    &call_ProtectedSelector,
                                    &call_ProtectedPointer );
endif
        switch ( nDialRetVal ) {
            case E_SUCC:    /* Function was successful. */
                /* success */
                break;
            case E_BADDL:   /* D4x hardware error. */
                ep->result = RC_BADLINE;
                lp->bSendEvent = TRUE;
                goto done;
            default:/* some unknown error */
                ep->result = RC_INTERNALLINE;
                lp->bSendEvent = TRUE;
                goto done;
        }
        lp->nCmdStage = 1;
        /* now wait until we get a call-answered event */
        goto done;

case 1:             /* we expect a call-answered event */
        IF_NO_EVENT_THEN_BREAK;
        IF_WINDOWS_EVENT_THEN_INTERNALFAIL;
        nDialEvent = NEXT_EVENT.nDialEvent;
        nDialCallState = NEXT_EVENT.nDialCallState;
        REMOVE_EVENT;
        switch ( nDialEvent ) {
            case T_SILOFF:      /* Silence off. */
                lp->silent = FALSE;
                goto done;          // remain in same state
            case T_SILON:       /* Silence on. */
                lp->silent = TRUE;
                goto done;          // remain in same state
            case T_CATERM:      /* Call analysis termination. */
                /* restore usual settings */
                Set_Channel_Mask ( CEM_STANDARD, 1 );
                if ( lp->bSendEvent )
                    goto done;
                switch ( nDialCallState ) {
                    case CA_BUSY: /* Called line is busy. */
                    case CA_OPINT:    /* Called line recvd oper
                                                        intercept */
                        lp->nTempVRetVal = RC_BUSYDEST;
                        break;
                    case CA_NOAN: /* Called line did not
                                                          answer. */
                    case CA_NORNG:    /* Called line did not
                                                            ring. */
                        lp->nTempVRetVal = RC_NOANSWER;
                        break;
                    case CA_CONN: /* Called line connected. */
                        lp->bUserIsOffHook = TRUE;
                        /* success */
                        lp->bCardIsOffHook = TRUE;
                        ep->result = RC_SUCCEED;
                        if ( cp->wait_for_silence ) {
                            ep->voice_after_answer = 0;
```

ATTORNEY DOCKET NO: VOYS2220WSW
wsw/voys/2220.001

- 264 -

```
                            /*
                             * Get call analysis results
                             */
    #if defined(E_W)        /* Windows */
                            alloc_DOS_mem(
                                    sizeof ( My_car ),
                                    &call_DosPointer,
                                    &call_ProtectedSelector,
                                    &call_ProtectedPointer
                                    );
                            if ( call_ProtectedSelector == 0 ) {
                               ep->result = RC_RAMFULL;
                               lp->bSendEvent = TRUE;
                               goto done;
                            }
    #endif
                            nDialRetVal = getcar (
                                    CHANNEL ( lp->nLineNum ),
                                    &My_car
                                    );
    #if defined(E_W)        /* Windows */
                            memcpy (
                                &My_car,        /* source */
                                ( void * )
                                        call_ProtectedPointer,
                                sizeof ( My_car )
                                    );
                            free_DOS_mem ( &call_DosPointer,
                                           &call_ProtectedSelector,
                                           &call_ProtectedPointer );
    #endif
                            if ( nDialRetVal != E_SUCC ) {
                               ep->result = RC_INTERNALLINE;
                            } else {
                               ep->voice_after_answer =
    My_car.ansrsize * 10;
                            }
                         }
                         lp->bSendEvent = TRUE;
                         goto done;
                    default:  /* some unknown callstate */
                         ep->result = RC_INTERNALLINE;
                         lp->bSendEvent = TRUE;
                         goto done;
                 }
                 break;
             default:/* some unknown event */
                 /* restore usual settings */
                 Set_Channel_Mask ( CEM_STANDARD, 1 );
                 if ( lp->bSendEvent )
                     goto done;
                 ep->result = RC_INTERNALLINE;
                 lp->bSendEvent = TRUE;
                 goto done;
         }
         /* no answer and we are still off-hook; hang up */

/*
          * Ask channel to go on-hook.
          */
         nDialRetVal = sethook (
```

- 265 -

```
                                CHANNEL ( lp->nLineNum ),
                                H_ONH
                                );
            switch ( nDialRetVal ) {
 5              case E_SUCC:   /* Function was successful. */
                    /* success */
                    break;
                case E_BADDL:  /* D4x hardware error. */
                    ep->result = RC_BADLINE;
10                  lp->bSendEvent = TRUE;
                    goto done;
                default:/* some unknown error */
                    ep->result = RC_INTERNALLINE;
                    lp->bSendEvent = TRUE;
                    goto done;
            }
            lp->nCmdStage = 2;
            /* now wait until we get an on-hook-complete event */
            goto done;
        case 2:
            IF_NO_EVENT_THEN_BREAK;
            IF_WINDOWS_EVENT_THEN_INTERNALFAIL;
            nDialEvent = NEXT_EVENT.nDialEvent;
25          REMOVE_EVENT;
            switch ( nDialEvent ) {
                case T_SILOFF:   /* Silence off. */
                case T_SILON:    /* Silence on. */
                    goto done;   // ignore; remain in same state
30              case T_ONH:      /* Onhook complete. */
                    break;
                default:            /* some unknown event */
                    ep->result = RC_INTERNALLINE;
                    lp->bSendEvent = TRUE;
35                  goto done;
            }
            // hung up successfully
            // wait a few seconds to make sure CO sees we are hung up
            lp->timeout = TIMEOUT_AFTER_ONHOOK;
            REMOVE_TIMEOUT_EVENTS;
            lp->nCmdStage = 3;
            /* now wait until we get a timeout event */
            goto done;

        case 3:
            IF_NO_EVENT_THEN_BREAK;
            if (!TIMEOUT_EVENT) {
                REMOVE_EVENT;
                // ignore it and keep waiting
50              goto done;
            }
            REMOVE_EVENT;
            /* make assumption */
            lp->bUserIsOffHook = FALSE;
            /* success */
            lp->bCardIsOffHook = FALSE;
            ep->result = lp->nTempVRetVal;   // saved result code
            lp->bSendEvent = TRUE;
            goto done;
60
        case SHUTDOWN_STAGE: // server is shutting down
```

ATTORNEY DOCKET NO: VOYS2220WSW
wsw/voys/2220.001

```
                        ep->result = RC_SERVERSHUTDOWN;
                        lp->bSendEvent = TRUE;
                        goto done;

5              default:        // unknown command stage
                        ep->result = RC_INTERNAL;
                        lp->bSendEvent = TRUE;
                        goto done;
            }
10      done:
            // if complete, check to see if we have to do clean up
            if (lp->bSendEvent) {
                // do something here
                free_DOS_mem ( &call_DosPointer, &call_ProtectedSelector,
                                              &call_ProtectedPointer );
                free_DOS_mem ( &(lp->cpb_DosPointer),
                                              &(lp->cpb_ProtectedSelector),
                                              &(lp->cpb_ProtectedPointer) );
            }
            return;
        }       // end function (DoCallOutCommand)

/********************************************************
         *
         * DoConnectCommand  --  Grab ownership of the current line.
         *
         ********************************************************/ static
        void DoConnectCommand (void)
        {
            CPB         My_cpb;         // Channel parameters
            CSB         My_csb;         // Channel status block
            int         nDialRetVal;    // Dialogic return value
            switch (lp->nCmdStage) { case 0:         // start of command
                    // fill in standard parts of event */
                    REMOVE_ALL_EVENTS;
                    ep->nEvent = EV_CONNECTED;
                    ep->num_lines = nActualLines;    // valid even if cmd
                                                     fails */
                    // initialize line */
                    lp->nLineNum = cp->nLine;
                    // check if loop current present or off hook
                    nDialRetVal = Get_Line_Status( &My_csb );
                    if ( nDialRetVal ) {
                        ep->result = nDialRetVal;
                        lp->bSendEvent = TRUE;
                        goto done;
                    }
                    if ( ! ( My_csb.linestat & LS_HOOK ) ||    // line off
                                                                  hook
                           ! ( My_csb.linestat & LS_RING ) ||  // ring
                                                                  incoming
```

ATTORNEY DOCKET NO: VOYS2220WSW
wsw/voys/2220.001

```
                        ! ( My_csb.linestat & LS_SIL )   ||       // silence
                                                                        off
                        ! ( My_csb.linestat & LS_LOOP )    // loop current
                                                                        present
 5                  ) {
                        ep->result = RC_BUSYLINE;
                        lp->bSendEvent = TRUE;
                        goto done;
                    }
                    // set channel parameters */
                    clrcpb ( &My_cpb );
        #if defined(E_W)                // Windows */
                    alloc_DOS_mem (
                                    sizeof ( My_cpb ),
                                    &( lp->cpb_DosPointer ),
                                    &( lp->cpb_ProtectedSelector ),
                                    &( lp->cpb_ProtectedPointer )
                                    );
                    if ( lp->cpb_ProtectedSelector == 0 ) {
                        Debug (
                            3, sprintf ( Debug_buf,
                            "LD_Dial/DoConnectCommand:%s(CPB, %d bytes)",
                            cDosMemErr, sizeof ( My_cpb ) )
                            );
                        ep->result = RC_RAMFULL;
                        lp->bSendEvent = TRUE;
                        goto done;
                    }
30                  memcpy (
                            ( void * ) lp->cpb_ProtectedPointer,     // dest
                            ( void * ) &My_cpb,                      // source
                            sizeof ( My_cpb )
                            );
        #endif
                    nDialRetVal = setcparm (
                                    CHANNEL ( lp->nLineNum ),
        #if defined(E_W)                                             // Windows
                                    ( void * ) lp->cpb_DosPointer
        #else
                                    &My_cpb
        #endif
                                    );
        #if defined(E_W)
45                  free_DOS_mem ( &( lp->cpb_DosPointer ),
                                    &( lp->cpb_ProtectedSelector ),
                                    &( lp->cpb_ProtectedPointer ) );
        #endif
                    switch ( nDialRetVal ) {
                        case E_SUCC:   // Function was successful. */
                            // success */
                            Set_Channel_Mask ( CEM_STANDARD, 1 );
                            if ( lp->bSendEvent )
                                goto done;
                            lp->bUserIsOffHook = FALSE;
                            lp->bCardIsOffHook = FALSE;
                            lp->bConnected = TRUE;
                            ep->result = RC_SUCCEED;
                            lp->bSendEvent = TRUE;
                            goto done;
                        case E_BADDL:  // D4x hardware error. */
```

- 268 -

```
                        ep->result = RC_BADLINE;
                        lp->bSendEvent = TRUE;
                        goto done;
                    default:          // some unknown error */
                        ep->result = RC_INTERNALLINE;
                        lp->bSendEvent = TRUE;
                        goto done;
                }
                // never get here */ case SHUTDOWN_STAGE: // server is shutting down
                ep->result = RC_SERVERSHUTDOWN;
                lp->bSendEvent = TRUE;
                goto done;

default:          // unknown command stage
                ep->result = RC_INTERNAL;
                lp->bSendEvent = TRUE;
                goto done;
        } done:
        // if complete, check to see if we have to do clean up
        if (lp->bSendEvent) {
            // do something here !!!
        } return;
    }       // end function (DoConnectCommand)

/*********************************************************
     *
     * DoDisconnectCommand  --  Relinquish ownership of the current
     *       line.
     *
     *********************************************************/ static
    void DoDisconnectCommand (void)
    {
        int     ifile_num;      /* indexed filenum (0 to MAX_IFILE-1) */
        int     nDialRetVal;    // Dialogic return value
        int     nDialEvent;     // Dialogic event number switch (lp->nCmdStage) { case 0:         // start of command
                /* this is a multi-stage command */
                REMOVE_ALL_EVENTS;
                ep->nEvent = EV_DISCONNECTED;
                // close any indexed files that are open */
                for ( ifile_num = 0; ifile_num < lp->num_openifile;
                                                    ifile_num++ ) {
                    if ( lp->ifile[ifile_num].ifhandle >= 0 ) {
                        close ( lp->ifile[ifile_num].ifhandle );
                        lp->ifile[ifile_num].ifhandle = ( -1 );
                    }
                }
                lp->num_openifile = 0;
```

```
                        // hang up line
                        nDialRetVal = sethook (
                                CHANNEL ( lp->nLineNum ),
                                H_ONH /* go on-hook */
                        );
                        switch ( nDialRetVal ) {
                            case E_SUCC:   /* Function was successful. */
                                /* success */
                                break;
                            case E_BADDL:  /* D4x hardware error. */
                                ep->result = RC_BADLINE;
                                lp->bSendEvent = TRUE;
                                goto done;
                            default:       /* some unknown error */
                                ep->result = RC_INTERNALLINE;
                                lp->bSendEvent = TRUE;
                                goto done;
                        }
                        lp->timeout = TIMEOUT_FOR_BROKEN;
                        REMOVE_TIMEOUT_EVENTS;
                        /* now wait until we get an on-hook-complete event */
                        lp->nCmdStage = 1;
                        goto done;

case 1:
                        IF_NO_EVENT_THEN_BREAK;
                        IF_TIMEOUT_THEN_INTERNALFAIL;
                        IF_WINDOWS_EVENT_THEN_INTERNALFAIL;
                        nDialEvent = NEXT_EVENT.nDialEvent;
                        REMOVE_EVENT;
                        switch ( nDialEvent ) {
                            case T_SILOFF:    /* Silence off. */
                            case T_SILON:     /* Silence on. */
                                goto done;    // ignore; remain in same state
                            case T_ONH:       /* Onhook complete. */
                                /* success */
                                break;
                            default:          /* some unknown event */
                                ep->result = RC_INTERNALLINE;
                                lp->bSendEvent = TRUE;
                                goto done;
                        }
                        Set_Channel_Mask ( 0, 0 );
                        if ( lp->bSendEvent )
                            goto done;
                    // hung up successfully
                    // wait a few seconds to make sure CO sees we are hung up
                        lp->timeout = TIMEOUT_AFTER_ONHOOK;
                        REMOVE_TIMEOUT_EVENTS;
                        lp->nCmdStage = 2;
                        /* now wait until we get a timeout event */
                        goto done;

case 2:
                        IF_NO_EVENT_THEN_BREAK;
                        if (!TIMEOUT_EVENT) {
                            REMOVE_EVENT;
                            // ignore it and keep waiting
                            goto done;
                        }
                        REMOVE_EVENT;
```

- 270 -

```
                /* make assumption */
                lp->bUserIsOffHook = FALSE;
                /* success */
                lp->bCardIsOffHook = FALSE;
                lp->bConnected = FALSE;
                ep->result = RC_SUCCEED;
                lp->bSendEvent = TRUE;
                goto done;

case SHUTDOWN_STAGE:  // server is shutting down
                ep->result = RC_SERVERSHUTDOWN;
                lp->bSendEvent = TRUE;
                goto done;

default:       // unknown command stage
                ep->result = RC_INTERNAL;
                lp->bSendEvent = TRUE;
                goto done;
        }
done:
        return;
}       // end function (DoDisconnectCommand)

/********************************************************
*
*   DoWaitForCallCommand  --  Wait for an incoming call on
*                             the current line and answer it.
*
********************************************************/ static
void DoWaitForCallCommand (void)
{
        int     nDialRetVal;   // Dialogic return value
        int     nDialEvent;    // Dialogic event number
        CSB     My_csb;

switch (lp->nCmdStage) { case 0:       // start of command
                REMOVE_ALL_EVENTS;
                ep->nEvent = EV_INCOMINGCALL;
                if ( lp->bCardIsOffHook ) {
                    ep->result = RC_CARDOFFHOOK;
                    lp->bSendEvent = TRUE;
                    goto done;
                }
                // Check line status
                nDialRetVal = Get_Line_Status( &My_csb );
                if ( nDialRetVal ) {
                    ep->result = nDialRetVal;
                    lp->bSendEvent = TRUE;
                    goto done;
                }
                if ( ! ( My_csb.linestat & LS_HOOK ) ||     // line off
                                                            hook
        // Not to detect no silence since at this moment, there may
        // be ring coming in.
                //    ! ( My_csb.linestat & LS_SIL ) ||     // silence
```

```
                              ! ( My_csb.linestat & LS_LOOP )    // loop current off
                                                                              present
                          ) {
                              ep->result = RC_BUSYLINE;
                              lp->bSendEvent = TRUE;
                              goto done;
                          }
                          // If ring already present, answer it
                          if ( ! ( My_csb.linestat & LS_RING ) )  {
                              ADD_DIALOGIC_EVENT( T_RING, 0 )
                          }

// Ask channel to report inbound calls.
                          Set_Channel_Mask ( C_RING + CEM_STANDARD,
                                                              cp->answer_rings );
                          if ( lp->bSendEvent )
                              goto done;
                          if ( cp->total_timeout == 0 )
                              lp->timeout = 0;  /* wait forever */
                          else {
                              lp->timeout = ( time_in_msec ( ) +
                                                              cp->total_timeout );
                          }
                          /* now wait until we get an incoming-call event */
                          lp->nCmdStage = 1;
                          goto done;

case 1:           /* we expect an incoming-call event */
                          IF_NO_EVENT_THEN_BREAK;
                          if (TIMEOUT_EVENT) {
                              REMOVE_EVENT;
                              ep->result = RC_TOTALTIMEOUT;
                              lp->bSendEvent = TRUE;
                              goto done;
                          }
                          IF_WINDOWS_EVENT_THEN_INTERNALFAIL;
                          nDialEvent = NEXT_EVENT.nDialEvent;
                          REMOVE_EVENT;
                          switch ( nDialEvent ) {
                              case T_SILOFF:   /* Silence off. */
                              case T_SILON:    /* Silence on. */
                                  goto done;   // ignore; remain in same state
                          }
                          Set_Channel_Mask ( CEM_STANDARD, 1 );
                          if ( lp->bSendEvent )
                              goto done;
                          switch ( nDialEvent ) {
                              case T_RING:  /* Rings received. */
                                  /* success */
                                  break;
                              default:/* some unknown event */
                                  ep->result = RC_INTERNALLINE;
                                  lp->bSendEvent = TRUE;
                                  goto done;
                          }
                          /*
                           * Ask channel to go off-hook.
                           */
                          nDialRetVal = sethook (
                                              CHANNEL ( lp->nLineNum ),
```

- 272 -

```
                        H_OFFH
                    );
            switch ( nDialRetVal ) {
                case E_SUCC:  /* Function was successful. */
                    /* success */
                    break;
                case E_BADDL: /* D4x hardware error. */
                    ep->result = RC_BADLINE;
                    lp->bSendEvent = TRUE;
                    goto done;
                default:/* some unknown error */
                    ep->result = RC_INTERNALLINE;
                    lp->bSendEvent = TRUE;
                    goto done;
            }
            lp->timeout = TIMEOUT_FOR_BROKEN;
            REMOVE_TIMEOUT_EVENTS;
            /* now wait until we get an off-hook-complete event */
            lp->nCmdStage = 2;
            goto done;

case 2:
            IF_NO_EVENT_THEN_BREAK;
            IF_TIMEOUT_THEN_INTERNALFAIL;
            IF_WINDOWS_EVENT_THEN_INTERNALFAIL;
            nDialEvent = NEXT_EVENT.nDialEvent;
            REMOVE_EVENT;
            switch ( nDialEvent ) {
                case T_SILOFF:   /* Silence off. */
                case T_SILON:    /* Silence on. */
                    goto done;   // ignore; remain in same state
                case T_OFFH:     /* Offhook complete. */
                    lp->bCardIsOffHook = TRUE;
                    lp->bUserIsOffHook = TRUE;
                    /* success */
                    ep->result = RC_SUCCEED;
                    lp->bSendEvent = TRUE;
                    goto done;
                default:/* some unknown event */
                    ep->result = RC_INTERNALLINE;
                    lp->bSendEvent = TRUE;
                    goto done;
            }
            /* never get here */
            break;

case SHUTDOWN_STAGE: // server is shutting down
            ep->result = RC_SERVERSHUTDOWN;
            lp->bSendEvent = TRUE;
            goto done;

default:        // unknown command stage
            ep->result = RC_INTERNAL;
            lp->bSendEvent = TRUE;
            goto done;
    }
done:
    return;
}       // end function (DoWaitForCallCommand)
```

ATTORNEY DOCKET NO: VOYS2220WSW
wsw/voys/2220.001

```
/************************************************
 *
 *  DoGetDTMFCommand  --  Get DTMF digits from user.
 *
 ************************************************/ static
void DoGetDTMFCommand (void)
{
    RWB     My_xrwb;                // read/write block
    struct  findex far *fptr;
    int     nDialRetVal;            // Dialogic return value
    int     nDialEvent;             // Dialogic event number switch (lp->nCmdStage) { case 0:         // start of command ep->nEvent = EV_GETDTMF;
            ep->string[0] = '\0';
            if ( !lp->bCardIsOffHook ) {
                ep->result = RC_CARDONHOOK;
                lp->bSendEvent = TRUE;
                goto done;
            }
            if ( !lp->bUserIsOffHook ) {
                ep->result = RC_USERONHOOK;
                lp->bSendEvent = TRUE;
                goto done;
            }
            /*
            nDialRetVal = Check_User_Connection();
            if ( nDialRetVal ) {
                ep->result = nDialRetVal;
                lp->bSendEvent = TRUE;
                goto done;
            }
            */ if ( cp->flush_digits_at_start ) {
                Flush_All_DTMF ( );
                if ( lp->bSendEvent )
                    goto done;
            }

Set_End_Conditions ( );
            if ( lp->bSendEvent ) goto done;

// get digits
            clrxrwb ( &My_xrwb );
            /* set parameters */
            if ( cp->end_oper_on_any_digit )
                My_xrwb.termdtmf = '@';
            else if ( cp->end_oper_on_digit_end )
                My_xrwb.termdtmf = cp->end_digit;
            else
                My_xrwb.termdtmf = '\0';
            /* tricky:  0==unlimited(MAX_DIGITS); also handle too big */
            My_xrwb.maxdtmf = lp->nMaxDTMF;
            My_xrwb.isxrwb = 1;
```

```
                My_xrwb.maxsec = ( word ) MSEC_TO_SEC (
                                                    cp->total_timeout );
                /*
                 * maxsil == add up all silence between digits -- not
                 *     what we want
                 */
                /* My_xrwb.maxsil = MSEC_TO_SEC(cp->start_timeout); */
                My_xrwb.intrdig = ( byte ) MSEC_TO_SEC (
10                                                  cp->interdigit_to );
                My_xrwb.rwbflags = 0;

My_xrwb.loopsig = 1;/* terminate on hangup */
   #if defined(E_W)           /* Windows */
15              alloc_DOS_mem (
                            MAX_DIGITS + 1,
                            &( lp->dtmf_DosPointer ),
                            &( lp->dtmf_ProtectedSelector ),
                            &( lp->dtmf_ProtectedPointer )
20                          );
                if ( lp->dtmf_ProtectedSelector == 0 ) {
                    ep->result = RC_RAMFULL;
                    lp->bSendEvent = TRUE;
                    goto done;
25              }
                fptr = ( void * ) lp->dtmf_DosPointer;
   #else
                fptr = dial_dtmfbuf[lp->nLineNum];
   #endif
30              My_xrwb.xferseg = FP_SEG ( fptr );
                My_xrwb.xferoff = FP_OFF ( fptr );
                My_xrwb.maxbyteh = 0;
                My_xrwb.maxbyte = MAX_DIGITS;
   #if defined(E_W)           /* Windows */
35              alloc_DOS_mem (
                            sizeof ( My_xrwb ),
                            &( lp->xrwb_DosPointer ),
                            &( lp->xrwb_ProtectedSelector ),
                            &( lp->xrwb_ProtectedPointer )
                            );
                if ( lp->xrwb_ProtectedSelector == 0 ) {
                    Debug (
                        3, sprintf ( Debug_buf,
                        "LD_Dial/DoGetDTMFCommand:%s(XRWB, %d bytes)",
                        cDosMemErr, sizeof ( My_xrwb ) )
                        );
                    ep->result = RC_RAMFULL;
                    lp->bSendEvent = TRUE;
                    goto done;
50              }
                memcpy ( ( void * ) lp->xrwb_ProtectedPointer,
                         ( void * ) &My_xrwb, sizeof ( My_xrwb ) );
   #endif
                /* start recording data */
                nDialRetVal = getdtmfs (
                                    CHANNEL ( lp->nLineNum ),
   #if defined(E_W)                                           /* Windows */
                                    ( RWB * ) lp->xrwb_DosPointer
   #else
                                    &My_xrwb    /* non-Windows */
   #endif
```

```
                );
            switch ( nDialRetVal ) {
                case E_SUCC:   /* Function was successful. */
                    break;
                default:       /* some unknown error */
                    ep->result = RC_INTERNALLINE;
                    lp->bSendEvent = TRUE;
                    goto done;
            }
            /* now wait until we get an event */
            lp->nCmdStage = 2;
            goto done;

case 2:                /* we expect an end-of-input event */
            IF_NO_EVENT_THEN_BREAK;
            IF_WINDOWS_EVENT_THEN_INTERNALFAIL;
            nDialEvent = NEXT_EVENT.nDialEvent;
            REMOVE_EVENT;
            switch ( nDialEvent ) {
                case T_SILOFF:  /* Silence off. */
                case T_SILON:   /* Silence on. */
                    goto done;  // ignore; remain in same state
            }
if defined(E_W)
            memcpy ( dial_dtmfbuf[lp - line],
                            ( void * ) lp->dtmf_ProtectedPointer,
                                            MAX_DIGITS + 1 );
            free_DOS_mem ( &( lp->xrwb_DosPointer ),
                            &( lp->xrwb_ProtectedSelector ),
                            &( lp->xrwb_ProtectedPointer ) );
            free_DOS_mem ( &( lp->dtmf_DosPointer ),
                            &( lp->dtmf_ProtectedSelector ),
                            &( lp->dtmf_ProtectedPointer ) );
endif
            switch ( nDialEvent ) {
                case T_MAXDT: /* Maximum DTMF digits received. */
                    ep->result = RC_DATALENGTH;
                    strcpy ( ep->string, dial_dtmfbuf[lp - line] );
                    lp->bSendEvent = TRUE;
                    goto done;
                case T_TERMDT:   /* Terminating DTMF digit
                                                    received. */
                case T_MDTMF: /* Terminated by masked DTMF digit*/
                    ep->result = RC_ENDFLAG;
                    strcpy ( ep->string, dial_dtmfbuf[lp - line] );
                    lp->bSendEvent = TRUE;
                    goto done;
                case T_TIME:  /* Rec/play/getdtmf timed out. */
                case T_SIL:   /* Maximum silence received. */
                case T_IDTIME:   /* Interdigit delay exceeded. */
                    strcpy ( ep->string, dial_dtmfbuf[lp - line] );
                    if ( ep->string[0] == '\0' )
                        ep->result = RC_STARTTIMEOUT;
                    else
                        ep->result = RC_INTERDIGITTIMEOUT;
                    lp->bSendEvent = TRUE;
                    goto done;
                case T_LCTERM:   /* Terminate by drop in loop
                                                    signal */
                    ep->result = RC_USERHUNGUP;
                    strcpy ( ep->string, dial_dtmfbuf[lp - line] );
```

```
                                  lp->bSendEvent = TRUE;
                                  goto done;
                           case T_STOP:   /* Rec/play/getdtmf stopped. */
                           case T_HFAIL:  /* Hardware failure. */
                                  ep->result = RC_BADLINE;
                                  lp->bSendEvent = TRUE;
                                  goto done;
                           default:       /* some unknown event */
                                  ep->result = RC_INTERNALLINE;
                                  lp->bSendEvent = TRUE;
                                  goto done;
                    }
                    /* never get here */
                    break;

case SHUTDOWN_STAGE:  // server is shutting down
                    ep->result = RC_SERVERSHUTDOWN;
                    lp->bSendEvent = TRUE;
                    goto done;

default:         // unknown command stage
                    ep->result = RC_INTERNAL;
                    lp->bSendEvent = TRUE;
                    goto done;
       } done:
       // if complete, check to see if we have to do clean up
       if (lp->bSendEvent) {
              // do something here !!!
              free_DOS_mem ( &( lp->xrwb_DosPointer ),
                                         &( lp->xrwb_ProtectedSelector ),
                                         &( lp->xrwb_ProtectedPointer ) );
              free_DOS_mem ( &( lp->dtmf_DosPointer ),
                                         &( lp->dtmf_ProtectedSelector ),
                                         &( lp->dtmf_ProtectedPointer ) );
       }
       return;
}          // end function (DoGetDTMFCommand)

/*********************************************************
 *
 * DoGetWordsCommand  --  Get words from user.
 *
 *********************************************************/ static
void DoGetWordsCommand (void)
{
       int    nDialEvent;        // Dialogic event number
       int    nDialCallState;    // Dialogic call state number switch (lp->nCmdStage) { case 0:          // start of command
                    ep->nEvent = EV_GETWORDS;
                    ep->string[0] = '\0';
                    /* error-checking */
                    if ( !lp->bCardIsOffHook ) {
```

- 277 -

```
                    ep->result = RC_CARDONHOOK;
                    lp->bSendEvent = TRUE;
                    goto done;
                }
 5              if ( !lp->bUserIsOffHook ) {
                    ep->result = RC_USERONHOOK;
                    lp->bSendEvent = TRUE;
                    goto done;
                }
                lp->nCmdStage = 40;
                // tricky; fall through ...

case 40:             // still start of command
                vr_Get_Words (
                        *cp,
                        0,  // nDialEvent
                        0,  // nDialCallState
                        &lp->nCmdStage,
                        ep,
20                      &lp->bSendEvent
                        );
                goto done;

case 41:             // some event
            case 42:             // some event
                IF_NO_EVENT_THEN_BREAK;
                IF_WINDOWS_EVENT_THEN_INTERNALFAIL;
                nDialEvent = NEXT_EVENT.nDialEvent;
                nDialCallState = NEXT_EVENT.nDialCallState;
                REMOVE_EVENT;
                vr_Get_Words (
                        *cp,
                        NEXT_EVENT.nDialEvent,
                        NEXT_EVENT.nDialCallState,
                        &lp->nCmdStage,
                        ep,
                        &lp->bSendEvent
                        );
                goto done;
            case SHUTDOWN_STAGE:  // server is shutting down
                vr_Get_Words (
                        *cp,
                        0,
                        0,
                        &lp->nCmdStage,
                        ep,
                        &lp->bSendEvent
                        );
50              goto done;

default:             // unknown command stage
                ep->result = RC_INTERNAL;
                lp->bSendEvent = TRUE;
55              goto done;
        } done:
        return;
    }       // end function (DoGetWordsCommand)
```

```
/************************************************************
 *
 * DoSetIFileCommand -- Open indexed prompt file.
 *
 ************************************************************/ static
void DoSetIFileCommand (void)
{
    int     ifile_num;      // indexed filenum (0 to MAX_IFILE-1) */
    int     pcount;         // phrase count */
    char    buffer[40];     // file input buffer for setifile */
    int     rval;
    char    *ptr, *startptr, *endptr;

// in-file struct to access an indexed file */
    struct {
        long    max;        // number of if_entry's that follow
                            //                          if_header */
        long    rate;       // always 6053 */
        long    top;        // number of phrases in file (<= max) */
        long    rsv3;       // reserved */
        long    size;       // size of file in bytes */
        long    rsv5;       // reserved */
    } if_header;

// in-file struct to access an indexed file */
    // one if_entry per phrase in file */
    struct {
        long    start;      // starting byte in file */
        long    length;     //length in bytes (0==no phrase here)*/
        long    annotate;   // unused (== 0) */
    } if_entry;

switch (lp->nCmdStage) { case 0:             // start of command
            ep->nEvent = EV_SETIFILE;
            /* error-checking */
            if ( lp->num_openifile >= MAX_IFILE ) {
                ep->result = RC_BADCOMMAND;
                lp->bSendEvent = TRUE;
                goto done;
            }
            ifile_num = lp->num_openifile;

/*
             * First, do the voice file.
             */
            lp->ifile[ifile_num].ifhandle = open (
                    cp->play_item.fname, O_BINARY | O_RDONLY );
            if ( lp->ifile[ifile_num].ifhandle < 0 ) {
                ep->result = RC_NOFILE;
                ep->C_error = errno;
                ep->DOS_error = _doserrno;
                lp->bSendEvent = TRUE;
                goto done;
            }
            /* read header from indexed file */
            rval = read (
```

- 279 -

```
                              lp->ifile[ifile_num].ifhandle,
                              &if_header,
                              sizeof ( if_header )
                );
            if ( rval < sizeof ( if_header ) ) {
                ep->result = RC_BADFILE;
                ep->C_error = errno;
                ep->DOS_error = _doserrno;
                close ( lp->ifile[ifile_num].ifhandle );
                lp->ifile[ifile_num].ifhandle = ( -1 );
                lp->bSendEvent = TRUE;
                goto done;
            }
            /* do some error-checking */
            if ( ( if_header.top < 0 )
                || ( if_header.max < 0 )
                || ( if_header.top > if_header.max ) ) {
                ep->result = RC_BADFILE;
                close ( lp->ifile[ifile_num].ifhandle );
                lp->ifile[ifile_num].ifhandle = ( -1 );
                lp->bSendEvent = TRUE;
                goto done;
            }
            if ( if_header.max >= MAX_PHRASE ) {
                ep->result = RC_BADFILE;
                close ( lp->ifile[ifile_num].ifhandle );
                lp->ifile[ifile_num].ifhandle = ( -1 );
                lp->bSendEvent = TRUE;
                goto done;
            }
            /* read phrase entries from indexed file */
            for ( pcount = 0; pcount < if_header.max; pcount++ ) {
                rval = read (
                              lp->ifile[ifile_num].ifhandle,
                              &if_entry,
                              sizeof ( if_entry )
                );
                if ( rval < sizeof ( if_entry ) ) {
                    ep->result = RC_BADFILE;
                    ep->C_error = errno;
                    ep->DOS_error = _doserrno;
                    close ( lp->ifile[ifile_num].ifhandle );
                    lp->ifile[ifile_num].ifhandle = ( -1 );
                    lp->bSendEvent = TRUE;
                    goto done;
                }
                /* do some error-checking */
                if ( ( if_entry.start < ( sizeof ( if_header ) + (
                          if_header.max * sizeof ( if_entry ) ) ) )
                                || ( if_entry.length < 0 ) ) {
                    ep->result = RC_BADFILE;
                    close ( lp->ifile[ifile_num].ifhandle );
                    lp->ifile[ifile_num].ifhandle = ( -1 );
                    lp->bSendEvent = TRUE;
                    goto done;
                }
                lp->ifile[ifile_num].indextab[pcount].start =
                                                    if_entry.start;
                lp->ifile[ifile_num].indextab[pcount].length =
                                                    if_entry.length;
            }
```

```
            lp->ifile[ifile_num].num_phrases = ( int )
                                                      if_header.max;

/*
          * Second, do the map file.
          */
         lp->open_file = open (
                              cp->name,
                              O_TEXT | O_RDONLY
                              );
         if ( lp->open_file < 0 ) {
            ep->result = RC_NOFILE;
            ep->C_error = errno;
            ep->DOS_error = _doserrno;
            close ( lp->ifile[ifile_num].ifhandle );
            lp->ifile[ifile_num].ifhandle = ( -1 );
            lp->bSendEvent = TRUE;
            goto done;
         }
      /* read phrase file names (1 per line) from map file */
         pcount = 0;
         lp->ifile[ifile_num].indextab[pcount].fname[0] = '\0';
         while ( pcount < lp->ifile[ifile_num].num_phrases ) {
            rval = read (
                        lp->open_file,
                        &buffer,
                        sizeof ( buffer ) - 1
                        );
            if ( rval == 0 ) {
               /* EOF before proper number of phrases done */
               close ( lp->ifile[ifile_num].ifhandle );
               lp->ifile[ifile_num].ifhandle = ( -1 );
               close ( lp->open_file );
               lp->open_file = ( -1 );
               ep->result = RC_BADFILE;
               lp->bSendEvent = TRUE;
               goto done;
            }
            if ( rval < 0 ) {
               close ( lp->ifile[ifile_num].ifhandle );
               lp->ifile[ifile_num].ifhandle = ( -1 );
               close ( lp->open_file );
               lp->open_file = ( -1 );
               ep->result = RC_BADFILE;
               ep->C_error = errno;
               ep->DOS_error = _doserrno;
               lp->bSendEvent = TRUE;
               goto done;
            }
            buffer[rval] = '\0';  /* for debugging purposes */
            ptr = buffer;
            startptr = ptr;
            endptr = ptr + rval;
            while ( ptr < endptr ) {
               while ( ( ptr < endptr ) && ( *ptr != '\n' ) )
                  ptr++;
               strncat (
                  lp->ifile[ifile_num].indextab[pcount].fname,
                  startptr,
                  ptr - startptr
                  );
```

- 281 -

```
                    if ( *ptr == '\n' ) {
                        pcount++;
                        ptr++;
                        startptr = ptr;
                    }
                }
            }
/* doesn't detect map file contains more lines than expected */
            close ( lp->open_file );
            lp->open_file = ( -1 );
            if ( Debug_flag >= 9 )
                for ( pcount = 0; pcount <
                        lp->ifile[ifile_num].num_phrases; pcount++ )
            lp->num_openifile++;
            ep->result = RC_SUCCEED;
            lp->bSendEvent = TRUE;
            goto done;

default:        // unknown command stage
            ep->result = RC_INTERNAL;
            lp->bSendEvent = TRUE;
            goto done;
    } done:
    return;
}       // end function (DoSetIFileCommand)

/**********************************************************
*
*  DoRecordCommand    --   Record from the current line to a file.
*
**********************************************************/ static
void DoRecordCommand (void)
{
    RWB         My_xrwb;        // read/write block
    int         nDialRetVal;    // Dialogic return value
    int         nDialEvent;     // Dialogic event number
    char far    *fptr;

switch (lp->nCmdStage) { case 0:         // start of command
            ep->nEvent = EV_RECORD;
            ep->string[0] = '\0';
            if ( !lp->bCardIsOffHook ) {
                ep->result = RC_CARDONHOOK;
                lp->bSendEvent = TRUE;
                goto done;
            }
            if ( !lp->bUserIsOffHook ) {
                ep->result = RC_USERONHOOK;
                lp->bSendEvent = TRUE;
                goto done;
            }
            /*
```

ATTORNEY DOCKET NO: VOYS2220WSW
wsw/voys/2220.001

```
                    - 282 - nDialRetVal = Check_User_Connection();
            if ( nDialRetVal ) {
                ep->result = nDialRetVal;
                lp->bSendEvent = TRUE;
 5              goto done;
            }
            */ if ( cp->flush_digits_at_start ) {
10              Flush_All_DTMF ( );
                if ( lp->bSendEvent )
                    goto done;
            }

            Set_End_Conditions ( );
            if ( lp->bSendEvent ) goto done;

clrxrwb ( &My_xrwb );
            /* create the file and open it */
            lp->open_file = open (
                    cp->play_item.fname,
                    O_CREAT | O_TRUNC | O_BINARY | O_RDWR,
                    S_IREAD | S_IWRITE
                    );
            if ( lp->open_file < 0 ) {
                ep->result = RC_NOFILE;
                ep->C_error = errno;
                ep->DOS_error = _doserrno;
                lp->bSendEvent = TRUE;
                goto done;
            }
            My_xrwb.filehndl = lp->open_file;
            /* set parameters */
            /* total duration (secs) */
            My_xrwb.maxsec = ( word ) MSEC_TO_SEC (
                                            cp->total_recording );
            /* max silence duration (secs) */
            My_xrwb.maxsil = ( byte ) MSEC_TO_SEC ( ( int ) (
                                            cp->end_silence ) );
            if ( cp->end_voice_on_any_digit )
                My_xrwb.termdtmf = '@';
            else if ( cp->end_voice_on_digit_end )
                My_xrwb.termdtmf = cp->end_digit;
            else
                My_xrwb.termdtmf = '\0';
            // My_xrwb.maxdtmf = lp->nMaxDTMF;
            My_xrwb.rwbflags = RW_TONE;  /* play beep tone */
            My_xrwb.rwbdata1 = 2;    /* beep duration (200 msec
                                                        incrs) */
            My_xrwb.loopsig = 1;     /* terminate on hangup */
            My_xrwb.isxrwb = 1;
            My_xrwb.intrdig = ( byte ) MSEC_TO_SEC ( ( int ) (
                                            cp->end_silence ) );
            My_xrwb.maxnsil = ( byte ) MSEC_TO_SEC ( ( int ) (
                                            cp->total_recording ) );
            /* start recording data */
    #if defined(E_W)            /* Windows */
            alloc_DOS_mem (
                    sizeof ( My_xrwb ),
                    &( lp->xrwb_DosPointer ),
                    &( lp->xrwb_ProtectedSelector ),
```

ATTORNEY DOCKET NO: VOYS2220WSW
wsw/voys/2220.001

- 283 -

```
                            &( lp->xrwb_ProtectedPointer )
                        );
                    if ( lp->xrwb_ProtectedSelector == 0 ) {
 5                      ep->result = RC_RAMFULL;
                        lp->bSendEvent = TRUE;
                        goto done;
                    }
                    memcpy ( ( void * ) lp->xrwb_ProtectedPointer,
                             ( void * ) &My_xrwb, sizeof ( My_xrwb ) );
    #endif
                    nDialRetVal = recfile (
                        CHANNEL ( lp->nLineNum ),
    #if defined(E_W)
                        ( RWB * ) lp->xrwb_DosPointer, /* Windows */
    #else
                        &My_xrwb,     /* non-Windows */
    #endif
                        RM_NORM
                    );
                    switch ( nDialRetVal ) {
                        case E_SUCC:   /* Function was successful. */
                            break;
                        case E_BADDL:  /* D4x hardware error. */
                            close ( lp->open_file );
                            lp->open_file = ( -1 );
                            ep->result = RC_BADLINE;
                            lp->bSendEvent = TRUE;
                            goto done;
                        default:       /* some unknown error */
                            close ( lp->open_file );
                            lp->open_file = ( -1 );
                            ep->result = RC_INTERNALLINE;
                            lp->bSendEvent = TRUE;
                            goto done;
35                  }
                    /* now wait until we get an event */
                    lp->nCmdStage = 1;
                    goto done;

                case 1:       /* we expect an end-of-recording event */
                    IF_NO_EVENT_THEN_BREAK;
                    IF_WINDOWS_EVENT_THEN_INTERNALFAIL;
                    nDialEvent = NEXT_EVENT.nDialEvent;
                    REMOVE_EVENT;
                    switch ( nDialEvent ) {
                        case T_SILOFF:   /* Silence off. */
                        case T_SILON:    /* Silence on. */
                            goto done;    // ignore; remain in same state
                    }
    #if defined(E_W)
                    free_DOS_mem ( &( lp->xrwb_DosPointer ),
                                   &( lp->xrwb_ProtectedSelector ),
                                   &( lp->xrwb_ProtectedPointer ) );
    #endif
                    close ( lp->open_file );
                    lp->open_file = ( -1 );
                    /* extract base filename from full filename */
                    fname_full_to_base (
                        cp->play_item.fname,  /* input -- full filename */
                        ep->filename          /* retval -- base fname */
                    );
```

ATTORNEY DOCKET NO: VOYS2220WSW
wsw/voys/2220.001

- 284 -

```
            switch ( nDialEvent ) {
                case T_MAXDT: /* Maximum DTMF digits received. */
                    lp->nTempVRetVal = RC_DATALENGTH;
                    break;
                case T_TERMDT:     /* Terminating DTMF digit
                                                        received. */
                case T_MDTMF:      /* Terminated by masked DTMF
                                                           digit */
                    lp->nTempVRetVal = RC_ENDFLAG;
                    break;
                case T_MAXBYT:     /* Max bytes reached on play or
                                                             rec */
                    lp->nTempVRetVal = RC_DATALENGTH;
                    break;
                case T_TIME:   /* Rec/play/getdtmf timed out. */
                    lp->nTempVRetVal = RC_TOTALTIMEOUT;
                    break;
                case T_SIL:        /* Maximum silence received. */
                case T_IDTIME:     /* Interdigit delay exceeded. */
                    lp->nTempVRetVal = RC_INTERDIGITTIMEOUT;
                    break;
                case T_LCTERM:     /* Terminate by drop in loop
                                                          signal */
                    ep->result = RC_USERHUNGUP;
    // don't bother getting any digits they may have entered (?)
                    lp->bSendEvent = TRUE;
                    goto done;
                case T_DOSERR:     /* Dos error. */
                case T_DFULL:      /* Disk full. */
                    remove ( ep->filename );
                    ep->filename[0] = '\0';
                    ep->result = RC_DISKFULL;
                    lp->bSendEvent = TRUE;
                    goto done;
                case T_STOP:       /* Rec/play/getdtmf stopped. */
                case T_HFAIL:      /* Hardware failure. */
                case T_EMSERR:     /* Terminated by EMS error. */
                    ep->filename[0] = '\0';
                    ep->result = RC_BADLINE;
                    lp->bSendEvent = TRUE;
                    goto done;
if 0
                case 37:       /* some undocumented event */
                    /* ignore event */
                    goto done;
endif
                default:       /* some unknown event */
                    ep->filename[0] = '\0';
                    ep->result = RC_INTERNALLINE;
                    lp->bSendEvent = TRUE;
                    goto done;
            } if ( !cp->get_digits_at_end ) {
                ep->result = lp->nTempVRetVal;
                lp->bSendEvent = TRUE;
                goto done;
            }

// get digits
            clrxrwb ( &My_xrwb );
```

ATTORNEY DOCKET NO: VOYS2220WSW
wsw/voys/2220.001

- 285 -

```
                /* set parameters */
                if ( cp->end_oper_on_any_digit )
                    My_xrwb.termdtmf = '@';
                else if ( cp->end_oper_on_digit_end )
                    My_xrwb.termdtmf = cp->end_digit;
                else
                    My_xrwb.termdtmf = '\0';
        /* tricky:  0==unlimited(MAX_DIGITS); also handle too big */
                My_xrwb.maxdtmf = lp->nMaxDTMF;
                My_xrwb.isxrwb = 1;
                cp->total_timeout = SEC_TO_MSEC ( 1 );  /* don't wait*/
                My_xrwb.maxsec = ( word ) MSEC_TO_SEC (
                                                    cp->total_timeout );
        /*
         * maxsil == add up all silence between digits -- not what we
         * want
         */
                /* My_xrwb.maxsil = MSEC_TO_SEC(cp->start_timeout); */
                My_xrwb.intrdig = ( byte ) MSEC_TO_SEC (
                                                    cp->interdigit_to );
                My_xrwb.rwbflags = 0;

My_xrwb.loopsig = 1;/* terminate on hangup */
        #if defined(E_W)        /* Windows */
                alloc_DOS_mem (
                            MAX_DIGITS + 1,
                            &( lp->dtmf_DosPointer ),
                            &( lp->dtmf_ProtectedSelector ),
                            &( lp->dtmf_ProtectedPointer )
                        );
                if ( lp->dtmf_ProtectedSelector == 0 ) {
                    ep->result = RC_RAMFULL;
                    lp->bSendEvent = TRUE;
                    goto done;
                }
                fptr = ( void * ) lp->dtmf_DosPointer;
        #else
                fptr = dial_dtmfbuf[lp->nLineNum];
        #endif
                My_xrwb.xferseg = FP_SEG ( fptr );
                My_xrwb.xferoff = FP_OFF ( fptr );
                My_xrwb.maxbyteh = 0;
                My_xrwb.maxbyte = MAX_DIGITS;
        #if defined(E_W)        /* Windows */
                alloc_DOS_mem (
                            sizeof ( My_xrwb ),
                            &( lp->xrwb_DosPointer ),
                            &( lp->xrwb_ProtectedSelector ),
                            &( lp->xrwb_ProtectedPointer )
                        );
                if ( lp->xrwb_ProtectedSelector == 0 ) {
                    ep->result = RC_RAMFULL;
                    lp->bSendEvent = TRUE;
                    goto done;
                }
                memcpy ( ( void * ) lp->xrwb_ProtectedPointer,
                            ( void * ) &My_xrwb, sizeof ( My_xrwb ) );
        #endif
                /* start recording data */
                nDialRetVal = getdtmfs (
```

```
                        CHANNEL ( lp->nLineNum ),
        #if defined(E_W)
                            ( RWB * ) lp->xrwb_DosPointer  /* Windows */
        #else
 5      #endif
                            &My_xrwb        /* non-Windows */
                        );
                        switch ( nDialRetVal ) {
                            case E_SUCC:    /* Function was successful. */
10                              break;
                            default:        /* some unknown error */
                                ep->result = RC_INTERNALLINE;
                                lp->bSendEvent = TRUE;
                                goto done;
15                      }
                        /* now wait until we get an event */
                        lp->nCmdStage = 2;
                        goto done;

20                case 2:         /* we expect an end-of-input event */
                        IF_NO_EVENT_THEN_BREAK;
                        IF_WINDOWS_EVENT_THEN_INTERNALFAIL;
                        nDialEvent = NEXT_EVENT.nDialEvent;
                        REMOVE_EVENT;
25                      switch ( nDialEvent ) {
                            case T_SILOFF:  /* Silence off. */
                            case T_SILON:   /* Silence on. */
                                goto done;    // ignore; remain in same state
                        }
30      #if defined(E_W)
                        memcpy ( dial_dtmfbuf[lp - line], ( void * )
                                    lp->dtmf_ProtectedPointer, MAX_DIGITS + 1 );
                        free_DOS_mem ( &( lp->xrwb_DosPointer ),
                                            &( lp->xrwb_ProtectedSelector ),
35                                          &( lp->xrwb_ProtectedPointer ) );
                        free_DOS_mem ( &( lp->dtmf_DosPointer ),
                                            &( lp->dtmf_ProtectedSelector ),
                                            &( lp->dtmf_ProtectedPointer ) );
        #endif
40                      switch ( nDialEvent ) {
                            case T_MAXDT:   /* Maximum DTMF digits received. */
                                ep->result = RC_DATALENGTH;
                                strcpy ( ep->string, dial_dtmfbuf[lp - line] );
                                lp->bSendEvent = TRUE;
45                              goto done;
                            case T_TERMDT:  /* Terminating DTMF digit
                                                            received. */
                            case T_MDTMF:   /* Terminated by masked DTMF digit*/
                                ep->result = RC_ENDFLAG;
50                              strcpy ( ep->string, dial_dtmfbuf[lp - line] );
                                lp->bSendEvent = TRUE;
                                goto done;
                            case T_TIME:    /* Rec/play/getdtmf timed out. */
                            case T_SIL:     /* Maximum silence received. */
55                          case T_IDTIME:  /* Interdigit delay exceeded. */
                                strcpy ( ep->string, dial_dtmfbuf[lp - line] );
                                if ( ep->string[0] == '\0' )
                                    ep->result = RC_STARTTIMEOUT;
                                else
60                                  ep->result = RC_INTERDIGITTIMEOUT;
                                lp->bSendEvent = TRUE;
```

- 287 -

```
                        goto done;
                case T_LCTERM:    /* Terminate by drop in loop
                                                        signal */
                    ep->result = RC_USERHUNGUP;
5                   strcpy ( ep->string, dial_dtmfbuf[lp - line] );
                    lp->bSendEvent = TRUE;
                    goto done;
                case T_STOP:    /* Rec/play/getdtmf stopped. */
                case T_HFAIL:   /* Hardware failure. */
10                  ep->result = RC_BADLINE;
                    lp->bSendEvent = TRUE;
                    goto done;
                default:        /* some unknown event */
                    ep->result = RC_INTERNALLINE;
15                  lp->bSendEvent = TRUE;
                    goto done;
            }
            /* never get here */
            break;
20
        case SHUTDOWN_STAGE:  // server is shutting down
            ep->result = RC_SERVERSHUTDOWN;
            lp->bSendEvent = TRUE;
            goto done;
25
        default:        // unknown command stage
            ep->result = RC_INTERNAL;
            lp->bSendEvent = TRUE;
            goto done;
30      } done:
        // if complete, check to see if we have to do clean up
        if (lp->bSendEvent) {
35          // do something here !!!
            free_DOS_mem ( &( lp->xrwb_DosPointer ),
                                    &( lp->xrwb_ProtectedSelector ),
                                    &( lp->xrwb_ProtectedPointer ) );
            free_DOS_mem ( &( lp->dtmf_DosPointer ),
                                    &( lp->dtmf_ProtectedSelector ),
                                    &( lp->dtmf_ProtectedPointer ) );
        }
        return;
    }       // end function (DoRecordCommand)

/*****************************************/
    #if DO_FAKE_LINES
    // tricky: include C code into this file, because needs to get at
    // line array
    #include "fakeline.c"
55  #endif 60  /************************************************
     *  ld_Do_Command
```

ATTORNEY DOCKET NO: VOYS2220WSW
wsw/voys/2220.001

- 288 -

```
/***********************************************************/ int     ld_Do_Command (
                const   struct command     cmd,    // command to execute
                const   boolean            start_of_cmd, // start new cmd ?
                                                            or continue old
                struct event        *event      // result of command
                        )
        {
            int             nVRetVal;    // Voysys return value
            boolean         GotEvent;

if ( !Initialized ) {
                nVRetVal = RC_NOTINITIALIZED;
                event->result = nVRetVal;
                goto done;
            } if ( ( cmd.nLine < 0 )
        #if DO_FAKE_LINES
                    || ( cmd.nLine >= ( int ) MAX_AL ) ) {
        #else
                    || ( cmd.nLine >= ( int ) nActualLines ) ) {
        #endif
                nVRetVal = RC_NOLINE;
                event->result = nVRetVal;
                goto done;
            }

       // see if driver has any events for ANY line - get all of them */
            GotEvent = TRUE;
            while ( GotEvent )
                Check_For_Event ( &GotEvent );

           lp = &line[cmd.nLine];
            cp = &( lp->cmd );
            ep = &( lp->event );
            ep->result = RC_CMDNOTDONE;

       // if we are waiting for an event and we haven't got one yet,
        // return */
            if ( ( !start_of_cmd ) && ( !IS_AN_EVENT )) {
                if (( lp->bCmdInProgress ) && ( lp->nCmdStage ==
                                                        ABORT_STAGE))
                    goto doit;
                if (( lp->bCmdInProgress ) && ( lp->nCmdStage ==
                                                        SHUTDOWN_STAGE))
                    goto doit;
                if ( ( lp->timeout != 0 ) && ( time_in_msec() >=
                                                        lp->timeout ) ) {
                    // command timed out */
                    ADD_EVENT(WM_TIMER,0,0,0);
                } else
                    goto finished;
            } if ( start_of_cmd )
                lp->nCmdStage = 0;

60     doit:
```

ATTORNEY DOCKET NO: VOYS2220WSW
wsw/voys/2220.001

- 289 -

```
            lp->bSendEvent = FALSE;

// handle case of new command */
            if ( start_of_cmd ) {
                ep->nEvent = EV_NONE;
                ep->nLine = cmd.nLine;
                ep->C_error = 0;
                ep->DV_error = 0;
                ep->DOS_error = 0;
                ep->string[0] = '\0';
                ep->filename[0] = '\0';
                if (lp->bCmdInProgress && (cmd.nCommand == DVRC_ABORT )) {
            // handle abort by putting current command into funny stage */
                    lp->nCmdStage = ABORT_STAGE;
                } else {
                    if ( lp->bCmdInProgress ) {
            // error -- new command before previous command finished */
                        ep->nEvent = EV_BUSYWITHCMD;
                        ep->result = RC_BUSYLINE;    // not quite right
                        goto sendev;
                    }
                    lp->cmd = cmd;
                    lp->bCmdInProgress = TRUE;
                    lp->nCmdStage = 0;
                    lp->timeout = 0;
                }
            } if DO_FAKE_LINES
            if ( cmd.nLine >= ( int ) nActualLines ) {
                DoFakeLineCommand();
                if ( lp->bSendEvent )
                    goto sendev;
                goto finished;
            }
        #endif switch ( cp->nCommand ) {

/*----------------------------------------------------------*/
                case DVRC_CONNECT:        // connect Line task to line N
                    DoConnectCommand();
                    if ( lp->bSendEvent )
                        goto sendev;
                    goto finished;

/*----------------------------------------------------------*/
                case DVRC_DISCONNECT: // disconnect Line task from line N
                    DoDisconnectCommand();
                    if ( lp->bSendEvent )
                        goto sendev;
                    goto finished;

/*----------------------------------------------------------*/
                case DVRC_GETSTATE:
                    ep->nEvent = EV_GOTSTATE;
                    ep->user_off_hook = lp->bUserIsOffHook;
                    ep->result = RC_SUCCEED;
                    goto sendev;

/*----------------------------------------------------------*/
```

ATTORNEY DOCKET NO: VOYS2220WSW
wsw/voys/2220.001

- 290 -

```
            case DVRC_WAITFORCALL:   /* wait for incoming call +
                                                         answer it */
                DoWaitForCallCommand();
                if ( lp->bSendEvent )
                    goto sendev;
                goto finished;

/*-------------------------------------------------------*/
            case DVRC_RECORD:        /* record voice or FAX from user */
                DoRecordCommand();
                if ( lp->bSendEvent )
                    goto sendev;
                goto finished;

/*-------------------------------------------------------*/
            case DVRC_INITPLAY:   /* initialize playlist to empty */
                ep->nEvent = EV_INITPLAY;
                lp->plist_count = 0;
                ep->result = RC_SUCCEED;
                goto sendev;

/*-------------------------------------------------------*/
            case DVRC_ADDPLAY:         /* add item to playlist */
                ep->nEvent = EV_ADDPLAY;
                if ( lp->plist_count >= MAX_PF ) {
                    ep->result = RC_PLISTLENGTH;
                    goto sendev;
                }
                if ( cp->play_item.type != PI_SINGLE_FILE ) {
                    ep->result = RC_UNIMPCOMMAND;
                    goto sendev;
                }
                lp->plist[lp->plist_count] = cp->play_item;
                /* see if we can find prompt in an indexed file */
                Find_Phrase_In_IFile ( &(lp->plist[lp->plist_count]));
                lp->plist_count++;
                ep->result = RC_SUCCEED;
                goto sendev;

/*-------------------------------------------------------*/
            case DVRC_PLAY:        /* play voice or FAX out to user */
                DoPlayCommand();
                if ( lp->bSendEvent )
                    goto sendev;
                goto finished;

/*-------------------------------------------------------*/
            case DVRC_CALLOUT:   /* initiate a call + wait for answer
                                                                   */
                DoCallOutCommand();
                if ( lp->bSendEvent )
                    goto sendev;
                goto finished;

/*-------------------------------------------------------*/
            case DVRC_GETDTMF:   /* get DTMF digit string from user
                                                                   */
                DoGetDTMFCommand();
                if ( lp->bSendEvent )
                    goto sendev;
                goto finished;
```

ATTORNEY DOCKET NO: VOYS2220WSW
wsw/voys/2220.001

```
/*------------------------------------------------------------*/
            case DVRC_SENDDTMF:    /* send DTMF digit string out on
                                                           line */
                DoSendDTMFCommand();
                if ( lp->bSendEvent )
                    goto sendev;
                goto finished;

/*------------------------------------------------------------*/
            case DVRC_ABORT:   /* abort any operation in progress */
                /* if we get here, it means there was no command in
                                                         progress */
                ep->nEvent = EV_ABORT;
                ep->result = RC_NULLABORT;
                goto sendev;

/*------------------------------------------------------------*/
            case DVRC_HANGUP:      /* hang up (go on-hook) */
                DoHangupCommand();
                if ( lp->bSendEvent )
                    goto sendev;
                goto finished;

/*------------------------------------------------------------*/
            case DVRC_SETIFILE:     /* open indexed prompt file */
                DoSetIFileCommand();
                if ( lp->bSendEvent )
                    goto sendev;
                goto finished;

/*------------------------------------------------------------*/
            case DVRC_SETVOCAB:     /* open vocabulary map files */
                ep->nEvent = EV_SETVOCAB;
                ep->result = vr_Set_Vocabulary ( *cp );
                goto sendev;

/*------------------------------------------------------------*/
            case DVRC_GETWORDS:    /* get voice-recognized words from
                                        user */
                DoGetWordsCommand();
                if ( lp->bSendEvent )
                    goto sendev;
                goto finished;

/*------------------------------------------------------------*/
            case DVRC_GET:         /* get options and parameters */
                switch ( cmd.nSetGetOpCode ) {
                    case GET_FILEFORMATS:
                        ep->nEvent = EV_GET;
                        ep->cGetParm[0] = ( char ) NULL;
                        ep->dwGetParm = FM_VOX;
                        ep->result = RC_SUCCEED;
                        break;
                }   /* end of switch */
                goto sendev;

/*------------------------------------------------------------*/
            default:                /* unknown/illegal command value */
                /* send back event */
                ep->nEvent = EV_BADCOMMAND;
                ep->result = RC_BADCOMMAND;
```

- 292 -

```
            /* send the event */
            goto sendev;
        }
        /* never get here */
    sendev:
        /* send back event */
        *event = *ep;
        lp->bCmdInProgress = FALSE;
        /* fall through to ... */ finished:
        nVRetVal = ep->result;

    done:
        if ( nVRetVal != RC_CMDNOTDONE )
            return ( nVRetVal );
    }

/***********************************************************
     * ld_Initialize - Verify that Dialogic driver is running, find
     *   out how many lines exist, initialize them.
     ***********************************************************/
    int     ld_Initialize (
            const int       ld_hw_irq,      // HW IRQ for LD card
            const int       ld_sw_int,      //SW interrupt for LD card driver
            const long      win_hInst,      // hInst if using Windows
            const long      win_hWnd,       // hWnd if using Windows
                  char      *promptext,     // filename extension for prompt
                                                                        files
                  char      *ifileext       // filename extension for indexed
                                                                  prompt files
                    )
    {
        int     aline_num;      /* active line num (0 to MAX_LINES-1) */
        int     ifile_num;      /* indexed file number (0 to
                                                        MAX_IFILE-1) */
        int     nVRetVal;       // Voysys return value
        int     nDialRetVal;    // Dialogic return value
    #if DO_SETXPARM
        DCB     My_dcb;         /* dialog control block (global params) */ if defined(E_W)                    /* Windows */
        long    dcb_DosPointer = 0L;
        short   dcb_ProtectedSelector = 0;
        long    dcb_ProtectedPointer = 0L;

endif
    #endif
        int     GotEvent;
        long far    *address;

if ( Initialized ) {
            nVRetVal = RC_ALREADYINITIALIZED;
            goto done;
        }
```

```
        // sanity-check a debug array
        if ((sizeof(DialEventNumToName)/sizeof(char*)) != MAXTERM+1) {
            Debug ( 1, sprintf ( Debug_buf, "LD_TAPI/ld_Initialize:
                                 DialEventNumToName sanity failure" ) );
            nVRetVal = RC_INTERNAL;
            goto done;
        } strcpy ( promptext, PROMPT_FEXT );
        strcpy ( ifileext, INDEX_FEXT );
        nActualLines = 0;

/*
         * Test to see if the Dialogic driver is up and running.
         */
        int_level = ld_sw_int;    /* software interrupt level  -  must
                                     agree with driver */
        nDialRetVal = getvctr (  );
        if ( ( nDialRetVal == 0 ) || ( nDialRetVal != ld_sw_int ) ) {
            nVRetVal = RC_NOLINE;
            goto done;
        }
        address = ( long far * ) _dos_getvect ( ld_sw_int );
        address = ( long far * ) _dos_getvect ( ld_sw_int - 1 );
if 0
        nDialRetVal = isdrvact ( ld_sw_int );
        if ( nDialRetVal != 1 ) {
            nVRetVal = RC_NOLINE;
            goto done;
        }
endif /*
         * Shut the system down.  Ignore the return code; we don't
         *      care if the system is already initialized or not.
         */
        nDialRetVal = stopsys ( );

if DO_SETXPARM

/*
         * Initialize the Dialogic system.
         */
        clrdcb ( &My_dcb );
if defined(E_W)                    /* Windows */
        alloc_DOS_mem (
                       sizeof ( My_dcb ),
                       &dcb_DosPointer,
                       &dcb_ProtectedSelector,
                       &dcb_ProtectedPointer
                     );
        if ( dcb_ProtectedSelector == 0 ) {
            nVRetVal = RC_RAMFULL;
            goto done;
        }
        memcpy (
                 ( void * ) dcb_ProtectedPointer,    /* dest */
                 ( void * ) &My_dcb,/* source */
                 sizeof ( My_dcb )
               );
```

- 294 -

```
        #endif
           nDialRetVal = setxparm (
        #if defined(E_W)              /* Windows */
                               dcb_DosPointer
        #else
                               &My_dcb
        #endif
                );

        #if defined(E_W)              /* Windows */
            free_DOS_mem ( &dcb_DosPointer, &dcb_ProtectedSelector,
                                               &dcb_ProtectedPointer );
        #endif
            switch ( nDialRetVal ) {
               case E_SUCC:           /* Function was successful. */
                   break;
               case E_BADDL:          /* D4x hardware error. */
                   nVRetVal = RC_NOLINE;
                   goto done;
               default:               /* some unknown error */
                   nVRetVal = RC_INTERNALLINE;
                   goto done;
            }
        #endif
            nDialRetVal = startsys (
               ld_hw_irq,   /* HW interrupt level */
               SM_EVENT,    /* use Event mode */
               0,           /* use buffers specified to driver */
               0,           /* use buffers specified to driver */
               &nActualLines    // retval -- number of lines available
               );

switch ( nDialRetVal ) {
               case E_SUCC:          /* Function was successful. */
                   break;
               case E_FAILST:        /* Board failed self test. */
               case E_SACT:          /* System already active. */
               case E_SNACT:         /* System not active. */
               case E_BADDL:         /* D4x hardware error. */
               case E_BADINT:        /* Interrupt level not available. */
                   nVRetVal = RC_NOLINE;
                   goto done;
               default:              /* some unknown error */
                   nVRetVal = RC_INTERNALLINE;
                   goto done;
            } if defined(E_W)             /* Windows */
            /* allocate memory for Check_For_Event */
            alloc_DOS_mem (
                           sizeof ( EVTBLK ),
                           &cfe_DosPointer,
                           &cfe_ProtectedSelector,
                           &cfe_ProtectedPointer
                );
            if ( cfe_ProtectedSelector == 0 ) {
               nVRetVal = RC_RAMFULL;
               goto done;
            }
60      #endif
```

ATTORNEY DOCKET NO: VOYS2220WSW
wsw/voys/2220.001

- 295 -

```
            if ( nActualLines > MAX_LINES )
                nActualLines = MAX_LINES;
            if ( nActualLines > MAX_AL )
                nActualLines = MAX_AL;
            /* initialize array of active line states */
            for ( aline_num = 0; aline_num < MAX_AL; aline_num++ ) {
                lp = &line[aline_num];
                lp->nLineNum = aline_num;
                lp->bConnected = FALSE;
                lp->bCmdInProgress = FALSE;
                lp->timeout = 0;
                lp->bUserIsOffHook = FALSE;
                lp->bCardIsOffHook = FALSE;
                lp->num_events = 0;

lp->plist_count = 0;
                lp->open_file = ( -1 );
                for ( ifile_num = 0; ifile_num < MAX_IFILE; ifile_num++ )
                    lp->ifile[ifile_num].ifhandle = ( -1 );
                lp->num_openifile = 0;
            }

            Initialized = TRUE;
            nVRetVal = RC_SUCCEED;

/*
             * See if we have voice recognition capabilities. They are
             *     optional; not having them is not an error.
             */
            vr_Initialize ( );

Check_For_Event ( &GotEvent );   /* !!! */
        done:
            return ( nVRetVal );
        }

40
        /****************************************/ int     ld_Shutdown ( void )
        {
45          int     nVRetVal;    // Voysys return value
            int     nDialRetVal; // Dialogic return value
            int     aline_num;   /* active line num (0 to MAX_AL-1) */
            int     ifile_num;   /* indexed file number (0 to
                                                      MAX_IFILE-1) */
            boolean    bNeedToWait;
            int        nLineNum;

if ( !Initialized ) {
                nVRetVal = RC_NOTINITIALIZED;
                goto done;
            }

// abort any command in progress on any line
            bNeedToWait = FALSE;
            for ( nLineNum = 0; nLineNum < MAX_AL; nLineNum++ ) {
                lp = &line[nLineNum];
```

ATTORNEY DOCKET NO: VOYS2220WSW
wsw/voys/2220.001

- 296 -

```
            if ( lp->bCmdInProgress ) {
                if ( lp->cmd.nCommand != DVRC_DISCONNECT ) {
                    lp->nCmdStage = SHUTDOWN_STAGE;
                }
                bNeedToWait = TRUE;
            }
        }
        if (bNeedToWait) {
            nVRetVal = RC_BUSYLINE;
            goto done;
        }

// fail if any line is connected
        for ( nLineNum = 0; nLineNum < MAX_AL; nLineNum++ ) {
            lp = &line[nLineNum];
            if ( lp->bConnected ) {
                nVRetVal = RC_BUSYLINE;
                goto done;
            }
        }

Initialized = FALSE;

/*
         * Shut down voice recognition (if any).
         */
        vr_Shutdown ( );

/*
         * Shut the system down.
         */
        nDialRetVal = stopsys ( );

switch ( nDialRetVal ) {
            case E_SUCC:        /* Function was successful. */
                break;
            case E_SNACT:       /* System not active. */
                break;
            default:            /* some unknown error */
                nVRetVal = RC_INTERNALLINE;
                goto done;
        } for ( aline_num = 0; aline_num < MAX_AL; aline_num++ ) {
            /* close any files left open (should never happen) */
            if ( line[aline_num].open_file >= 0 )
                close ( line[aline_num].open_file );
            /* close any indexed files that are open */
            for ( ifile_num = 0; ifile_num <
                         line[aline_num].num_openifile; ifile_num++ ) {
                if ( line[aline_num].ifile[ifile_num].ifhandle >= 0 )
    {
                    close ( line[aline_num].ifile[ifile_num].ifhandle);
                    line[aline_num].ifile[ifile_num].ifhandle = ( -1 );
                }
            }
            line[aline_num].num_openifile = 0;
        }
    #if defined(E_W)            /* Windows */
        /* free memory for Check_For_Event */
```

- 297 -

```
        free_DOS_mem ( &cfe_DosPointer,  &cfe_ProtectedSelector,
endif                                      &cfe_ProtectedPointer );

nVRetVal = RC_SUCCEED;

done:
        return ( nVRetVal );
}

/*****************************************/
// handle event that came from above (from application)
int ld_Process_Event (
        const   UINT      message,    // Windows message number
        const   WPARAM    wParam,     // parameter
        const   LPARAM    lParam      // parameter
                )
{
    int             nVRetVal;    // Voysys return value if ( !Initialized ) {
        nVRetVal = RC_NOTINITIALIZED;
        goto done;
    }

Debug ( 1, sprintf ( Debug_buf, "LD_Dial/ld_Process_Event:
discard event 0x%04X", message ) );

nVRetVal = RC_SUCCEED;

done:
    return ( nVRetVal );
}

/*****************************************/
```

ATTORNEY DOCKET NO: VOYS2220WSW
wsw/voys/2220.001

We claim:

1. Telephony server apparatus, for use with a plurality of telephony channels, comprising:

a processor structure;

channel control hardware coupled to said telephony channels and to said processor structure; and a memory structure having stored therein a plurality of channel programs each associated with a respective one of said telephony channels, multi-tasking operating system software instructions executable by said processor structure, database engine software instructions executable by said processor structure under a different task of said operating system for each of said telephony channels, and a database, said database engine software instructions including instructions which, when executing under a given task of said operating system, interpret the channel program associated with the telephony channel of said given task and perform both database and telephony operations in response to such channel program associated with the telephony channel of said given task, said database operations including at least one operation from the group consisting of reading data from and writing data to said database, and said telephony operations including at least one operation from the group consisting of speaking a predefined prompt onto the telephony channel associated with the given task, receiving and storing DTMF-encoded input from the telephony channel associated with the given task, and recording audio input from the telephony channel associated with the given task.

2. Apparatus according to claim 1, wherein said processor structure includes no more than one processor.

3. Apparatus according to claim 1, wherein said memory structure includes both semiconductor memory and rotating memory.

4. Apparatus according to claim 1, wherein each of said tasks includes an executable portion and a read-write data portion, the read-write data portion being separate for each of said tasks, and the executable portion being common to all of said tasks.

5. Apparatus acording to claim 4, wherein the read-write data portion of the task associated with each particular one of said telephony channel includes the channel program associated with said particular telephony channel, and wherein all of said channel programs are the same.

6. Apparatus according to claim 1, wherein said database operations include all operations from said group consisting of reading data from and writing data to said database, and wherein said telephony operations include all operations from said group consisting of speaking a predefined prompt onto the telephony channel associated with the given task, receiving and storing DTMF-encoded numerical input from the telephony channel associated with the given task, and digitally recording audio input from the telephony channel associated with the given task.

7. Apparatus according to claim 1, wherein said telephony operations further include the operation of waiting for a ring signal from the telephony channel associated with the given task.

8. Apparatus according to claim 1, wherein said telephony operations further include the operation of answering a call from the telephony channel associated with the given task.

9. Apparatus according to claim 1, wherein said telephony operations further include the operation of hanging up a call on the telephony channel associated with the given task.

10. Apparatus according to claim 1, wherein said telephony operations further include the operation of dialing a call on the telephony channel associated with the given task.

11. Telephony server apparatus, for use with a first telephony channel, comprising:

a processor structure;

channel control hardware coupled to said first telephony channel; and a memory structure having stored therein a database and software instructions executable by said processor structure, said software instructions including:

a database language sequencer;

a database control module having a plurality of procedures callable by said database language Sequencer for performing at least one of the database operations from the group consisting of reading selected data from and writing specified data to said database; and a telephony control module having a plurality of procedures callable by said database language sequencer for performing at least one of the telephony operations from the group consisting of speaking a predefined prompt onto the first telephony channel, receiving and storing DTMF-encoded input from the first telephony channel, and recording audio input from the first telephony channel, said database language sequencer calling said database control module procedures and said telephony control module procedures in a sequence defined by a program which satisfies predefined syntax rules of a predefined database language.

12. Apparatus according to claim 11, wherein said database language sequencer comprises:

said program; and an interpreter which interprets said program to develop said sequence in which said database language sequencer calls said database control module procedures and said telephony control module procedures.

13. Apparatus according to claim 11, wherein said database language sequencer comprises a product produced by the method comprising the steps of:

providing said program; and converting said program to software instructions executable by said processor structure.

14. Apparatus according to claim 11, wherein said processor structure includes no more than one processor.

15. Apparatus according to claim 11, wherein said memory structure includes both semiconductor memory and rotating memory.

16. Apparatus according to claim 11, wherein said database operations include all operations from said group consisting of reading data from and writing data to said database, and wherein said telephony operations include all operations from said group consisting of speaking a predefined prompt onto said first telephony channel, receiving and storing DTMF-encoded numerical input from said first telephony channel, and digitally recording audio input from said first telephony channel.

17. Apparatus according to claim 11, wherein said telephony operations further include the operation of waiting for a ring signal from said first telephony channel.

18. Apparatus according to claim 11, wherein said telephony operations further include the operation of answering a call from said first telephony channel.

19. Apparatus according to claim 11, wherein said telephony operations further include the operation of hanging up a call on said first telephony channel.

20. Apparatus according to claim 11, wherein said telephony operations further include the operation of dialing a call on said first telephony channel.

21. Apparatus according to claim 11, for use further with a second telephony channel, wherein said database language sequencer, said database control module and said telephony control module comprise first instantiations of said database language sequencer, said database control module and said telephony control module, respectively, and wherein said memory structure further has stored therein:

a second instantiation of each of said database language sequencer, said database control module and said telephony control module, the procedures of said second instantiation of said telephony control module speaking a predefined prompt onto said second channel, receiving and storing DTMF-encoded numerical input from said second channel, and digitally recording audio input from said second channel.

22. Apparatus according to claim 21, wherein said first and second instantiations of said database language sequencer share a common set of software instructions and have different instance data, wherein said first and second instantiations of said database control module share a common set of software instructions and have different instance data, and wherein said first and second instantiations of said telephony control module share a common set of software instructions and have different instance data, the instance data for said first instantiation of said telephony control module identifying said first telephony channel and the instance data for said second instantiation of said telephony control module identifying said second telephony channel.

23. Apparatus according to claim 22, wherein the common set of software instructions shared by said first and second instantiations of said database language sequencer includes an interpreter which interprets a database language program to develop said sequence in which said database language sequencer calls said database control module procedures and said telephony control module procedures, wherein the instance data of said first instantiation of said database language sequencer identifies a first program as the database language program to interpret, and wherein the instance data of said second instantiation of said database language sequencer identifies a second program as the database language program to interpret.

24. Apparatus according to claim 22, wherein said software instructions stored in said memory structure further include:

a channel server common to both said first and second instantiations of said telephony control module, said channel server performing said telephony operations on said first telephony channel in response to communications from said first instantiation of said telephony control module, and performing said telephony operations on said second telephony channel in response to communications from said second instantiation of said telephony control module.

* * * * *